(12) United States Patent
Benk et al.

(10) Patent No.: US 12,497,422 B2
(45) Date of Patent: Dec. 16, 2025

(54) SITE-SPECIFIC, KINETICALLY INERT CONJUGATION OF LABELS AND/OR CARRIERS TO TARGET MOLECULES SUCH AS His-TAGGED PROTEINS VIA METAL COMPLEX REAGENTS

(71) Applicants: Max-Planck-Gesellschaft zur Förderung der Wissenschaften e.V., Munich (DE); Universität Heidelberg, Heidelberg (DE)

(72) Inventors: Amelie S. Benk, Stuttgart (DE); Franziska Schenk, Aalen (DE); Seraphine Wegner, Münster (DE); Peter Comba, Wiesenbach (DE); Joachim P. Spatz, Stuttgart (DE)

(73) Assignees: Max-Planck-Gesellschaft zur Förderung der Wissenschaften e. V., Munich (DE); Universität Heidelberg, Heidelberg (DE)

( * ) Notice: Subject to any disclaimer, the term of this patent is extended or adjusted under 35 U.S.C. 154(b) by 978 days.

(21) Appl. No.: 17/620,073

(22) PCT Filed: Jun. 18, 2020

(86) PCT No.: PCT/EP2020/067046
§ 371 (c)(1),
(2) Date: Dec. 16, 2021

(87) PCT Pub. No.: WO2020/254539
PCT Pub. Date: Dec. 24, 2020

(65) Prior Publication Data
US 2022/0306670 A1    Sep. 29, 2022

(30) Foreign Application Priority Data
Jun. 18, 2019 (EP) .................................... 19180999

(51) Int. Cl.
| | |
|---|---|
| *C07F 15/06* | (2006.01) |
| *A61K 47/54* | (2017.01) |
| *A61K 47/64* | (2017.01) |
| *A61K 47/65* | (2017.01) |
| *C07K 1/13* | (2006.01) |
| *G01N 33/58* | (2006.01) |

(52) U.S. Cl.
CPC .......... *C07F 15/065* (2013.01); *A61K 47/547* (2017.08); *A61K 47/64* (2017.08); *A61K 47/65* (2017.08); *C07K 1/13* (2013.01); *G01N 33/585* (2013.01)

(58) Field of Classification Search
None
See application file for complete search history.

(56) References Cited

U.S. PATENT DOCUMENTS

| | | | |
|---|---|---|---|
| 4,431,666 | A | 2/1984 | Bulten et al. |
| 4,569,794 | A | 2/1986 | Smith et al. |
| 2003/0224974 | A1 | 12/2003 | Bolotin et al. |
| 2006/0093660 | A1 | 5/2006 | Bolotin et al. |
| 2008/0015263 | A1 | 1/2008 | Bolotin et al. |
| 2010/0069293 | A1 | 3/2010 | Bolotin et al. |
| 2013/0131283 | A1 | 5/2013 | Wang et al. |
| 2022/0324893 | A1* | 10/2022 | Benk ...................... A61K 47/65 |

FOREIGN PATENT DOCUMENTS

| | | |
|---|---|---|
| EP | 0497585 | 8/1992 |
| JP | 56-100796 | 8/1981 |
| JP | 2008/523054 | 7/2008 |
| JP | 2009-529501 | 8/2009 |
| WO | WO 1989/010772 | 11/1989 |
| WO | WO 1992/013965 | 8/1992 |

(Continued)

OTHER PUBLICATIONS

CAS Abstract and Indexed Compounds, E. Akkaya et al., 5 Journal of Physical Organic Chemistry, 540-548 (1992) (Year: 1992).*
Oxford Dictionary of Chemistry 169 (John Daintith ed., 6th ed., 2008) (Year: 2008).*
M. Smith et al., 5 Molecular BioSystems, 962-972 (2009) (Year: 2009).*
S. Mirozoeva et al. J. Med. Chem. 45, 563-566 (2002) (Year: 2002).*
A. Ondrus et al., Chem Commun., 4151-4165 (2009) (Year: 2009).*
M. Murthy, New Members of the Periodic Table, 40-41 (2017) (Year: 2017).*
A. Auer et al., 243 Sensors and Actuators B, 104-113 (2017) (Year: 2017).*
J. Russo et al., 192 Biomaterials, 171-178 (2019) (Year: 2019).*

(Continued)

*Primary Examiner* — Alexander R Pagano
(74) *Attorney, Agent, or Firm* — pH IP Law

(57) ABSTRACT

The present invention relates to means and methods for conjugating/attaching target molecules such as proteins to a label and/or carrier. Specifically, the present invention provides a complex comprising a metal cation coordinating (i) a metal cation ligand being a carbonate selected from $CO_3^{2-}$ and $HCO_3-$ and (ii) a metal cation chelating domain comprising a chelating ligand and a label and/or carrier. This complex can be used for attaching a label and/or a carrier to a target molecule, preferably a protein. The attachment of the label or carrier via the complex of the invention involves the replacement of the metal cation ligand with a coordinating group of the target molecule so that a product complex with the target molecule as primary ligand in the coordination sphere of the metal cation is formed. Accordingly, the present invention also provides for uses and methods involving the attachment of a label and/or carrier to a target molecule. Also provided are the products obtained by the labeling and or carrier-attaching methods of the invention and uses thereof. The invention further relates to methods for producing the complex of the invention and kits comprising the components for producing the complex of the invention.

13 Claims, 34 Drawing Sheets

Figure 1:
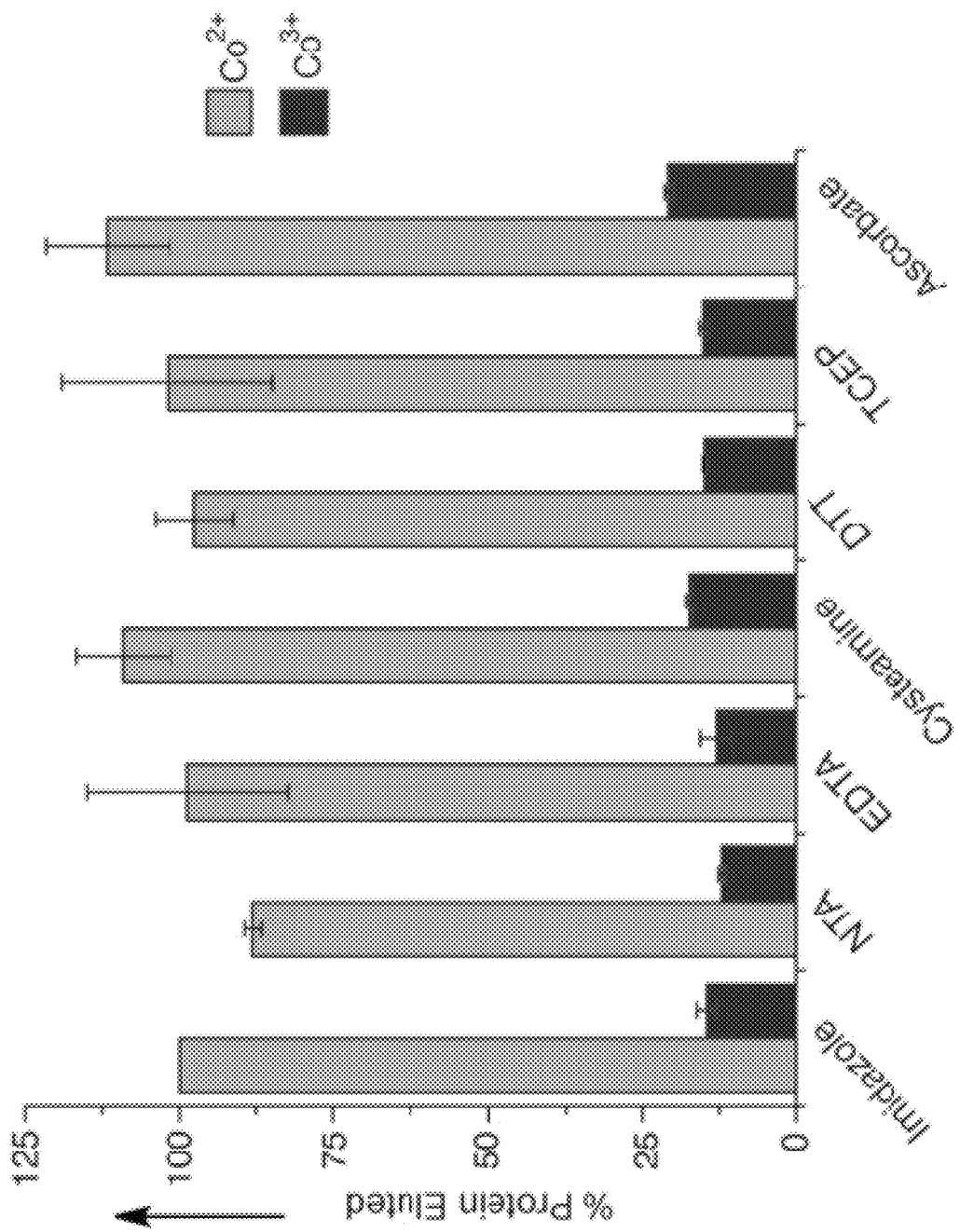

Specification includes a Sequence Listing.

(56) References Cited

FOREIGN PATENT DOCUMENTS

| WO | WO 1998/06739 | | 2/1998 | | |
| WO | WO 2002/33044 | | 4/2002 | | |
| WO | WO 2003/018756 | | 3/2003 | | |
| WO | WO 2003/072143 | | 9/2003 | | |
| WO | WO-03072143 | A1 * | 9/2003 | ............ | A61K 47/10 |
| WO | WO 2004/104023 | | 12/2004 | | |
| WO | WO 2005/112977 | | 12/2005 | | |
| WO | WO 2005/120700 | | 12/2005 | | |
| WO | WO-2005112977 | A2 * | 12/2005 | ............ | A61K 38/26 |
| WO | WO 2006/062391 | | 6/2006 | | |
| WO | WO 2007/104135 | | 9/2007 | | |
| WO | WO 2009/114520 | | 9/2009 | | |
| WO | WO 2011/031771 | | 3/2011 | | |
| WO | WO 2014/072525 | | 5/2014 | | |
| WO | WO-2014072525 | A1 * | 5/2014 | ............ | C07F 15/065 |
| WO | WO 2015/191797 | | 12/2015 | | |
| WO | WO 2020/254540 | | 12/2020 | | |

OTHER PUBLICATIONS

J. Schroder, Development and Optimization of Purification Processes and Protein Stabilization Methods for Enzymes Applied for Biocatalytical N-Acetylneuraminic Acid Synthesis (2020) (Year: 2020).*

S. Wegner et al., 52 Angew. Chem. Int. Ed., 7593-7596 (2013) (Year: 2013).*

S Wegner et al., 22 Chemistry a European Journal, 3156-3162 (2016) (Year: 2016).*

Block et al., "Chapter 27 Immobilized-Metal Affinity Chromatography (IMAC): A Review", *Methods in Enzymology, Academ. Press, USA*, 463, 439-473, 2009.

International Preliminary Report on Patentability for PCT/EP2020/067046 dated Dec. 21, 2021, 13 pages.

International Preliminary Report on Patentability for PCT/EP2020/067047 dated Dec. 21, 2021, 14 pages.

Office Action for Chinese application No. 202080044661.8 dated Jun. 29, 2023, 9 pages.

Office Action for Chinese application No. 202080044662.2 dated Jun. 29, 2023, 9 pages.

PCT International Search Report and Written Opinion issued in International Application No. PCT/EP2020/067046, mailed Jul. 17, 2020, 26 pages.

PCT International Search Report and Written Opinion issued in International Application No. PCT/EP2020/067047, mailed Jul. 20, 2020, 26 pages.

Search Report for European Application No. 19180999.5 dated Dec. 20, 2019, 17 pages.

Wegner & Spatz, "Cobalt(III) as a Stable and Inert Mediator Ion between NTA and His6-Tagged Proteins", *Angew. Chem. Int. Ed.*, 52:7593-7596, 2013.

Di Russo et al., "NTA-$Co^{3+}$-His $_6$ versus NTA-$Ni^{2+-His}$ $_6$ mediated E-Cadherin surface immobilization enhances cellular traction," Biomaterials 192:171-178, 2019.

Akkaya et al., "Synthesis and Transacylating Activity of Isomeric Co(III)-Cyclodextrin artificial Metaloenzymes", *Journal of Physical Organic Chemistry*, 5:540-548, 1992.

Office Communication issued in U.S. Appl. No. 17/620,087, mailed Dec. 26, 2024.

Park et al., "Different Origins of Strain-Induced Chirality Inversion of $Co^{2+}$-Triggered Supramolecular Peptide Polymers", *Chem. Mater.* 30:2074-2083, 2018.

CAS Abstract and Indexed Compounds, P. Whimp et al., 12 Journal of the Chemical Society [Section] A: Inorganic, Physical, Theoretical 1827-1830, 1966.

Office Communication issued in U.S. Appl. No. 17/620,087, mailed Mar. 28, 2025.

Whimp et al., "Some Cyclic Tetra-amines and their Metal-Ion Complexes. Part III. Complexes of Coblat(III) with Hexamethyl-1,4,8,11-tetra-azacyclotetradecane and Bidentate Ligands," Journal of the Chemical Society [Section] A: Inorganic, Physical, Theoretical 12:1827-1830, 1966.

* cited by examiner

Figure 2:
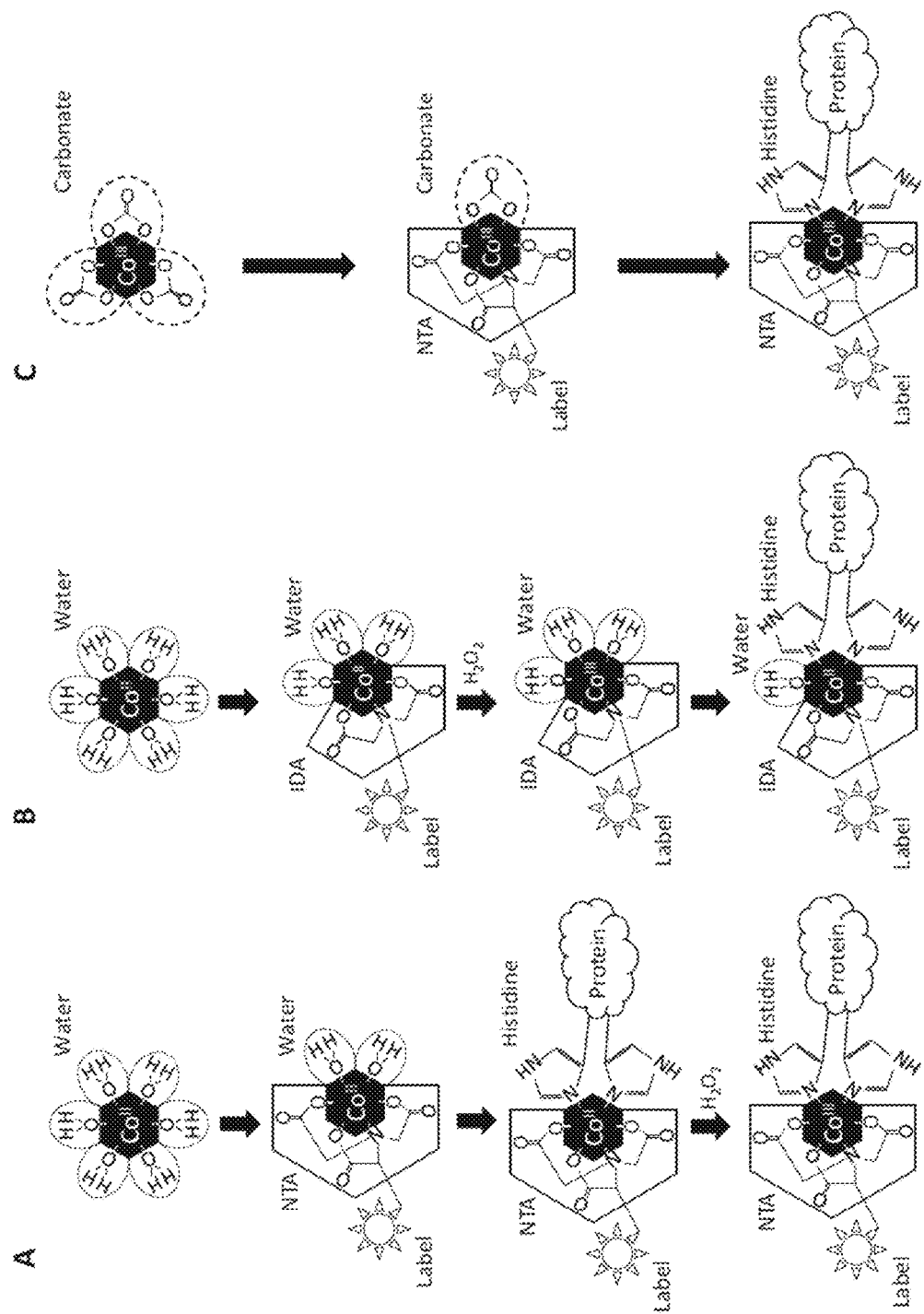

Figure 2, continued
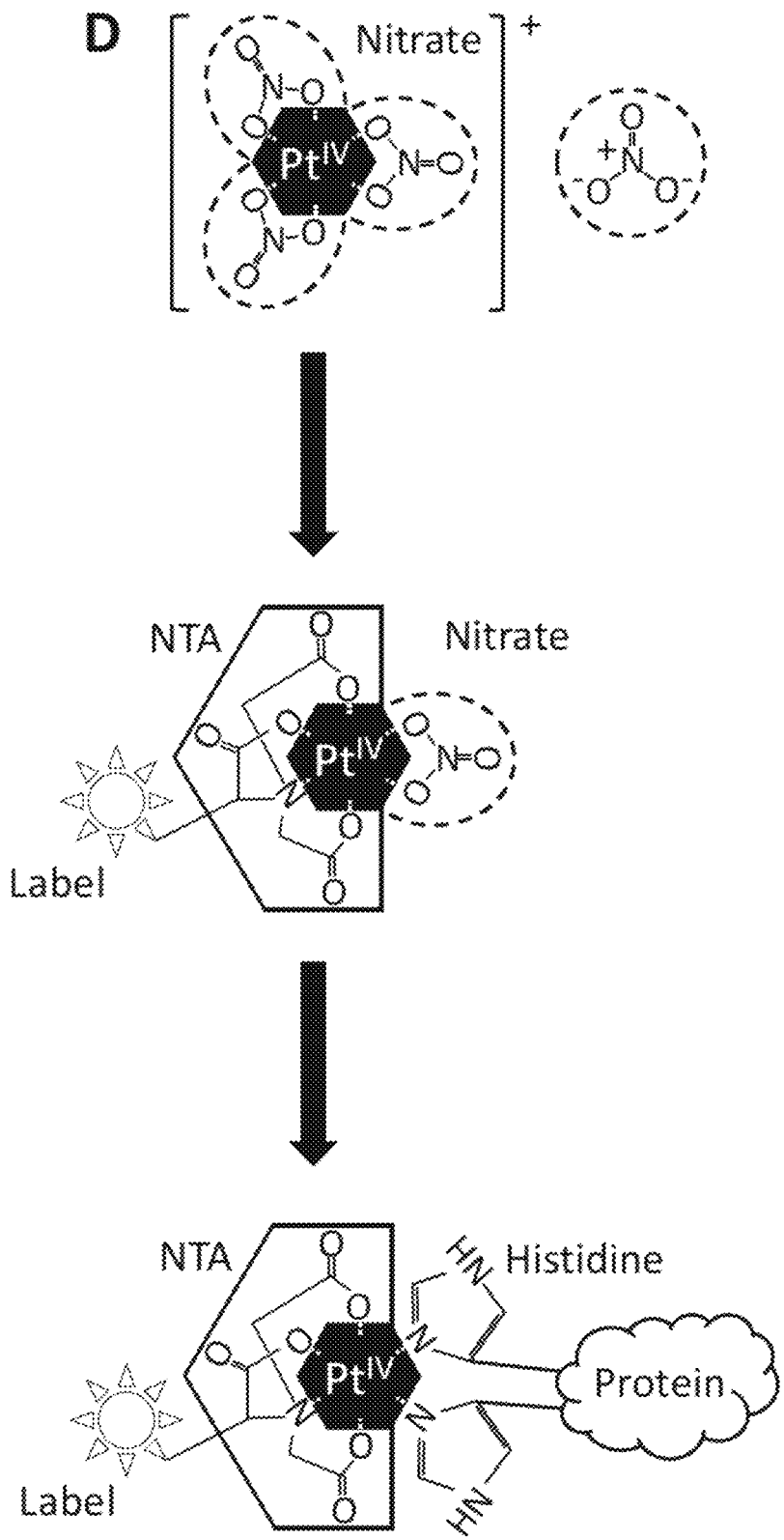

Figure 7:
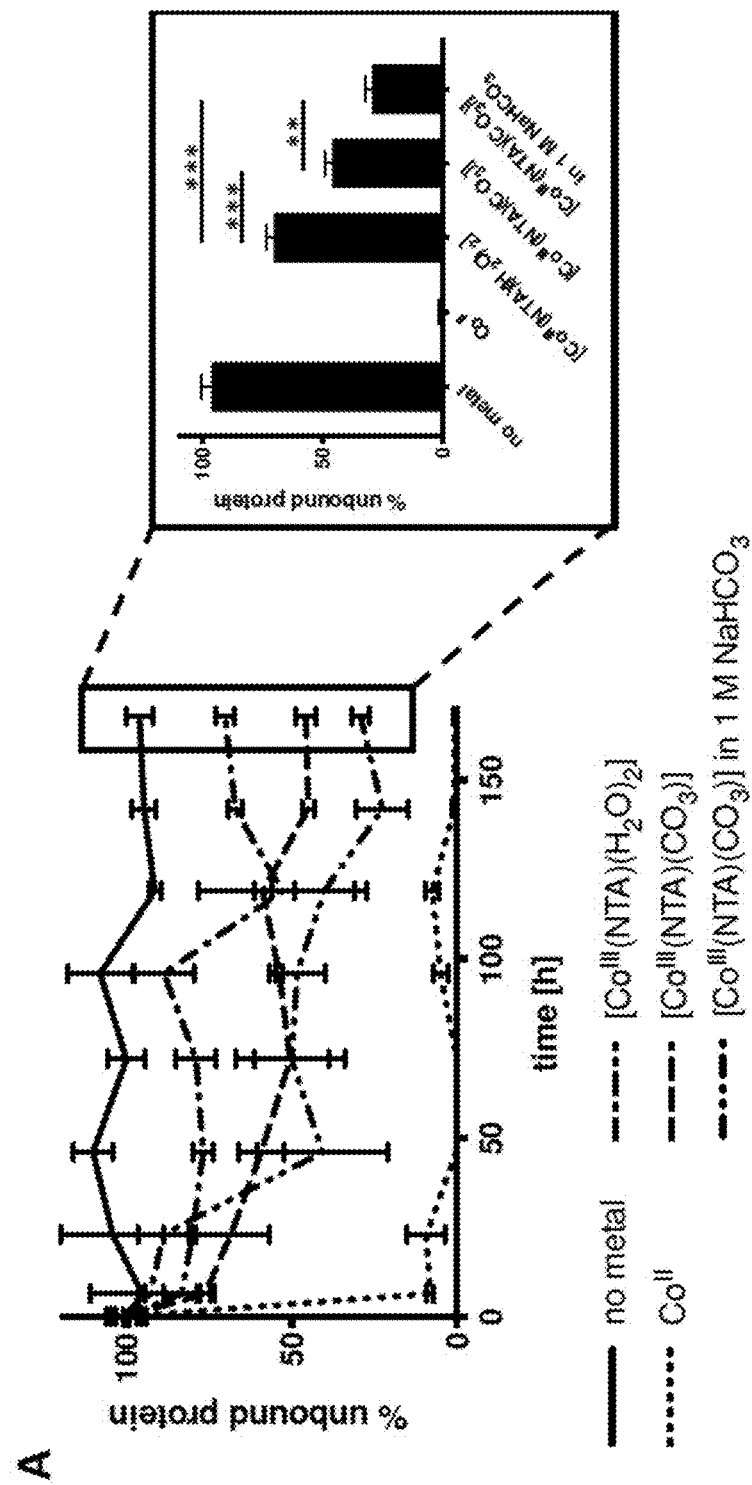

Figure 7, continued
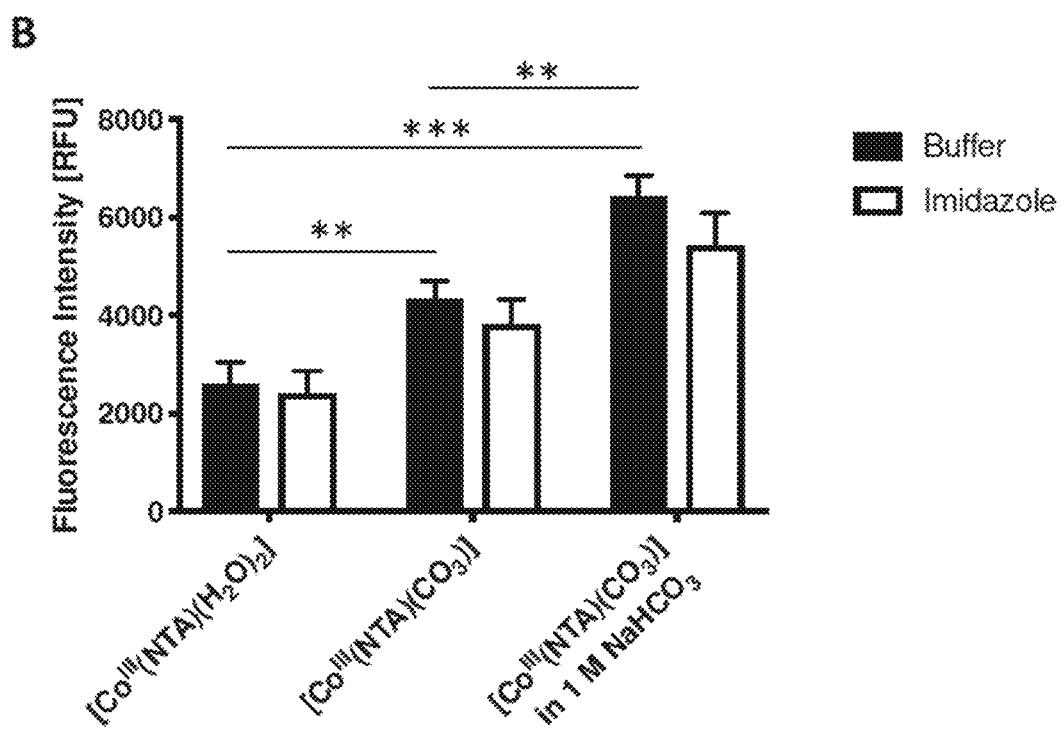

Figure 8:
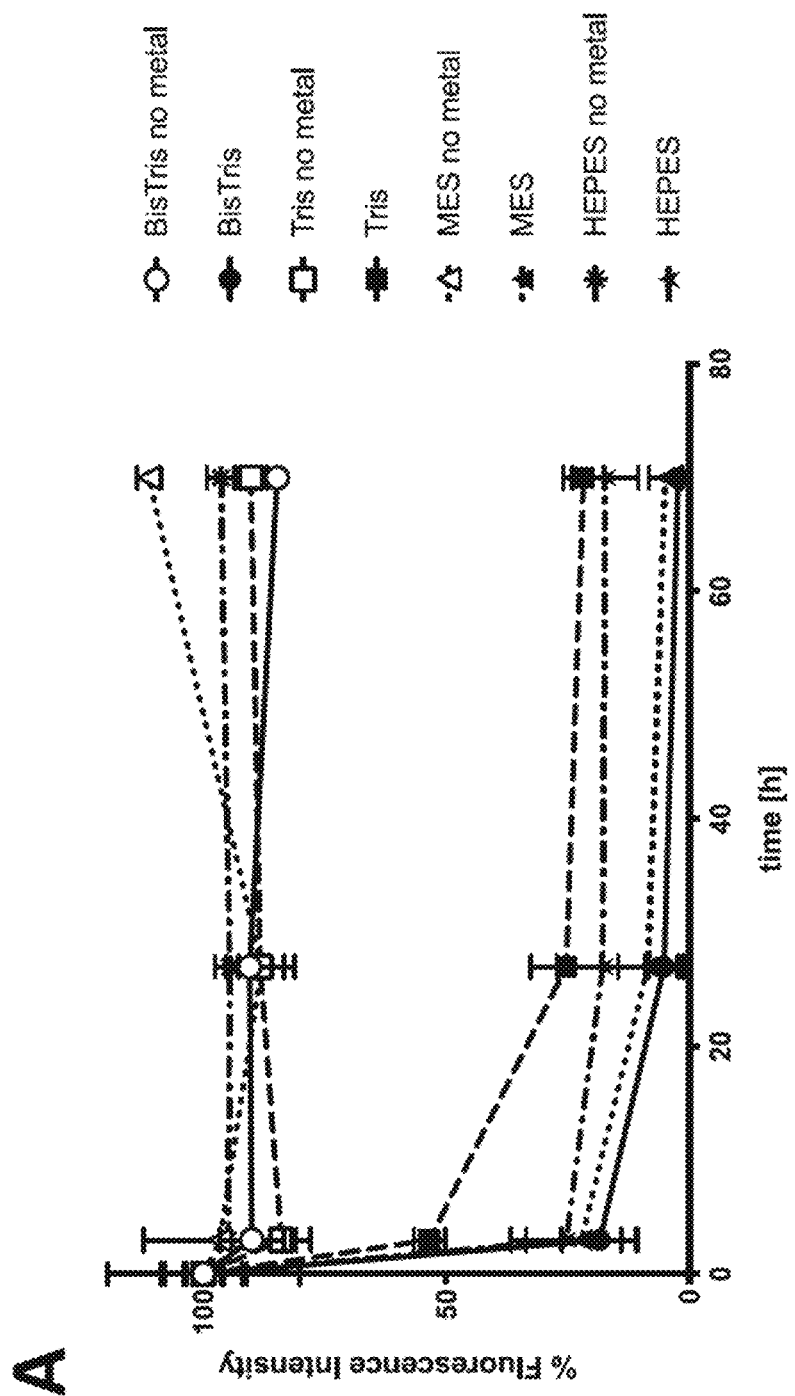

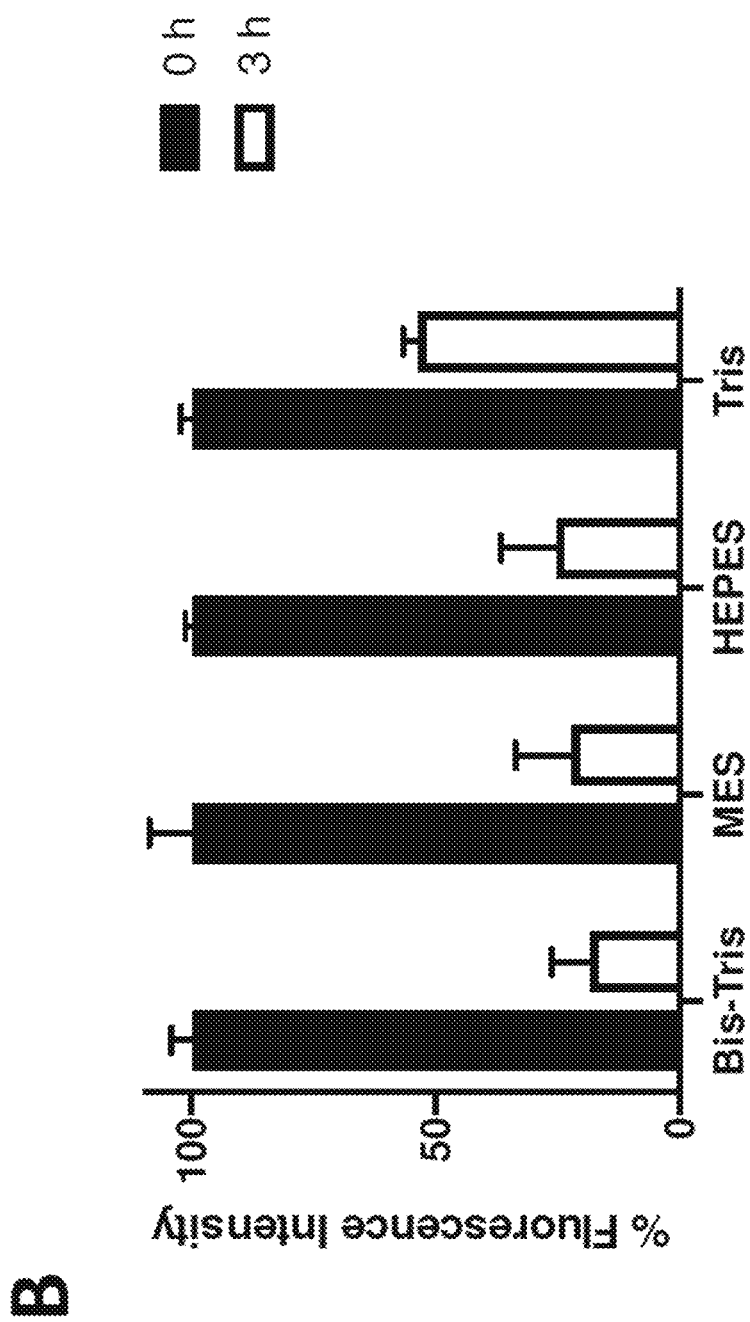
Figure 8, continued

Figure 10:
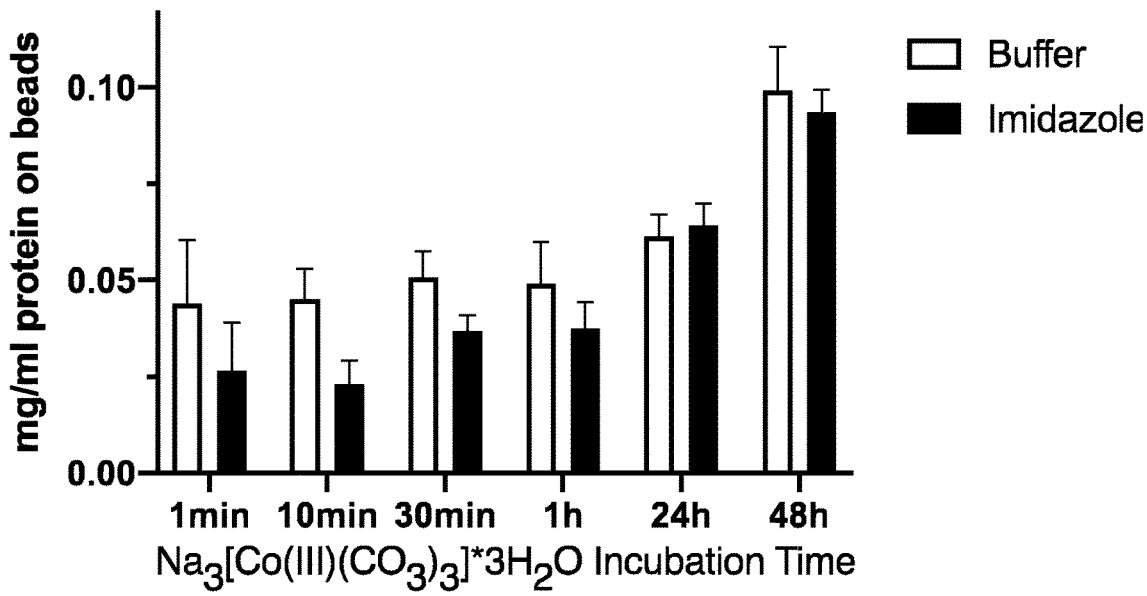
Figure 10:
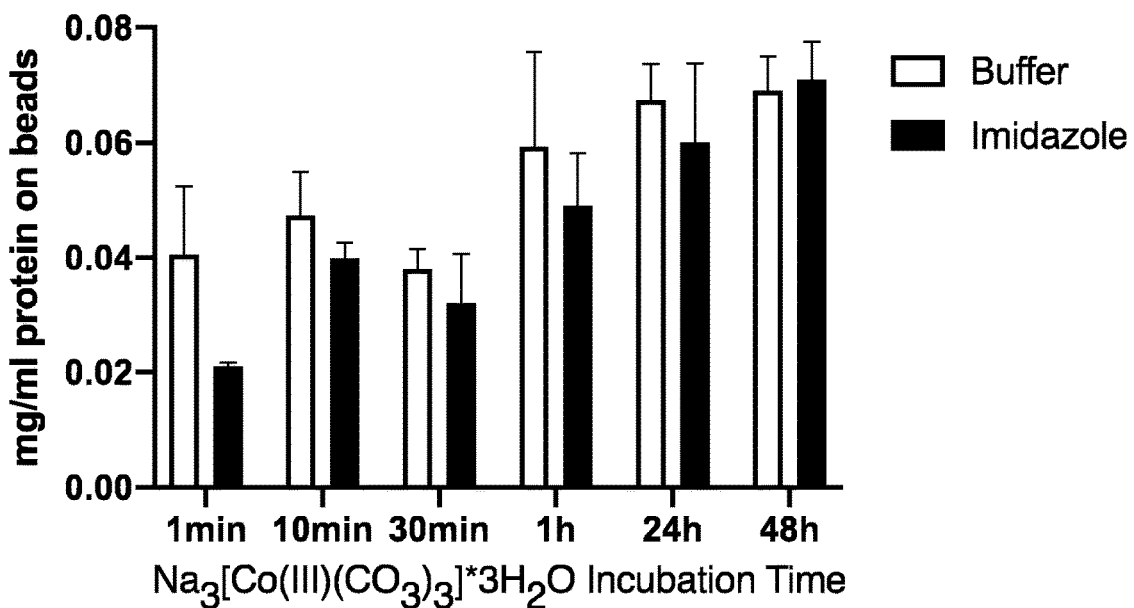

Figure 10, continued
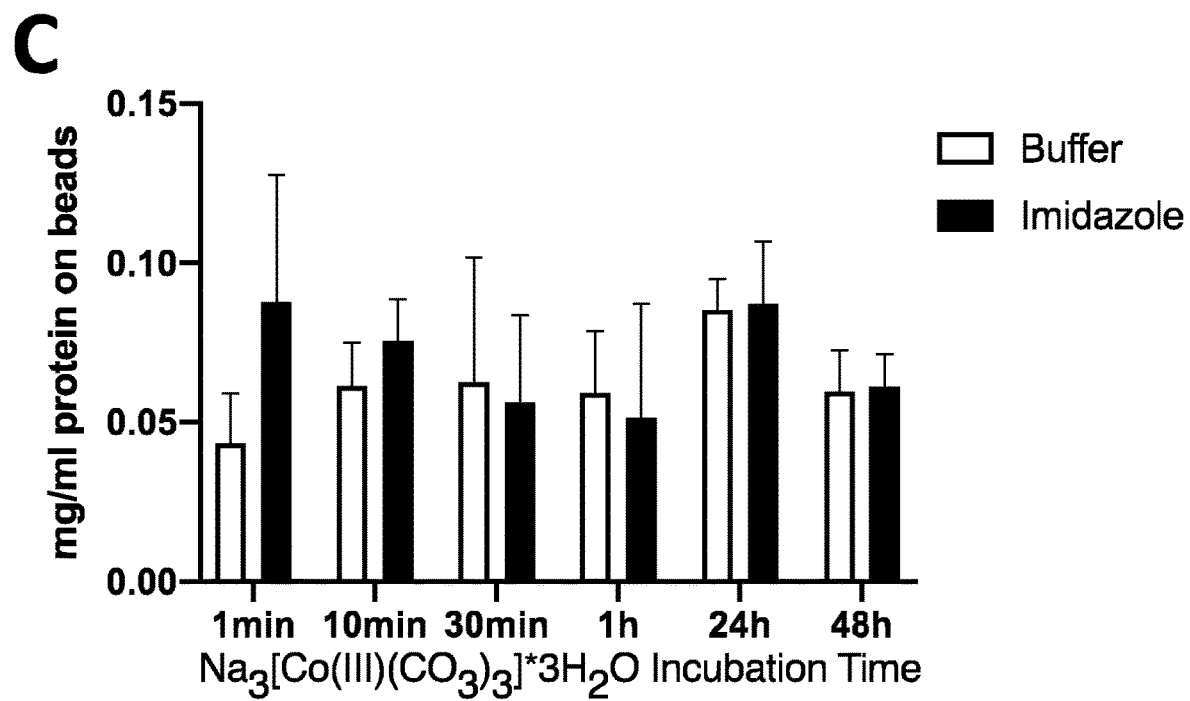

Figure 11:
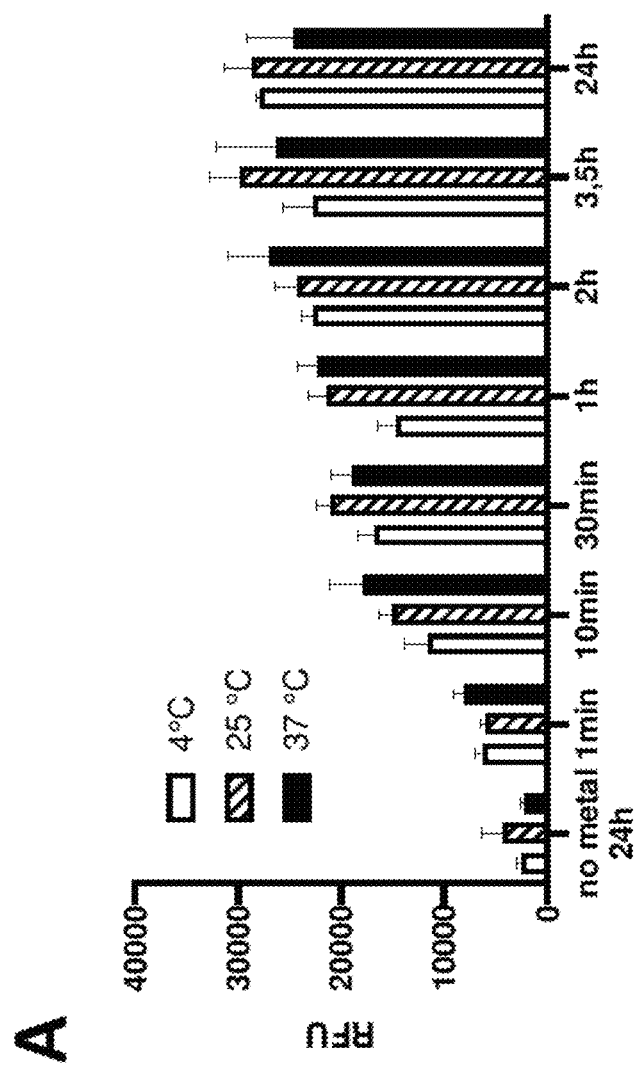

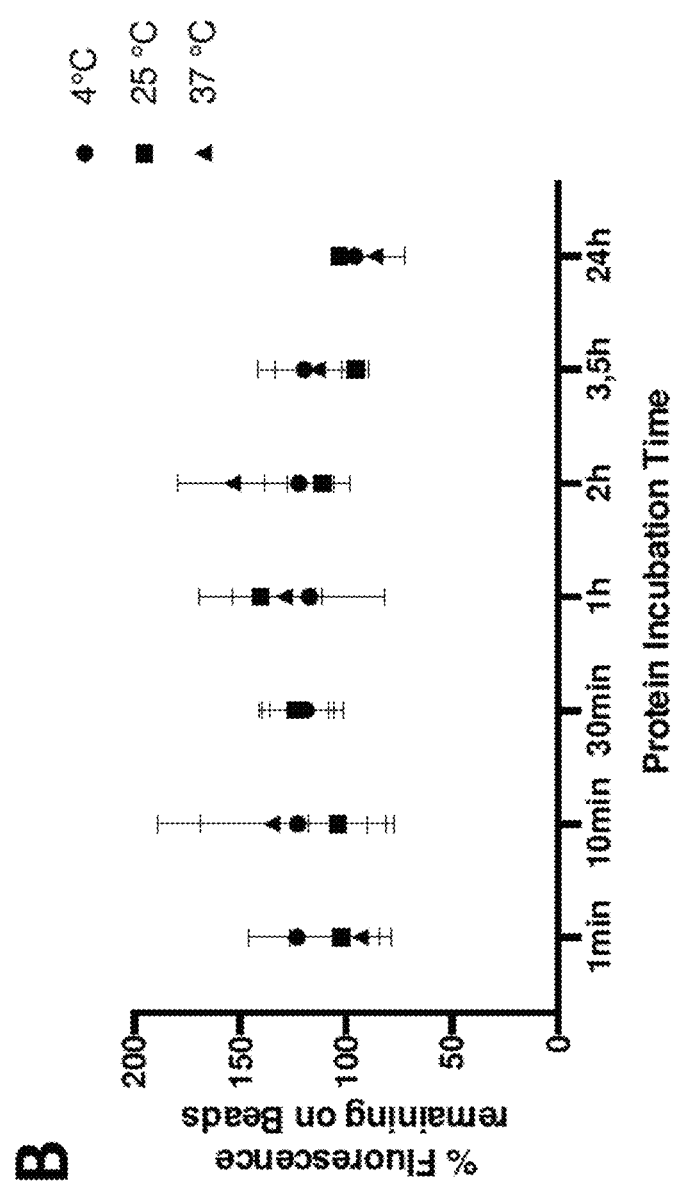
Figure 11, continued

Figure 14:
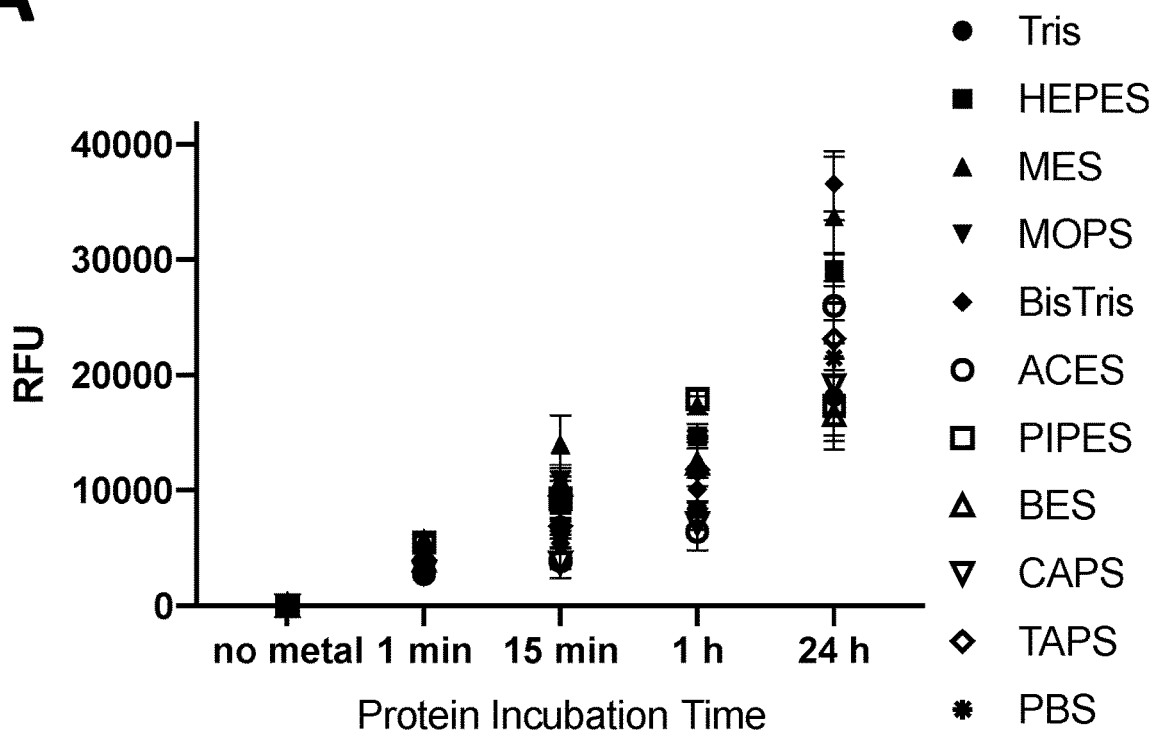
Figure 14:
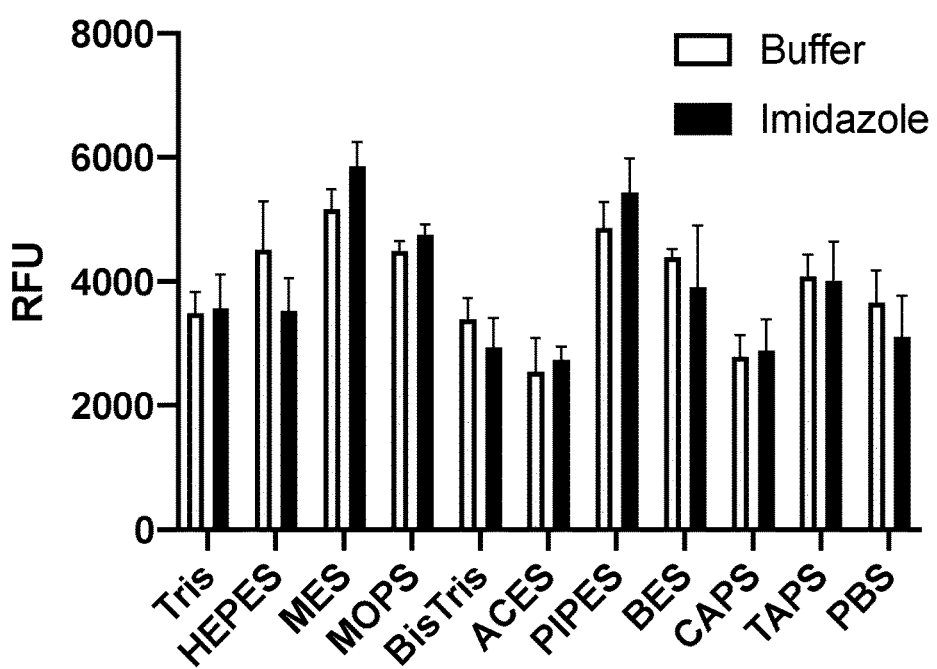

Figure 14, continued
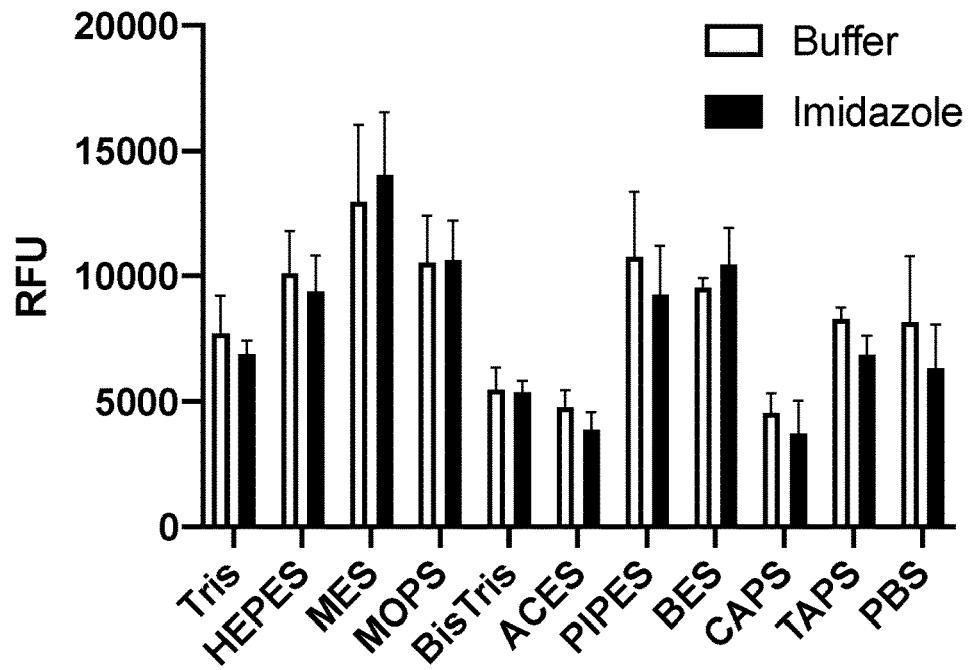
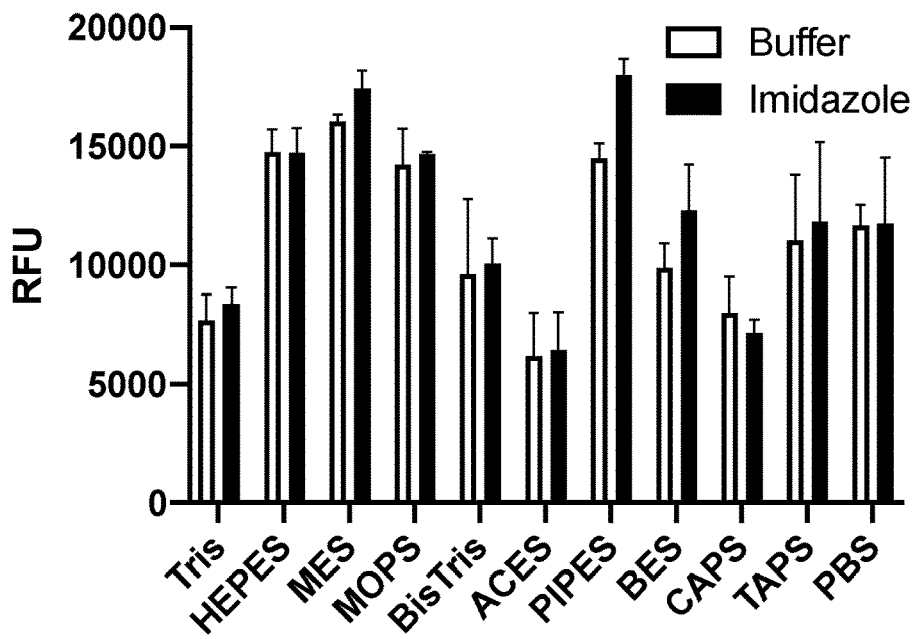

Figure 14, continued
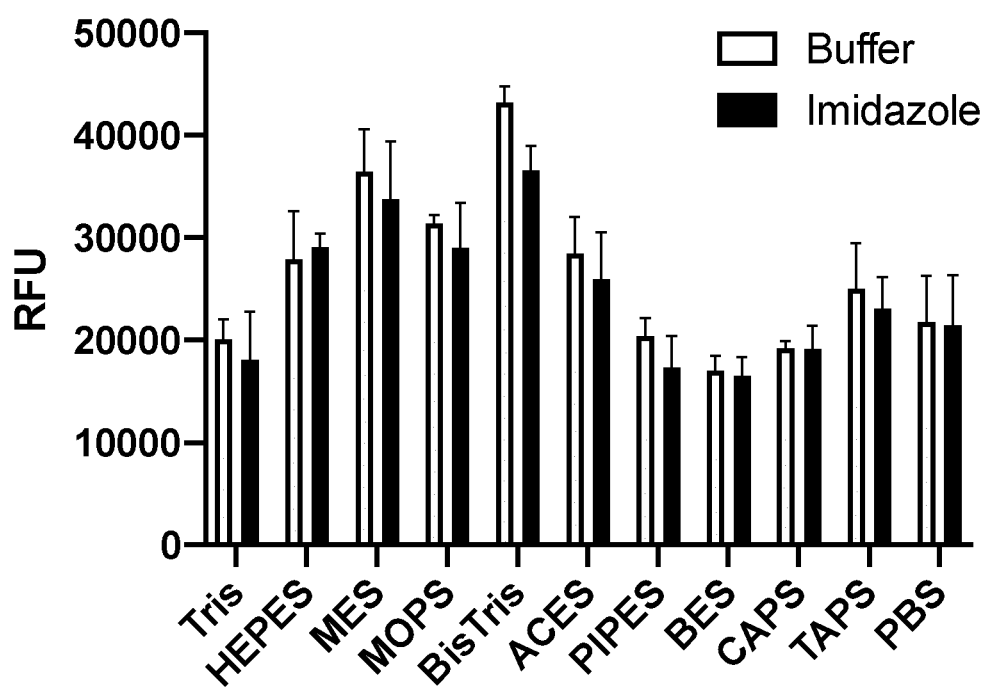

Figure 15:
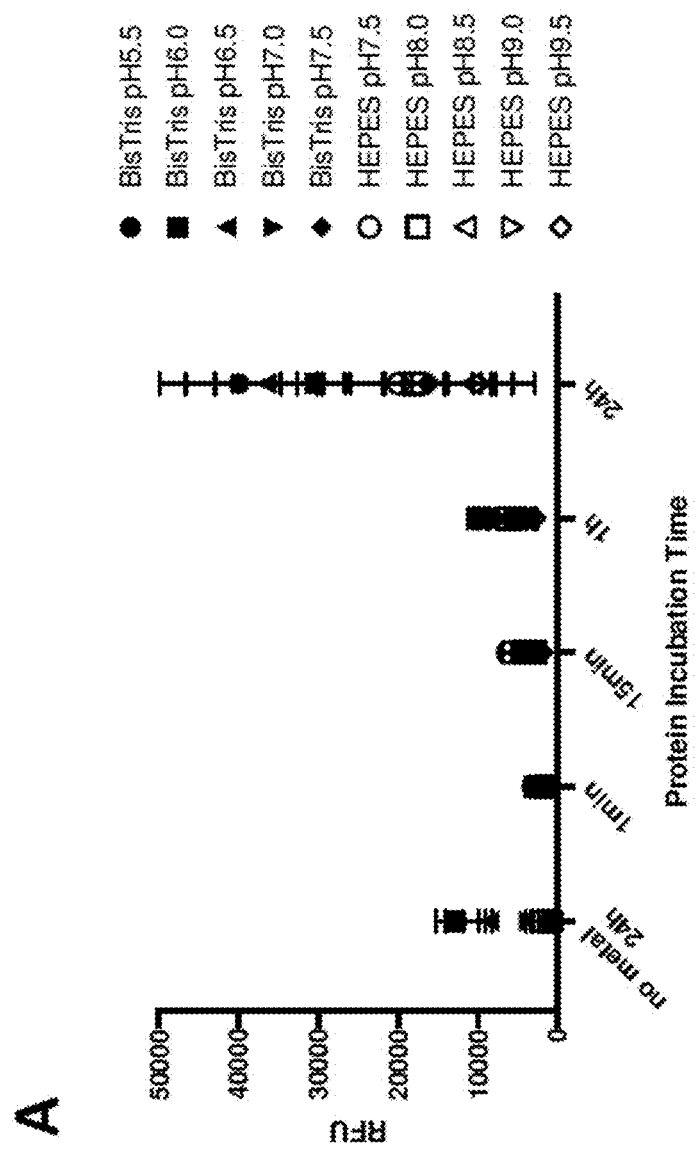

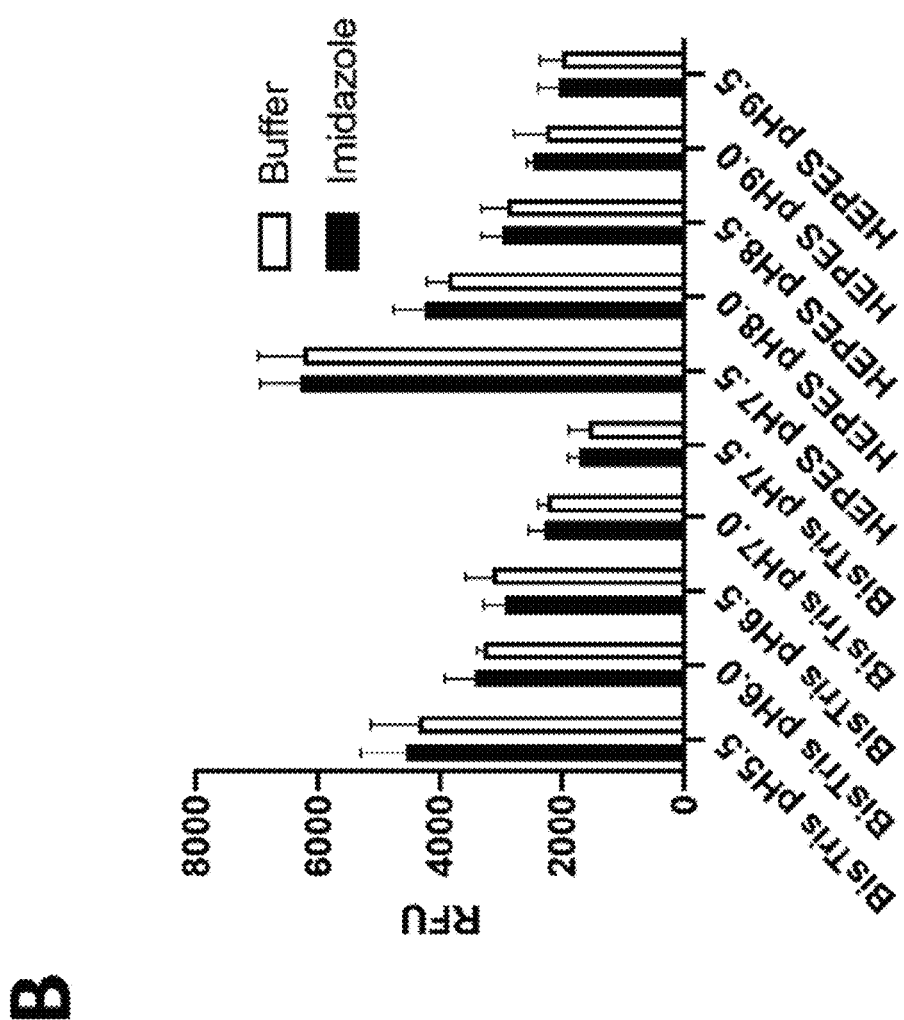
Figure 15, continued

Figure 16:
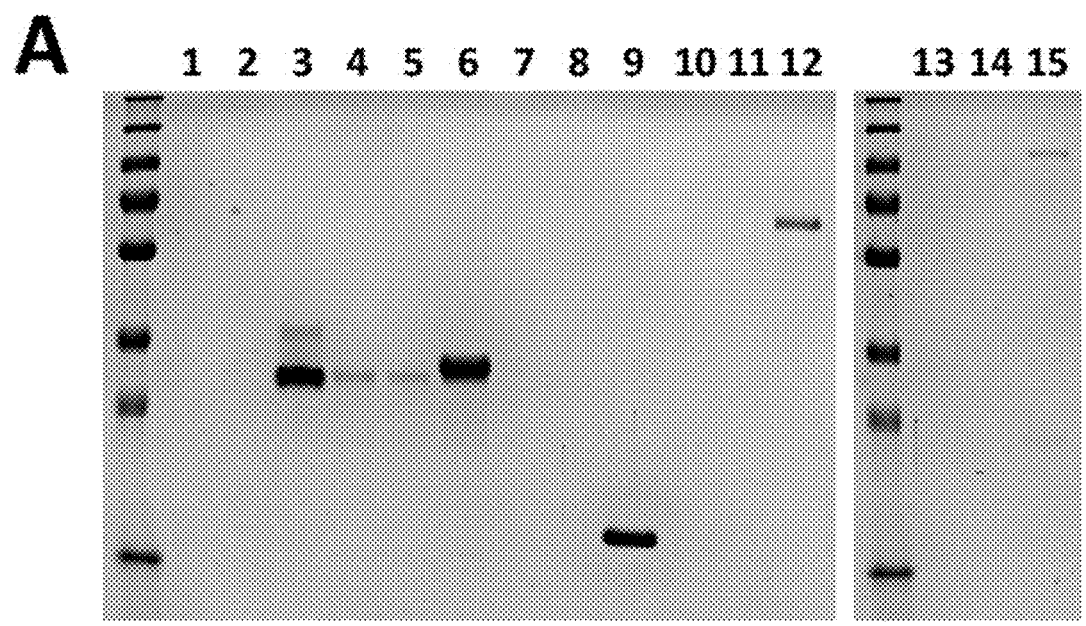
Figure 16:
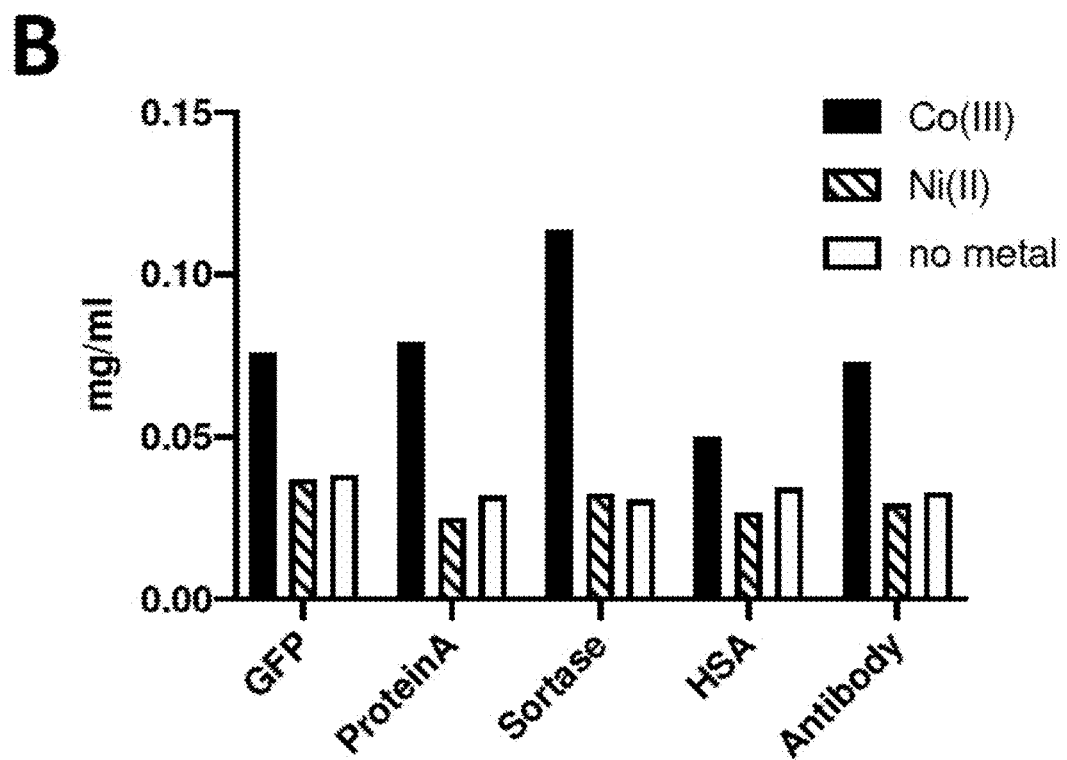

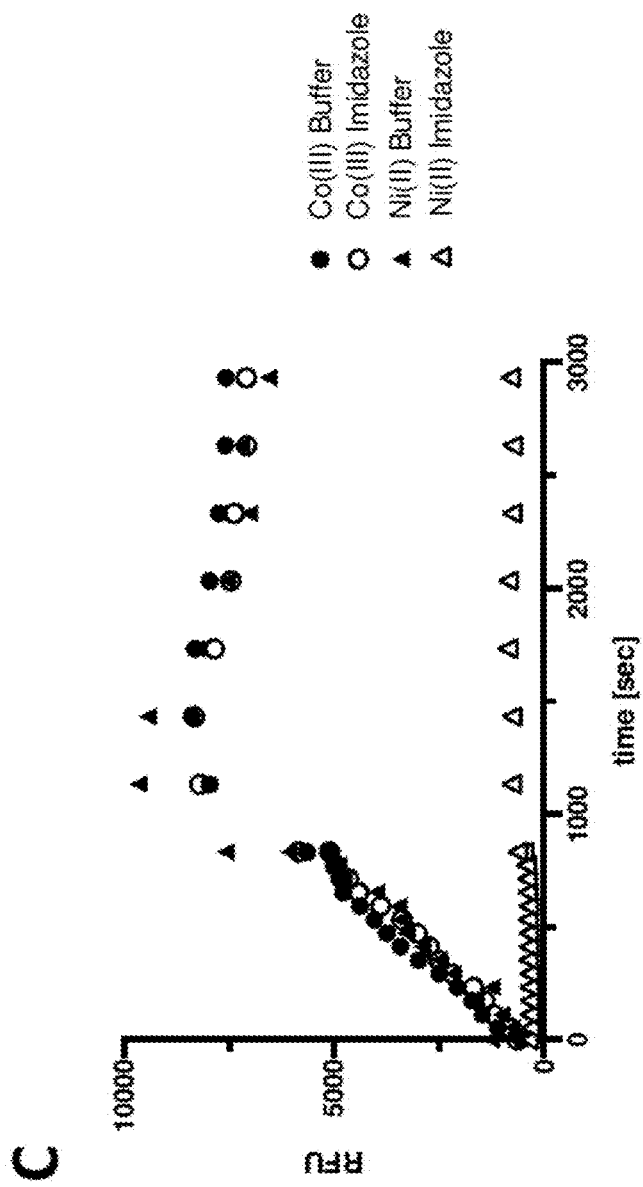
Figure 16, continued

Figure 16, continued
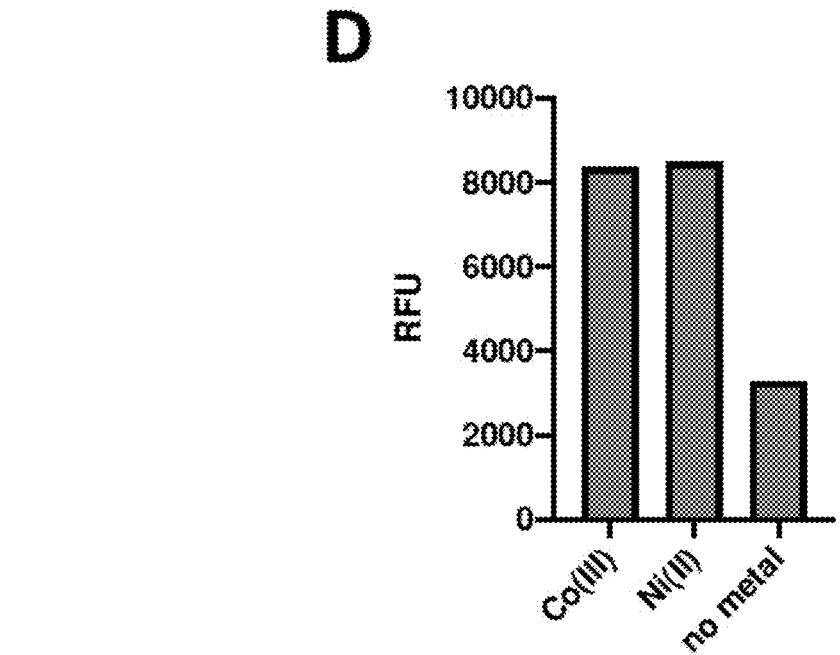
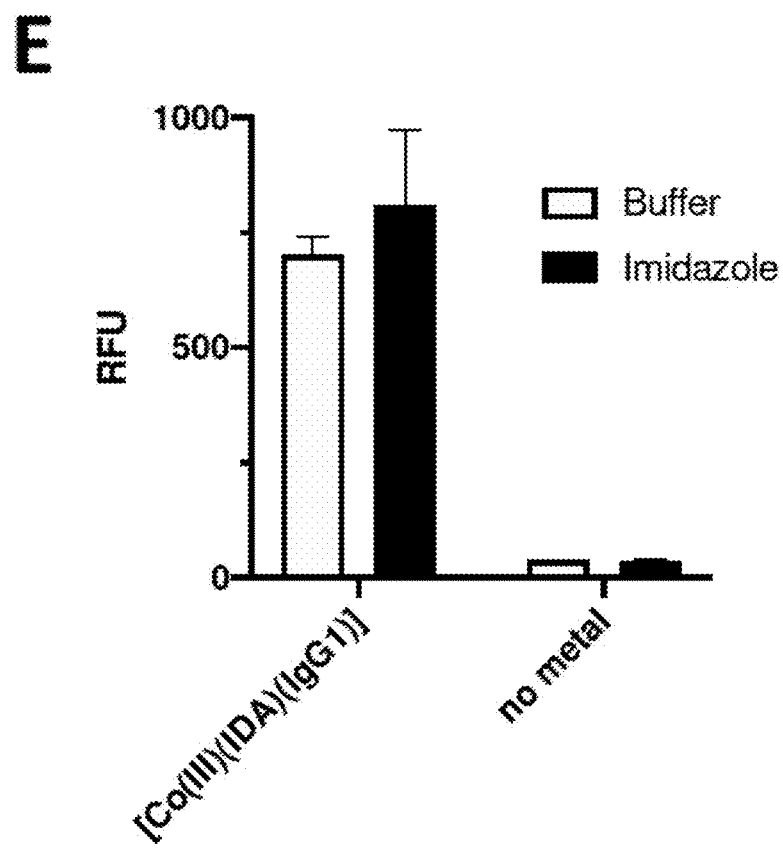

Figure 19:
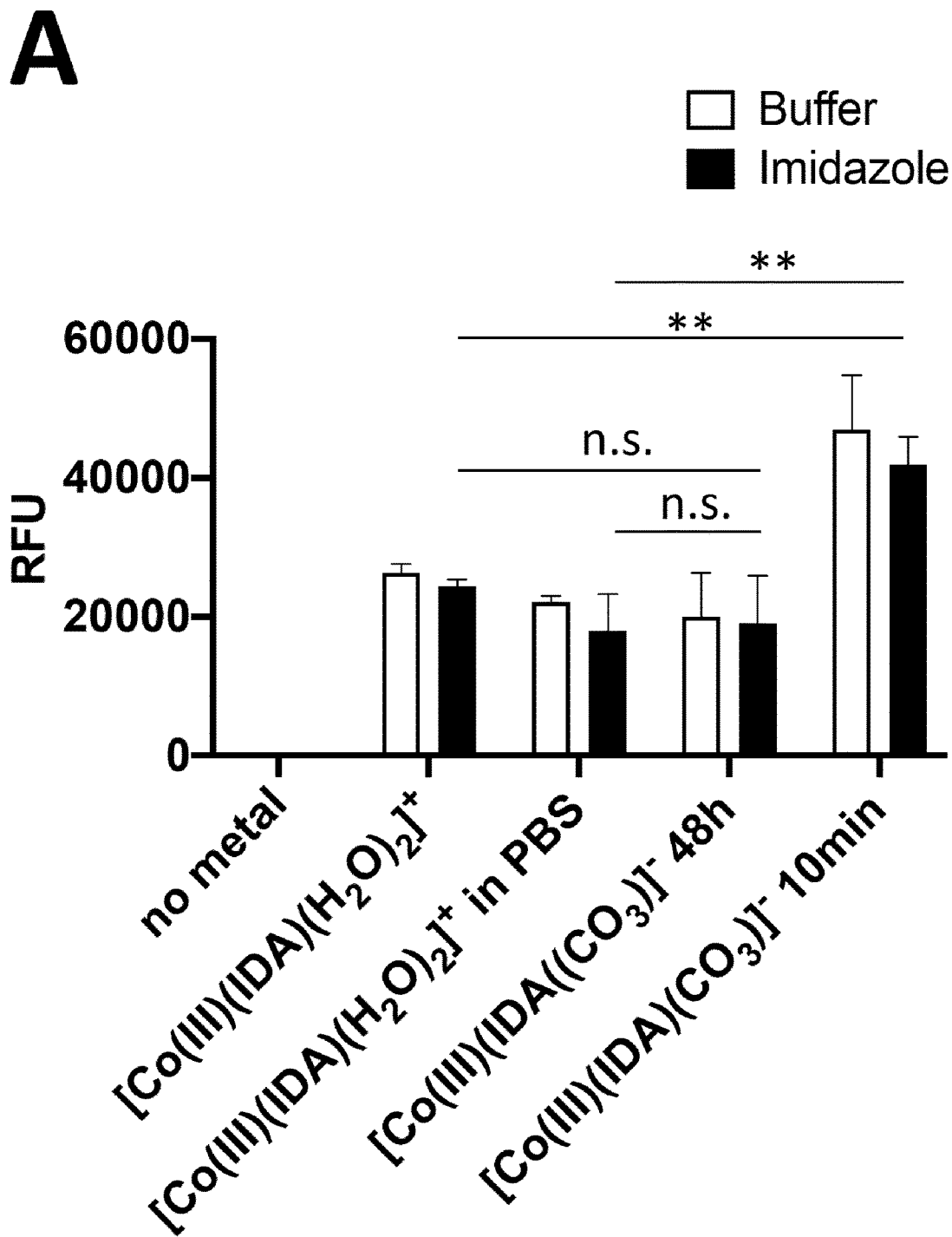

Figure 19, continued
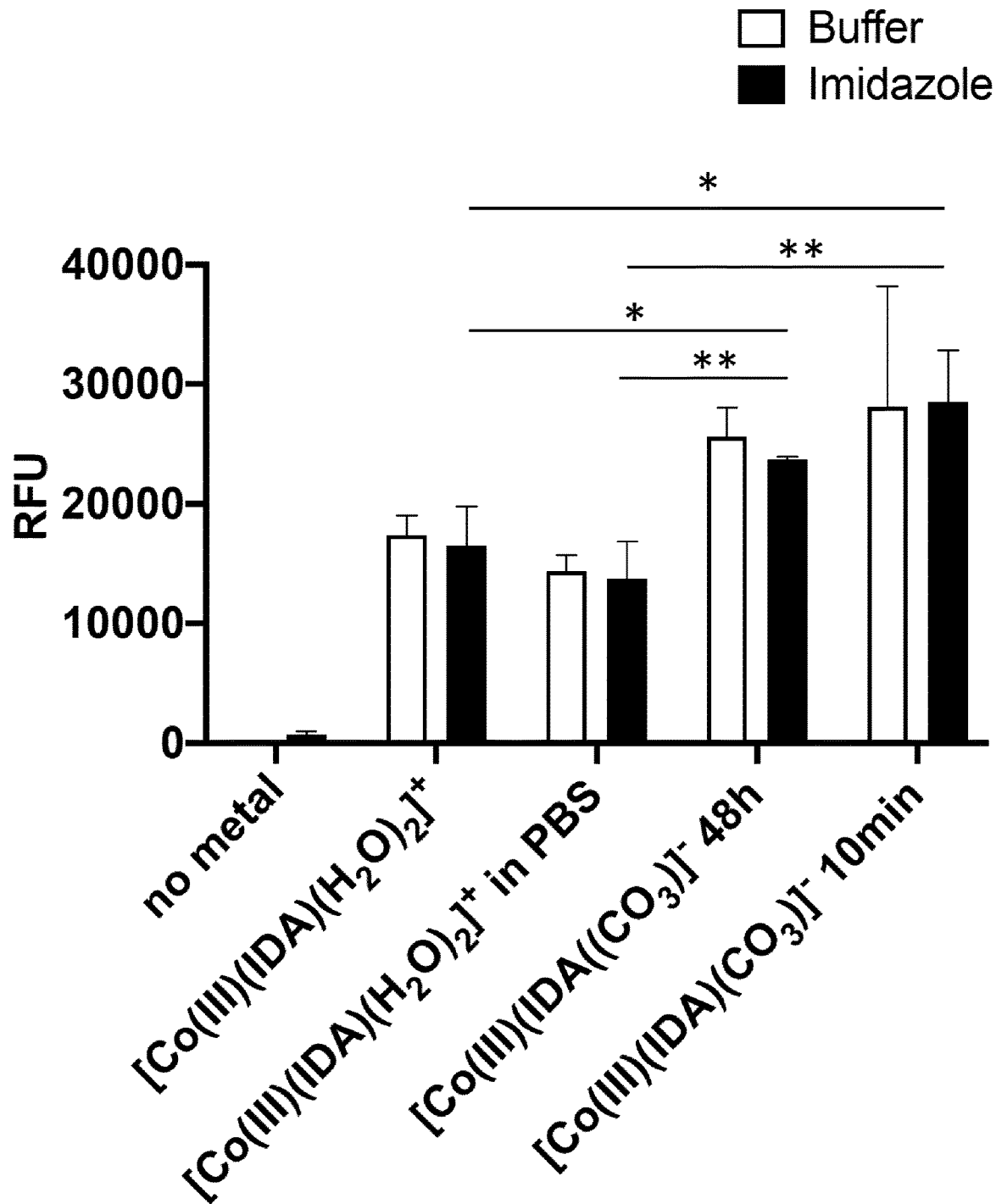

SEQUENCE LISTING

<160> NUMBER OF SEQ ID NOS: 16

<210> SEQ ID NO 1
<211> LENGTH: 6
<212> TYPE: PRT
<213> ORGANISM: Artificial Sequence
<220> FEATURE:
<223> OTHER INFORMATION: Consensus sequence chelating peptide

<400> SEQUENCE: 1

-continued

```
Gly His His Pro His Gly
1               5

<210> SEQ ID NO 2
<211> LENGTH: 11
<212> TYPE: PRT
<213> ORGANISM: Artificial Sequence
<220> FEATURE:
<223> OTHER INFORMATION: Consensus sequence chelating peptide

<400> SEQUENCE: 2

Gly His His Pro His Gly His His Pro His Gly
1               5                   10

<210> SEQ ID NO 3
<211> LENGTH: 16
<212> TYPE: PRT
<213> ORGANISM: Artificial Sequence
<220> FEATURE:
<223> OTHER INFORMATION: Consensus sequence chelating peptide

<400> SEQUENCE: 3

Gly His His Pro His Gly His His Pro His Gly His His Pro His Gly
1               5                   10                  15

<210> SEQ ID NO 4
<211> LENGTH: 20
<212> TYPE: PRT
<213> ORGANISM: Artificial Sequence
<220> FEATURE:
<223> OTHER INFORMATION: Metal cation ligand amino acid motif k=2
<220> FEATURE:
<221> NAME/KEY: VARIANT
<222> LOCATION: 1
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 2..4
<223> OTHER INFORMATION: X = is absent or G, A, F, W, M, Y, C, D, E, Q,
      H, K, P, S, T, N, R, U, O
<220> FEATURE:
<221> NAME/KEY: VARIANT
<222> LOCATION: 5..10
<223> OTHER INFORMATION: X = is absent or L, I, V
<220> FEATURE:
<221> NAME/KEY: VARIANT
<222> LOCATION: 11
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 12..14
<223> OTHER INFORMATION: X= absent or G, A, F, W, M, Y, C, D, E, Q, H,
      K, P, S, T, N, R, U, O
<220> FEATURE:
<221> NAME/KEY: VARIANT
<222> LOCATION: 15..20
<223> OTHER INFORMATION: X = absent or L, I, V

<400> SEQUENCE: 4

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa
            20

<210> SEQ ID NO 5
<211> LENGTH: 30
<212> TYPE: PRT
<213> ORGANISM: Artificial Sequence
<220> FEATURE:
```

```
<223> OTHER INFORMATION: Metal cation ligand amino acid motif k=3
<220> FEATURE:
<221> NAME/KEY: VARIANT
<222> LOCATION: 1
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 2..4
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 5..10
<223> OTHER INFORMATION: X = absent or L, I, V
<220> FEATURE:
<221> NAME/KEY: VARIANT
<222> LOCATION: 11
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 12..14
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 15..20
<223> OTHER INFORMATION: X = absent or L, I, V
<220> FEATURE:
<221> NAME/KEY: VARIANT
<222> LOCATION: 21
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 22..24
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 25..30
<223> OTHER INFORMATION: X = absent or L, I, V

<400> SEQUENCE: 5

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa
            20                  25                  30

<210> SEQ ID NO 6
<211> LENGTH: 40
<212> TYPE: PRT
<213> ORGANISM: Artificial Sequence
<220> FEATURE:
<223> OTHER INFORMATION: Metal cation ligand amino acid motif k=4
<220> FEATURE:
<221> NAME/KEY: VARIANT
<222> LOCATION: 1
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 2..4
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 5..10
<223> OTHER INFORMATION: X = absent or L, I, V
<220> FEATURE:
<221> NAME/KEY: VARIANT
<222> LOCATION: 11
<223> OTHER INFORMATION: X = G, A, F, W, M, Y, C, D, E, Q, H, K, P, S,
      T, N, R, U, O
<220> FEATURE:
```

```
<221> NAME/KEY: VARIANT
<222> LOCATION: 12..14
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 15..20
<223> OTHER INFORMATION: X = absent or L, I, V
<220> FEATURE:
<221> NAME/KEY: VARIANT
<222> LOCATION: 21
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 22..24
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 25..30
<223> OTHER INFORMATION: X = absent or L, I, V
<220> FEATURE:
<221> NAME/KEY: VARIANT
<222> LOCATION: 31
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 32..34
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 35..40
<223> OTHER INFORMATION: X = absent or L, I, V

<400> SEQUENCE: 6

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa
        35                  40

<210> SEQ ID NO 7
<211> LENGTH: 50
<212> TYPE: PRT
<213> ORGANISM: Artificial Sequence
<220> FEATURE:
<223> OTHER INFORMATION: Metal cation ligand amino acid motif k=5
<220> FEATURE:
<221> NAME/KEY: VARIANT
<222> LOCATION: 1
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 2..4
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 5..10
<223> OTHER INFORMATION: X = absent or L, I, V
<220> FEATURE:
<221> NAME/KEY: VARIANT
<222> LOCATION: 11
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 12..14
<223> OTHER INFORMATION: X = absent or G, A, F, W, M, Y, C, D, E, Q, H,
      K, P, S, T, N, R, U, O
```

```
<220> FEATURE:
<221> NAME/KEY: VARIANT
<222> LOCATION: 15..20
<223> OTHER INFORMATION: X = absent or L, I, V
<220> FEATURE:
<221> NAME/KEY: VARIANT
<222> LOCATION: 21
<223> OTHER INFORMATION: X = G, A, F, W, M, Y, C, D, E, Q, H, K, P, S,
     T, N, R, U, O
<220> FEATURE:
<221> NAME/KEY: VARIANT
<222> LOCATION: 22..24
<223> OTHER INFORMATION: X = absent or G, A, F, W, M, Y, C, D, E, Q, H,
     K, P, S, T, N, R, U, O
<220> FEATURE:
<221> NAME/KEY: VARIANT
<222> LOCATION: 25..30
<223> OTHER INFORMATION: X = absent or L, I, V
<220> FEATURE:
<221> NAME/KEY: VARIANT
<222> LOCATION: 31
<223> OTHER INFORMATION: X = G, A, F, W, M, Y, C, D, E, Q, H, K, P, S,
     T, N, R, U, O
<220> FEATURE:
<221> NAME/KEY: VARIANT
<222> LOCATION: 32..34
<223> OTHER INFORMATION: X = absent or G, A, F, W, M, Y, C, D, E, Q, H,
     K, P, S, T, N, R, U, O
<220> FEATURE:
<221> NAME/KEY: VARIANT
<222> LOCATION: 35..40
<223> OTHER INFORMATION: X = absent or L, I, V
<220> FEATURE:
<221> NAME/KEY: VARIANT
<222> LOCATION: 41
<223> OTHER INFORMATION: X = G, A, F, W, M, Y, C, D, E, Q, H, K, P, S,
     T, N, R, U, O
<220> FEATURE:
<221> NAME/KEY: VARIANT
<222> LOCATION: 42..44
<223> OTHER INFORMATION: X = absent or G, A, F, W, M, Y, C, D, E, Q, H,
     K, P, S, T, N, R, U, O
<220> FEATURE:
<221> NAME/KEY: VARIANT
<222> LOCATION: 45..50
<223> OTHER INFORMATION: X is absent or L, I, V

<400> SEQUENCE: 7

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa Xaa Xaa Xaa Xaa Xaa Xaa Xaa
        35                  40                  45

Xaa Xaa
    50

<210> SEQ ID NO 8
<211> LENGTH: 60
<212> TYPE: PRT
<213> ORGANISM: Artificial Sequence
<220> FEATURE:
<223> OTHER INFORMATION: Metal cation ligand amino acid motif k=6
<220> FEATURE:
<221> NAME/KEY: VARIANT
<222> LOCATION: 1
<223> OTHER INFORMATION: X = G, A, F, W, M, Y, C, D, E, Q, H, K, P, S,
     T, N, R, U, O
<220> FEATURE:
<221> NAME/KEY: VARIANT
<222> LOCATION: 2..4
<223> OTHER INFORMATION: X = absent or G, A, F, W, M, Y, C, D, E, Q, H,
     K, P, S, T, N, R, U, O
<220> FEATURE:
```

```
<221> NAME/KEY: VARIANT
<222> LOCATION: 5..10
<223> OTHER INFORMATION: X = absent or L, I, V
<220> FEATURE:
<221> NAME/KEY: VARIANT
<222> LOCATION: 11
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 12..14
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 15..20
<223> OTHER INFORMATION: X = absent or L, I, V
<220> FEATURE:
<221> NAME/KEY: VARIANT
<222> LOCATION: 21
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 22..24
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 25..30
<223> OTHER INFORMATION: X = absent or L, I, V
<220> FEATURE:
<221> NAME/KEY: VARIANT
<222> LOCATION: 31
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 32..34
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 35..40
<223> OTHER INFORMATION: X = absent or L, I, V
<220> FEATURE:
<221> NAME/KEY: VARIANT
<222> LOCATION: 41
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 42..44
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 45..50
<223> OTHER INFORMATION: X = absent or L, I, V
<220> FEATURE:
<221> NAME/KEY: VARIANT
<222> LOCATION: 51
<223> OTHER INFORMATION: X = G, A, F, W, M, Y, C, D, E, Q, H, K, P, S,
      T, N, R, U, O
<220> FEATURE:
<221> NAME/KEY: VARIANT
<222> LOCATION: 52..54
<223> OTHER INFORMATION: X = absent or G, A, F, W, M, Y, C, D, E, Q, H,
      K, P, S, T, N, R, U, O
<220> FEATURE:
<221> NAME/KEY: VARIANT
<222> LOCATION: 55..60
<223> OTHER INFORMATION: X = absent or L, I, V

<400> SEQUENCE: 8

Xaa Xaa Xaa Xaa Xaa Xaa Xaa Xaa Xaa Xaa Xaa Xaa Xaa Xaa Xaa Xaa
1               5                   10                  15
```

Xaa Xaa Xaa Xaa Xaa Xaa Xaa Xaa Xaa Xaa Xaa Xaa Xaa Xaa
        20                  25                  30

Xaa Xaa Xaa Xaa Xaa Xaa Xaa Xaa Xaa Xaa Xaa Xaa Xaa
        35                  40                  45

Xaa Xaa Xaa Xaa Xaa Xaa Xaa Xaa Xaa Xaa Xaa Xaa
        50                  55                  60

<210> SEQ ID NO 9
<211> LENGTH: 20
<212> TYPE: PRT
<213> ORGANISM: Artificial Sequence
<220> FEATURE:
<223> OTHER INFORMATION: Spaced histidine tag k=2
<220> FEATURE:
<221> NAME/KEY: VARIANT
<222> LOCATION: 2..4
<223> OTHER INFORMATION: X = absent or H
<220> FEATURE:
<221> NAME/KEY: VARIANT
<222> LOCATION: 5..10
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 12..14
<223> OTHER INFORMATION: X = absent or H
<220> FEATURE:
<221> NAME/KEY: VARIANT
<222> LOCATION: 15..20
<223> OTHER INFORMATION: X = absent or G, A, F, W, M, Y, C, D, E, Q, H,
      K, P, S, T, N, R, L, I, V, U, O

<400> SEQUENCE: 9

His Xaa Xaa Xaa Xaa Xaa Xaa Xaa Xaa Xaa His Xaa Xaa Xaa Xaa Xaa
1               5                   10                  15

Xaa Xaa Xaa Xaa
        20

<210> SEQ ID NO 10
<211> LENGTH: 30
<212> TYPE: PRT
<213> ORGANISM: Artificial Sequence
<220> FEATURE:
<223> OTHER INFORMATION: Spaced histidine tag k=3
<220> FEATURE:
<221> NAME/KEY: VARIANT
<222> LOCATION: 2..4
<223> OTHER INFORMATION: X = absent or H
<220> FEATURE:
<221> NAME/KEY: VARIANT
<222> LOCATION: 5..10
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 12..14
<223> OTHER INFORMATION: X = absent or H
<220> FEATURE:
<221> NAME/KEY: VARIANT
<222> LOCATION: 15..20
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 22..24
<223> OTHER INFORMATION: X = absent or H
<220> FEATURE:
<221> NAME/KEY: VARIANT
<222> LOCATION: 25..30
<223> OTHER INFORMATION: X = absent or G, A, F, W, M, Y, C, D, E, Q, H,
      K, P, S, T, N, R, L, I, V, U, O

<400> SEQUENCE: 10

His Xaa Xaa Xaa Xaa Xaa Xaa Xaa Xaa Xaa His Xaa Xaa Xaa Xaa Xaa
1               5                   10                  15

Xaa Xaa Xaa Xaa His Xaa Xaa Xaa Xaa Xaa Xaa Xaa Xaa
            20                  25                  30

<210> SEQ ID NO 11
<211> LENGTH: 40
<212> TYPE: PRT
<213> ORGANISM: Artificial Sequence
<220> FEATURE:
<223> OTHER INFORMATION: Spaced histidine tag k=4
<220> FEATURE:
<221> NAME/KEY: VARIANT
<222> LOCATION: 2..4
<223> OTHER INFORMATION: X = absent or H
<220> FEATURE:
<221> NAME/KEY: VARIANT
<222> LOCATION: 5..10
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 12..14
<223> OTHER INFORMATION: X = absent or H
<220> FEATURE:
<221> NAME/KEY: VARIANT
<222> LOCATION: 15..20
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 22..24
<223> OTHER INFORMATION: X = absent or H
<220> FEATURE:
<221> NAME/KEY: VARIANT
<222> LOCATION: 25..30
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 32..34
<223> OTHER INFORMATION: X = absent or H
<220> FEATURE:
<221> NAME/KEY: VARIANT
<222> LOCATION: 35..40
<223> OTHER INFORMATION: X = absent or G, A, F, W, M, Y, C, D, E, Q, H,
      K, P, S, T, N, R, L, I, V, U, O

<400> SEQUENCE: 11

His Xaa Xaa Xaa Xaa Xaa Xaa Xaa Xaa Xaa His Xaa Xaa Xaa Xaa Xaa
1               5                   10                  15

Xaa Xaa Xaa Xaa His Xaa Xaa Xaa Xaa Xaa Xaa Xaa His Xaa
            20                  25                  30

Xaa Xaa Xaa Xaa Xaa Xaa Xaa Xaa
        35                  40

<210> SEQ ID NO 12
<211> LENGTH: 50
<212> TYPE: PRT
<213> ORGANISM: Artificial Sequence
<220> FEATURE:
<223> OTHER INFORMATION: Spaced histidine tag k=5
<220> FEATURE:
<221> NAME/KEY: VARIANT
<222> LOCATION: 2..4
<223> OTHER INFORMATION: X = absent or H
<220> FEATURE:
<221> NAME/KEY: VARIANT
<222> LOCATION: 5..10
<223> OTHER INFORMATION: X = absent or G, A, F, W, M, Y, C, D, E, Q, H,
      K, P, S, T, N, R, L, I, V, U, O
<220> FEATURE:

```
<221> NAME/KEY: VARIANT
<222> LOCATION: 12..14
<223> OTHER INFORMATION: X = absent or H
<220> FEATURE:
<221> NAME/KEY: VARIANT
<222> LOCATION: 15..20
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 22..24
<223> OTHER INFORMATION: X = absent or H
<220> FEATURE:
<221> NAME/KEY: VARIANT
<222> LOCATION: 25..30
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 32..34
<223> OTHER INFORMATION: X = absent or H
<220> FEATURE:
<221> NAME/KEY: VARIANT
<222> LOCATION: 35..40
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 42..44
<223> OTHER INFORMATION: X = absent or H
<220> FEATURE:
<221> NAME/KEY: VARIANT
<222> LOCATION: 45..50
<223> OTHER INFORMATION: X = absent or G, A, F, W, M, Y, C, D, E, Q, H,
      K, P, S, T, N, R, L, I, V, U, O

<400> SEQUENCE: 12

His Xaa Xaa Xaa Xaa Xaa Xaa Xaa Xaa Xaa His Xaa Xaa Xaa Xaa Xaa
1               5                   10                  15

Xaa Xaa Xaa Xaa His Xaa Xaa Xaa Xaa Xaa Xaa Xaa Xaa Xaa His Xaa
            20                  25                  30

Xaa Xaa Xaa Xaa Xaa Xaa Xaa Xaa His Xaa Xaa Xaa Xaa Xaa Xaa Xaa
        35                  40                  45

Xaa Xaa
    50

<210> SEQ ID NO 13
<211> LENGTH: 60
<212> TYPE: PRT
<213> ORGANISM: Artificial Sequence
<220> FEATURE:
<223> OTHER INFORMATION: Spaced histidine tag k=6
<220> FEATURE:
<221> NAME/KEY: VARIANT
<222> LOCATION: 2..4
<223> OTHER INFORMATION: X = absent or H
<220> FEATURE:
<221> NAME/KEY: VARIANT
<222> LOCATION: 5..10
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 12..14
<223> OTHER INFORMATION: X = absent or H
<220> FEATURE:
<221> NAME/KEY: VARIANT
<222> LOCATION: 15..20
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 22..24
<223> OTHER INFORMATION: X = absent or H
```

```
<220> FEATURE:
<221> NAME/KEY: VARIANT
<222> LOCATION: 25..30
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 32..34
<223> OTHER INFORMATION: X = absent or H
<220> FEATURE:
<221> NAME/KEY: VARIANT
<222> LOCATION: 35..40
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 42..44
<223> OTHER INFORMATION: X = absent or H
<220> FEATURE:
<221> NAME/KEY: VARIANT
<222> LOCATION: 45..50
<223> OTHER INFORMATION: X = absent or G, A, F, W, M, Y, C, D, E, Q, H,
      K, P, S, T, N, R, L, I, V, U, O
<220> FEATURE:
<221> NAME/KEY: VARIANT
<222> LOCATION: 52..54
<223> OTHER INFORMATION: X = absent or H
<220> FEATURE:
<221> NAME/KEY: VARIANT
<222> LOCATION: 55..60
<223> OTHER INFORMATION: X = absent or G, A, F, W, M, Y, C, D, E, Q, H,
      K, P, S, T, N, R, L, I, V, U, O

<400> SEQUENCE: 13

His Xaa Xaa Xaa Xaa Xaa Xaa Xaa Xaa His Xaa Xaa Xaa Xaa Xaa
1               5                   10                  15

Xaa Xaa Xaa Xaa His Xaa Xaa Xaa Xaa Xaa Xaa Xaa Xaa His Xaa
            20                  25                  30

Xaa Xaa Xaa Xaa Xaa Xaa Xaa Xaa His Xaa Xaa Xaa Xaa Xaa Xaa
            35                  40                  45

Xaa Xaa His Xaa Xaa Xaa Xaa Xaa Xaa Xaa Xaa Xaa
    50                  55                  60

<210> SEQ ID NO 14
<211> LENGTH: 266
<212> TYPE: PRT
<213> ORGANISM: Artificial Sequence
<220> FEATURE:
<223> OTHER INFORMATION: His-GFP

<400> SEQUENCE: 14

Met Gly Ser Ser His His His His His Gly Ser Ser Val Ser Lys
1               5                   10                  15

Gly Glu Glu Leu Phe Thr Gly Val Val Pro Ile Leu Val Glu Leu Asp
            20                  25                  30

Gly Asp Val Asn Gly His Lys Phe Ser Val Arg Gly Glu Gly Glu Gly
            35                  40                  45

Asp Ala Thr Asn Gly Lys Leu Thr Leu Lys Phe Ile Cys Thr Thr Gly
            50                  55                  60

Lys Leu Pro Val Pro Trp Pro Thr Leu Val Thr Thr Leu Thr Tyr Gly
65                  70                  75                  80

Val Gln Cys Phe Ser Arg Tyr Pro Asp His Met Lys Gln His Asp Phe
                85                  90                  95

Phe Lys Ser Ala Met Pro Glu Gly Tyr Val Gln Glu Arg Thr Ile Ser
                100                 105                 110

Phe Lys Asp Asp Gly Thr Tyr Lys Thr Arg Ala Glu Val Lys Phe Glu
```

```
                 115                 120                 125
Gly Asp Thr Leu Val Asn Arg Ile Glu Leu Lys Gly Ile Asp Phe Lys
        130                 135                 140

Glu Asp Gly Asn Ile Leu Gly His Lys Leu Glu Tyr Asn Phe Asn Ser
145                 150                 155                 160

His Asn Val Tyr Ile Thr Ala Asp Lys Gln Lys Asn Gly Ile Lys Ala
                165                 170                 175

Asn Phe Lys Ile Arg His Asn Val Glu Asp Gly Ser Val Gln Leu Ala
            180                 185                 190

Asp His Tyr Gln Gln Asn Thr Pro Ile Gly Asp Gly Pro Val Leu Leu
        195                 200                 205

Pro Asp Asn His Tyr Leu Ser Thr Gln Ser Lys Leu Ser Lys Asp Pro
210                 215                 220

Asn Glu Lys Arg Asp His Met Val Leu Leu Glu Phe Val Thr Ala Ala
225                 230                 235                 240

Gly Ile Thr Leu Gly Met Asp Glu Leu Tyr Lys Gly Ile Glu Glu Asn
                245                 250                 255

Leu Tyr Phe Gln Ser Asn Ile Gly Ser Gly
            260                 265

<210> SEQ ID NO 15
<211> LENGTH: 591
<212> TYPE: PRT
<213> ORGANISM: Artificial Sequence
<220> FEATURE:
<223> OTHER INFORMATION: His-PercevalHR

<400> SEQUENCE: 15

Met Lys His His His His His His Gly Ala Ser Met Lys Lys Val
1               5                   10                  15

Glu Ser Ile Ile Arg Pro Glu Lys Leu Glu Ile Val Lys Lys Ala Leu
            20                  25                  30

Ser Asp Ala Gly Tyr Val Gly Met Thr Val Ser Glu Val Lys Gly Ser
        35                  40                  45

Gly Val Gln Gly Gly Ile Phe Glu Arg Tyr Arg Gly Arg Val Tyr Ser
    50                  55                  60

Ala Gly Tyr Asn Ser Asp Asn Val Tyr Ile Thr Ala Asp Lys Gln Lys
65                  70                  75                  80

Asn Gly Ile Lys Ala Asn Phe Lys Ile Arg His Asn Ile Glu Asp Gly
                85                  90                  95

Gly Val Gln Leu Ala Asp His Tyr Gln Gln Asn Thr Pro Ile Gly Asp
            100                 105                 110

Gly Pro Val Leu Leu Pro Asp Asn His Tyr Leu Ser Phe Gln Ser Lys
        115                 120                 125

Leu Ser Lys Asp Pro Asn Glu Lys Arg Asp His Met Val Leu Leu Glu
    130                 135                 140

Phe Val Thr Ala Ala Gly Ile Thr Leu Gly Met Asp Glu Leu Tyr Lys
145                 150                 155                 160

Gly Gly Ser Gly Gly Met Val Ser Lys Gly Glu Glu Leu Phe Thr Gly
                165                 170                 175

Val Val Pro Ile Leu Val Glu Leu Asp Gly Asp Val Asn Gly His Lys
            180                 185                 190

Phe Ser Val Ser Gly Glu Gly Glu Gly Asp Ala Thr Tyr Gly Lys Leu
        195                 200                 205

Thr Leu Lys Leu Ile Cys Thr Thr Gly Lys Leu Pro Val Pro Trp Pro
```

```
                210                 215                 220
Thr Leu Val Thr Thr Leu Gly Tyr Gly Leu Gln Cys Phe Ala Arg Tyr
225                 230                 235                 240

Pro Asp His Met Lys Gln His Asp Phe Phe Lys Ser Ala Met Pro Glu
            245                 250                 255

Gly Tyr Val Gln Glu Arg Thr Ile Phe Phe Lys Asp Asp Gly Asn Tyr
            260                 265                 270

Lys Thr Arg Ala Glu Val Lys Phe Glu Gly Asp Thr Leu Val Asn Arg
        275                 280                 285

Ile Glu Leu Lys Gly Ile Asp Phe Lys Glu Asp Gly Asn Ile Leu Gly
    290                 295                 300

His Lys Leu Glu Tyr Asn Gly Thr Ile Val Asp Leu Ile Pro Lys Val
305                 310                 315                 320

Lys Ile Glu Leu Val Lys Glu Glu Asp Val Asp Asn Val Ile Asp
            325                 330                 335

Ile Ile Cys Glu Asn Ala Arg Thr Gly Asn Pro Gly Asp Gly Lys Ile
            340                 345                 350

Phe Val Ile Pro Val Glu Arg Val Arg Val Arg Thr Lys Glu Glu
        355                 360                 365

Gly Ala Ser Gly Gly Gly Ser Gly Gly Gly Gly Ala Ser Gly Met Lys
    370                 375                 380

Lys Val Glu Ala Ile Ile Arg Pro Glu Lys Leu Glu Ile Val Lys Lys
385                 390                 395                 400

Ala Leu Ser Asp Ala Gly Tyr Val Gly Met Thr Val Ser Glu Val Lys
            405                 410                 415

Gly Arg Gly Ala Gly Gly Asp Leu Ile Pro Lys Val Lys Ile Glu
        420                 425                 430

Leu Val Lys Glu Glu Asp Val Asp Asn Val Ile Asp Ile Ile Cys
    435                 440                 445

Glu Asn Ala Arg Thr Gly Asn Pro Gly Asp Gly Lys Ile Phe Val Ile
450                 455                 460

Pro Val Glu Arg Ile Val Arg Val Arg Thr Lys Glu Glu Gly Ala Ser
465                 470                 475                 480

Gly Gly Gly Gly Gly Ser Gly Gly Ala Ser Gly Met Lys Lys Val Glu
            485                 490                 495

Ala Ile Ile Arg Pro Glu Lys Leu Glu Ile Val Lys Lys Ala Leu Asn
            500                 505                 510

Asp Asp Gly Tyr Val Gly Met Thr Val Ser Glu Val Lys Gly Arg Gly
        515                 520                 525

Ala Gly Gly Gly Asp Leu Ile Pro Lys Val Lys Ile Glu Leu Val Val
        530                 535                 540

Lys Glu Glu Asp Val Asp Asn Ile Ile Asp Ile Ile Cys Glu Asn Ala
545                 550                 555                 560

Arg Thr Gly Asn Pro Gly Asp Gly Lys Ile Phe Val Ile Pro Val Glu
            565                 570                 575

Arg Val Val Arg Pro Arg Thr Lys Glu Glu Gly Lys Glu Ala Leu
        580                 585                 590

<210> SEQ ID NO 16
<211> LENGTH: 156
<212> TYPE: PRT
<213> ORGANISM: Artificial Sequence
<220> FEATURE:
<223> OTHER INFORMATION: enzyme Sortase A
```

```
<400> SEQUENCE: 16

Met Gln Ala Lys Pro Gln Ile Pro Lys Asp Lys Ser Lys Val Ala Gly
1               5                   10                  15

Tyr Ile Glu Ile Pro Asp Ala Asp Ile Lys Glu Pro Val Tyr Pro Gly
            20                  25                  30

Pro Ala Thr Arg Glu Gln Leu Asn Arg Gly Val Ser Phe Ala Glu Glu
            35                  40                  45

Asn Glu Ser Leu Asp Asp Gln Asn Ile Ser Ile Ala Gly His Thr Phe
            50                  55                  60

Ile Asp Arg Pro Asn Tyr Gln Phe Thr Asn Leu Lys Ala Ala Lys Lys
65                  70                  75                  80

Gly Ser Met Val Tyr Phe Lys Val Gly Asn Glu Thr Arg Lys Tyr Lys
                85                  90                  95

Met Thr Ser Ile Arg Asn Val Lys Pro Thr Ala Val Glu Val Leu Asp
            100                 105                 110

Glu Gln Lys Gly Lys Asp Lys Gln Leu Thr Leu Ile Thr Cys Asp Asp
            115                 120                 125

Tyr Asn Glu Glu Thr Gly Val Trp Glu Thr Arg Lys Ile Phe Val Ala
            130                 135                 140

Thr Glu Val Lys Leu Glu His His His His His His
145                 150                 155
```

SITE-SPECIFIC, KINETICALLY INERT CONJUGATION OF LABELS AND/OR CARRIERS TO TARGET MOLECULES SUCH AS His-TAGGED PROTEINS VIA METAL COMPLEX REAGENTS

The present application is a national phase application under 35 U.S.C. § 371 of International Application No. PCT/EP2020/067046, filed Jun. 18, 2020, which claims the priority benefit of European Application No. 19180999.5, filed Jun. 18, 2019, the entire contents of each of which are hereby incorporated by reference.

The present invention relates to means and methods for conjugating/attaching target molecules such as proteins to a label and/or carrier. Specifically, the present invention provides a complex comprising a metal cation coordinating (i) a metal cation ligand being $CO_3^{2-}$ or $HCO_3^-$ and (ii) a metal cation chelating domain comprising a chelating ligand and a label and/or carrier. This complex can be used for attaching a label and/or a carrier to a target molecule, preferably a protein. The attachment of the label or carrier via the complex of the invention involves the replacement of the metal cation ligand with a coordinating group of the target molecule so that a product complex with the target molecule as primary ligand in the coordination sphere of the metal cation is formed. Accordingly, the present invention also provides for uses and methods involving the attachment of a label and/or carrier to a target molecule. Also provided are the products obtained by the labeling and/or carrier-attaching methods of the invention and uses thereof. The invention further relates to methods for producing the complex of the invention and kits comprising the components for producing the complex of the invention.

In recent years, chemically modified proteins became a very important tool for many biological applications. Various biochemical and cellular techniques in life science research such as fluorescence-based assays, western blot and protein purification rely on labeled or immobilized proteins. But also for the development of biopharmaceuticals (e.g. antibody-drug-conjugates, PEGylation and lipidation), medical diagnostics including biosensors, bioimaging and even medical engineering, protein conjugation is a crucial production step. Thereby in all application fields a simple, stable, site-specific modification method, which does not impede protein function, is desirable. In addition, also other biological molecules such as nucleic acids are often labeled or attached to carriers.

In classical labeling/immobilization procedures, small molecules are attached covalently to reactive groups (such as primary amines in lysines or thiols in cysteines) in the unmodified protein of interest via e.g. N-hydroxy-succinimide (NHS) derived reagents or maleimides in a fast and efficient way (Chen and Wu, 2016). However, all these approaches possess intrinsic disadvantages due to the ubiquitous availability of these reactive sites in a protein. Hence, the control of these labeling reactions is limited, resulting in huge batch to batch variability with a lack of site-specificity, inhomogeneous immobilization/labeling stoichiometry and even destabilization and loss of protein functionality (Lindhoud et al., 2012). To address this problem, in recent years several new techniques for site-specific protein conjugation were developed.

The most prominent is thereby the Avi-tag system, in which a biotin moiety is attached site-specifically to a short peptide tag by the enzymatic catalysis with biotin ligase BirA (Tirat et al., 2006). But also in other methods, enzymes such as sortase (Popp et al., 2007), transglutaminase (Lin and Ting, 2006), lipoic acid ligase (Fernandez-Suarez, M. et al., 2007) and phospho-pantheinyl-transferases (Yin et al., 2005) are used to catalyze the oriented conjugation of proteins via short recognition peptide tags.

Another approach is the expansion of the genetic code through the ribosomal incorporation of bio-orthogonal functional groups such as tetratines, alkynes, azides or norbornenes via non-natural amino acids (Ou et al., 2011; Deiters et al., 2003; Lang et al. 2012). Using specific linking chemistry, the target protein can be modified at the integrated group in a very precise way.

Alternatively, to unnatural amino acids, conventional amino acids with a unique reactivity and low abundance on the protein surface can be used for site-specific labeling. Most methods in this context use engineered cysteine substitutions that provide accessible thiol groups for selective targeting (Junutula et al., 2008; Cal et al. 2014). Not only surface exposed, but also N-terminal amino acids can be a useful reaction point for protein conjugation. For example, N-terminal cysteines can be selectively targeted by native chemical ligation with thioester derivates (Dawson et al., 1994) or if incorporated in a short N-terminal tag, the protein can be labeled by perfluoroaromatic reagents (Zhang et al., 2016). Alternatively, proteins can be conjugated site-specifically by the oxidation of N-terminal serine leading to a targetable unique aldehyde group (Gaertner and Offord, 1996) or by the acylation of an N-terminal glycin-histidine tag (Martos-Maldonado et al., 2018).

The above described methods have in common that they require specialized molecular tags, non-natural amino acids and/or additional amino acids being incorporated that are not frequently used for other applications. Accordingly, often laborious genetic engineering and re-expression of proteins is required. Even more importantly, the mainly multi-step chemical conjugation reactions of these methods are often performed at quit harsh reaction conditions which can negatively affect protein stability and function.

In addition several labeling strategies have been developed that rely on interaction with a His-tag, an affinity tag that is widely used in the field of protein biochemistry. The His-tag consists of usually six to eight histidine moieties and His-tagged proteins are widespread due to the well-established purification technology based on $Ni^{2+}$-mediated coordination of nitrilotriacetic acid (NTA) and the imidazole groups of the histidines (Hochuli et al., 1988). The principle of binding His-tagged proteins to a $Ni^{2+}$-NTA substrate by formation of [Ni(II)(NTA)(His-tag)] complexes has also been adapted for many other applications such as the immobilization of proteins on surfaces (Kang et al., 2007; Rusmini et al., 2007), and the conjugation of fluorophores and other molecules to proteins (Kamoto et al., 2008). However, a major drawback of these methods—even when using improved tris-NTA reagents (Huang et al., 2009)—is the low affinity and the rapid ligand exchange rate of these $Ni^{2+}$ mediated complexes. Already small amounts of common chelators like EDTA or imidazole destroy the complex and interfere with protein conjugation. Several additional documents describe similar complexes that are not kinteti-cally inert or even require lability; see, e.g. WO 2005/112977 A2, WO 03/072143 A1, WO 2005/120700 A2, WO 2009/114520, WO 98/06739 A1, US 4 569 794 A, Block et al., 2009, WO 03/018756 A2, US 2010/069293 A1, WO 2004/104023 A2, WO 02/33044 A2, US 2013/131283 A1, WO 2011/031771 A1, US 2008/015263.

WO 2003/072143 A1 also describes the use of metal bridges to connect a carrier and an active agent of interest, wherein the carrier may comprise a polypeptide with a histidine tag.

To overcome the limitations of $Ni^{2+}$ mediated complexes, $Co^{3+}$ instead of commonly used $Ni^{2+}$ or $Co^{2+}$ was proposed as metal ion for mediating complex formation (Wegner and Spatz, 2013; Hale, 1995). With the usage of low-spin octahedral paramagnetic complexes ($e_g^6 t_2^0$) of $Co^{3+}$, in which four coordination sites are occupied by a chelator such as NTA and two by the histidines of the His-tag, a kinetically inert linkage of a His-tagged protein to the NTA moiety can be achieved. The $Co^{3+}$-based complexes were found to have a significantly lower ligand exchange rate (about $10^{-6}$ $s^{-1}$) than $Ni^2$-based complexes ($3*10^6$ $s^{-1}$) (Lippard and Berg, 1994).

However, while the ligand exchange rate of the [Co(III)(NTA)(His-protein)] complex is extremely slow, vice versa also the formation of the complex is tardy. Therefore, an indirect and multi-step preparation method is currently the method of choice for producing such [Co(III)(NTA)(His-protein)] complex (WO 2014/072525 A1; Wegner and Spatz, 2013; Hale, 1995; see schematic reaction scheme in FIG. 2A). First a pre-complex is formed with $Co^{2+}$ following an oxidation step with hydrogen peroxide of the whole [Co(II)(NTA)(His-protein)] complex, in which $Co^{2+}$ is oxidized to $Co^{3+}$ directly in the final complex. Although this method is very fast and simple, the oxidation process in the presence of the protein can cause loss of protein function due to amino acid oxidation. Additionally, the combination of hydrogen peroxide and cobalt ions can also provoke Fenton reactions, which may result in cleavage or degradation of the protein backbone and can lead to removal of the His-tag and a release of the protein from the complex comprising the label (Andberg et al., 2007).

$Co^{3+}$-based complexes with His-tagged proteins produced with the indirect and multi-step preparation method involving an oxidation step have also been employed for immobilizing proteins on surfaces (Wegner et al., 2016; Di Russo et al., 2018). Yet, also in context of surface immobilization the method suffers from the use of the harsh oxidation agent $H_2O_2$ which may negatively affect protein function and may also interfere with certain surface structures.

Similar to the above mentioned documents EP 0 497 585 A2 employs the oxidation of $Co^{2+}$ to $Co^{3+}$ only after the [Co(II)(IDA)(His-protein)] complex is formed. The [Co(II)(IDA)(His-protein)] complex is contacted with O2 gas for several hours to facilitate the oxidation of $Co^{2+}$ to $Co^{3+}$. However, it is known in the art that labile proteins may be harmed by a several hour exposure to high concentrations of oxygen. Furthermore, the present inventors were not able to reproduce said method, i.e. they did not observe stable complexes when the [Co(II)(NTA)(His-protein)] complex was contacted with $O_2$ gas.

Zatloukalová and Kucerová proposed a procedure for forming [Co(III)(IDA)(His-tag)($H_2O$)] complexes, in which oxidation in presence of the protein can be circumvented (Zatloukalová and Kucerová, 2006). In this procedure, the $Co^{2+}$ center is oxidized with hydrogen peroxide to $Co^{2+}$ in a pre-complex with IDA and subsequently, the resulting [Co(III)(IDA)($H_2O$)$_3$]$^+$ is coordinated with the His-tagged protein to form the final [Co(III)(IDA)(His-tag)($H_2O$)] complex (see FIG. 2B for schematic reaction scheme; Zatloukalová and Kucerová, 2006). Yet, the method has still major disadvantages. Compared to a $Co^{2+}$ based pre-complex with a water ligand, the $Co^{3+}$ based pre-complex with a water ligand coordinates significantly slower and, as demonstrated by the present inventors in the appended examples, the final efficacy of complex formation is also low, especially at low temperatures which are required for most proteins. In addition, the usage of hydrogen peroxide in the presence of the IDA-conjugates can still negatively influence the function of the conjugates, i.e. the labels and/or carriers that are to be attached to IDA conjugates, by oxidation. For example, the fluorescence of fluorophores can decrease upon oxidation. Further, the protocol requires purification of the oxidized pre-complex from hydrogen peroxide for further downstream applications. These purification processes are material and time consuming and bear the risk of residual oxidizing agent that may oxidize and damage the protein to be modified in downstream applications.

Thus, the technical problem underlying the present invention is the provision of improved means and methods that allow attachment of labels and/or carriers to target molecules such as proteins via complex formation in an easy and efficient manner that prevents interference with label/carrier and target molecule function and/or stability.

This technical problem is solved by provision of the embodiments characterized in the claims and as provided herein below.

In a first aspect, the present invention provides a compound in form of a complex comprising:
 a) a metal cation;
 b) a metal cation ligand being a carbonate selected from $CO_3^{2-}$ and $HCO_3^-$; and
 c) a metal cation chelating domain comprising a chelating ligand and a label and/or carrier.

The present inventors have surprisingly found that the complex of the invention is an advantageous tool for attaching a label and/or a carrier to a target molecule such as a His-tagged protein. The labeling is achieved by the exchange of the metal cation ligand of the complex with a target molecule in the primary coordination sphere of the complex. By this exchange a new complex having the metal cation chelating domain comprising a chelating ligand and a label and/or carrier as a first ligand and the target molecule as a second ligand is formed. As exemplified in the appended Examples, which employ a complex of the invention comprising the transition metal cation $Co^{3+}$ or $Pt^{4+}$, the complex of the invention allows attachment of a label and/or carrier to the target molecule in a kinetically inert manner. Preferred target molecules are His-tagged proteins or proteins with histidine-rich regions, because histidine residues are ligands that can participate in formation of metal complexes, especially with transition metals such as $Co^{3+}$. Histidine tags can function as didentate and/or polydentate ligands.

An advantage of the complex of the invention is that an oxidation reaction using $H_2O_2$ is neither necessary for the production steps of the complex in which the label and/or carrier is present, nor for attaching a label and/or carrier to the target molecule. Avoiding oxidation steps such as $H_2O_2$ treatment has the advantage that the attachment of a label and/or carrier can be achieved without interfering with the function of target molecules, labels and/or carriers by oxidation. This makes the metal complex mediated labeling and/or carrier-attachment more widely applicable, especially also to oxidation sensitive target molecules such as proteins. Moreover, it also reduces the necessity for cumbersome and time consuming washing steps to remove the oxidation reagent.

For Co(III) or other transition metals complexes with low ligand exchange rates the direct complex formation without any intermediate steps is extremely slow and inefficient. Therefore current state-of-the-art methodologies for the formation of these kinetically inert complexes focus on two step procedures. Thereby first a complex with a metal center in the kinetically labile oxidation state (e.g. Co(II)) is formed, followed by the an oxidation process commonly with hydrogen peroxide. As this oxidation process can lead to unforeseeable dysfunctions of the protein, metal binding domain and/or the carrier.

To overcome these limitations, the current invention describes a process for the direct formation of kinetically inert complexes. Starting directly with the metal in the desired oxidation state, the usage of oxidation reagent in the presence of the protein, metal binding domain or protein can be circumvented. Thereby the metal of choice is introduced to the metal binding domain pre-complexed with three metal cation ligands being carbonate or nitrate. In a first step two metal cation ligands are replaced by the metal cation chelating domain followed by the replacement of the last metal cation ligand through coordination of the protein. The pre-coordination of the metal with carbonate or nitrate facilitates the formation of the final complex leading to a significant faster complex formation speed paired with a higher complex formation efficacy. The improved direct complex formation process using pre-complexes with coordinated carbonate or nitrate ligands originates from the ability of these metal cation ligands to get protonated after release from the pre-complex. In case of carbonate the protonation upon ligand release can lead to gas formation which might additionally enhance the formation process. Therefore, kinetically inert metal complexes can be formed directly significantly faster and more efficient using carbonate or nitrate pre-complexes than with other ligands including water as demonstrated by the inventors. As illustrated in the appended examples, the inventive means and methods relate, inter alia, on novel and inventive complexes comprising and/or consisting of a metal cation, carbonate (as a metal cation ligand; $CO_3^{2-}$ or $HCO_3^-$) and a metal cation chelating domain comprising a chelating ligand as well as a label and/or carrier. It is evident from the disclosure herein as well as from the appended examples that also a corresponding complex employing "nitrate" instead of "carbonate" ($CO_3^{2-}$ or $HCO_3^-$) may be employed. Accordingly, the invention may also be based on corresponding "nitrate complexes". Accordingly, herein described are corresponding "carbonate complexes", but also "nitrate complexes". Carbonate and nitrate in context of this invention can be considered as equivalents since both metal cations get protonated after release from a corresponding pre-complex. In context of this invention, carbonate complexes are the preferred ones for the herein provided means and methods. Further details are provided herein below.

In the prior art of Wegner and Spatz (loc. cit) and Zatloukalová and Kucerová (loc. cit) mentioned above, methods for labeling proteins by the formation of $Co^{3+}$ mediated complexes is described. However, in contrast to the present invention these methods both involved oxidation steps using $H_2O_2$ (see FIGS. 2A and B). The oxidation step is a harmful treatment that can negatively affect stability and functionality of labels (e.g. fluorophores) and/or carriers and a protein to be labeled (see appended Examples). The complex of the invention allows to avoid an oxidation step comprised in these prior art protocols. Moreover, the complex of the invention coordinates metal binding target molecules, preferably His-tagged proteins or proteins with histidine-rich regions, fast and efficient such that the label and/or carrier can be attached to the target molecule by an interaction mediated by the metal cation. The label and/or carrier is attached to the target molecule in the final product in a similar kinetically inert manner as described by Wegner and Spatz and Zatloukalová and Kucerová. The binding of the target molecule is achieved by exchanging the metal cation coordinating ligand with the target molecules so as to form a new complex, referred to as "product complex" herein. By choosing the metal coordinating ligand to be a carbonate selected from $CO_3^{2-}$ and $HCO_3^-$ or a nitrate, the inventors found that the "product complex" comprising the label/carrier comprising metal cation chelating domain and the target molecule coordinated to the metal cation can be formed very efficient and fast. In particular, the inventors found the binding of the target molecule to be more complete and faster compared to a complex employing water as metal cation ligand, as described in the method of Zatloukalová and Kucerová, especially at low temperatures. Thus, the complex of the invention attaches labels and/or carriers faster and more completely to target molecules (e.g. His-tagged proteins). In sum, the key advantages of the complex of the invention are that the complex allows fast and efficient attachment and at the same time prevents the requirement for using oxidizing reagents in presence of a label and/or carrier.

The complex of the invention or a composition comprising the same is particularly useful in numerous applications including but not limited to labeling of proteins with fluorophores, toxins, diagnostic moieties, targeting moieties, stabilizing domains and/or reactive groups. Using the complex, in particular also biopharmaceuticals, such as toxin labeled antibodies, and diagnostics may be manufactured. The labeling is kinetically inert (i.e. the ligand exchange rate is $10^{-1}s^{-1}$ or lower) so that ligand exchange that is often problematic with $Ni^{2+}$ or $Co^{2+}$-based complexes can be prevented. The labeling is furthermore thermodynamically more stable than with $Ni^{2+}$ or $Co^{2+}$-based complexes.

Figure 21:
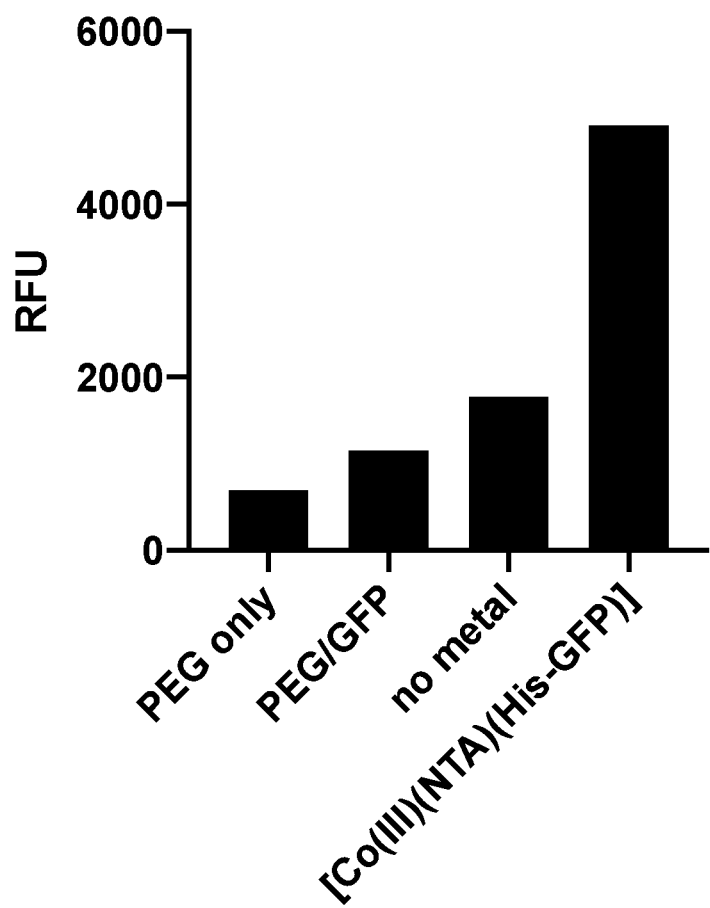
Figure 22:
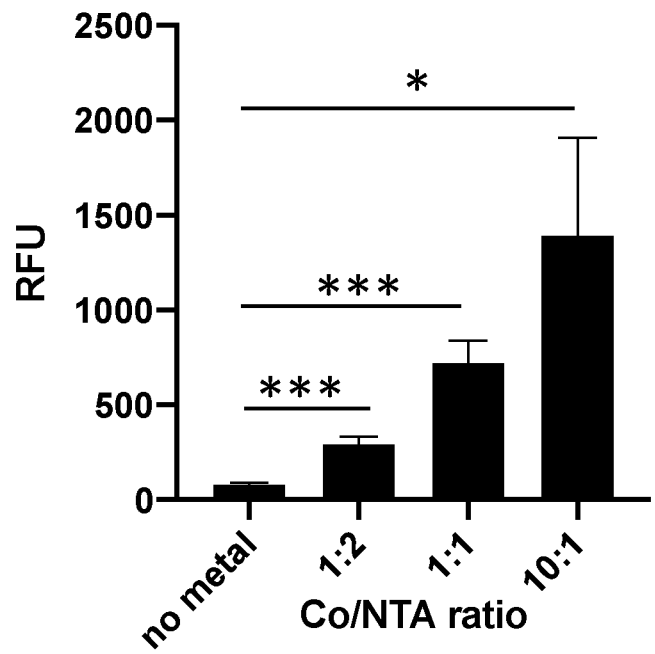
Figure 22:
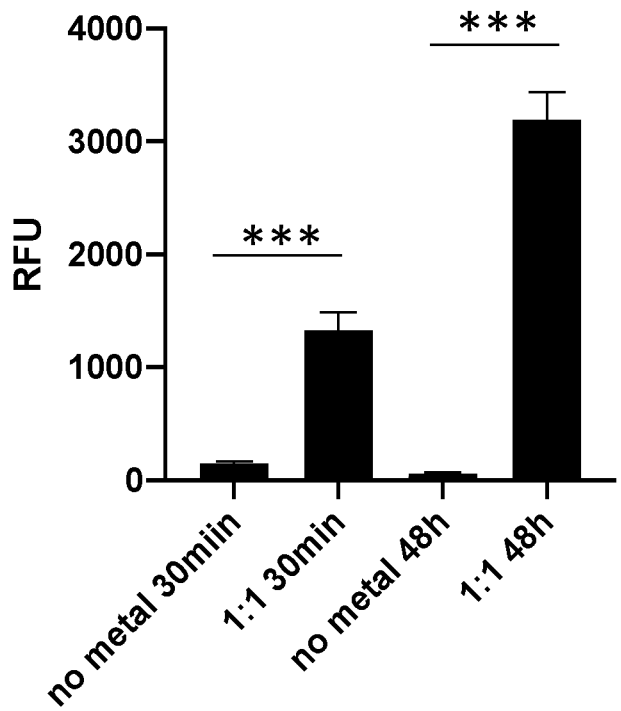

The complex of the invention may also be used to achieve a stable attachment of a target molecule, preferably a protein, to a carrier. A carrier may, for instance, be a surface, a bead, a nanoparticle, a prosthetic a quantum dot, a polymer, a hydrogel, a microparticle, a sphere (e.g. a nano- and/or microsphere) or a combination thereof. For instance, Example 19 demonstrates that His-tagged GFP can be attached to a gold nano-structured glass surface. First a gold nano-structured glass surface is functionalized with NTA by coupling a NTA-linker-thiol reagent via the interaction of the gold particles with the thiol group. Subsequently, the complex of the invention is produced on the surface and His-GFP is attached (FIG. 21). Furthermore, it is shown in non limiting Example 20 that a His-tagged GFP can be attached to biotin group coupled via linker to the complex of the invention. The product comprising the biotin group, linker, the complex of the invention and the His-tagged GFP was subsequently coupled to beads comprising a streptavidin group (FIG. 22).

The appended examples demonstrate that a wide variety of (His-tagged) proteins can be coupled to beads using the complex of the invention. For one tested protein (Sortase A) it was proofed that enzymatic activity is conserved upon immobilization (Example 14, FIG. 16C). It is also demonstrated that an antibody can be coupled to beads via the complex of the invention using the histidine rich region of the Fc region of the antibody. As demonstrated in FIG. 16D the immobilized antibody retains the ability to bind its antigen.

That the complex of the invention can achieve fast and efficient metal cation mediated labeling or carrier attachment to a target molecule without the necessity of the oxidation step in the presence of the target molecule to be labeled and/or the label and/or carrier as described by Wegner and Spatz and Zatloukalová and Kucerová makes it particularly suitable for the above-described applications, in which it is typically of critical importance to avoid oxidation of the target protein and/or the label and/or carrier.

The complex of the invention may be provided in solution or as a solid. The complex of the invention may bear a charge, especially when provided in solution. The charge will depend on the charges of the metal cation, the metal cation ligand and the metal cation chelating domain. For instance, a complex, comprising $Co^{3+}$ as metal cation, $CO_3^{2-}$ as metal cation ligand, and a metal cation chelating domain consisting of NTA as chelating ligand and a non-charged label has the charge "2–" (i.e. a divalent negative charge). The complex may also be provided with counter ions. The complex may also be provided as solid when it further comprises one or more counter-ions. The counter-ion(s) are preferably monovalent ions. Particularly preferred are monovalent ions from the group of alkali metals. Most preferred are Na+ and K+ as counter ions when the complex is negatively charged.

The metal cation chelating domain (which may alternatively be referred to as first ligand or chelator) of the complex of the invention comprises a chelating ligand. The chelating ligand mediates the coordination with the metal cation of the complex by providing at least two binding sites that can be coordinated by the metal cation of the complex (i.e. is in other words didentate or polydentate). In a preferred embodiment, the chelating ligand of the metal cation chelating domain may be tridentate (e.g. IDA) or tetradentate (e.g. NTA). "Tridentate" means that the chelating ligand comprises three atoms that can function as donor atoms (i.e. Lewis donor) in metal ion based complexes. "Tetradentate" means that the chelating ligand comprises four atoms that can function as donor atoms (i.e. Lewis donor) in metal ion based complexes. Accordingly, in other words the chelating ligand of the metal cation chelating domain may preferably have three or four, more preferably three binding sites that can be coordinated by the metal cation of the complex. Without being bound by theory, using chelating ligands with more atoms that can function as donor atoms (i.e. Lewis donor) in the complex has the advantage that the metal cation is bound stronger in the complex. A stronger binding prevents the frequency of undesired release of the metal cation from the complex; i.e. undesired disassembly of the complex. This applies to the complex of the invention as well as the "product complexes" as formed by the uses and methods of the invention. Generaly, tridentate and tetradentate complexes are preferred herein. In accordance with the appended examples tridentate is most preferred.

The metal cation chelating domain of the complex of the invention further comprises a label and/or carrier, i.e. a functional moiety to be attached to a target molecule. The chelating ligand may be directly linked with the label and/or carrier or via a linker.

The chelating ligand of the metal cation chelating domain can in principle be any chelating ligand known in the art. Preferred chelating ligands comprise at least one or more carboxylic acid group and/or one or more amine group. In one embodiment, the chelating ligand of the metal cation chelating domain may be a polycarboxylic acid, a polyamine or an aminopolycarboxylic acid.

Exemplary but non-limiting chelating ligands are: nitrilotriacetic acid (NTA) (Hochuli et al. 1987), iminodiacetic acid (IDA) (Porath et al. 1975, Arnold 1991, Franzreb et al. 2006), tris(carboxymethyl)ethylenediamine (TED) (Porath and Olin 1983), chelating peptides (e.g. peptides with the consensus sequence $(GHHPH)_nG$, wherein G refers to glycine, H refers to histidine, P refers to proline and n is an integer number from 1 to 3; see also SEQ ID NOs: 1 to 3) (Hutchens and Yip 1992), chelating proteins (e.g. his tagged proteins or proteins with a spaced His-tag as defined elsewhere herein) or cadystin (Hayashi et al. 1986), triazacyclononane (TACN) (Sobiesciak and Zielenkiewicz 2010), diethylenetriamine-pentaacetate (DTPA) (Rahhal and Richter 1988; Hnatowich et al. 1982, Hnatowich et al. 1983), phytochelatin (Song et al. 2014), carboxymethylaspartate (CMA) (Porath et al. 1975, Hutschenreiter et al. 2003), tanic acid (TA) (Zhang et al. 2015, Han, Liu et al. 2017), porphyrin (Shao et al. 2015), dipyridylamine (DPA) (Clerac et al. 2000), phytic acid (Evans and Pierce 1982), nitrilopropionicdiacetic acid (NPDA) (Mitsuo et al. 1970), nitriloisopropionicdiacetic acid (NIPDA) (Mitsuo et al. 1970), N-(hydroxyethyl)ethylenediaminetriacetic acid (HEDTA) (Wubs and Beenackers 1993, Graff et al. 1995), ethylenediaminetetraacetic acid (EDTA) (Wubs and Beenackers 1993), ethylene-bis(oxyethylene-nitrilo)tetraacetic acid (EGTA) (Border et al. 1976, Okazaki et al. 2011), 1,4,7,10-tetraazacyclododecane-N,N',N'',N'''-tetraacetic acid (DOTA) (Kline et al. 1991, Chappell et al. 2003), 1,4,7-tris(carboxymethyl)-10-(2'-hydroxypropyl)-1,4,7,10-tetraazocyclodecane (Filippi et al. 2014), 1,4,7-triazacyclononane phosphinic acid (TRAP) (Simecek et al. 2012), 1,4,8,11-tetraazacyclotetradecane-N,N',N'',N'''-tetraacetic acid (TETA) (Yuanfang and Chuanchu 1991), ethylene dicysteine (Kong et al. 2010), bis(aminoethanethiol)carboxylic acid (Sun et al. 1996), triethylenetetraamine-hexaacetic acid (TTHA) (Harju and Ringbom 1970, Achour et al. 1998), 1,2-diaminocyclohexane-N,N,N',N'-tetraacetic acid (DACT) (Krzek et al. 2007), phosphonates (Rizkalla et al. 1980), 1,4,7-triazacyclonane-1,4,7-triacetic acid (NOTA) (Strand et al. 2013; Simecek et al. 2012), 1-(1,3-carboxypropyl)-1,4,7-triazacyclononane-4.7-diacetic acid (NODAGA) (Strand et al. 2013), deoxyribonucleic acid (DNA) (Pages et al. 2015), ribonucleic acid (RNA) (Alberti et al. 2016), purine (Cini and Giogi 1987) and pyridimidine (Saha and Mukherjee 1984).

Accordingly, the chelating ligand comprised in the metal cation chelating domain of c) may, for instance, be selected from the following non-limiting list: nitrilotriacetic acid (NTA), iminodiacetic acid (IDA), tris(carboxymethyl)ethylenediamine (TED), chelating peptides such as peptides with the consensus amino acid sequence $(GHHPH)_nG$, wherein G refers o glycine, H refers to histidine, P refers to proline and n is an integer number from 1 to 3; see also SEQ ID NOs: 1 to 3) or cadystin, triazacyclononane (TACN), diethylenetriamine-pentaacetate (DTPA), phytochelatin, carboxymethylaspartate (CMA), phosphonates, tannic acid (TA), porphyrin, dipyridylamine (DPA), phytic acid, nitrilopropionicdiacetic acid (NPDA), nitriloi sopropionicdiacetic acid (NIPDA), N-(hydroxylethyl)ethylenediaminetriacetic acid (HEDTA), 1,4,7,10-tetraazacyclodo-decane-N,N',N'',N'''-tetraacetic acid (DOTA), 1,4,7-tris(carboxymethyl)-10-(2'-hydroxypropyl)-1,4,7,10-tetraazocyclodecane, 1,4,7-triazacyclonane-1,4,7-triacetic acid (NOTA), 1-(1,3-carboxypropyl)-1,4,7-triazacyclononane-4.7-diacetic acid (NODAGA), 1,4,8,11-tetraazacyclotetra-decane-N,N',N'',N'''-tetraacetic acid (TETA), ethylenedicysteine, ethylenediaminetetraacetic acid (EDTA), 1,2-diaminocyclohexane-N,N,N',N'-tetraacetic acid (DACT), bis(aminoethanethiol)carboxylic acid, ethylene-bis(oxyethylene-nitrilo)tetraacetic acid (EGTA), tri ethylenetetramine-hexaacetic acid (TTHA), 1,4,7-triazacyclononane phosphinic acid (TRAP), deoxyribonucleic acid (DNA) and ribonucleic acid (RNA), purine, pyridimidine and derivatives thereof.

All these chelating ligands have in common that they provide at least two coordination sites that can act as Lewis base donor so as to form a coordination complex with the metal cation (i.e. are chelating agents). Accordingly, in one embodiment the chelating ligand may have at least 2, 3, 4, 5 or more chemical groups that can coordinate to the metal cation, i.e. that they can act as a lewis base.

In a preferred embodiment, the chelating ligand of the metal cation chelating domain of c) are selected from: nitrilotriacetic acid (NTA), iminodiacetic acid (IDA), chelating peptides with the consensus sequence (GHHPH)·G, wherein n is 1 to 3; see also SEQ ID NOs: 1 to 3), diethylenetriamine-pentaacetate (DTPA), nitrilopropionicdiacetic acid (NPDA), nitriloi sopropionicdiacetic acid (NIPDA), ethylenediamine-tetraacetic acid (EDTA), ethylene-bis(oxyethylene-nitrilo)tetraacetic acid (EGTA), carboxymethylaspartate (CMA) and derivatives thereof.

In another preferred embodiment the chelating ligand may be an amino polycarboxylic acid. Preferably the amino polycarboxylic acid is selected from ethylenediamine-tetraacetic acid (EDTA), nitrilo triacetic acid (NTA), iminodiacetic acid (IDA), ethylene-bis(oxyethylene-nitrilo)tetraacetic acid (EGTA), diethylenetriamine-pentaacetate (DTPA), and triethylenetetramine-hexaacetic acid (TTHA), tris(carboxymethyl)ethylenediamine (TED), triazacyclononane (TACN) or derivatives thereof.

In a particularly preferred embodiment the chelating ligand of the metal cation chelating domain of c) comprises or is selected from NTA, IDA, TALON and derivatives thereof. Most preferred is NTA and IDA as chelating ligand, particular most preferred is IDA. NTA is a tetradentate ligand and thus binds particularly strong to the metal cation. IDA is tridentate and also binds the metal cation strongly, yet weaker than NTA. Strong binding to the metal cation prevents release of the metal cation which results in undesired disassembly of the complex or release of the label and/or carrier from a target molecule. In certain embodiments IDA is preferred since complexes with high stability percentage can be formed faster than complexes with NTA. It is assumed that for tridentate metal binding domains the coordination of the protein is additionally facilated as the second metal cation ligand might still stay half coordinated to the metal, while it is completely displaced when using a tetradentate metal binding domains. Due to the partial coordination the ligand can be displaced easily by one histidine residue of the protein. Being now in close proximity also one or two other histidine residues can release the last ligand and form a stable complex.

In the context of the chelating ligand the term "derivative" refers to compounds having the same lead structure, but may be substituted by further chemically reactive groups. Preferably, the term "derivatives" in this context includes the substitution with one or more additional chemical groups selected from the group consisting of carboxyl, amine, azide, acrylate, maleimide, hydroxyl, thiol, aromatic, aliphatic, disulfate, and vinylsulfone groups. The term derivatives may also include molecules with isotopic substitutions. "Isotopic substitution" means that one or more of the atoms are isotope labeled.

The metal cation is preferably a metal cation that is stable in the respective oxidation state. The oxidation state may be +2, +3 or +4 depending on the metal employed. Accordingly, the metal cation of the complex may be a di-, tri- or tetravalent metal cation. In a preferred embodiment the cation is a trivalent metal cation (e.g. $Co^{3+}$). In another preferred embodiment the cation is a tetravalent metal cation (e.g. $Pt^{4+}$).

The metal cation may be a metal cation that can form a low-spin octahedral paramagnetic complex ($e_g^6 t_{2g}^0$), such as, for example, $Co^{3+}$. Accordingly, in one embodiment the complex may be a low-spin octahedral paramagnetic complex ($e_g^6 t_{2g}^0$), preferably a $Co^{2+}$ low-spin octahedral paramagnetic complex ($e_g^6 t_{2g}^0$). The metal cation may be a metal cation that can form a diamagnetic octahedral low-spin complex)($t_{2g}^6 e_g^0$, such as, for example, $Pt^{4+}$. Accordingly, in one embodiment the complex may be a diamagnetic octahedral low-spin complex)($t_{2g}^6 e_g^0$, preferably a diamagnetic octahedral low-spin $Pt^{4+}$ ($t_{2g}^6 e_g^0$).

Preferably, the metal cation is a metal cation having a water ligand exchange rate of $10^{-1}$ s$^{-1}$ or less (e.g. $10^{-2}$ s$^{-1}$ or less or $10^{-3}$ s$^{-1}$ or less). Metal cations with such low water ligand exchange rate have the advantage to form very tight complexes with the target molecule which are kinetically inert, i.e. do exchange the target molecule ligand only at very slow rates and provide a nearly covalent bond (i.e. a kinetically inert bond).

Methods for determining the water exchange rate of metal cations (and complexes comprising the same) are known in the art. An overview of methods that can be employed for determining the water exchange rate are described by A. Dunand and coworkers (Dunand et al. 2003). For assessing slow exchange rates as used in the context of the present invention, the measurement method may involve $^{17}O$ NMR analysis (Cusanelli et al. 1996). In such assays a complex of the metal with $^{17}O$ labeled water is generated and dissolved in $H_2O$. To determine the water exchange rate the $^{17}O$ loss over time is measured by the peak shift that arrises from the exchange with the $H_2O$.

In a preferred embodiment the metal cation of the complex may be a transition metal cation. The transition metal cation is preferably in an oxidation state that shows a water ligand exchange rate of $10^{-1}$ s$^{-1}$ or less. Transition metal cations are known in the art to have water exchange rates in this range and/or to be kinetically inert include: $Co^{3+}$, $Cr^{3+}$, $Rh^{3+}$, $Ir^{3+}$, $Ir^{4+}$, $Pt^{2+}$, $Pt^{4+}$, $Pd^{4+}$, $Mo^{3+}$, $Fe^{3+}$, $Gd^{3+}$, $Tb^{3+}$, $Eu^{3+}$, $Ru^{3+}$, $La^{3+}$, $Ru^{3+}$, $Re^{3+}$, $Re^{4+}$, $Os^{2+}$, $V^{2+}$, $Mn^{4+}$ and $Fe^{2+}$. Thus, preferred but non-limiting examples for metal ions that may be employed in the context of the present invention that belong to the transition metal cations are: $Co^{3+}$, $Cr^{3+}$, $Rh^{3+}$, $Ir^{3+}$, $Ir^{4+}$, $Pt^{2+}$, $Pt^{4+}$, $Pd^{4+}$, $Mo^{3+}$, $Fe^{3+}$, $Gd^{3+}$, $Tb^{3+}$, $Eu^{3+}$, $Ru^{3+}$, $La^{3+}$, $Ru^{3+}$, $Re^{3+}$, $Re^{4+}$, $Os^{2+}$, $V^{2+}$, $Mn^{4+}$ and $Fe^{2+}$.

In one embodiment the metal cation may be a trivalent transition metal cation, preferably the trivalent transition metal cations as listed above, even more preferably $CoFe^{3+}$, $Gd^{3+}$, $Tb^{3+}$, $Eu^{3+}$, $Ru^{3+}$, $La^{3+}$, $Ru^{3+}$, $Re^{3+}$, $Re^{4+}$, $Os^{2+}$, $V^{2+}$, $Mn^{4+}$ and $Fe^{2+}$.

In one embodiment the metal cation may be a tetravalent transition metal cation, preferably the tetravalent transition metal cations as listed above, preferably $Pt^{4+}$.

In one embodiment the metal cation of the complex may be a lanthanoide (also referred to as inner transition metal) cation. The lanthanoides are a subgroup of the transition metals and include the following metals: La, Ce, Pr, Nd, Pm, Sm, Eu, Gd, Tb, Dy, Ho, Er, Tm, Yb and Lu. A lanthanoide cation that may be employed in the present invention has preferably an oxidation state that has a water ligand exchange rate of $10^{-1}$ s$^{-1}$ or lower, preferably $10^{-2}$ s$^{-1}$ or lower. Lanthanoid cations are known in the art to have water exchange rates in this range and/or to be kinetically inert are: $La^{3+}$, $Eu^{3+}$, $Gd^{3+}$ and $Tb^{3+}$. Accordingly, the metal cation in context of the invention may be a lanthanoid cation selected from the group consisting of: $La^{3+}$, $Eu^{3+}$, $Gd^{3+}$ and $Tb^{3+}$. Thus, in one embodiment the metal cation of the complex may also be a trivalent lanthanoid cation.

In one embodiment the metal cation may be selected from the group consisting of: $Co^{3+}$, $Pt^{4+}$ $Cr^{3+}$, $Rh^{3+}$, $Ir^{3+}$, $Pt^{2+}$, $Ru^{2+}$, $Ru^{3+}$, $La^{3+}$, $Eu^{3+}$, $Os^{2+}$, $Pd^{4+}$, $Mo^{3+}$, $Fe^{3+}$, $Ru^{2+}$, $Gd^{3+}$, $Tc^{3+}$, $Re^{3+}$, $Sm^{3+}$, $Tb^{3+}$, $Ce^{3+}$, $Pr^{3+}$, $Nd^{3+}$, $Pm^{3+}$, $Dy^{3+}$, $Ho^{3+}$, $Er^{3+}$, $Tm^{3+}$, $Yb^{3+}$, $Lu^{3+}$, $V^{2+}$, $Mn^{4+}$ and $Fe^{2+}$. A skilled person is aware that these metal cations are characterized by a very low water ligand exchange rate. The present inventors found that especially such metal cations with a low water ligand exchange rate are useful metal cations for mediating the interaction between the label and/or carrier-containing metal cation chelating domain and a target molecule in the product complex formed by incubating the complex of the invention with the target molecule. This is because these metals facilitate a very stable interaction in the product complex that is thermodynamically stable and kinetically inert.

In a preferred embodiment the metal cation is selected from the group consisting of: $Co^{3+}$, $Pt^{4+}$, $Cr^{3+}$, $Rh^{3+}$, $Ir^{3+}$, $Ir^{4+}$, $Pt^{2+}$, $Pd^{4+}$, $Mo^{3+}$, $Fe^{3+}$, $Gd^{3+}$, $Tb^{3+}$, $Eu^{3+}$, $Ru^{2+}$, $Re^{3+}$, $Re^{4+}$, $Os^{2+}$, $V^{2+}$, $Mn^{4+}$, $Fe^{2+}$. These metal cations have been described in literature to have water ligand exchange rate of $10^{-1}$ $s^{-1}$ or less and/or to be kinetically inert metal cations: $Co^{3+}$ (Lippard and Berg 1994), $Cr^{3+}$ (Helm and Merbach 2002; Helm and Merbach, 1999), $Rh^{3+}$ (Aebischer et al. 1993; Helm and Merbach, 1999), $Ir^{3+}$ (Cusanelli et al. 1996; Helm and Merbach, 1999), $Ir^{4+}$ (Saito et al. 1990), $Pt^{2+}$ (Helm et al. 1984; Helm and Merbach, 1999), $Pt^{4+}$ (Giandomenico et al. 1995), $Pd^{4+}$ (Saito et al. 1990), $Mo^{3+}$ (Saito et al. 1990), $Fe^{3+}$ (Harrington et al. 2018), $Gd^{3+}$ (Caravan et al. 2001), $Tb^{3+}$ (Junker et al. 2018), $Eu^{3+}$ (Morrow and Chin 1993), $Ru^{2+}$ (Hugi-Cleary et al. 1987; Helm and Merbach, 1999), $La^{3+}$ (Morrow and Chin 1993), $Ru^{3+}$ (Hugi-Cleary et al. 1987; Helm and Merbach, 1999), $Re^{3+}$ (House and House, 2015), $Re^{4+}$ (Saito et al. 1990) and $Os^{2+}$ (Livingstone, 1973), $V^{2+}$ (House and House, 2015), $Mn^{4+}$ (House and House, 2015), $Fe^{2+}$ (House and House, 2015). Thus, it is plausible that these metal cations can form similarly stable product complexes with target molecules so that the label and/or carrier is attached to the target molecule stably.

In the context of the invention a "kinetically inert metal cation" is understood as a metal cation having a water ligand exchange rate of $10^{-1}$ $s^{-1}$ or lower. This definition and cut-off is also in accordance with the common understanding of this expression in the literature (Taube, 1952; Luther III, 2016). Preferred methods for measuring the water exchange rate are mentioned elsewhere herein.

"Kinetically inert" when used in the context of the binding of a ligand in a metal complex, e.g. of the target molecule in the "product complex", as used herein preferably means that the ligand exchange rate in an aqueous solution is $10^{-1}$ $s^{-1}$ or lower, even more preferably $10^{-2}$ $s^{-1}$ or lower. Methods for measuring the ligand exchange rate are known in the art. For instance, the methods as described herein elsewhere for measuring water exchange rate may be used mutatis mutandis. An assay for determining the ligand exchange rate and/or evaluating kinetic inertness of the binding of a target molecule in a "product complex" in accordance with the invention may involve measuring competition with competing ligands (such as imidazole or EDTA) and/or with reducing agents (e.g. DTT) as described in the appended Examples and Figures (see e.g. FIGS. 1, 6 and 7B). A preferred assay for assessing "kinetic inertness" of the binding of a target molecule to the complex (i.e. the "product complex) may be assessed by a method as exemplary described in Example 5. Specifically, a [Co(III)(NTA)(CO$_3$)]$^{2-}$ complex with NTA linked to agarose beads may be generated as described herein and in the appended Examples and Figures. Subsequently, this bead bound [Co(III)(NTA)(CO$_3$)]$^{2-}$ complex may be incubated with the target molecule to form a [Co(III)(NTA)(target protein)] "product complex" immobilized on agarose beads. Subsequently, the chemical stability of the [Co(III)(NTA)(target protein)] complex may be evaluated by washing equal amounts of the generated agarose beads with PBS(=control) or with an imidazole solution (PBS supplemented with 250 mM imidazole)(=sample). Optionally, a conventional $Ni^{2+}$-NTA based matrix can be employed as comparison. The amount of bound target molecule may then be assessed for all samples (optionally before and after washing). Methods for determining the presence of the target molecule (i.e. read-outs) depend on the properties of the target molecule and are known in the art. For instance, the assay may involve fluorescence measurement (e.g. when the target molecule is fluorescent). For non-fluorescent target molecules fluorescent antibodies detecting the target molecule may be used for the read out. Another example for read-outs is the use of enzymatic reactions when the target molecule is an enzyme or when using an enzyme labeled antibody directed to the target molecule. In the context of the present invention a target molecule ligand is preferably found to be bound "kinetically inert" in the "product complex" when the 250 mM imidazole washed beads(=sample) contain after washing at least about 30%, at least about 40%, at least about 50%, at least about 60%, at least about 70%, at least about 80%, preferably about 85%, even more preferably at least about 90%, even more preferably about 95% and most preferably at least about 99% of the target molecule relative to the amount of target molecule bound to the PBS washed beads(=control).

In one embodiment the metal cation may be $Co^{2+}$ or $Cr^{3+}$.

In a particularly preferred embodiment the metal is $Co^{3+}$. As demonstrated in the appended Examples, $Co^{3+}$ is particularly well suitable and allows for a fast and easy production of the complex of the invention and ensures a kinetically inert binding to the target molecule.

In another preferred embodiment the metal is $Pt^{4+}$. As demonstrated in the appended Examples, $Pt^{4+}$ is particularly well suitable and allows for a fast and easy production of the complex of the invention and ensures a kinetically inert binding to the target molecule.

The invention also relates to a complex, wherein the metal cation is $Co^{3+}$ and the chelating ligand of the metal cation chelating domain is NTA (or a derivate thereof).

The invention also relates to a complex, wherein the metal cation is $Co^{3+}$ and the chelating ligand of the metal cation chelating domain is IDA (or a derivate thereof).

The invention also relates to a complex, wherein the metal cation is $Co^{3+}$ and the chelating ligand of the metal cation chelating domain is Talon (or a derivate thereof).

The invention also relates to a complex, wherein the metal cation is $Pt^{4+}$ and the chelating ligand of the metal cation chelating domain is NTA (or a derivate thereof).

The invention also relates to a complex, wherein the metal cation is $Pt^{4+}$ and the chelating ligand of the metal cation chelating domain is Talon (or a derivate thereof).

The invention also relates to a complex, wherein the metal cation is $Pt^{4+}$ and the chelating ligand of the metal cation chelating domain is IDA (or a derivate thereof).

Accordingly, the present invention relates to a complex (e.g. a complex for attaching a label and/or a carrier to a target molecule) comprising:
a) $Co^{3+}$;
b) a metal cation ligand being a carbonate selected from $CO_3^{2-}$ and $HCO_3^-$ or nitrate; and
c) a metal cation chelating domain comprising NTA and a label and/or carrier.

The present invention also relates to a complex (e.g. a complex for attaching a label and/or a carrier to a target molecule) comprising:
a) $Co^{3+}$;
b) a $CO_3^{2-}$ or $HCO_3^-$ ligand; and
c) a metal cation chelating domain comprising NTA and a label and/or carrier.

The present invention also relates to a complex (e.g. a complex for attaching a label and/or a carrier to a target molecule) comprising:
a) $Co^{3+}$;
b) a $CO_3^{2-}$ or $HCO_3^-$ ligand; and
c) a metal cation chelating domain comprising Talon and a label and/or carrier.

The present invention also relates to a complex (e.g. a complex for attaching a label and/or a carrier to a target molecule) comprising:
a) $Co^{3+}$;
b) a $CO_3^{2-}$ or $HCO_3^-$ ligand; and
c) a metal cation chelating domain comprising IDA and a label and/or carrier.

The present invention also relates to a complex (e.g. a complex for attaching a label and/or a carrier to a target molecule) comprising:
a) $Pt^{4+}$;
b) a $CO_3^{2-}$ or $HCO_3^-$ ligand; and
c) a metal cation chelating domain comprising NTA and a label and/or carrier.

The present invention also relates to a complex (e.g. a complex for attaching a label and/or a carrier to a target molecule) comprising:
a) $Pt^{4+}$;
b) a $CO_3^{2-}$ or $HCO_3^-$ ligand; and
c) a metal cation chelating domain comprising IDA and a label and/or carrier.

The present invention also relates to a complex (e.g. a complex for attaching a label and/or a carrier to a target molecule) comprising:
a) $Pt^{4+}$;
b) a $CO_3^{2-}$ or $HCO_3^-$ ligand; and
c) a metal cation chelating domain comprising Talon and a label and/or carrier.

In one embodiment the chelating ligand of the metal cation chelating domain is diethylenetriamine-pentaacetate (DTPA) and the metal cation is selected from $Gd^{3+}$, $In^{3+}$, and $Fe^{3+}$. In one embodiment, the chelating ligand of the metal cation chelating domain is tanic acid (TA) and the metal cation is $Co^{3+}$. In one embodiment, the chelating ligand of the metal cation chelating domain is dipyridylamine (DPA) and the metal cation is $Co^{3+}$. In one embodiment the chelating ligand of the metal cation chelating domain is 1,4,7-triazacyclononane phosphinic acid (TRAP) and the metal cation is $Ga^{3+}$. In one embodiment the chelating ligand of the metal cation chelating domain is ethylenedicysteine and the metal cation is $Re^{3+}$ or $Tc^{3+}$. In one embodiment the chelating ligand of the metal cation chelating domain is triethylenetetraamine-hexaacetic acid (TTHA) and the metal cation is selected from the group consisting of $Gd^{3+}$, $In^{3+}$ and $Fe^{3+}$. In one embodiment the chelating ligand of the metal cation chelating domain is 1,4,7-triazacyclonane-1,4,7-triacetic acid (NOTA) and the metal cation is $In^{3+}$. In one embodiment the chelating ligand of the metal cation chelating domain is 1-(1,3-carboxypropyl)-1,4,7-triazacyclononane-4.7-diacetic acid (NODAGA) and the metal cation is $In^{3+}$.

The metal cation ligand (which may also be referred to as second ligand) of the complex of the invention is selected from the carbonates $CO_3^{2-}$ and $HCO_3^-$ or nitrate. The inventors have found that using these metal cation ligands facilitates target molecule coordination. This is achieved by the faster and easier exchange of the carbonates or nitrate from the complex with the target molecule. Carbonates and nitrate can both get protonated after release from the complex. This protonation facilitates release from the complex. In the context of the carbonates $CO_3^{2-}$ and $HCO_3^-$ protonation even leads to gas formation. Without being bound by theory, gas formation is believed to further increase the exchange kinetics and thermodynamics of the exchange of the carbonate ligand with the target molecule. Therefore, the carbonates $CO_3^{2-}$ and $HCO_3^-$ are particularly preferred metal cation ligands.

Nitrate may also be used as a metal cation ligand but this is the matter of a different invention.

In a preferred embodiment the metal cation ligand is a carbonate selected from $CO_3^{2-}$ and $HCO_3^-$. It is demonstrated in the appended Examples that these carbonates facilitate the formation of the product complex with the target molecule. In other words, the complex of the invention is more reactive regarding attaching labels and/or carriers to a target molecule.

In a particular embodiment, the complex of the invention comprises an $[Co(III)(NTA)CO_3]^{2-}$ complex, an $[Co(III)(NTA)HCO_3]^-$ complex or a hydrate thereof. The label and/or carrier is/are attached to the NTA. In these complexes four coordination sites are occupied by the NTA and two are occupied by the carbonate. Carbonate is a didentate ligand, i.e. has two atoms that can coordinate to the metal cation in the complex as donors (i.e. lewis bases) and facilitates binding of a target molecule. NTA is a chelator with a particularly strong binding of the metal cation due to its tetradentate binding. Thus, NTA prevents undesired complex and product complex disassembly by undesired metal cation release.

In a preferred embodiment, the complex of the invention comprises an $[Co(III)(IDA)CO_3]^-$ complex, an $[Co(III)(IDA)HCO_3]$ complex or a hydrate thereof. The label and/or carrier is/are attached to the IDA. In these complexes three coordination sites are occupied by the IDA and two are occupied by the carbonate. Carbonate is a didentate ligand, i.e. has two atoms that can coordinate to the metal cation in the complex as donors (i.e. lewis bases) and facilitates binding of a target molecule. It is assumed that for tridentate metal binding domains the coordination of the protein is additionally facilated as the second metal cation ligand might still stay half coordinated to the metal, while it is completely displaced when using a tetradentate metal binding domains. Due to the partial coordination the ligand can be displaced easily by one histidine residue of the protein. Being now in close proximity also one or two other histidine residues can release the last ligand and form a stable complex.

The metal cation chelating domain of the complex of the invention comprises a label and/or carrier. In other words, the complex of the invention comprises a functional moiety. It is preferred that the label and/or carrier is different from the coordination groups of the chelating ligand, i.e. does not share the same atoms. However, in some embodiments the chelating ligand and the label and/or carrier may also share one or more atoms.

The metal cation chelating domain of the complex of the invention may comprise a chelating ligand and a label but no carrier. Alternatively, the metal cation chelating domain of the complex of the invention may comprise a chelating ligand and a carrier but no label. In another embodiment, the metal cation chelating domain of the complex of the invention may comprise a carrier and a label.

In a particular embodiment, the metal cation chelating domain may further comprise a linker between the chelating ligand and the label and/or carrier. Such linker may facilitate complex formation and/or establish a defined distance between the label and/or carrier and the chelating ligand. A linker can in principle be any chemical linkage suitable to covalently link the label/carrier with the chelating ligand in the desired distance. The skilled person can select the linker according to the needs with respect to resistance of the bond to the environment and conditions of the intended use. A linker may, for example, comprise an antibody-drug conjugate (ADC) linker, a negatively charged sulfone group, a polyethylene glycol (PEG), a pyrophosphate diester, a peptide-based linker (e.g., a Cathepsin B-responsive linker such as Val-Cit-PABC or Val-Ala-PABC; wherein herein Cit refers to L-citrulline and PABC refers to p-aminobenzyloxycarbonyl), a hydrazone, a disulfide containing linker, a thioether containing linker, a beta-glucuronide or combinations thereof. In one embodiment the linker may consist of an antibody-drug conjugate (ADC) linker, a negatively charged sulfone group, a pyrophosphate diesters, a peptide-based linker (e.g. a Cathepsin B-responsive linker such as Val-Cit-PABC or Val-Ala-PABC), a hydrazone, a disulfide containing linker, a thioether containing linker, a beta-glucuronide, a nucleic acid linker (preferably DNA) or combinations thereof. Antibody-drug conjugate (ADC) linkers are known in the art. Exemplary ADC linkers that may be employed in the context of the invention are, for example described in Tsuchikama and An; 2018, ADC_Review 2019; and/or Jain et al., 2015, all of which are herein incorporated by reference in their entirety. Linkers based on negative charged sulfone groups are also known in the art. Exemplary linkers with negative charged sulfone groups that may be employed in the context of the invention are described in Zhao et al., 2011, which is incorporated herein by reference in its entirety. PEG linkers are known in the art. Exemplary PEG linkers that may be employed in the context of the invention are described in Lyon et al., 2015, which is incorporated herein by reference in its entirety. Pyrophosphate diester linkers are known in the art. Exemplary pyrophosphate diester linkers that may be employed in the context of the invention are described in Kern et al., 2016, which is incorporated herein by reference in its entirety. Peptide-based linkers (e.g. a Cathepsin B-responsive linker such as Val-Cit-PABC or Val-Ala-PABC) are known in the art. Exemplary Peptide-based linker (e.g. a Cathepsin B-responsive linker such as Val-Cit-PABC or Val-Ala-PABC) that may be employed in the context of the invention are described in Dubowchik et al., 2002 and/or Hartley, 2011, which are incorporated herein by reference in their entirety. Hydrazone linkers are known in the art. Exemplary hydrazone that may be employed in the context of the invention are described in Tolcher et al., 1999, which is incorporated herein by reference in its entirety. Disulfide containing linkers are known in the art. Exemplary disulfide containing linkers that may be employed in the context of the invention are described in Saito et al., 2003, which is incorporated herein by reference in its entirety. Thioether containing linkers are known in the art. Exemplary thioether containing linkers that may be employed in the context of the invention are described in Stenton et al., 2018, which is incorporated herein by reference in its entirety. Beta-glucuronide linkers are known in the art. Exemplary beta-glucuronide linkers that may be employed in the context of the invention are described in Jeffrey et al., 2010, which is incorporated herein by reference in its entirety. Nucleic acid linkers, such as DNA linkers are known in the art.

The label of the metal cation chelating domain may comprise or consist of a fluorophore, a diagnostic, a targeting moiety, a therapeutic agent, a polyethylene glycol (PEG) molecule, a lipid, biotin (and/or its derivatives such as, for example, photobiotin: N-(4-azido-2-nitrophenyl)-aminopropyl-N'-(N-d-biotinyl-3-aminopropyl)-N'-methyl-1,3-propanediamine (Forster et al., 1985), a protein (e.g. an antibody), a peptide or a toxin. A label may also comprise or consist of a reactive group, preferably selected from a thiol group or reactive groups suitable for click chemistry. Non-limiting examples for reactive groups suitable for click chemistry are azide, alkyne, nitrone, tetrazine and tetrazole. The definition of the term "derivatives" as mentioned elsewhere herein applies mutatis mutandis.

Labels may include functional moieties that can be detected directly (such as fluorescent, chromophoric, electron-dense, chemiluminescent, and radioactive labels), as well as moieties, such as enzymes or ligands, that are detected indirectly, e.g., through an enzymatic reaction or molecular interaction.

Exemplary labels include, but are not limited to, the radioisotopes $^{32}$P, $^{14}$C, $^{125}$I, $^{3}$H, and $^{131}$I (preferably these atoms do not form part of the chelating ligand), fluorophores, fluorescein and its derivatives, rhodamine and its derivatives, dansyl, umbelliferone, luceriferases, e.g., firefly luciferase and bacterial luciferase (U.S. Pat. No. 4,737,456), luciferin, 2,3-dihydrophthalazinediones, horseradish peroxidase (HRP), alkaline phosphatase, β-galactosidase, glucoamylase, lysozyme, saccharide oxidases, e.g., glucose oxidase, galactose oxidase, and glucose-6-phosphate dehydrogenase, heterocyclic oxidases such as uricase and xanthine oxidase, coupled with an enzyme that employs hydrogen peroxide to oxidize a dye precursor such as HRP, lactoperoxidase, or microperoxidase, biotin/avidin, spin labels, bacteriophage labels, stable free radicals, and the like. In another embodiment, a label is a positron emitter. Positron emitters include but are not limited to $^{68}$Ga, $^{18}$F, $^{64}$Cu, $^{86}$Y, $^{76}$Br, $^{89}$Zr, and $^{124}$I. In a particular embodiment, a positron emitter is $^{89}$Zr.

In one embodiment said label is a label which is sensitive to an oxidation reagent (preferably $H_2O_2$) treatment. "Sensitive to an oxidation reagent" in this context means that the label shows reduced function/activity (e.g. fluorescence in the case of fluorophores) and/or stability after oxidation agent treatment. Preferably, the oxidation agent treatment is a treatment with a 20 mM $H_2O_2$ solution and the label is sensitive after treatment of at least 0.5 h, 1 h, 2 h or 24 h. In a preferred test of sensitivity against oxidation agents, the incubation may be performed in 20 mM $H_2O_2$ solution for at least 1 h, e.g. exactly 1 h as described as oxidation step in Wegner and Spatz, 2013. Alternatively, the test may be conducted in a 0.05% (v/v) $H_2O_2$ solution for at least 90 min, e.g. exactly 90 min as described for the oxidation step of Zatloukalová and Kucerová. To shorten the test, one may also use a solution with a higher $H_2O_2$ concentration such as a 1% (v/v) $H_2O_2$. Preferred $H_2O_2$ concentrations and incubation times, including time course experiments that may be used to evaluate $H_2O_2$ sensitivity are described in the appended Examples. Assays for measuring oxidation agent sensitivity involve the incubation with an oxidation agent (e.g. $H_2O_2$) comprising solution (at the desired oxidation agent concentration, preferably in an aqueous solution, even more preferably water) and the measurement of a read-out indicative for label function/activity and/or stability (e.g. measuring the emitted fluorescence in the case of fluorophores) before and at different time points during the treatment. A label is considered to be "oxidation sensitive" when the read-out measure indicates loss of label function/activity and/or stability. The preferred time point to assess the loss of label function/activity and/or stability is the time required to oxidize $Co^{2+}$ to $Co^{3+}$ in the presence of the oxidation agent used and as mentioned-above. When assessing $H_2O_2$ sensitivity preferred concentrations of $H_2O_2$ and the incubation times are the ones indicated in this passage above. An exemplary method for testing oxidation sensitivity of fluorophore labels is described in the appended Examples. A skilled person can modify this assay depending on the label used and adapt parameters as $H_2O_2$ concentration and incubation time.

In one embodiment the label may comprise or may consist of a fluorophore. Fluorophores are known in the art and are publically and/or commercially available. Also methods for coupling fluorophores to the chelating ligand of the metal cation chelating domain are known in the art. As demonstrated by the appended Examples many fluorophores (e.g. fluorescein, FITC, Atto488 and Alexa 488) are sensitive to $H_2O_2$ treatment. This sensitivity makes the complex of the invention particularly suitable for use in the context of fluorophores as label. Yet, this advantage is not limited to fluorophores. In one embodiment, the metal binding domain may comprise a fluorophore as label and the chelating ligand may be NTA. In one embodiment, the metal binding domain may comprise a fluorophore as label and the chelating ligand may be IDA.

In one embodiment the fluorophore may be fluorescein, FITC, Atto488 and Alexa 488. As demonstrated in the appended Examples these fluorophores are sensitive to $H_2O_2$ treatment.

In one embodiment, the complex of the invention and more specifically the label and/or carrier may not be or comprise a porphyrin-phospholipid as described by Shao et al. (Shao et al. 2015).

The term "label" in the context of the invention excludes single atoms such as hydrogen atoms which are part of the chelating ligand of the metal cation chelating domain. Preferably, a label relates to a structure comprising at least two atoms, at least three or at least 10 atoms. Preferably, the label is a functional moiety and/or a moiety that can be detected with methods known in the art (e.g. NMR, fluorescence measurement, enzymatic assays etc.).

As mentioned above, the metal binding domain may comprise a carrier (optionally in addition to a label). Non-limiting examples for a carrier according to the present invention are a polymer, a hydrogel, a microparticle, a nanoparticle, a sphere (e.g. a nano- or microsphere), beads (e.g. microbeads), quantum dots, prosthetics and a solid surface. In one embodiment the carrier may comprise or be a nano-patterned gold surface. Such nano-patterned gold surface may be functionalized with thiol residues.

The skilled person is aware of techniques to attach/immobilize the chelating ligands on the carrier so as to form a metal binding domain comprising a chelating ligand and a carrier. For instance, if the chelating ligand is an aminopolycarboxylic acid (e.g. NTA) the chelating ligand may be covalently bound to the solid phase, e.g., via at least one of the carboxylic acid groups or the amino groups. In another embodiment the chelating ligand may be linked to the carrier via an amide- or ester-linkage.

In a preferred embodiment the carrier is a bead (e.g. a microbead), such as an agarose bead. Accordingly, the invention relates to beads (e.g. microbeads) having the complex of the invention (without the label and/or carrier) attached thereto. These beads may also be referred to as affinity matrix. Such beads with the complex of the invention represent a ready-to-use reagent for attaching a target molecule to the beads (i.e. immobilize the target molecule to the beads). Accordingly, the present invention relates to a complex (e.g. a complex for attaching a target molecule to a bead) comprising:
 a) $Co^{3+}$;
 b) a metal cation ligand being a carbonate selected from $CO_3^{2-}$ and $HCO_3^-$ or nitrate; and
 c) a metal cation chelating domain comprising NTA and a bead.

Preferably, the present invention relates to a complex (e.g. a complex for attaching a label and/or a carrier to a target molecule) comprising:
 a) $Co^{3+}$;
 b) a $CO_3^{2-}$ or $HCO_3^-$ ligand; and
 c) a metal cation chelating domain comprising NTA and a bead.

More preferably, the present invention relates to a complex (e.g. a complex for attaching a label and/or a carrier to a target molecule) comprising:
 a) $Co^{3+}$;
 b) a $CO_3^{2-}$ or $HCO_3^-$ ligand; and
 c) a metal cation chelating domain comprising IDA and a bead.

Such complexes may be generated as described in the appended Examples. For example, NTA agarose resin (Qiagen, 1022963) may be washed once with 10 bead volumes $ddH_2O$, once with 3 bead volumes 100 mM EDTA pH7.5, thrice with 10 bead volumes $ddH_2O$. Subsequently 10 bead volumes of 1 mM $Na_3[CO(III)(CO_3)_3]*3H_2O$ or $K_3[Co(III)(CO_3)_3]*3H_2O$ in 1 M $NaHCO_3$ may be added to the beads. After incubation for 48 h in a thermoshaker at 23° C. shaking at 1100 rpm, the beads may be washed twice with 10 bead volumes $ddH_2O$ and once with 10 bead volumes protein buffer (50 mM Tris pH7.4, 150 mM NaCl). Finally the beads may be collected (e.g. by centrifugation) to obtain the complex attached to the beads as carrier.

As shown in the appended examples but without being bound by theory, the incubation times of the metal cation, the metal cation ligand and the metal cation chelating domain to form the complex of the invention may influence the latter association of the complex of the invention with the target molecule. The incubation time for formation of the inventive complex is in context of this invention the "complex formation time". The incubation time of the inventive complex with the target molecule is in context of this invention the "complex-target incubation time". Non limiting Example 18 shows e.g., that when the complex formation time is 10 min substantially more of the target molecule (i.e. $His_6$-GFP) binds to the inventive complex after a complex-target incubation time of 30 min compared to the same complex-target incubation time but with a complex formation time of 48 h (FIG. 20B). However, when the complex-target incubation time is prolonged (e.g. to 48 h) the efficient binding of $His_6$-GFP to the inventive complex is restored (see e.g. FIG. 10). The person skilled in the art is readily in the position to adapt the corresponding incubation times as desired.

Furthermore, the appended examples show that both, the complex formation time and the complex-target incubation time influence the stability of the resulting product complex, i.e. the stability between the inventive complex and the target molecule. Example 18 demonstrates that when the complex formation time is 10 min and the complex-target incubation time is 30 min the target molecule binds efficient to the inventive complex but only a fraction of the product complex is kinetically inert, i.e. resistant against imidazole treatment (FIG. 20B). The fraction of kinetically inert product complexes increases when one incubation time, i.e. the complex formation time or the complex-target incubation time is prolonged (e.g. to 48 h).

As also illustrated by non-limiting Example 18 the combination of a complex formation time of 10 min and a complex-target incubation time of 48 h leads to a high fraction of stable product complexes. In addition, the combination of a complex formation time of 48 h and a complex-target incubation time of 30 min leads to stable product complexes (see e.g. Example 10, FIG. 11). As discussed above a complex formation time of 48 h may lead to a reduced binding efficiency of the target molecule to the inventive complex.

Therefore, depending on the nature of the target molecule the skilled person knows how to chose suitable incubation times. It may be possible that the target molecule is very prone to e.g. denaturation or aggregation during incubation but kinetically inert product complexes are required. Thus, when desired the skilled person may choose a prolonged complex formation time (e.g. 48 h) and a shorter complex-target incubation time (e.g. 30 min) although the amount of resulting product complexes may be reduced. It is noted that appended Example 18 was performed with NTA as metal chelating ligand.

Without wishing to be bound by theory it is noted that the influence of above-mentioned incubation times may be dependent on the metal chelating ligand used. For example, in appended non-limiting Example 15, IDA is used as metal chelating ligand and said Example documents that a high fraction of kinetically inert product complexes are formed even for two short incubation times (i.e. a complex formation time of 10 min and a complex-target incubation time of 30 min).

Thus, the skilled artisan is aware that the incubation time may have influence on the stability of the product complex may need to be determined for each individual metal chelating ligand. Yet, this adaption of the corresponding incubation time is well within the skills of the relevant artisan and can be achieved without further ado with the teachings of the present invention and the illustration of the experimental part and scientific details provided therein. Similarly, the person skilled in the art is also readily capable to adapt additional paramters like pH, temperature and buffer systems in order to obtain the kinetically inert product complexes.

Table 1 may help the skilled artisan to determine the effect of the incubation times on the stability of the product complex and the yield of stable, i.e. kinetically inert product complexes. Medium stability for example means that a smaller fraction of product complexes is kinetically inert compared to incubation times that result in a high stability, i.e. in a high fraction of kinetically inert product complexes. It is noted that also a medium stability may result in a yield of stable product complexes that may be useful for certain applications and technical fields. When unlimited amounts of the target molecule are available and stable product complex are required on a short term the skilled artisan may refer to the following protocol, preferably when NTA is used as a metal cation chelating ligand:
- choose two shorter incubation times
- treat the resulting product complex (e.g. bound to beads) with imidazole to remove product complex that is not kinetically inert
- recover product complex resistant to imidazole treatment, i.e. the kinetically inert product complexes (e.g. by recovering the beads)

The skilled artisan is well aware how to adapt said protocol depending on the application.

It is clear that Table 1 can further be used to select the complex formation time and the complex-target incubation time.

Accordingly, the times disclosed in Table 1 can be combined with the inventive complexes, methods and uses described herein.

Accordingly, the invention relates for example to a complex comprising:
a) a metal cation;
b) a metal cation ligand being $CO_3^{2-}$ or $HCO_3^-$; and
c) a metal cation chelating domain comprising a chelating ligand and a label and/or carrier;
wherein the complex formation time is about 48 h.

The invention also relates to a complex comprising:
a) a metal cation;
b) a metal cation ligand being $CO_3^{2-}$ or $HCO_3^-$; and
c) a metal cation chelating domain comprising a chelating ligand and a label and/or carrier;
wherein the complex formation time is about 10 min.

It is noted that Table 1 is solely for illustrative purposes and is not in any way limiting for the scope of the invention.

TABLE 1

Influence of complex formation time and complex-target incubation time on stability of the product complex and on yield of stable product complex. If not indicated otherwise all incubation steps were performed at 25° C.

| Metal binding domain (mbd) | metal center (mc) | metal binding ligand (mbl) | Incubation time for [mc(mbd)(mbl)] formation (complex formation time) | Incubation time for [mc(mbd)(His-Protein)] formation (complex-target incubation time) | Stability | Yield of stable complex |
|---|---|---|---|---|---|---|
| NTA | Co(III) | $CO_3^{2-}/HCO_3^-$ | 48 h | 30 min | high | medium |
| NTA | Co(III) | $CO_3^{2-}/HCO_3^-$ | 48 h | 3,5 h | high | maximum |

TABLE 1-continued

Influence of complex formation time and complex-target incubation time on stability of the product complex and on yield of stable product complex. If not indicated otherwise all incubation steps were performed at 25° C.

| Metal binding domain (mbd) | metal center (mc) | metal binding ligand (mbl) | Incubation time for [mc(mbd)(mbl)] formation (complex formation time) | Incubation time for [mc(mbd)(His-Protein)] formation (complex-target incubation time) | Stability | Yield of stable complex |
|---|---|---|---|---|---|---|
| NTA | Co(III) | $CO_3^{2-}$/$HCO_3^-$ | 10 min | 48 h | high | high |
| NTA | Co(III) | $CO_3^{2-}$/$HCO_3^-$ | 10 min (70° C.) | 48 h | high | high |
| NTA | Co(III) | $CO_3^{2-}$/$HCO_3^-$ | 10 min | 30 min | medium | medium |
| NTA | Pt(IV) | $NO_3^-$ | 10 min | 30 min | high | high |
| IDA | Co(III) | $CO_3^{2-}$/$HCO_3^-$ | 10 min | 30 min | high | high |
| IDA | Co(III) | $CO_3^{2-}$/$HCO_3^-$ | 10 min | 3 h | high | maximum |
| TALON | Co(III) | $CO_3^{2-}$/$HCO_3^-$ | 10 min | 48 h | high | high |
| TALON | Co(III) | $CO_3^{2-}$/$HCO_3^-$ | 48 h | 1 h | high | high |
| TALON | Co(III) | $CO_3^{2-}$/$HCO_3^-$ | 10 min | 30 min | medium | high |

The binding of NTA to $Co^{3+}$ may be enhanced by introduction of energy into the system/exposure to energy during incubation. Such introduction of energy to the system/exposure to energy may be electromagnetic resonance techniques at different frequencies (as used e.g. with. NMR, x-ray, UV-Vis), heat, ultrasound, or plasmon resonance techniques.

The carrier of the invention or a surface thereof may be further functionalized with amino-groups, carboxylic acid groups and/or activated esters, such as NHS esters.

Further non-limiting examples for metal binding domains comprising a carrier are described in WO 2014/072525 A1 and WO 2003/072143 which are herein incorporated by reference in their entirety.

In a second aspect, the present invention relates to a composition comprising the complex of the invention. What is said herein elsewhere for the complex applies mutatis mutandis.

The composition may in addition to the complex comprise additional compounds. Such compounds may also be chemical compounds that are used for producing the complex of the invention as specified elsewhere herein. The composition may also comprise other complexes, such as complexes having the same metal cation but different ligands. The composition can be in form of a solution or a solid.

In one embodiment the composition of the invention may be a solution comprising the complex of the invention and $HCO_3^-$ or $CO_3^{2-}$. The presence of $HCO_3^-$ or $CO_3^{2-}$ prevents release of the metal cation ligand of the complex, i.e. facilitates complex stability. $HCO_3^-$ or $CO_3^{2-}$ are preferably employed in the solution when the metal cation ligand is also a carbonate. If nitrate is employed as metal cation ligand, the solution may comprise nitrate rather than $HCO_3^-$ or $CO_3^{2-}$.

The concentration of $HCO_3^-$ or $CO_3^{2-}$ in the composition solution may be at least 1 mM, preferably at least 10 mM and most preferably 1 M. The concentration of nitrate in the composition solution may be at least 1 mM, preferably at least 10 mM and most preferably 1 M.

The inventors found that the complex of the invention also fulfills its function as a reagent to attach a label and/or carrier to a target molecule in presence of additional component, e.g., when being unpurified after synthesis. Accordingly, the uses of the complex of the invention described herein, as well as the methods using the complex of the invention that are described herein, may be conducted with the composition of the invention mutatis mutandis. The skilled person will avoid components in the composition that may negatively affect the efficiency and or kinetics of the respective use or method.

In a third aspect, the present invention provides for a method for producing a complex of the invention. The production method comprises incubating: (i) the metal cation; (ii) the metal cation ligand, and (iii) the metal cation chelating domain together. During incubating these components in a solution (i.e. in presence of a solvent, preferably an aqueous solution), the complex of the invention will form without further ado. As discussed above, the time of said incubation is the "complex formation time" in context of the present invention. Table 1 and the appended examples may help the skilled artisan to choose a suitable complex formation time. Accordingly, the invention also relates to a production method comprising incubating (i) the metal cation; (ii) the metal cation ligand, and (iii) the metal cation chelating domain together, wherein the incubation time, i.e. the complex formation time is about 48 h. The invention also relates to production methods comprising incubating (i) the metal cation; (ii) the metal cation ligand, and (iii) the metal cation chelating domain together, wherein the incubation time, i.e. the complex formation time is about 1 h. The invention further relates to production method comprising incubating (i) the metal cation; (ii) the metal cation ligand, and (iii) the metal cation chelating domain together, wherein the incubation time, i.e. the complex formation time is about 3.5 h. In addition, the invention relates to production method comprising incubating (i) the metal cation; (ii) the metal cation ligand, and (iii) the metal cation chelating domain together, wherein the incubation time, i.e. the complex formation time is about 30 min. Again other incubation times are in the routine skills of the person skilled in the art.

What is said elsewhere herein with respect to the metal cation, the metal cation ligand and the metal cation chelating domain applies mutatis mutandis.

In a preferred embodiment the metal cation and the metal cation ligand may be provided in form of a neutral complex, preferably a salt (e.g. as solid or as solution). The neutral complex (e.g. salt) may also comprise other components. In this embodiment incubating means admixing the neutral complex (e.g. salt) with the metal cation chelating domain in the solution and maintaining this mixture for a defined time. When using neutral complex (e.g. salt) the method may further comprise the step of producing the neutral complex (e.g. salt). Optionally, the salt may be derived as solid and may be filtered and/or washed.

The incubation may be conducted for at least 1 min, at least 5 min, at least 10 min, at least 20 min, at least 30 min, at least 45 min, at least 1 h, at least 2 h, at least 3 h, at least 4 h, at least 5 h, at least 8 h, at least 10 h, at least 12 h, at least 15 h, at least 18 h, at least 24 h or at least 48 h. In other words, the complex formation time may be at least about 1 min, at least about 5 min, at least about 10 min, at least about 20 min, at least about 30 min, at least about 45 min, at least about 1 h, at least about 2 h, at least about 3 h, at least about 4 h, at least about 5 h, at least about 8 h, at least about 10 h, at least about 12 h, at least about 15 h, at least about 18 h, at least about 24 h or at least about 48 h (see also Table 1). The longer the incubation time the more complex is formed. At some point of the reaction saturation of complex formation can be observed. The time point at which this saturation is observed and the yield of the complex formed depends, e.g., on the temperature and the concentration of the components used as well as the components themselves (e.g. choice of buffer). For the production process, reaching saturation is not required but may increase production yield.

The incubation may in principle be conducted at any temperature at which the solvent used for the reaction is in a liquid status. When using an aqueous solution or water as solvent, the temperature may be selected from 0° C. to 99° C. Preferably, the temperature is chosen according to the thermal stability of the label and/or carrier used. Therefore, preferred temperature ranges are, for example, 2° C. to 42° C., 4° C. to 37° C. and 4° to 25° C. Without being bound by theory, the formation of the complex is facilitated by higher temperatures so that a higher temperature is preferred as long as label and/or carrier stability are no negatively affected. The skilled person can select the temperature dependent on the knowledge of the thermal stability of the label and/or carrier.

The metal cation, the metal cation ligand and the metal cation chelating domain may be each individually selected as described herein elsewhere. Preferences regarding combinations of these components or a subset thereof as described herein elsewhere apply mutatis mutandis.

The method for producing the complex of the invention may further comprise collecting and/or purifying the complex. As described above, the complex of the invention also fulfills its function in presence of other compounds, especially also including the reaction mixture as produced by the incubation step of the production method of the invention. Yet, in certain settings purification and/or isolation of the complex may be desired. Washing is preferably conducted with a solution comprising 1 mM, preferably, 10 mM, even more preferably 100 mM and most preferably 1 M $CO_3^{2-}$ or $HCO_3^-$. As illustrated in the appended examples and Figures, washing the complex of the invention with such solution leads to an improved attachment of the label and/or carrier when the complex of the invention is used for attaching a label and/or carrier to a target molecule (e.g. a protein). Without being bound by theory, conducting the washing step with a solution comprising 1 M $CO_3^{2-}$ or $HCO_3^-$ prevents that $CO_3^{2-}$ or $HCO_3^-$ ligands may be released from the complex of the invention during the washing.

If the method comprises a carrier the purification and/or isolation may involve one or more washing steps. The carrier may then be isolated by removing the washing buffer after the final washing step from the carrier. For instance, if beads are employed the beads may be pelleted by centrifugation and the supernatant may be removed. Alternative filter columns that allow liquid flow through but retain the carrier attached complex may be employed. Filter columns have the advantage that less carriers (e.g. beads) are lost in washing steps compared to using pelleting and aspirating the supernatant.

When a label is employed, a purification method may involve using an affinity matrix that specifically recognizes the label. After binding to the affinity matrix the complex can be washed one or more times to remove free reagents. In a final step the complex may be eluted. Purification and isolation of the complex may in addition or alternatively also involve chromatography such as size exclusion chromatography or anion- or cation-exchange chromatography. Alternatively, labeled from unlabeled can be separated via a $Ni^{2+}$-NTA-resin as labeled proteins will show reduced to no interaction with $Ni^{2+}$-NTA compared to unlabeled proteins with free His-tag as shown in Wegner and Spatz, 2013.

Methods for purifying the complex of the invention, especially when the complex does not comprise a carrier and when $Co^{2+}$ is employed as metal cation, may also be conducted by the methods as described in the art (see, e.g., Shibata M., 1983).

A preferred complex of the invention comprises $Co^{2+}$ as a metal cation and a carbonate selected from $CO_3^{2-}$ or $HCO_3^-$ as metal cation ligand. The method for producing this preferred complex of the invention may comprise providing the $Co^{2+}$ and $CO_3^{2-}$ or $HCO_3^-$ in form of a neutral complex with counter ions, such as in form of a salt. Alternatively, a charged complex comprising the $Co^{2+}$ and $CO_3^{2-}$ or $HCO_3^-$ may be provided in solution. In a preferred embodiment the neutral complex (and salt) is selected from sodium tris-carbonatocobalte(III) trihydrate ($Na_3[Co(III)(CO_3)_3]*3H_2O$) or potassium tri s-carbonatocobalte(III) trihydrate ($K_3[Co(III)(CO_3)_3]*3H_2O$).

Sodium tris-carbonatocobalte(III) trihydrate ($Na_3[Co(III)(CO_3)_3]*3H_2O$) may be synthesized as described by Bauer and Drinkard (Bauer and Drinkard 1960). Briefly, a mixture of 0.1 mole (29.1 g) of $Co(II)(NO_3)*6H_2O$ (Sigma; 1.02554) in 50 ml dd$H_2O$ and 10 ml of 30% hydrogen peroxide (Riedel-de Haen; 18312) may be added dropwise with stirring to an ice-cold slurry of 0.5 mole(=42.0 g) sodium bicarbonate (Merck; 1.06329) in 50 ml dd$H_2O$. The mixture may then be incubated on ice with continuous stirring for 1 h. Subsequently, the olive product may be filtered and washed thrice with each of cold water, absolute ethanol and dry ether. Finally, the product can be dried overnight under vacuum and can optionally be stored at −20° C. in nitrogen atmosphere. The concentrations and amounts used can be adapted by the skilled person. The success of the production can be confirmed by NMR, e.g. as employed in the appended Examples.

Potassium tris-carbonatocobalte(III) trihydrate ($K_3[Co(III)(CO_3)_3]3H_2O$) may be synthesized in solution as described by Shibata (Shibata 1983; adaptation of Mori et al. 1956). Briefly, a mixture of 0.1 mole (24 g) of Co(II)

$Cl_2*6H_2O$ (Honeywell; 255599) in 24 ml $ddH_2O$ and 40 ml of 30% hydrogen peroxide may be added dropwise with stirring to an ice-cold slurry of 0.7 mole (70 g) potassium bicarbonate (Honeywell; 237205) in 70 ml $ddH_2O$. Subsequently, the resulting green solution may be filtered (e.g. by suction) and directly used for following experiments. The concentrations and amounts used can be adapted by the skilled person. The success of the production can be confirmed by NMR, e.g. as employed in the appended Examples.

The incubation is performed in a solution (preferably a buffered solution) comprising $HCO_3^-$ or $CO_3^{2-}$ when the metal cation ligand of the complex to be formed is $HCO_3^-$ or $CO_3^{2-}$. Preferably, the $HCO_3^-$ or $CO_3^{2-}$ is provided in a concentration of at least 1 mM, preferably at least 10 mM and most preferably 1 M.

It is particularly preferred that the method for producing the complex of the invention does not involve an oxidation step in the presence of the label and/or carrier in which the metal cation forming the center of the complex of the invention is oxidized, e.g. via $H_2O_2$ treatment.

In one aspect, the present invention further relates to a kit comprising:
a) a metal cation;
b) a metal cation ligand being a carbonate selected from $CO_3^{2-}$ and $HCO_3^-$ or nitrate, preferably $CO_3^{2-}$ and $HCO_3^-$ and
c) a metal cation chelating domain comprising a chelating ligand and a label and/or carrier.

What is said herein elsewhere with respect to the metal cation, the metal cation ligand and the metal cation chelating domain, the chelating ligand and the label and/or carrier applies mutatis mutandis.

The kit may be a kit for producing the complex of the invention, i.e. may comprise components that can be reacted to form the complex of the invention. In another embodiment the assembled complex may be comprised in the kit.

In a particularly preferred embodiment the metal cation is $Co^{2+}$ and the kit comprises the metal cation and the metal cation ligand in form of sodium tris-carbonatocobalte(III) trihydrate ($Na_3[Co(III)(CO_3)_3]*3H_2O$) or potassium tris-carbonatocobalte(III) trihydrate ($K_3[Co(III)(CO_3)_3]*3H_2O$). Preferably, the metal cation chelating domain comprises Talon, NTA or IDA, preferably NTA or IDA, most preferably IDA coupled to a ligand and/or carrier. With this kit preferred $Co^{2+}$ complexes according to the invention may be generated.

In one aspect the components a) to c) of the kit may not be provided as an entity, i.e. as complex of the invention.

In another aspect, the kit may also comprise the metal cation, the metal cation ligand and the metal cation chelating domain assembled as the complex of the invention, e.g. in form of a salt (e.g. with the counter-ions indicated elsewhere herein; or in solution, e.g. in a solution comprising $CO_3^{2-}$ or $HCO_3^-$, e.g., as defined in the context of the composition of the invention). Such kit may further comprise reagents such as a suitable reaction buffer (preferably any of the buffers as described for the methods and uses employing the complex of the invention herein elsewhere). Optionally, the kit may further comprise purification material (e.g beads, agarose beads) and/or filter columns. In a preferred embodiment the kit may comprise a complex of the invention, wherein the carrier is a bead (e.g. microbead). In this embodiment the complex is provided as a ready-to use affinity resin for target molecule binding.

As explained above, the complex of the invention is particularly useful for attaching a label or a carrier to a target molecule by a metal cation mediated interaction. The present inventors have surprisingly found that using a carbonate selected from $CO_3^{2-}$ or $HCO_3^-$ or a nitrate facilitates complex formation with the target molecule vis-à-vis previously used complexes involving water as metal cation ligand. In the art only a $[Co(III)(NTA)(CO_3)]^{2-}$ complex without label and/or carrier was described (Davies and Hung, 1976; Visser et al., 2001). Yet, these prior art documents provided neither motivation for modifying this complex with a label nor for using this complex for labeling target molecules such as proteins (e.g. His-tagged proteins). In particular, these prior art documents did also not suggest the advantageous features in attaching a label and/or carrier to a target molecule found by the present inventors (see appended Examples).

In a fourth aspect, the present invention relates to the use of the complex of the invention for attaching the label and/or carrier comprised in the complex to a target molecule. The metal cation mediated linkage between the label and/or carrier is thereby achieved by bringing the complex of the invention into contact with the target molecule so that the target molecule can replace the metal cation ligand in the primary coordination sphere of the complex. This is achieved at a particularly high rate with the complex of the invention because the metal cation ligand is selected from $CO_3^{2-}$, $HCO_3^-$ and nitrate. As exemplified for the carbonate $CO_3^{2-}$ in the appended examples, these metal cation ligands can easily be replaced by target molecules in the coordination sphere, especially by target molecules that comprise two groups functioning as lewis base (e.g. His-tagged proteins). Without being bound by theory, it is believed that the metal cation ligands of the complex of the invention get protonated after release from the complex which in turn facilities their release from the complex and the exchange with the target molecule. In the case of the carbonates as metal cation ligands the protonation of the carbonates leads to gas formation which even further facilitates the target molecule binding by facilitating the metal cation ligand release. Therefore, the carbonates $CO_3^{2-}$ and $HCO_3^-$ are particularly preferred metal cation ligands in the context of the invention.

Accordingly, the present invention provides the use of a complex or a composition of the invention for attaching a label and/or carrier to a target molecule. The target molecule of the invention comprises a nucleic acid (e.g. a DNA, RNA or analogues of DNA or RNA made from nucleotide analogues), a peptide or a protein. In particular, a target molecule according to the invention may be a nucleic acid (e.g. a DNA, RNA or analogues of DNA or RNA made from nucleotide analogues), a peptide or a protein. It is particularly preferred that the target molecule in the context of the present invention comprises a protein or peptide. Similarly, it is also particularly preferred that the target molecule is a protein or a peptide. The protein or peptide comprised in the target molecule or the protein or peptide forming the target molecules must be configured so that they can act as a ligand (lewis base) within a metal complex. This means that the molecule must contain one or more moieties; in particular amino acid(s) that can act as ligand/lewis base and can coordinate to the metal cation of the complex. In other words, the target molecule must be configured such that it can exchange the metal cation ligand in the complex of the invention so as to form a new complex comprising the target molecule as ligand. Whether the ligand of the target molecule can exchange the metal cation ligand in the complex of the invention can, for example be tested, as follows: (i) usage of beads functionalized with the complex of the invention (preparation of such beads may be conducted as described in the appended Examples); (ii) addition of target molecule (e.g. according to the protocol as described in the appended Examples); (iii) incubation of the beads with the target molecule (preferably for at least 30 min, at least 1 h, at least 3 h, at least 3.5 h at least 24 h, preferably 48 h at 4° C.) (iv) separating the beads and the supernatant (v) analysis of target molecule in supernatant and/or beads by target specific methods (e.g. fluorescence based, antibody detection, enzymatic test, quantitative mass spectrometry etc.). A negative control without complex should be included. The exchange can then be detected by measuring a reduced amount of target molecule in the supernatant and/or an increased amount of target molecules bound to the beads.

In a preferred embodiment the protein or peptide of the target molecule (i.e. comprised in the target molecule or forming the target molecule) comprises a "metal cation ligand amino acid motif" with at least four amino acids residues in a sequence $[X_nS_m]_k$, wherein X is at each of position independently selected from a group of amino acids that can coordinate with the metal cation of the complex of the invention, i.e. function as a lewis base; S is an amino acid that is not comprised in the first group of amino acids (with S being selected from this list of amino acids at each position independently); n is in each case independently 1-4; m is in each case independently 0-6; and k is 2-6 (see SEQ ID NOs: 4 to 8), preferably 2-5 (see SEQ ID NOs: 4 to 7), and wherein the "metal cation ligand amino acid motif" comprises at least 4, preferably at least 6 and most preferably at least 8 selected from a group of amino acids that can coordinate with the metal cation of the complex of the invention. The "metal cation ligand amino acid motif" may have a regular sequence, i.e. n and m have in each occurrence the same value, or an irregular sequence, i.e. n and m may have different values. Accordingly, in one embodiment the target molecule may comprise "metal cation ligand amino acid motif" comprising or consisting of any of the amino acid sequences as defined in SEQ ID NOs: 4 to 8, wherein the "metal cation ligand amino acid motif" comprises at least 4, preferably at least 6 and most preferably at least 8 selected from a group of amino acids that can coordinate with the metal cation of the complex of the invention. A larger number of amino acids of the first group that can coordinate with the metal cation of the complex of the invention within an amino acid motif may increase binding strength and/or specificity for the metal complex, i.e. may facilitate attachment to the label and/or carrier.

The "group of amino acids that can coordinate with the metal cation of the complex of the invention" may consist of glycine, alanine, phenylalanine, tryptophan, methionine, tyrosin, cysteine, aspartate, glutamate, glutamine, histidine, lysine, proline, serine, threonine, asparagine, arginine, selenocystein and pyrrolysine. Preferably, the group of amino acids that can coordinate with the metal cation of the complex of the invention" consists of glycine, alanine, phenylalanine, tryptophan, methionine, tyrosin, cysteine, aspartate, glutamate and histidine. Even more preferably, the group of amino acids that can coordinate with the metal cation of the complex of the invention" consists of glycine, tryptophan, tyrosin, cysteine, aspartate, glutamate and histidine These amino acids are known to be suitable as metal ligands that can form complexes with metal cations. (Chin et al., 1999; McAuliff et al. 1966; Sugimori et al. 1993; Sajadi, 2010; Bell and Sheldrick 2014) Most preferably, the group of amino acids that can coordinate with the metal cation of the complex of the invention" consists of histidine; i.e. "X" is histidine.

The "metal cation ligand amino acid motif" as used herein is preferably configured such that it can exchange the metal cation ligand in the complex of the invention so as to form a new complex comprising the "metal cation ligand amino acid motif" as ligand. The exchange with the metal cation ligand so as to form the new complex can be tested as described above for the target molecule.

Histidine is a well-studied ligand for metal cation complexes and complex formation with metal ions and histidine-tags is widely used in the field of protein biochemistry, e.g., for purifying proteins or attaching the same to surfaces. In the context of the present invention the target molecule (e.g. a protein or peptide forming the target molecule or being comprised therein) may comprise a "spaced histidine tag" comprising at least four histidine residues in a sequence $[H_nS_m]_k$, wherein H is histidine, S is at each position independently selected from an amino acid residue different from histidine, preferably selected from glycine and/or serine and/or threonin, n is in each case independently 1-4, m is in each case independently 0-6, and k is 2-6 (see SEQ ID NOs: 9 to 13), preferably 2-5 (see SEQ ID NOs: 10 to 13). The spaced histidine tag may have a regular sequence, i.e. n and m have in each occurrence the same value, or an irregular sequence, i.e. n and m may have different values. Accordingly, in one embodiment the target molecule may comprise a space histidine tag comprising or consisting of any of the amino acid sequences as defined in SEQ ID NOs: 9 to 13, wherein the "metal cation ligand amino acid motif" comprises at least 4, preferably at least 6 and most preferably at least 8 histidine residues. A larger number of histidines within a polyhistidine tag may increase binding strength and specificity for a metal cation (e.g. $Co^{3+}$). Too many consecutive histidines, however, can in some cases lower expression levels and solubility of recombinant proteins, e.g. proteins recombinantly expressed in E. coli. These problems can be overcome by interrupting continuous runs of histidines with short spaces, comprising glycine, serine or threonine, i.e. with the spaced histidine tag.

In a particularly preferred embodiment the target molecule may comprise a His-tag. The His-tag may comprise or consist of 2 to 14, preferably 3 to 10, and even more preferably 4 to 8 consecutive histidine or histidine-like residues. In one embodiment a His-tag may comprise at least 2, preferably at least 3, preferably at least 4, preferably at least 5 and most preferably at least 6 (e.g. 2, 3, 4, 5, 6, 7 or 8) consecutive histidine or histidine-like residues. "Histidine-like" refers to non-natural amino acid derivatives that contain an imidazole group. In a particularly preferred embodiment a His-tag consists of at least 4, preferably at least 5 and most preferably at least 6 (e.g. 4, 5, 6, 7 or 8) consecutive histidine residues.

The His-tag may be a sequence stretch occurring in a natural protein or may be a recombinant histidine tag. "Recombinant" in this context means that the His-tag is artificially generated by genetic engineering, e.g. by altering the coding nucleic acid sequence such that a fusion protein comprising a His-tag is expressed.

The His-tag may be comprised at the N-terminus or C-terminus of a target molecule or may be provided as internal sequence stretch. In some embodiments, the His-tag may be N-terminal and C-terminal.

In one embodiment the target molecule of the invention may have a three-dimensional structure in which at least 2, preferably at least 3, preferably at least 4, preferably at least 5, and most preferably at least 6 histidine or histidine-like residues are in spatial proximity. "Spatial proximity" in this context preferably means a distance of 0 to 5 angstrom between each of the residues. The "distance" between two residues is the shortest distance between the two closest nitrogen atoms of two individual, neighboring histidine side chains or histidine-like side chains.

Non-limiting preferred examples for a target molecule of the invention are a pharmaceutical, a diagnostic, a research agent, a cosmetic and/or a protein for environment treatments (e.g. a protein for water treatment).

Other non-limiting preferred examples for target molecules are molecules comprising or consisting of an enzyme, a targeting protein (e.g. an antibody, a nanobody etc.), a cytokine, a transport protein (e.g. FABS for fatty acid transport), a storage protein (e.g. ferritin), a mechanical support protein (e.g. collagen), a growth factor, a hormone (e.g. insulin or TSH), an interferon, a glycoprotein, a synthetically engineered protein or a fragment thereof.

The target molecule as employed in the context of the invention may also be a nucleic acid. Nucleic acids comprise purine and pyrimidine bases. Both are known to be able to form complexes with metal cations of the invention. Preferably nucleic acids comprise at least 2, preferably at least 5 and even more preferably at least 10 bases. The nucleic acids include DNA, RNA, LNA and other nucleic acid derivatives known in the art. Most preferred is DNA. In particular it is envisaged that the target molecule is an origami structure, i.e. a nucleic acid structure with a three-dimensional fold. Such origami structure is typically formed by base pairing of several nucleic acid strands including a scaffold strand and staple strands.

The use of a complex or a composition of the invention for the labeling of a target molecule involves the attachment of the label and/or carrier to the target molecule by exchanging the metal cation ligand of the complex of the invention with a target molecule. Said exchange is achieved by bringing the complex of the invention into contact with the target molecule. Accordingly, the use preferably comprises bringing the complex of the invention into contact with the target molecule in a solution.

Accordingly, in one aspect, the invention relates to a method for attaching the label and/or the carrier to a target molecule comprising the step of incubating the complex of the invention or the composition comprising the complex of the invention with a target molecule. The target molecule is a target molecule as defined herein elsewhere.

"Incubating" means that the complex and the target molecule are admixed in a solution and the mixture is allowed to react for a defined time. As discussed above, the time the complex is incubated with the target molecule is the "complex-target incubation time" in context of the present invention. Table 1 and the appended examples may help the skilled artisan to choose a complex-target incubation time. Accordingly, the present invention for example relates to the use of the complex of the invention for attaching the label and/or carrier comprised in the complex to a target molecule, wherein the complex-target incubation time may be about 48 h. As described herein also the complex formation time may have influence on the product complex formation. As also described herein the complex formation time may be choosen based on Table 1 or the appended examples. Accordingly, the present invention for example relates to the use of the complex of the invention for attaching the label and/or carrier comprised in the complex to a target molecule, wherein the complex formation time is about 48 h and the complex-target incubation time is about 3.5 h. In another exemplifying example, the invention also relates to the the use of the complex of the invention for attaching the label and/or carrier comprised in the complex to a target molecule, wherein the complex formation time is about 10 min and the complex-target incubation time is about 48 h. The invention further relates to the the use of the complex of the invention for attaching the label and/or carrier comprised in the complex to a target molecule, wherein the complex formation time is about 10 min and the complex-target incubation time is about 30 min. The invention also relates to the the use of the complex of the invention for attaching the label and/or carrier comprised in the complex to a target molecule, wherein the complex formation time is about 10 min and the complex-target incubation time is about 3 h. The invention also relates to the the use of the complex of the invention for attaching the label and/or carrier comprised in the complex to a target molecule, wherein the complex formation time is about 48 h and the complex-target incubation time is about 1 h.

In a specific embodiment of the use of the complex of the invention for attaching the label and/or carrier comprised in the complex to a target molecule the metal chelating ligand is IDA and the the complex formation time is 10 min and the complex-target incubation time is about 30 min. In another preferred embodiment of the use of the complex of the invention for attaching the label and/or carrier comprised in the complex to a target molecule the metal chelating ligand is IDA and the the complex formation time is 10 min and the complex-target incubation time is about 3 h.

The method for attaching the label and/or the carrier to the target molecule may comprise the step of recovering and/or purifying the target molecule with the label and/or carrier linked thereto. This is to provide an isolated target molecule with the label and/or carrier attached thereto.

If the method comprises attaching a carrier, the purification and/or isolation of the target molecule to which a carrier is attached may be achieved by isolating the carrier. For instance, if solid carriers are employed the beads may be pelleted by centrifugation and the supernatant may be removed. Alternatively, a filter column that allows liquid flow through but retains the carrier attached complex may be employed. Optionally, the carrier may be washed with a buffer solution to remove impurities.

In general independent of whether a carrier or label is employed the isolation and/or purification may be performed via chromatography. Said chromatography may involve or consist of size exclusion chromatography which uses differences in molecule size and shape between the target molecule that is attached to the carrier and/or label and the free target molecules and the complex of the invention.

Methods for purifying target molecules according to the invention with a label and/or carrier attached thereto are also described in WO 2014/072525 which is herewith incorporated by reference in its entirety.

In one embodiment purification may also be carried out with conventional Ni-NTA columns as described in WO 2014/072525.

The incubation of the complex of the invention or the composition comprising the same may be conducted in solutions with different pH values. While the attachment of the label and/or the carrier to the target molecule can occur at diverse pH values. The lower the pH value the more is the release of the metal cation ligand (i.e. the carbonate or nitrate) facilitated. This is because the released ligands are protonated. The carbonates $CO_3^{2-}$ and $HCO_3^-$ even form gas that is released when they get protonated.

While in principle lower pH values facilitate the exchange reaction, the pH during the incubation is typically selected in a range that is compatible with the target molecule employed. Especially proteins are in many cases sensitive to too low or too high pH values. The pH is preferably selected such that the stability of the target molecule (e.g. the three-dimensional folding of the protein and/or biological function of the protein is maintained). Yet, the pH is still preferably selected at the lower end of the pH stability range of the target molecule to facilitate ligand exchange, i.e. the attachment of the label and/or carrier to the target molecule. The skilled person is aware of assays to test protein stability and function at different pH values.

In a preferred embodiment the pH during the incubation of the complex of the invention with the target molecule is between 4.0 and 9.5, preferably between 5.5 and 8.0. In these pH ranges most target molecules, in particular most proteins are stable and/or functional.

The exchange of the metal cation ligand and the target molecule typically occurs within a short time. Thus, depending on the attachment efficiency required and the target molecule used the incubation step of the method for attaching the label and/or carrier according to the invention may be conducted as short as only at least about 10 seconds, preferably at least about 1 min and most preferably at least about 10 min. In preferred embodiments the incubation is performed at least about 30 min, at least about 1 h, at least about 2 h, at least about 3 h, at least about 4 h, at least about 5 h, at least about 7 h, at least about 9 h, at least about 12 h, at least about 24 h or at least about 48 h. Without being bound by theory, it is believed that longer incubation results at a higher attachment yield. However, after a certain time of incubation a saturation of the labeling and or carrier attachment is recognized. The preferred incubation time may depend on the target molecule used and the desired attachment efficacy. The skilled person can test the attachment efficacy either by measuring the depletion of free label and/or carrier and/or quantifying the target molecules with attached label and/or carrier.

The incubation step of the method for attaching the label and/or carrier to the target molecule may be conducted at different temperatures. The exchange of the metal cation ligand with the target molecule in principle works at any temperature between 0 and 95° C. The higher the temperature the faster is the ligand exchange reaction. However, since the target molecules comprise or consist of biological molecules such as proteins which are temperature sensitive, the temperature has to be chosen so as to ensure target molecule stability and/or function. For instance, a protein originating from a thermophile bacterium will tolerate higher reaction temperatures than proteins from non-thermophyl sources. Similarly, DNA is more thermo tolerant than RNA. The temperature accordingly depends on the target molecule employed. Non-limiting temperature ranges that may be employed are 0° C. to about 95° C., 0° C. to about 60°, 0° C. to about 42° C., 0° C. to about 25° C. and about 4° C. to about 25° C. The temperature may remain constant during the incubation. Alternatively, also one or more different temperatures or a temperature gradient may be employed. In one embodiment, the target molecule is a protein and the temperature is selected from 0° C. to about 25° C., preferably about 2° C. to about 8° C.

As mentioned above, the incubation step is conducted in solution. Different solutions may be employed in this context including pure water or aqueous solutions. Thus, in one embodiment the incubation may be performed in water or an aqueous solution. Alternatively or additionally, the solution may comprise one or more organic solvents. A non-limiting preferred set of organic solvents includes DMSO, DMF, DMS, acetonitrile, and isopropanol. Accordingly, in one embodiment the incubation may be performed in a solution comprising one or more organic solvents selected from the group consisting of: DMSO, DMF, DMS, acetonitrile and isopropanol. The skilled person will select the solution so that it does not interfere with downstream applications and/or target molecule stability or activity. In the context of proteins aqueous solutions, preferably with physiological conditions, are particularly preferred.

As demonstrated in the appended example, the method for attaching a label and/or carrier to a target molecule may be conducted in presence of different buffer reagents. Accordingly, in a preferred embodiment the incubation step of the method may be conducted in an aqueous solution comprising one or more Good's buffer substances.

Good's buffer substances are twenty buffering agents for biochemical and biological research selected and described by Norman Good and colleagues during 1966-1980 (see Good et al., 1966; Good et al., 1972; Ferguson et al., 1980). These buffer agents are known in the art.

Exemplary but non-limiting buffer agents are ACES, AMPSO, BES, BisTris Propane, Borate, CAPS, CAPSO, CHES, DIPSO, EPPS, HEPES, HEPBS, HEPPSO, MES, MOPS, MOPSO, PIPES, POPSO, TAPS, TAPSO, TEA, TES and Tris as well as derivatives thereof may be employed. "Derivatives" relate to buffer substances having the same structural backbone but being substituted by additional chemical moieties. Alternatively or in addition, also a Tris buffer, carbonate/bicarbonate buffer or a phosphate buffer (e.g. PBS) may be employed.

In one embodiment a buffer substances selected from BisTris and derivatives, carbonate/bicarbonate buffers, CAPS, CAPSO, HEPES, HEPBS, HEPPSO MES, MOPS, MOPSO, PIPES, phosphate buffers (such as PBS), TAPS, TES, and Tris may be employed.

When using these exemplary buffer agents the pH of the solution may be chosen as follows:

ACES: 6.0-7.8; AMPSO: 8.0-10.0; BES: 6.2-8.0; BisTris: 5.5-7.5; BisTrisPropane: 6.0-9.8; Borate: 8.2-10.5; CAPS: 9.5-11.5; CAPSO: 8.5-10.5; CHES: 8.4-10.2; DIPSO: 6.8-8.5; EPPS: 7.0-9.0; HEPES: 7.2-9.5; HEPBS: 7.4-9.2; MES: 5.2-7.0; MOPS: 6.2-8.2; MOPSO: 6.0-8.0; Phosphate: 5.5-8.2; PIPES: 5.9-7.8; POPSO: 7.0-8.7; TAPS: 7.4-9.4; TAPSO: 6.7-8.5; TEA: 7.0-8.5; TES: 6.5-8.5; Tris: 6.8-9.5; Carbonate buffer: 8.5-11.0.

In principle also other pH values may be employed with each of the above-mentioned buffers since the reaction can be conducted at a wide range of pH values so that a buffering capacity is not absolutely required. However, to keep the pH constant and to better control the reaction a pH in the above mentioned pH ranges, in which the buffers have buffering capacity, is preferred.

The buffer agents may be employed at different concentrations such as from 1 mM to 1 M, preferably 1 mM to 250 mM and most preferably 1 mM to 100 mM (e.g. 50 mM). The skilled person can test the ideal buffer concentrations by assessing the attachment efficacy and using different buffer concentrations.

As demonstrated in the appended Examples the choice of the buffer substance/agent may influence the attachment efficiency of the label and/or carrier to the target molecule. Without being bound by theory, buffer agents that have low metal binding constants show increased efficiency in the attachment. Low metal cation binding constants prevent that the buffer agent coordinates to the metal and blocks the ligand position in the primary coordination sphere.

Thus, in one embodiment the buffer substance/agent used in the context of the invention may be a buffer substance/agent with low metal binding constants. What is understood by "low metal binding constants" and preferred examples of such buffer substances/agents is disclosed in Ferreira et. al, 2015, which is herein incorporated by reference in its entirety.

Furthermore, in a preferred embodiment the incubation step is performed in presence of a buffer substance/agent that comprises one or less (preferably no) group selected from amine group and carbonyl group. These groups comprise lewis bases that can mediate binding to the metal cation in the complex. Thus, absence of these groups reduces or prevents binding of the buffer substance to the metal cation and thereby facilitates target molecule binding.

As demonstrated by the appended examples, the following buffers may be advantageous for facilitating the label and/or carrier attachment: MES, HEPES, Bis-Tris and PIPES. The Example illustrates that these buffer agents lead to a higher attachment efficiency than a Tris based buffer. Accordingly, in a particularly preferred embodiment the buffer substance present in the solution during incubation may be selected from MES, HEPES, Bis-Tris and PIPES. These buffer substances are particularly advantageous for label and/or carrier attachment. Non-limiting Example 13 documents that buffer may need to be chosen depending on the pH used for the incubation. When the incubation of the inventive complex and the target molecule is performed at pH of about 7.5 HEPES and not BisTris may be used. When the incubation of the inventive complex and the target molecule is performed at a pH of about 5.5 BisTris may be used. The determination of the most suitable buffer and pH is well within the skills of the relevant artisan and can be achieved without further ado with the teachings of the present invention and the illustration of the experimental part and scientific details provided therein.

In view of these results and based on the theoretic consideration to keep buffer agent binding to the metal cation as low as possible, the buffer substance may preferably be selected from: BisTris, CAPS, CAPSO, HEPES, HEPBS, HEPPSO, MES, MOPS, MOPSO, PIPES, TAPS and TES.

In a preferred embodiment the incubation of the complex of the invention or the composition comprising the same with the target molecule may be conducted in the presence of $Ca^{2+}$ ions in the solution. The presence of $Ca^{2+}$ ions is particularly preferred when the metal cation ligand of the complex of the invention is a carbonate selected from $HCO_3^-$ or $CO_3^{2-}$. This is because the $Ca^{2+}$ ions can form insoluble $CaCO_3$ which precipitates from the solution and thereby facilitates carbonate release from the complex. This in turn facilitates binding of the target molecule as ligand and thereby facilitates the attachment of the label and/or carrier to the target molecule. Preferably, the $Ca^{2+}$ ions are provided by dissolving $CaCl_2$ that is dissolved in the reaction solution. The $Ca^{2+}$ ions may be added at the beginning of the reaction, i.e. may be directly added when the complex of the invention and the target molecule are brought in contact. Alternatively, yet less preferred, the $Ca^{2+}$ ions may be added in form of a salt (preferably $CaCl_2$) during the reaction. The $Ca^{2+}$ ions (preferably in form of $CaCl_2$) are preferably added at a concentration of 0.1 to 50 mM, even more preferably 0.1-10 mM and most preferably 1 mM.

The method for attaching a label and/or carrier to the target molecule according to the invention does not require an oxidation step in which the metal cation of the complex of the invention is oxidized, e.g. via $H_2O_2$ treatment. Such in a preferred embodiment the method for attaching a label and/or carrier to the target molecule according to the invention does not involve an oxidation step such as a treatment with $H_2O_2$. This is particularly preferred in the context of forming $Co^{2+}$ mediated label and/or carrier attachments. In previously reported methods (e.g. Wegner and Spatz, 2013) the $Co^{2+}$ mediated attachment of functional moieties was achieved by forming a $Co^{2+}$ complex with a his tagged target protein as ligand and only subsequently oxidizing the $Co^{2+}$ to $Co^{3+}$. As demonstrated in the appended examples, such oxidation step in the presence of Co cations can lead to spontaneous Fenton reactions which can result in protein degradation. Furthermore, oxidation of proteins may interfere with protein folding and function. It is thus a particular advantage of the method of the present invention that no oxidation step is required.

The method for attaching a label and/or carrier to a target molecule may also comprise the production of the complex of the invention (and optionally neutral complexes such as salts used therefore) as described herein elsewhere.

The method for attaching a label and/or carrier to the target molecule according to the invention results in the production of a labeled and/or carrier-attached. Accordingly, the method may also be referred to as a method for producing a target molecule to which a label and/or carrier is attached. The preferences regarding the target molecules indicated elsewhere herein apply mutatis mutandis. Accordingly, in one embodiment the method of the invention may be a method for attaching a label and/or carrier to a protein, e.g. a His-tagged protein, an antibody, derivatives thereof (e.g. including scFv fragments and nanobodies) or a domain thereof.

A preferred embodiment of the method for attaching a label and/or carrier to the target molecule is that the target molecule is a His-tagged protein and that the His-tagged protein is attached to a carrier being a surface (e.g. a chip). In this method that preferably employs $Co^{3+}$ as a metal cation, a carbonate as defined herein as metal cation ligand and NTA, Talon or IDA as chelating ligand, the His-tagged protein is attached to the surface. Due to the high stability and the kinetically inert binding of the target molecule, the proteins can be bound in a nearly covalent manner to the surface that is inert regarding imidazole and other chelates (e.g. EDTA) and reduction equivalent treatment.

In yet another aspect, the present invention relates to a target molecule with a label and/or carrier attached thereto as obtainable or obtained by the method for attaching a label and/or carrier to the target molecule according to the invention. The labeled and/or carrier-attached target molecule obtained by the method of the invention is characterized in that neither the target molecule nor the label and/or carrier have undergone an oxidation step (e.g. treatment with $H_2O_2$). By contrast, previously reported methods generating such structures involved oxidation steps in presence of at least one or both of i) the target molecule and ii) the label and/or carrier. Accordingly, the product of the method of the invention has the advantage of not being oxidized and being free from oxidation agents such as $H_2O_2$. This has also a crucial advantage for medical uses of the produced labeled and/or carrier-attached target molecule.

What has been said elsewhere herein with respect to the complex, its components, the target molecule and the method for attaching a label and/or carrier to the target molecule according to the invention applies mutatis mutandis.

The target molecule with a label and/or carrier attached thereto obtainable by the method of the present invention is also a complex. This obtained "product complex" comprises the metal cation of the complex of the invention and coordinated thereto i) the metal binding domain of the complex of the invention and ii) the target molecule.

The present invention also provides for a composition comprising the labeled and/or carrier-attached target molecule obtainable or obtained by the method for attaching the label and/or carrier to the target molecule.

The labeled and/or carrier-attached target molecules obtainable or obtained by the method of the invention or a composition comprising the same may be used as research reagent. Thus, the present invention also relates to a use of the labeled or carrier-attached target molecule obtainable or obtained by the method of the invention as a research reagent. Similarly, methods comprising the step of using the labeled or carrier-attached target molecule generated by the method of the invention as a research reagent are provided. For instance, the target molecule may be an extracellular matrix protein that is immobilized to a solid carrier for cell culture.

In one embodiment the labeled and/or carrier-attached target molecules obtainable or obtained by the method of the invention or a composition comprising the same may be used as in vitro diagnostic. For instance, the target molecule may be a detecting protein that specifically recognizes an analyte (e.g. an antibody that recognizes an antigen as analyte) and the label and/or carrier may be configured to comply with measuring methods known in the art.

The present invention relates to the labeled and/or carrier-attached target molecule obtainable or obtained by the method of the invention or a composition comprising the same for use as a medicament. Similarly, a method of treatment is provided that comprises administering an effective amount of the labeled and/or carrier-attached target molecule obtainable or obtained by the method of the invention or a composition comprising the same to a patient. Preferably, the target molecule is selected from an enzyme, a targeting protein such as an antibody, a cytokine (e.g. G-CSF), a transport protein such as FABS for fatty acid transport, a storage protein such as ferritin, a mechanical support protein such as collagen, a growth factor, a hormone such as insulin or TSH, an interferon, a glycoprotein a synthetically engineered protein or a fragment thereof.

The present invention in particular also encompasses embodiments in which the target molecule and/or label can be released from the "product complex" comprising the target molecule when used as a medicament in vivo, e.g. upon binding of the complex to a target structure in vivo. Accordingly, the target molecule with a label and/or carrier attached thereto obtainable by the method of the present invention may be configured such that the label and/or target molecule can be released, preferably in vivo. The release may be triggered by reduction of the metal cation in the product complex, a pH change and/or by binding of the target molecule and/or label to a target structure (e.g. a receptor or cell surface protein such as a cancer cell specific surface protein).

The present invention in particular provides the following items:
1. A complex comprising:
   a) a metal cation;
   b) a metal cation ligand being $CO_3^{2-}$ or $HCO_3^-$; and
   c) a metal cation chelating domain comprising a chelating ligand and a label and/or carrier.
2. The complex of item 1, wherein the chelating ligand of the metal cation chelating domain is a polydentate ligand that comprises one or more carboxylic acid groups and/or one or more amine groups and/or one or more aromatic amines and/or phosphates.
3. The complex of item 1, wherein the chelating ligand of the metal cation chelating domain of c) is selected from: nitrilotriacetic acid (NTA), iminodiacetic acid (IDA), tris(carboxymethyl)ethylenediamine (TED), chelating peptides such as peptides with the consensus sequence (GHHPH)nG; with n=1 to 3; see SEQ ID NOs: 1 to 3) or cadystin, triazacyclononane (TACN), diethylenetriamine-pentaacetate (DTPA), phytochelatin, carboxymethylaspartate (CMA), phosphonates, tannic acid (TA), porphyrin, dipyridylamine (DPA), phytic acid, nitrilopropionicdiacetic acid (NPDA), nitriloisopropionicdiacetic acid (NIPDA), N-(hydroxylethyl)ethylenediaminetriacetic acid (HEDTA), 1,4,7,10-tetraazacyclodo-decane-N,N',N'',N'''-tetraacetic acid (DOTA), 1,4,7-tris(carboxymethyl)-10-(2'-hydroxypropyl)-1,4,7,10-tetraazocyclodecane, 1,4,7-triazacyclonane-1,4,7-triacetic acid (NOTA), 1-(1,3-carboxypropyl)-1,4,7-triazacyclononane-4.7-diacetic acid (NODAGA), 1,4,8,11-tetraazacyclotetra-decane-N,N',N'',N'''-tetraacetic acid (TETA), ethylenedicysteine, ethylenediaminetetraacetic acid (EDTA), 1,2-diaminocyclohexane-N,N,N',N'-tetraacetic acid (DACT), bis(aminoethanethiol)carboxylic acid, ethylene-bis(oxyethylene-nitrilo)tetraacetic acid (EGTA), triethylenetetramine-hexaacetic acid (TTHA), 1,4,7-triazacyclononane phosphinic acid (TRAP), deoxyribonucleic acid (DNA) and ribonucleic acid (RNA), purine, pyridimidine and derivatives thereof
4. The complex of item 1, wherein the chelating ligand of the metal cation chelating domain of c) is selected from: nitrilotriacetic acid (NTA), iminodiacetic acid (IDA), chelating peptides with the consensus sequence $(GHHPH)_nG$, diethylenetriamine-pentaacetate (DTPA), nitrilopropionicdiacetic acid (NPDA), nitriloisopropionicdiacetic acid (NIPDA), ethylenediaminetetraacetic acid (EDTA), ethylene-bis(oxyethylene-nitrilo)tetraacetic acid (EGTA), carboxymethylaspartate (CMA) and derivatives thereof.
5. The complex of item 1, wherein the chelating ligand of the metal cation chelating domain of c) comprises or is selected from NTA, IDA and derivatives thereof.
6. The complex of any one of items 1 to 4, wherein the metal cation is a transition metal cation.
7. The complex of any one of items 1 to 5, wherein the metal cation of the complex is a di-, tri- or tetravalent metal cation.
8. The complex of any one of items 1 to 6, wherein the metal cation is a metal cation having a water ligand exchange rate of $10^{-1}$ $s^{-1}$ or lower, preferably $10^{-2}$ $s^{-1}$ or lower.
9. The complex of any one of items 1 to 7, wherein the metal cation is selected from the group consisting of: $Co^{3+}$, $Cr^+$, $Rh^{3+}$, $Ir^{3+}$, $Pt^{2+}$, $Pt^{4+}$, $Ru^{2+}$, $Ru^{3+}$, $La^{3+}$, $Eu^{3+}$, $Os^{2+}$, $Pd^{4+}$, $Mo^{3+}$, $Fe^{3+}$, $Ru^{3+}$, $Gd^{3+}$, $Tc^{3+}$, $Re^{3+}$, $Sm^{3+}$, $Tb^{3+}$, $Ce^{3+}$, $Pr^{3+}$, $Nd^{3+}$, $Pm^{3+}$, $Dy^{3+}$, $Ho^{3+}$, $Er^{3+}$, $Tm^{3+}$, $Yb^{3++}$, $V^{2+}$, $Mn^{4+}$, $Fe^{2+}$ and $Lu^{3+}$.
10. The complex of any one of items 1 to 7, wherein the metal cation is selected from the group consisting of: $Co^{3+}$, $Cr^{3+}$, $Rh^{3+}$, $Ir^{3+}$, $Ir^{4+}$, $Pt^{2+}$, $Pt^{4+}$, $Pd^{4+}$, $Mo^{3+}$, $Fe^{3+}$, $Gd^{3+}$, $Tb^{3+}$, $Eu^{3+}$, $Ru^{2+}$, $La^{3+}$, $Ru^{3+}$, $Re^{3+}$, $Re^{4+}$, $V^{2+}$, $Mn^{4+}$, $Fe^{2+}$ and $Os^{2+}$.
11. The complex of any one of items 1 to 7, wherein the metal cation is $Co^{3+}$.
12. The complex of any one of items 1 to 11, wherein the metal cation ligand of b) is carbonate $CO_3^{2-}$ or bicarbonate $HCO_3^-$.

13. The complex of any one of items 1 to 12, wherein the complex comprises a $[Co(III)(NTA)CO_3]^{2-}$, a $[Co(III)(NTA)HCO_3]^-$ complex or a hydrate thereof, wherein the label and/or carrier is attached to NTA.
14. The complex of any one of items 1 to 13, wherein the label comprises a fluorophore, a diagnostic, a targeting moiety, a therapeutic agent, a PEG molecule, a lipid, biotin and/or its derivatives, proteins, peptides, a toxin and/or a reactive group selected from a thiol, azide, alkyne, nitrone, tetrazine and tetrazole.
15. The complex of any one of items 1 to 13, wherein the label comprises or is a fluorophore.
16. The complex of any one of items 1 to 13, wherein the label comprises or is biotin or derivatives thereof.
17. The complex of any one of items 1 to 13, wherein the carrier is a polymer, a hydrogel, a microparticle, a nanoparticle, a sphere (including nano- and microsphere), a bead, a quantum dot, a prosthetic or a solid surface.
18. The complex of item 1 to 17, wherein the metal cation chelating domain comprises a linker between the chelating ligand and the label and/or carrier.
19. A composition comprising a complex as defined in any one of items 1 to 18.
20. Use of a complex of any one of items 1 to 18 or a composition of item 19 for the labeling of a target molecule, wherein the target molecule comprises a protein, peptide or nucleic acid, preferably a protein or DNA that can exchange the metal cation ligand in the complex and even more preferably wherein said target molecule comprising at least 4 histidine residues or histidine-like residues in a sequence [HnSm]k, wherein H is a histidine residue or a histidine-like residue, wherein S is a spacer amino acid residue, wherein n is in each case independently 1 to 4, wherein m is in each case independently 0 to 6, and wherein k is 2 to 6.
21. Use of a complex of any one of items 1 to 18 or a composition of item 19 for the labeling of a target molecule, wherein said target molecule contains a histidine-rich region comprising at least two histidine residues, wherein said histidine-rich region is formed by a three-dimensional folding of the target molecule that brings said at least two histidine residues in spatial proximity, wherein the at least two histidine residues have a distance of 0 to 5 angstroms and are not consecutive in the amino acid sequence.
22a. The use of item 21, wherein the histidine-rich region is the Fc region of an antibody.
22b. Use of the complex of any one of items 1 to 18 or a composition of item 19 for attaching a label and/or carrier to an antibody, a domain thereof (e.g. the Fc region) or fragments thereof.
22c. The use of item 22b, wherein the label is a toxin.
23. Use of a complex of any one of items 1 to 18 or a composition of item 19 for the labeling of a target molecule, said target molecule contains a region enriched in histidine-like residues, which develops during three-dimensional folding of the target molecule when histidine-like residues come in spatial proximity, wherein the at least two histidine-like residues have a distance of 0 to 5 angstroms and are not consecutive in the amino acid sequence.
24. The use of item 20, 21 or 23, wherein the target molecule is a pharmaceutical, a diagnostic, a research agent, a cosmetic and/or a protein for environment treatments (e.g. water treatment).
25. The use of item 20, 21 or 23, wherein the target molecule comprises or is a peptide or protein.
26. The use of item 20, 21, 23, 24 or 25, wherein the target molecule comprises or is an enzyme, a targeting protein such as an antibody, a cytokine, a transport protein such as FABS for fatty acid transport, a storage protein such as ferritin, a mechanical support protein such as collagen, a growth factor, a hormone such as insulin or TSH, an interferon, a glycoprotein a synthetically engineered protein or a fragment thereof.
27. The use according to any one of items 20 to 26, wherein the target molecule comprises the histidine residues or histidine like-residues at the N-terminus, the C-terminus or at an internal sequence region.
28. The use according to any one of items 20 to 26, wherein the histidine residues or histidine-like residues are comprised in form of a His tag, preferably wherein the His tag consists of 2 to 10, preferably 4 to 8, and most preferably 6 to 8 consecutive residues.
29. Use of a complex of any one of items 1 to 18 or a composition of item 19 for producing a pharmaceutical, a diagnostic and/or a cosmetic.
30. A kit comprising:
    a) a metal cation, preferably a metal cation as defined in any one of items 5 to 11;
    b) a metal cation ligand being $CO_3^{2-}$ or $HCO_3^-$; and
    c) a metal cation chelating domain comprising a chelating ligand and a label and/or carrier, preferably a metal cation chelating domain as defined in any one of items 2 to 4 and 14 to 18.
31. A method for producing a complex according to any one of items 1 to 18 comprising incubating in a solution: (i) a metal cation; (ii) a metal cation ligand as defined in item 1 b); and (iii) a metal cation chelating domain as defined in item 1 c).
32. The method of item 31 further comprising collecting and/or purifying the complex according to any one of items 1 to 18.
33. The method of item 31 or 32, wherein the metal cation chelating domain is a metal cation chelating domain as defined in any one of items 2 to 18.
34. The method of any one of items 31 to 33, wherein the metal cation is a metal cation as defined in any one of items 5 to 11.
35. The method of any one of items 31 to 34, wherein the metal cation is $Co^{3+}$, wherein the metal cation binding ligand is $CO_3^{2-}$ or $HCO_3^-$, and wherein $Co^{3+}$ and $CO_3^{2-}$ or $HCO_3^-$ are provided in form of a neutral complex with counter ions, such as in form of a salt, or in form of a charged complex comprising the $Co^{2+}$ and $CO_3^{2-}$ or $HCO_3^-$.
36. The method of item 35, wherein the neutral complex is sodium tris-carbonatocobalte(III) trihydrate ($Na_3[Co(III)(CO_3)_3]*3H_2O$) or potassium tris-carbonatocobalte (III) trihydrate ($K_3[Co(III)(CO_3)_3]*3H_2O$).
37. The method of any one of items 31 to 36, wherein the incubation is performed in a buffer comprising $HCO_3^-$ or $CO_3^{2-}$, preferably in a concentration of at least 1 mM, preferably at least 10 mM and most preferably 1 M.
38. A method for attaching a label and/or a carrier to a target molecule comprising the step of incubating the complex of any one of items 1 to 18 or the composition of item 19 with a target molecule, wherein the target molecule is a target molecule as defined in any one of items 20 to 28.

39. The method of item 38, wherein the method further comprises the step of recovering and/or purifying the target molecule with the label and/or carrier linked thereto.
40. The method of item 38 or 39, wherein the solution has a pH of between 4.0 to 9.5, preferably 5.5 and 8.0.
41. The method of any one of items 38 to 40, wherein the incubation is performed for at least 10 sec, preferably 1 min, most preferably 10 min.
42. The method of any one of items 38 to 41, wherein the incubation is performed at a temperature between 0 and 95° C., preferably between 0 and 60° C. and most preferably between 0 to 42° C.
43. The method of any one of items 38 to 42, wherein the method further comprises washing the complex of the invention in a solution comprising $HCO_3^-$ or $CO_3^{2-}$, preferably at a concentration of at least 1 mM, preferably 10 mM and most preferably 1 M, before the incubation and/or wherein the incubation is performed in a solution comprising $HCO_3^-$ or $CO_3^{2-}$, preferably in a concentration of at least 1 mM, preferably 10 mM and most preferably 1 M.).
44. The method of any one of items 38 to 43, wherein the incubation is performed in water or an aqueous solution.
45. The method of any one of items 38 to 44, wherein the incubation is performed in a solution comprising one or more organic solvents selected from the group consisting of: DMSO, DMF, DMS, acetonitrile and isopropanol.
46. The method of any one of items 38 to 45, wherein the incubation is performed in an aqueous solution containing one or more Good's buffer substances, Tris, phosphate and/or carbonate/bicarbonate.
In one embodiment of this item the buffer may be PBS.
47. The method of any one of items 38 to 46, wherein the incubation is performed in the presence of $Ca^{2+}$, preferably provided in form of $CaCl_2$.
48. The method of any one of items 38 to 47, wherein the incubation is performed in an aqueous solution containing one or more buffer substances, wherein the buffer substance(s) do not comprise an amine, carboxylic acid, aromatic amine and/or phosphate group.
49. The method of any one of items 38 to 48, wherein the incubation is performed in an aqueous solution containing one or more buffer substances selected from the group consisting of: ACES, AMPSO, BES, BisTris, BisTris propane, borate, CAPS, CAPSO, CHES, DIPSO, EPPS, HEPES, HEPBS, HEPPSO, MES, MOPS, MOPSO, PIPES, POPSO, TAPS, TAPSO, TEA, TES, carbonate/bicarbonate buffers, phosphate buffers (e.g. PBS) and Tris.
50. The method of any one of items 38 to 49, wherein the incubation is performed in an aqueous solution containing one or more buffer substances selected from the group consisting of: BisTris, CAPS, CAPSO, HEPES, HEPBS, HEPPSO MES, MOPS, MOPSO, PIPES, TAPS, TES, phosphate buffers (e.g. PBS) and Tris.
51. The method of any one of items 38 to 50, wherein the incubation is performed in an aqueous solution comprising a buffer substance selected from the group consisting of: Bis-Tris, MES, HEPES and PIPES.
52. The method of any one of items 38 to 51, wherein the method does not involve an oxidation step such as a treatment with $H_2O_2$ in the presence of the label and/or carrier.
53. A labeled or carrier-attached target molecule obtainable by the method as defined in any one of items 38 to 52.
54. A composition comprising the labeled or carrier-attached target molecule of item 53.
55. Use of the labeled or carrier-attached target molecule of item 53 or the composition of item 54 as a research reagent.
56. The labeled or carrier-attached target molecule of item 53 or the composition of item 54 for use as a medicament.

A "complex" of the invention refers to a complex formed by a metal cation and ligands. Thus, the term complex preferably relates to a coordination complex or a metal complex. A complex comprises a lewis acid in form of a metal cation and one or more lewis basis in form of one or more ligands. The complex of the invention has at least two ligands as defined herein elsewhere.

The terms "protein" and "peptide" as used herein both relate to polypeptides consisting of amino acids. The term "peptide" refers to polypeptides having 20 or less amino acids. The term "protein" refers to polypeptides having more than 20 amino acids. The term polypeptide encompasses both "peptides" and "proteins". Where herein "protein or peptide" is mentioned, also polypeptides are included.

An "antibody," as used herein, is any molecule that can specifically or selectively bind to target protein. An antibody may include or be an antibody or a part/fragment thereof, wherein the part/fragment shows the substantially the same binding activity as the full-length antibody.

Antibodies may also include multivalent molecules, multi-specific molecules (e.g., diabodies), fusion molecules, aptimers, avimers, or other naturally occurring or recombinantly created molecules. Illustrative antibodies useful in the present invention include antibody-like molecules. An antibody-like molecule is a molecule that can exhibit functions by binding to a target molecule (See, e.g., Current Opinion in Biotechnology 2006, 17:653-658; Current Opinion in Biotechnology 2007, 18:1-10; Current Opinion in Structural Biology 1997, 7:463-469; Protein Science 2006, 15:14-27), and includes, for example, DARPins (WO 2002/020565), Affibody (WO 1995/001937), Avimer (WO 2004/044011; WO 2005/040229), Adnectin (WO 2002/032925) and fynomers (WO 2013/135588). In general, the term "antibody" is used herein in the broadest sense and encompasses various antibody structures, including but not limited to monoclonal antibodies, polyclonal antibodies, multispecific antibodies (e.g., bispecific antibodies), fully-human antibodies and antibody fragments so long as they exhibit the desired antigen-binding activity. Antibodies within the present invention may also be chimeric antibodies, recombinant antibodies, antigen-binding fragments of recombinant antibodies, or humanized antibodies.

The terms "antigen-binding part" or "antigen-binding fragment" of an antibody refer to a molecule other than an intact antibody that comprises a portion of an intact antibody and that binds the antigen to which the intact antibody binds. Examples of antibody fragments include but are not limited to Fv, Fab, Fab', Fab'-SH, $F(ab')_2$; diabodies; linear antibodies; single-chain antibody molecules (e.g. scFv); and multispecific antibodies formed from an antibody.

The term "ligand" refers to a species that interacts in some fashion with another species. In the context of the invention, "ligand" when used in context of a complex refers to a molecule comprising a Lewis base that is capable of forming a coordinate bond with a Lewis Acid. In other examples, a ligand is a species, often organic, that comprises a group that forms a coordinate bond with a metal ion. Ligands, when coordinated to a metal ion, may have a variety of binding modes know to those of skill in the art, which include, for example, terminal (i.e., bound to a single metal ion) and bridging (i.e., one atom of the Lewis base bound to more than one metal ion).

The terms "Lewis acid" and "Lewis acidic" are art-recognized and refer to chemical moieties which can accept a pair of electrons from a Lewis base as defined above.

The terms "Lewis base" and "Lewis basic" generally refer to a chemical moiety capable of donating a pair of electrons under certain reaction conditions. It may be possible to characterize a Lewis base as donating a single electron in certain complexes, depending on the identity of the Lewis base and the metal ion, but for most purposes, however, a Lewis base is best understood as a two electron donor. Examples of Lewis basic moieties include uncharged compounds such as alcohols, thiols, and amines, and charged moieties such as alkoxides, thiolates, carbanions, and a variety of other organic anions. In certain examples, a Lewis base may consist of a single atom, such as oxide.

The term "coordination" or "coordinating" refers to an interaction between a ligand and a metal cation.

The term "diagnostic" or "diagnostics" in the context of the invention relates to diagnostic type of agent. Non limiting examples are radionucleotides, which may then be detected using positron mission tomography (PET) or single photon emission computed tomography (SPECT) imaging or other methods known to one of skill in the art, fluorescent moieties and enzymatic active moieties that can be detected by methods known in the art. The diagnostic also includes antibodies comprising radionucleotides, fluorophores or enzymes attached thereto.

The term "pharmaceutical" relates to any medicinal or preventive agent including but not limited to small molecules, biologics (e.g. antibodies). A preferred pharmaceutical is an antibody The present invention is illustrated by the following Figures and Examples.

FIGURES

FIG. 1: Chemical reactivity of the [Co(III)(NTA)(His-protein)] complex.

NTA beads with immobilized $His_6$-GFP (SEQ ID NO: 14) at $Co^{2+}$ and $Co^{3+}$ complex centers were incubated with different chelators and reducing agents in combination with 250 mM imidazole and the amount of eluted $His_6$-GFP was measured. Due to the kinetic inertness of the $Co^{3+}$ centers, $His_6$-GFP is almost not eluted when immobilized on the beads in form of [Co(III)(NTA)($His_6$-GFP)]. Graph is adapted from Wegner and Spatz, 2013 (Wegner and Spatz, 2013).

FIG. 2: Schematic overview of methods for the labeling of a His-tagged protein via [Co(III)(NTA)] chemistry.

A Formation of the [Co(III)(NTA)(His-protein)] complex by oxidation of preformed [Co(II)(NTA)(His-protein)] complex as published in 2013 by Wegner & Spatz (Wegner and Spatz, 2013). NTA is preloaded with $Co^{2+}$ ions (from $Co(II)Cl_2$) and incubated with His-tagged protein. Finally, the $Co^{2+}$ center is converted to $Co^{2+}$ by oxidating the whole protein complex for 1 h with 20 mM $H_2O_2$. This method, however, has a major disadvantage since the oxidation step can affect function and stability of the conjugated protein. Furthermore, conjugates attached to the NTA moiety can be affected by the oxidation process.

B Formation of the [Co(III)(IDA)(His-protein)] complex by oxidation of preformed [Co(II)(IDA)($H_2O)_3$] complex as published in 2006 by Zatloukalová & Kucerová (Zatloukalova and Kucerová, 2006). IDA is preloaded with $Co^{2+}$ ions (from $Co(II)Cl_2$) and the $Co^{2+}$ center is converted to $Co^{3+}$ by oxidating the [Co(II)(IDA)($H_2O)_3$] complex for 1 h with 20 mM $H_2O_2$. Subsequently, the [Co(III)(IDA)($H_2O)_3$]$^+$ complex is incubated with His-tagged protein. This procedure is limited due to a very slow complex formation and a reduced binding efficacy. Furthermore, conjugates attached to the IDA moiety can be affected by the oxidation process.

C Formation of the [Co(III)(NTA)(His-protein)] complex by using cobalt(III) carbonate salts. NTA is preloaded with $Co^{2+}$ ions from cobalt(III) carbonate salts (e.g. $Na_3$[Co(III)($CO_3)_3$]*$3H_2O$) so as to form the complex of the invention. The complex is then incubated with His-tagged protein. This procedure is a very simple workflow for the conjugation of His-tagged proteins which can be performed under mild reaction conditions. The function of the proteins as well as the NTA conjugate, i.e. a label (e.g. a fluorophore) and/or carrier, can be fully preserved as the reaction can be performed continuously in physiological buffer conditions. Additionally, the carbonate ligand allows a faster and more efficient protein binding compared to the two water ligands in procedure B.

D Formation of the [Pt(IV)(NTA)(His-protein)] complex by using platinum(IV) nitrate salts. NTA is preloaded with $Pt^{4+}$ ions from platinum(IV) nitrate solutions so as to form the complex of the invention. The complex is then incubated with His-tagged protein. This procedure is a very simple workflow for the conjugation of His-tagged proteins which can be performed under mild reaction conditions. Thereby the nitrate ligand allows a faster and more efficient protein binding compared to the two water ligands in procedure B.

Figure 3:
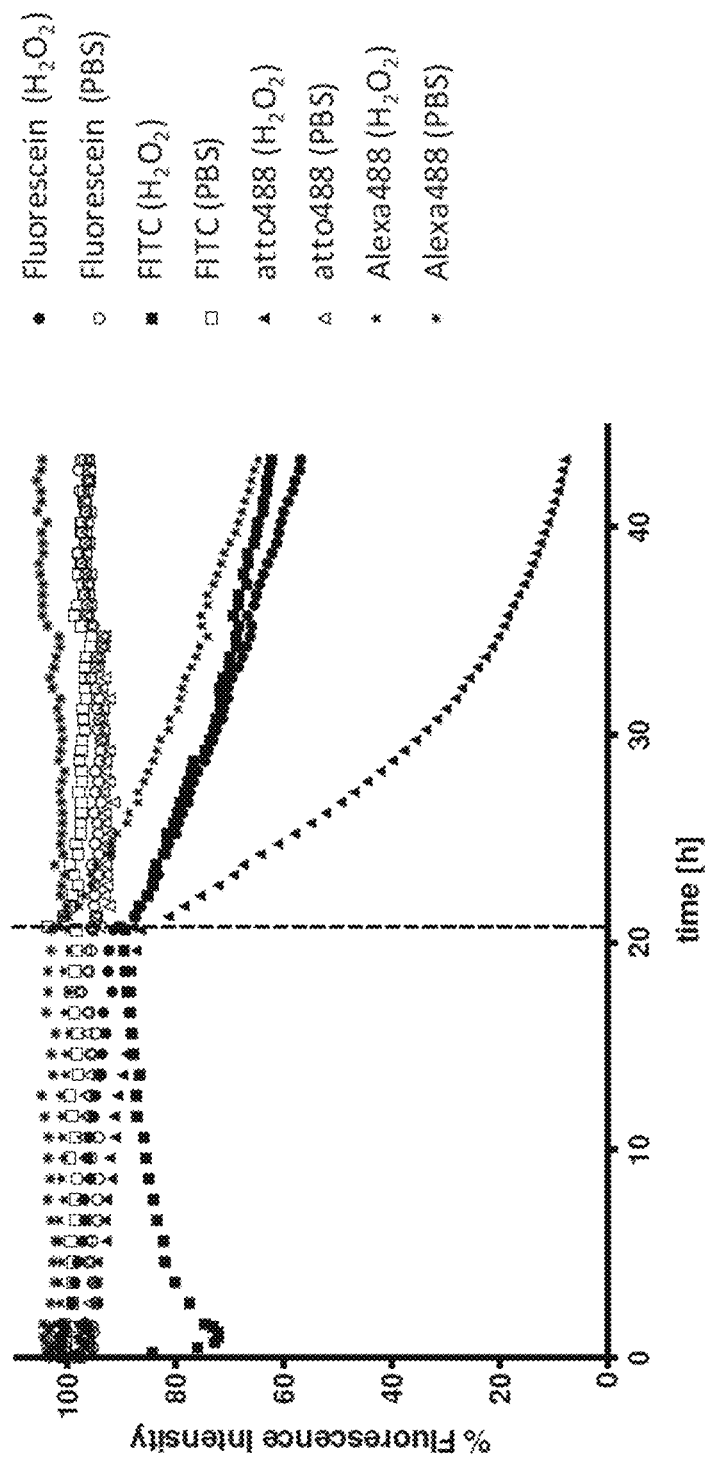

FIG. 3: Oxidation of fluorophores with hydrogen peroxide. Different fluorophores were incubated for about 21 hours with 0.05% $H_2O_2$ following an incubation in 1% $H_2O_2$. The fluorescence of the fluorophores was measured every 15 (0.05% $H_2O_2$) to 30 (1% $H_2O_2$) minutes. All fluorophores show a decrease in fluorescence intensity during the $H_2O_2$ treatment illustrating that oxidation steps with $H_2O_2$ can interfere with the function and stability of labels.

Figure 4:
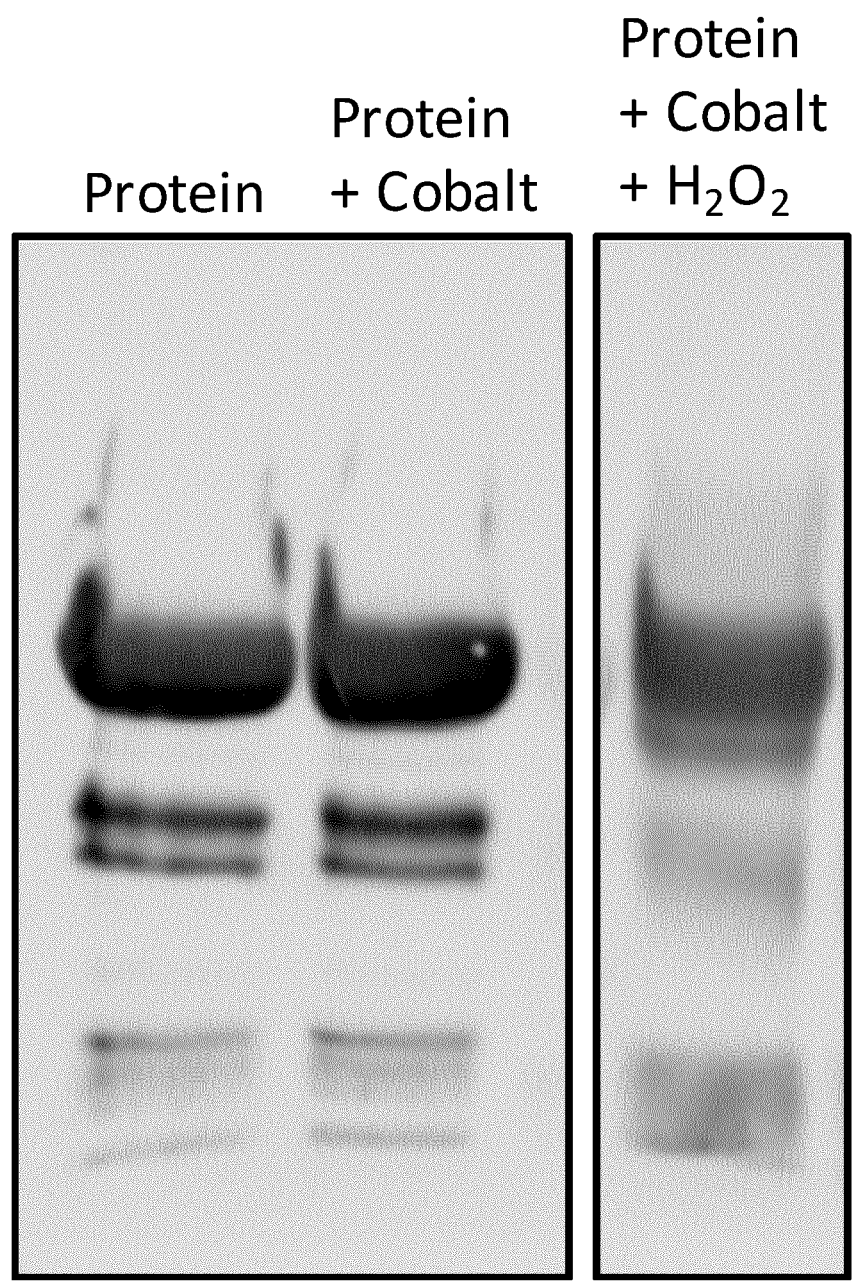

FIG. 4: Protein degradation and His-tag cleavage during cobalt oxidation by $H_2O_2$. His-tagged protein (3.3 µM) was incubated for 1 hour with or without 66 µM $CoCl_2$ and 20 mM $H_2O_2$. Protein stability and His-tag cleavage was analyzed by Western Blot using an α-$His_6$-tag-antibody coupled to horse radish peroxidase (clone H-3)). Upon exposure to cobalt and $H_2O_2$ the protein spontaneously showed partial signs of degradation as well as cleavage of the His-tag. Gel lanes from presented image originate from the same gel/membrane.

Figure 5:
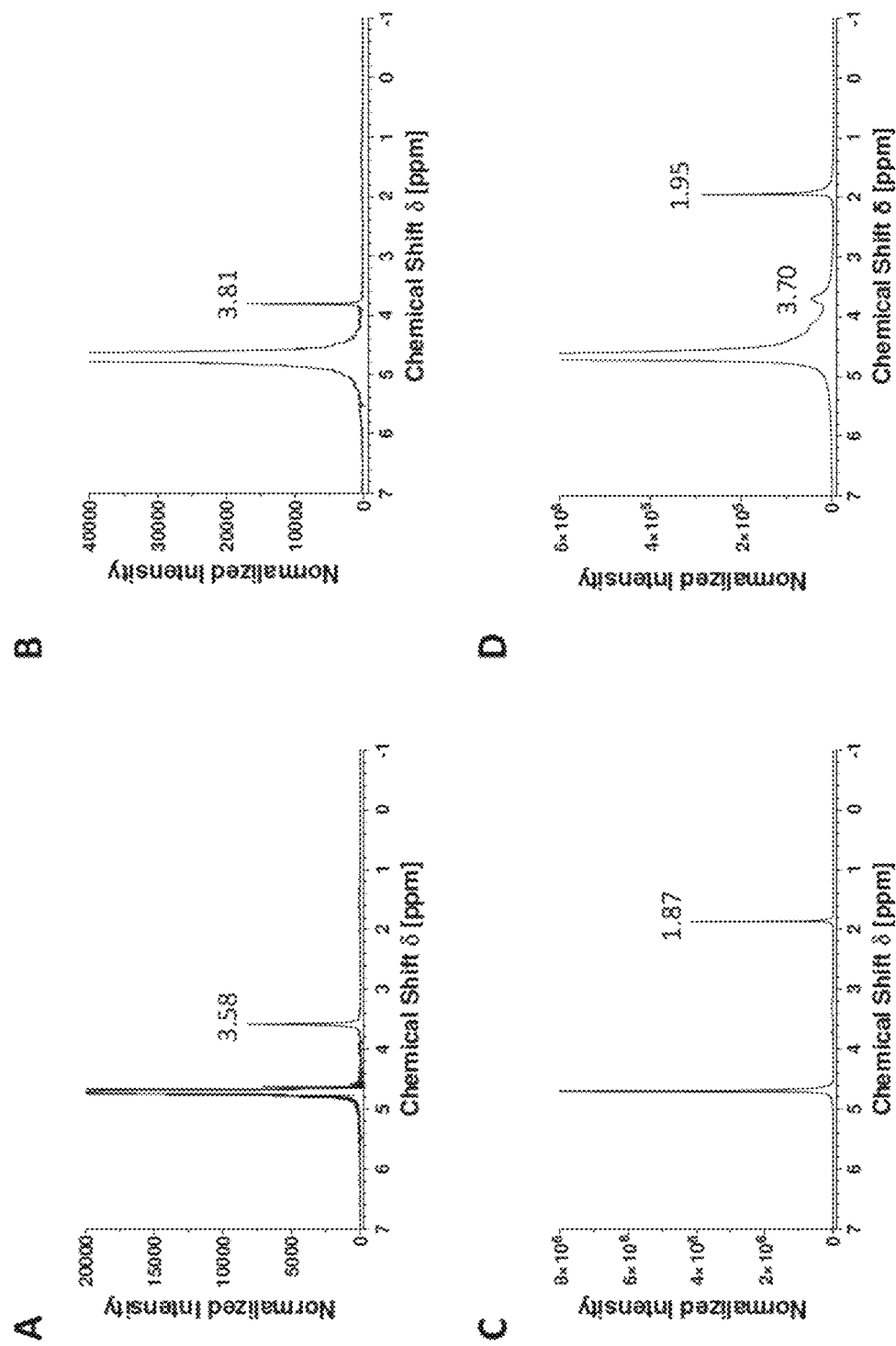

FIG. 5: $^1$H-NMR spectra of NTA and its cobalt complexes.

A $^1$H-NMR measurements of NTA show a peak at ~3.6 ppm, which correlates with the spectra created in silco (calculated peak at 3.57 ppm) using the software NMR Predict (https://www.nmrdb.org/new_predictor/index.shtml?v=v2.103.0; version April 2019), see Banfi and Patiny, 2008; Castillo et al. 2011; Aires-de-Sousa et al. 2002). B When NTA is complexed with $Co^{2+}$ and $D_2O$ to [Co(II)(NTA)($D_2O)_2$]$^-$ (synthesized with $CoCl_2$*$6H_2O$) the peak from ~3.6 ppm is shifted to ~3.8 ppm. C+D When the complexes are produced with $Na_3$[Co(III)($CO_3)_3$]*$3H_2O$ (C) or $K_3$[Co(III)($CO_3)_3$]*$3H_2O$ (D) the peak shifts further to ~1.9 ppm indicating the presence of the desired carbonato complex $[Co(III)(NTA)(CO_3)]^{2-}$. All ppm shifts are normalized to the peak of remaining $H_2O$ at 4.7 ppm.

Figure 6:
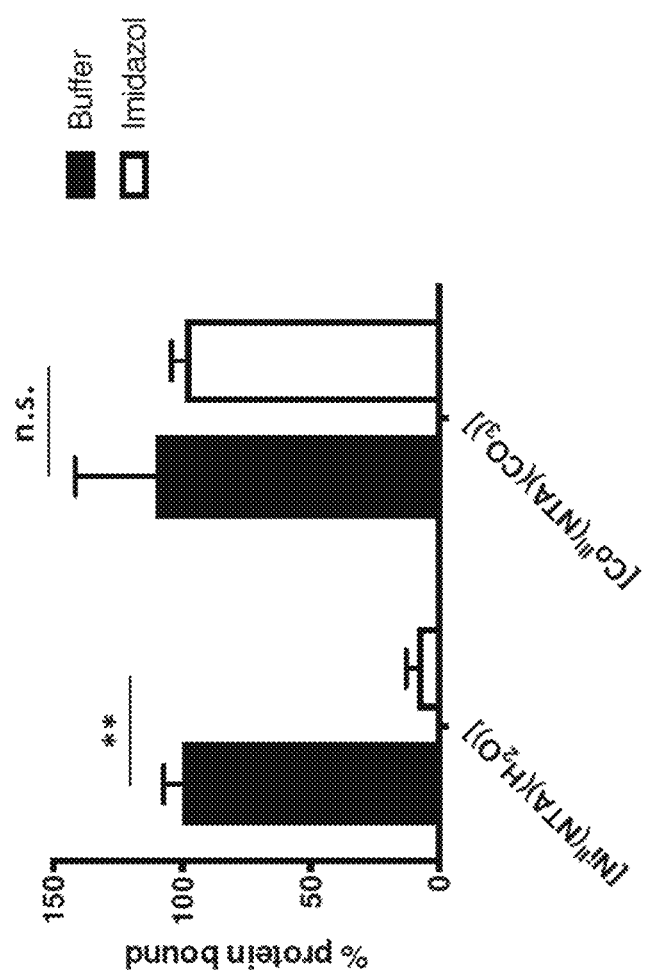

FIG. 6: Stability of the $[Co(III)(NTA)(His_6\text{-PercevalHR})]$ complex obtained via $[Co(III)(NTA)(CO_3)]^{2-}$. NTA beads with immobilized $His_6$-PercevalHR (SEQ ID NO: 15) at $Ni^{2+}$ and $Co^{3+}$ complex centers (latter produced with $Na_3[Co(III)(CO_3)_3]*3H_2O$) were washed with PBS or imidazole (250 mM) and the amount of $His_6$-PercevalHR remaining on the beads was determined by fluorescence measurements. $[Co(III)(NTA)(His_6\text{-PercevalHR})]$ complexes produced via $[Co(III)(CO_3)_3]$ salts show thereby a similar chemical stability in imidazole as for complexes formed via the $H_2O_2$ oxidation procedure (compare to FIG. 1). Error bars: +/−SD; p-values: <0.001: *; <0.01: ; <0.05: *; >0.05: not significant.

FIG. 7: Protein binding to $[Co(III)(NTA)]$ complexes.

Agarose beads functionalized with $[Ni(II)(NTA)(H_2O)_2]^-$, $[Co(III)(NTA)(H_2O)_2]$ or $[Co(III)(NTA)(CO_3)]^{2-}$ were incubated with $His_6$-GFP (SEQ ID NO: 14).

A The remaining unbound protein was determined by fluorescence measurements of the supernatant at different time points. The $[Co(III)(NTA)]$ complexes with an associated carbonate molecule bind the protein significantly faster than $[Co(III)(NTA)]$ complexes with associated water molecules.

B After an incubation of 312 h the beads were washed with buffer or 250 mM imidazole and the amount $His_6$-GFP remaining on the beads was determined by fluorescence measurements. All $[Co(III)(NTA)(His\text{-}GFP)]$ complexes show thereby a similar chemical stability in imidazole. However, beads functionalized with $[Co(III)(NTA)(CO_3)]^{2-}$ complexes bind significantly more protein than beads preloaded with $[Co(III)(NTA)(H_2O)_2]$. Error bars: +/−SD; p-values: <0.001: *; <0.01: ; <0.05: *; >0.05: not significant FIG. 8: Effect of buffer substance on protein binding.

A+B: Agarose beads functionalized with $[Co(III)(NTA)(CO_3)]^{2-}$ were incubated with $His_6$-GFP (SEQ ID NO: 14) in different buffers. The remaining unbound protein was determined by fluorescence measurements of the supernatant at different time points. In MES and Bis-Tris based buffer solutions the complex formation was faster compared to Tris based buffers and more efficient compared to Tris and HEPES based buffers. Graph B is a zoom from graph A at the time points 0 and 3 hours after experiment start. Error bars: +/−SD.

Figure 9:
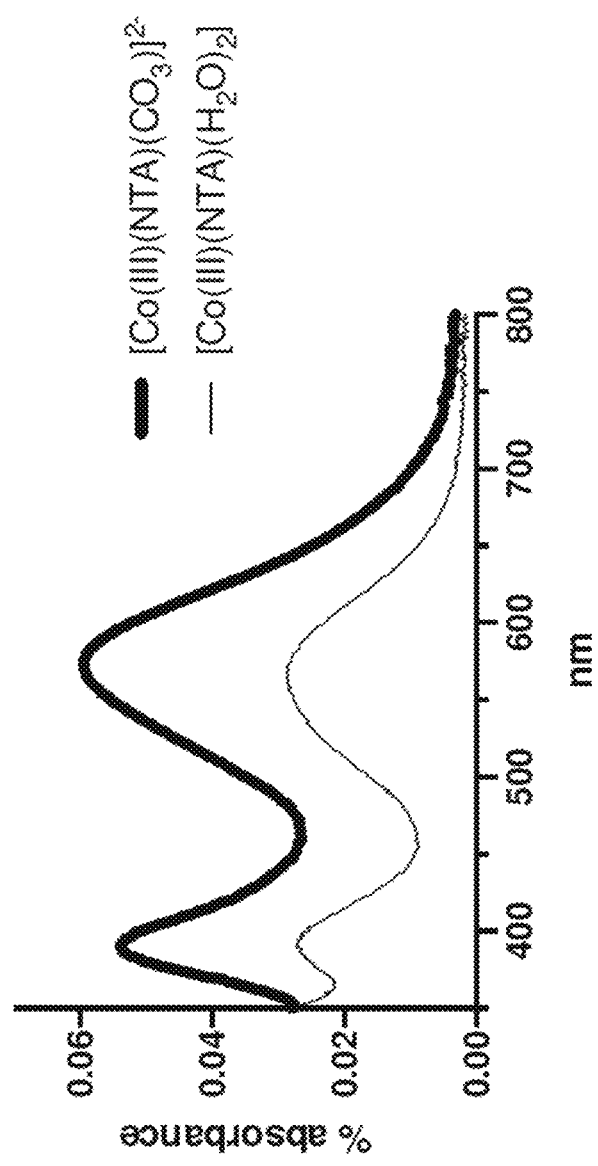

FIG. 9: UV-Vis Spectra of $[Co(III)(NTA)(CO_3)]^{2-}$ and $[Co(III)(NTA)(H_2O)_2]$ Visible absorption spectra of $[Co(III)(NTA)(CO_3)]^{2-}$ and $[Co(III)(NTA)(H_2O)_2]$ in aqueous solution at room temperature. $[Co(III)(NTA)(CO_3)]^{2-}$ is produced by incubating NTA with $Na_3[Co(III)(CO_3)_3]3H_2O$ and $[Co(III)(NTA)(H_2O)_2]$ is produced by oxidation with $H_2O_2$ of the $[Co(II)(NTA)(H_2O)_2]$ complex formed by incubating NTA with $Co(II)Cl_2*6H_2O$. A peak shift of each of the two maxima demonstrates the presence of the carbonate ligand at the $[Co(III)(NTA)(CO_3)]^{2-}$ complex.

FIG. 10: $Co(III)(NTA)(His\text{-}GFP)$ complex formation and stability in dependence of incubation time and temperature of $Na_3[Co(III)(CO_3)_3]*3H_2O$ with NTA NTA-functionalized agarose beads are incubated for different time periods at 4° C. (A), 25° C. (B) and 70° C. (C). Subsequently, resulting $[CoIII)(NTA)(CO_3)]^{2-}$ complexes are incubated for 48 h with $His_6$-GFP. Stability of the final $[Co(III)(NTA)(His\text{-}GFP)]$ complex is tested by a stringent wash with either a HEPES-based buffer or 250 mM imidazole in buffer. Protein amount immobilized on beads was determined by BCA-assay. With increasing $Na_3[Co(III)(CO_3)_3]*3H_2O$/NTA incubation times the percentage of stable complexes as well as the immobilized $His_6$-GFP on beads increases when protein is incubated subsequently for 48 h at 25° C. With elevating temperatures, saturation of immobilized protein is reached earlier. Error bars: +/−SD FIG. 11: $[Co(III)(NTA)(His\text{-}GFP)]$ complex formation and stability in dependence of $[Co(III)(NTA)(CO_3)]^{2-}$ with $His_6$-GFP incubation time and temperature $[CoIII)(NTA)(CO_3)]^{2-}$ functionalized magnetic agarose beads are incubated for different time periods at 4, 25 and 37° C. and stability of the final $[Co(III)(NTA)(His\text{-}GFP)]$ complex is tested by a stringent wash with either protein binding buffer or 250 mM imidazole in buffer. Protein amount immobilized on beads was determined based on the fluorescence of the beads slurry ($\lambda_{ex}$=490 nm, $\lambda_{em}$=535 nm). A His-GFP immobilized on beads after imidazole treatment based in their relative fluorescence. With longer protein incubation times also more protein could be immobilized on the beads starting to reach a saturation plateau at 3.5 h. No effect of the protein incubation temperature on the yield of the final complex could be observed. B Percentage of His-GFP immobilized on beads after imidazole treatment in comparison to buffer wash. All produced complexes demonstrate a high stability towards treatment 250 mM imidazole. Error bars: +/−SD FIG. 12: $[Co(III)(NTA)(His\text{-}GFP)]$ complex formation and stability with $K_3[Co(III)(CO_3)_3]*3H_2O$ NTA functionalized magnetic agarose beads are incubated for indicated times with $K_3[Co(III)(CO_3)_3]*3H_2O$ and followed by an incubation of $His_6$-GFP with the produced $[CoIII)(NTA)(CO_3)]^{2-}$ complex. Stability of the final $[Co(III)(NTA)(His\text{-}GFP)]$ complex is tested by a stringent wash with protein buffer ("buffer") or 250 mM imidazole in buffer ("imidazole"). Protein amount immobilized on beads was determined based on the fluorescence of the beads slurry ($\lambda_{ex}$=490 nm, $\lambda_{em}$=535 nm). $[CoIII)(NTA)(CO_3)]^{2-}$ complexes produced via $K_3[Co(III)(CO_3)_3]*3H_2O$ can also coordinate with His-GFP to form stable $[Co(III)(NTA)(His\text{-}GFP)]$ complexes.

Figure 13:
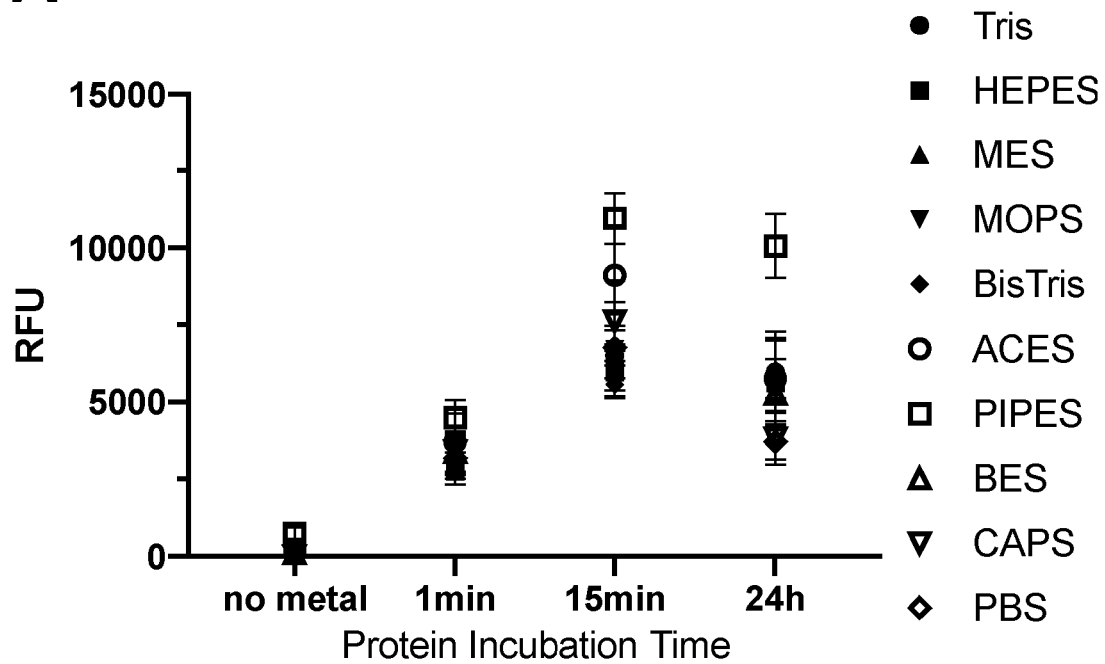
Figure 13:
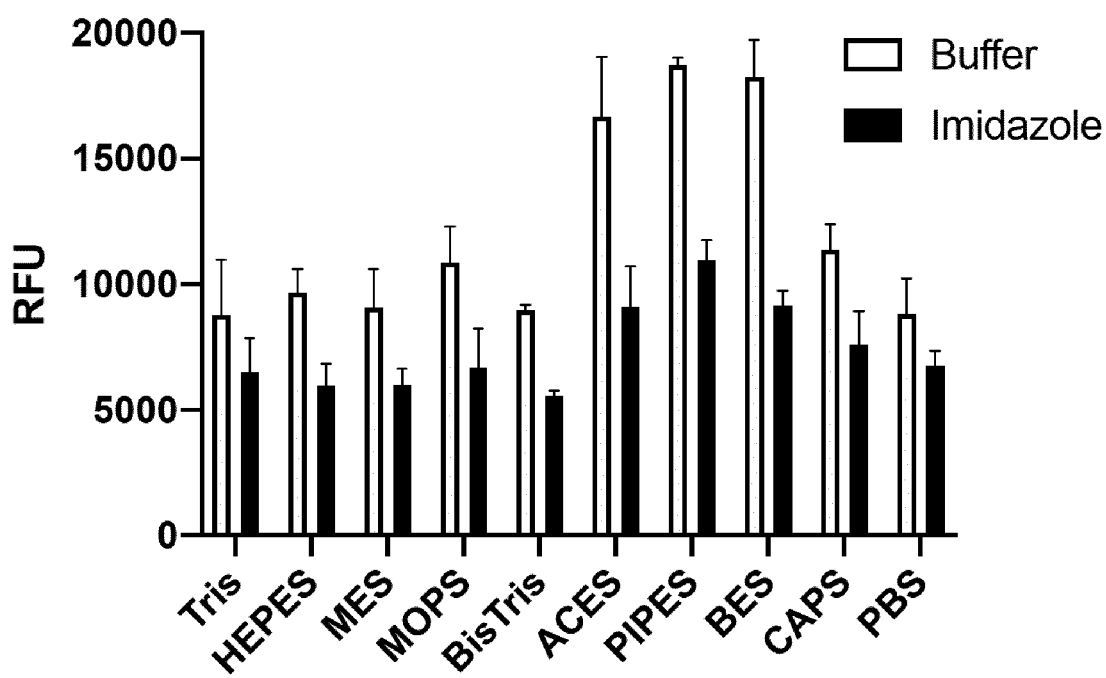

Error bars: +/−SD; p-values: <0.001: *; <0.01: ; <0.05: *; >0.05: not significant FIG. 13: $[Co(III)(NTA)(His\text{-}GFP)]$ complex formation in different buffer systems and its complex stability with 10 min $Na_3[Co(III)(CO_3)_3]*3H_2O$/NTA incubation $[CoIII)(NTA)(CO_3)]^{2-}$-functionalized magnetic agarose beads after 10 min of $Na_3[Co(III)(CO_3)_3]*3H_2O$/NTA incubation time are incubated for different time periods with $His_6$-GFP in different buffer systems. Stability of the final $[Co(III)(NTA)(His\text{-}GFP)]$ complex is tested by a stringent wash with a buffer solution ("buffer") followed by 250 mM imidazole in buffer ("imidazole"). Protein amount immobilized on beads was determined based on the fluorescence of the beads slurry ($\lambda_{ex}$=490 nm, $\lambda_{em}$=535 nm). A Protein amount immobilized on beads after imidazole treatment B His-GFP immobilized on beads after 15 min protein incubation before and after imidazole treatment. The formation of a stable $[Co(III)(NTA)(His\text{-}GFP)]$ complex is possible with all protein binding buffer systems, but with varying efficiencies for bound protein and stability percentages of the final complex. Error bars: +/−SD FIG. 14: $[Co(III)(NTA)(His\text{-}GFP)]$ complex formation in different buffer systems and its complex stability with 48 h $Na_3[Co(III)(CO_3)_3]*3H_2O$/NTA incubation $[CoIII)(NTA)(CO_3)]^{2-}$-functionalized magnetic agarose beads after 48 h of $Na_3[Co(III)(CO_3)_3]*3H_2O$/NTA incubation time are incubated for different time periods with $His_6$-GFP in different buffer systems. Stability of the final [Co(III)(NTA) (His-GFP)] complex is tested by a stringent wash with either analysis buffer ("buffer") or 250 mM imidazole in analysis buffer ("imidazole"). Protein amount immobilized on beads was determined based on the fluorescence of the beads slurry ($\lambda_{ex}$=490 nm, $\lambda_{em}$=535 nm). A Protein amount immobilized on beads after imidazole treatment B–E His-GFP immobilized on beads after 1 min (B), 15 min (C), 1 h (D) or 24 h (E) protein incubation with or without imidazole treatment. The formation of a stable [Co(III)(NTA)(His-GFP)] complex is possible with all protein binding buffer systems, but with varying efficacies for bound protein. Error bars: +/−SD FIG. 15: [Co(III)(NTA)(His-GFP)] complex formation at different pH values and its complex stability

[CoIII)(NTA)(CO$_3$)]$^{2-}$-functionalized magnetic agarose beads after 48 h of Na$_3$[Co(III)(CO$_3$)$_3$]*3H$_2$O/NTA incubation time are incubated for different time periods with His$_6$-GFP in BisTris- or HEPES-based buffer systems at different pH values. Stability of the final [Co(III)(NTA)(His-GFP)] complex is tested by a stringent wash with either analysis buffer ("buffer") or 250 mM imidazole in analysis buffer ("imidazole"). Protein amount immobilized on beads was determined based on the fluorescence of the beads slurry ($\lambda_{ex}$=490 nm, $\lambda_{em}$=535 nm). A Protein amount immobilized on beads after imidazole treatment B His-GFP immobilized on beads after 15 min protein incubation with or without imidazole treatment. The formation of a stable [Co(III)(NTA)(His-GFP)] complex is possible at all pH values, but with varying efficacies for bound protein. Thereby the efficiency increases with the protein incubation and with decreasing pH values during protein incubation. Error bars: +/−SD FIG. 16: Stable immobilization of different proteins with His-tag or histidine-rich region via [Co(III)(NTA)(CO$_3$)$^{2-}$

[Co(III)(NTA)(CO$_3$)]$^{2-}$ funtionalized magnetic agarose beads are incubated with His-GFP, His-ProteinA, His-Sortase, His-Human Serum Albumin or anti-GFP mouse IgG1 and stability of the final [Co(III)(NTA)(protein)] complex is tested by a stringent wash with either protein binding buffer or 250 mM imidazole in buffer. A SDS-PAGE of protein supernatant after protein incubation with [Co(III)(NTA)(CO$_3$)]$^{2-}$. Marker: 200, 150, 100, 75, 50, 37, 25 kDa. Lane 1, 4, 7, 10 and 13: protein remaining after [Co(III)(NTA)(CO$_3$)]$^{2-}$ incubation. Lane 2, 5, 8, 11 and 14: protein remaining after [Ni(II)(NTA)(H$_2$O)$_2$]$^-$ incubation. Lane 3, 6, 9, 12 and 15: protein remaining after NTA incubation. Lane 1-3: His-GFP, lane 4-6: His-ProteinA, lane 7-9: His-Sortase, lane 10-12: His-HSA, lane 13-15: anti-GFP mouse IgG1. Except for His-ProteinA, where it is just a high percentage, all protein could be cleared from the supernatant after protein incubation. B Protein amount on beads determined by BCA-assay after imidazole treatment. Stable [Co(III)(NTA)(protein)] complex formation could be achieved for all proteins. C Activity of immobilized Sortase before and after imidazole treatment determined fluometrical with the SensoLyte® 520 Sortase A Activity Assay Kit. Sortase is still active after immobilization and the formed [Co(III)(NTA)(His-Sortase)] complex could resist a treatment with 250 mM imidazole. D+E GFP binding to anti-GFP mouse IgG1 immobilized on NTA (D) oder IDA (E) functionalized beads determined based on the fluorescence of the beads slurry ($\lambda_{ex}$=490 nm, $\lambda_{em}$=535 nm). Immobilized antibody was still functional demonstrated by GFP binding.

Figure 17:
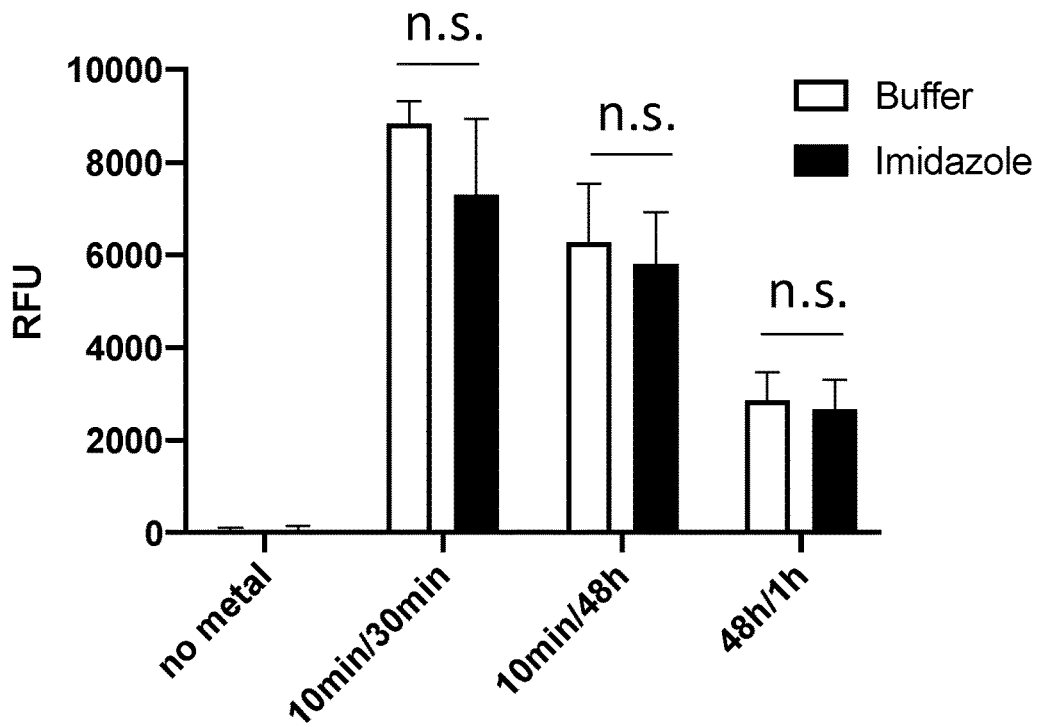
Figure 17:
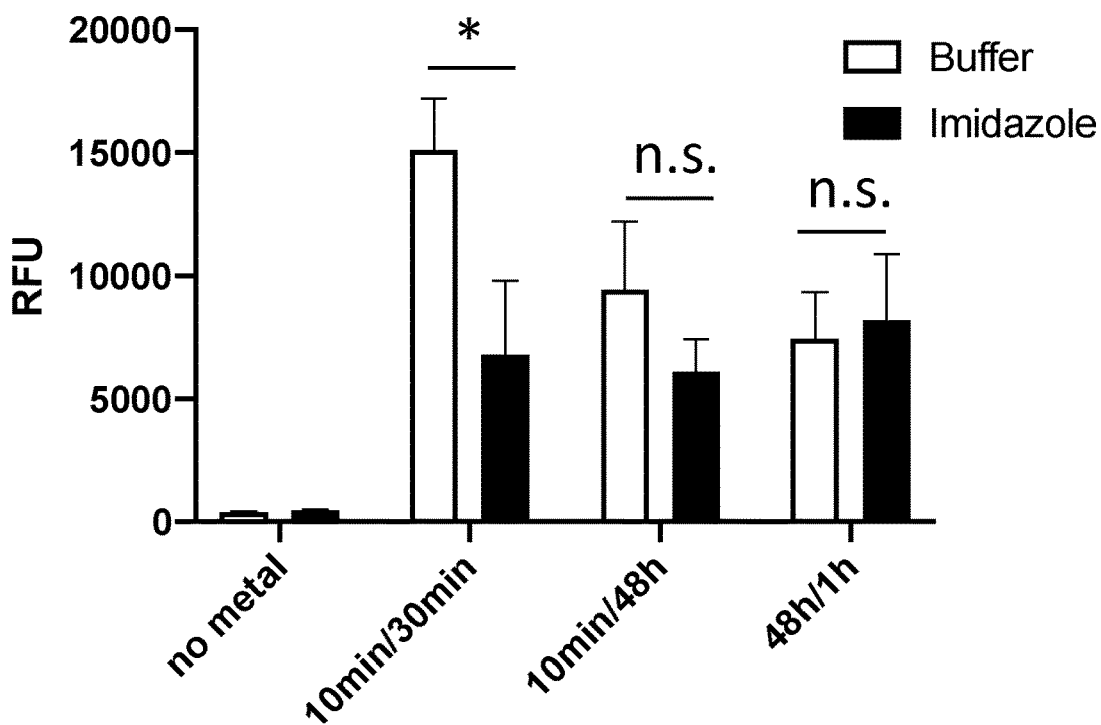

FIG. 17: IDA and TALON as metal binding domain. Formation and chemical stability of A [Co(III)(IDA)(His-GFP)] and B [Co(III)(TALON)(His-GFP)] complexes produced via [Co(III)(IDA)(CO$_3$)]$^-$ or [Co(III)(TALON)(CO$_3$)] complexes, respectively. Incubation times of Na$_3$[Co(III)(CO$_3$)$_3$]*3H$_2$O followed by His$_6$-GFP protein are indicated in brackets (Na$_3$[Co(III)(CO$_3$)$_3$]3H$_2$O/protein incubation time). Chemical stability was tested by a stringent wash with either a HEPES-based buffer or 250 mM imidazole in buffer. Protein amount immobilized on beads was measured based on the fluorescence of the beads slurry ($\lambda_{ex}$=490 nm, $\lambda_{em}$=535 nm). Significantly more His$_6$-protein was chemically stable immobilized on the beads using [Co(III)(IDA/TALON)(CO$_3$)]$^{2-}$ complexes compared to beads without metal treatment. Thereby the chemically stability of complexes with the tridentate metal binding domain IDA was dramatically increased versus tetradentate TALON complexes.

Error bars: +/−SD; p-values: <0.001: *; <0.01: ; <0.05: *; >0.05: not significant.

Figure 18:
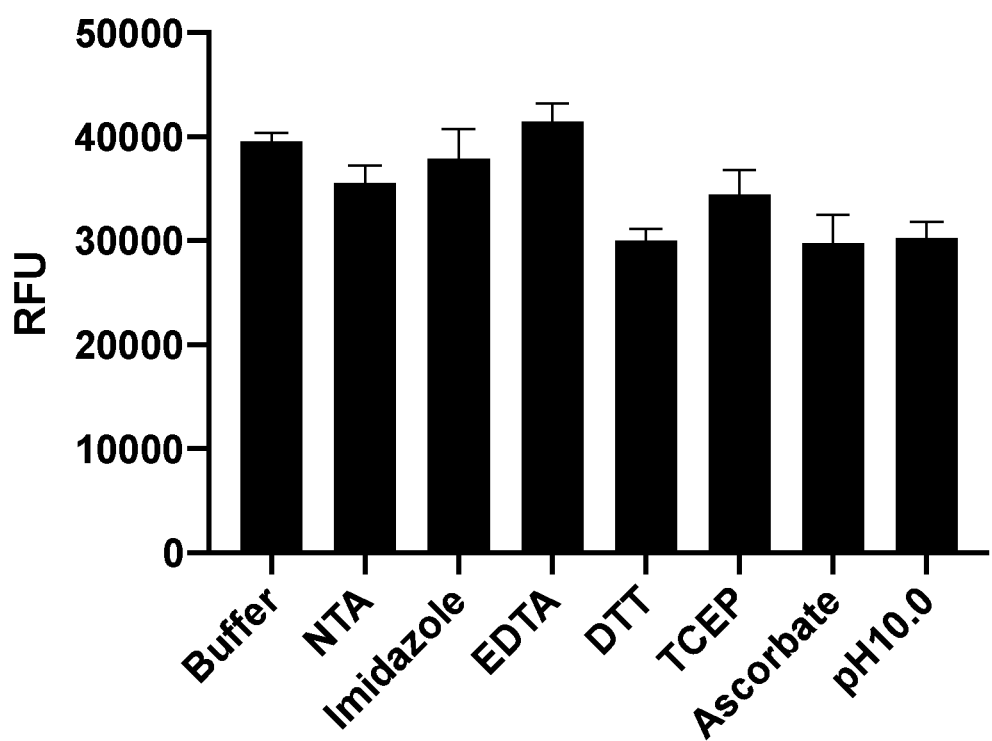

FIG. 18: Chemical reactivity of the [Co(III)(IDA)(His-protein)] complex.

Beads functionalized with [Co(III)(IDA)(His$_6$-GFP)] complex were incubated with different conditions including chelators or reducing agents in combination with 250 mM imidazole and the amount of His-GFP remaining on the beads is measured by fluorescence of the beads slurry ($\lambda_{ex}$=490 nm, $\lambda_{em}$=535 nm). Due to the kinetic inertness of the Co$^{3+}$ centers, His$_6$-GFP is almost not eluted, demonstrating the high stability of the produced [Co(III)(IDA)(His-protein)] complex. Error bars: +/−SD FIG. 19: Immobilization efficiency of His$_6$-GFP to [Co(III)(IDA)(CO$_3$)]$^-$ and [Co(III)(IDA)(H$_2$O)$_2$]$^+$ Complex formation efficiency and chemical stability of [Co(III)(IDA)(His-GFP)] produced via Co(III)(IDA)(CO$_3$)]$^-$ or [Co(III)(IDA)(H$_2$O)$_2$]$^+$complexes on magnetic beads after A 3 h and B 24 h of His$_6$-GFP incubation. Co(III)(IDA)(CO$_3$)]$^-$ complexes were produced by incubating IDA-functionalized magnetic beads with Na$_3$[Co(III)(CO$_3$)$_3$]*3H$_2$O for indicated time (10 min or 48 h). Chemical stability was tested by a stringent wash with either a HEPES-based buffer or 250 mM imidazole in buffer. Protein amount immobilized on beads was measured based on the fluorescence of the beads slurry ($\lambda_{ex}$=490 nm, $\lambda_{em}$=535 nm). Significantly more His$_6$-protein was chemically stable immobilized on the beads using [Co(III)(IDA)(CO$_3$)]$^-$ complexes prepared with 10 min Na$_3$[Co(III)(CO$_3$)$_3$]*3H$_2$O incubation compared to beads functionalized with Co(III)(IDA)(H$_2$O)$_2$]$^+$ complexes. [Co(III)(IDA)(CO$_3$)]$^-$ complexes prepared with 48 h Na$_3$[Co(III)(CO$_3$)$_3$]*3H$_2$O incubation outcompeted Co(III)(IDA)(H$_2$O)$_2$]$^+$ complexes after a protein incubation time of 24 h. All [Co(III)(IDA)(His-GFP)] complexes demonstrated a high chemical stability towards imidazole.

Figure 20:
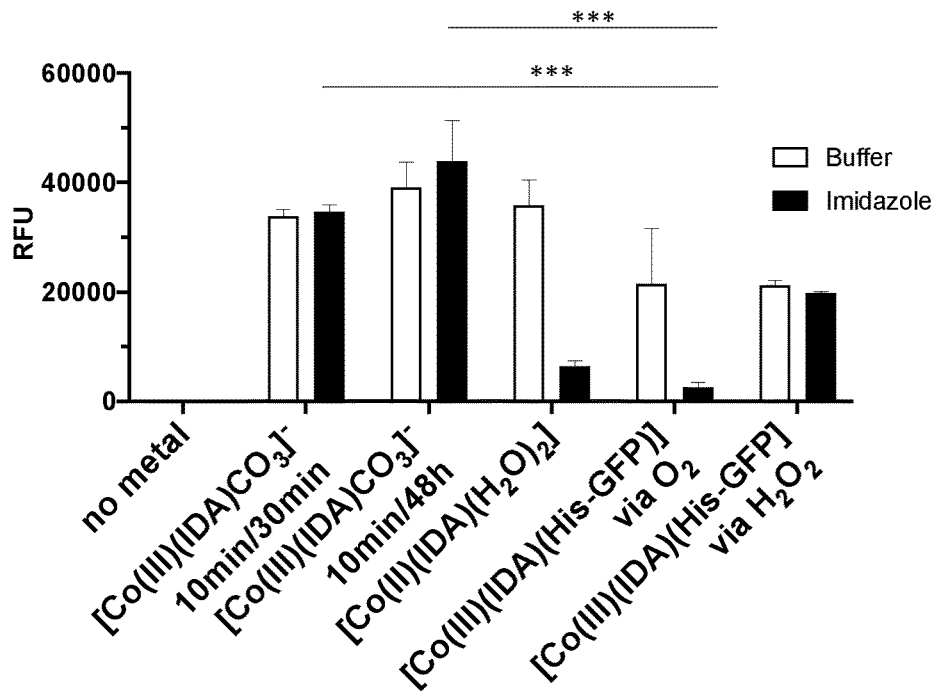
Figure 20:
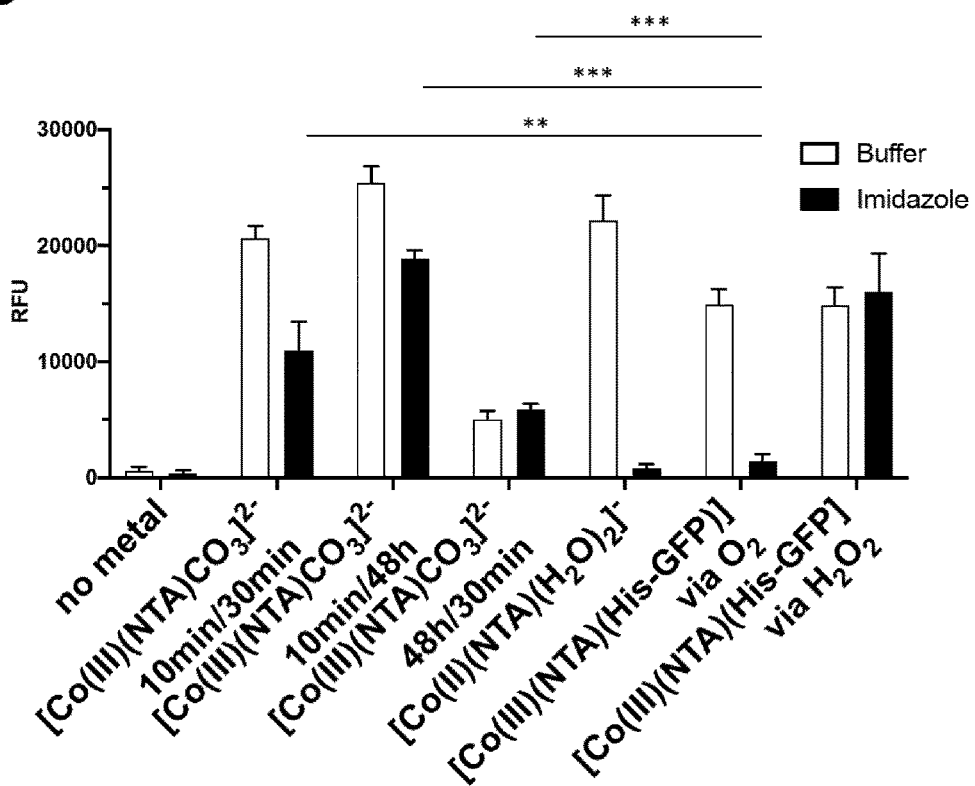

Error bars: +/−SD; p-values: <0.001: *; <0.01: ; <0.05: *; >0.05: not significant FIG. 20: [Co(III)(IDA/NTA)(His-GFP)] chemically stable complex formation via [Co(III)(IDA/NTA)(CO$_3$)] versus oxygen treatment of [Co(II)(metal binding domain)(His-GFP)]. Chemical stability of A [Co(III)(IDA)(His-GFP)] or B [Co(III)(NTA)(His-GFP)] complexes produced via [Co(III)(metal binding domain)(CO$_3$)]$^{2-}$ complexes (Na$_3$[Co(III)(CO$_3$)$_3$]3H$_2$O/protein incubation time) or oxidation of [Co(II)(metal binding domain)(His-GFP)] with oxygen (8 h) or hydrogen peroxide (20 mM, 1 h) treatment on magnetic beads was challenged with a treatment of a HEPES-based buffer or 250 mM imidazole in buffer. Protein amount immobilized on beads was measured based on the fluorescence of the beads slurry ($\lambda_{ex}$=490 nm, $\lambda_{em}$=535 nm). Significantly more His$_6$-protein was chemically stable immobilized on the beads using [Co(III)(metal binding domain)(CO$_3$)] complexes compared to a 8 hour oxygen treatment of [Co(II)(metal binding domain)(His-GFP)].

Error bars: +/−SD; p-values: <0.001: *; <0.01: ; <0.05: *; >0.05: not significant FIG. 21: Formation of Co(III)(HS-PEG-NTA)(His-GFP)] complexes on surfaces His-GFP was immobilized via [Co(III)(HS-PEG-NTA (CO$_3$)]$^{2-}$ complexes to a gold nano-structured glass surface. Nanostructured gold dots are functionalized via thiol-PEG-NTA followed by an incubation with Na$_3$[Co(III)(CO$_3$)$_3$]*3H$_2$O to form [Co(III)(HS-PEG-NTA(CO$_3$)]$^{2-}$ complexes, to which subsequently His$_6$-GFP is immobilized by formation of Co(III)(HS-PEG-NTA)(His-GFP)] complexes. All surfaces are passivated with a short PEG layer in-between the gold dots to avoid nonspecific protein interactions with the glass surface. The amount of immobilized His-GFP was determined based on the fluorescence on the surface ($\lambda_{ex}$=490 nm, $\lambda_{em}$=535 nm) confirming the GFP immobilization on the surface. "PEG only": passivated surface; "PEG/GFP": passivated surface incubated with His-GFP; "no metal": passivated surfaces incubated with thiol-PEG-NTA and His-GFP; "[Co(III)(NTA)(His-GFP)]": passivated surface incubated with thiol-PEG-NTA, Na$_3$[Co(III)(CO$_3$)$_3$]*3H$_2$O and His-GFP.

FIG. 22: Formation of [Co(III)(NTA-X-Biotin)(His-GFP)] complexes in solution His-GFP was coupled to a biotin moiety via [CoIII)(NTA-X-Biotin)(CO$_3$)] complexes produced by incubating Na$_3$[Co(III)(CO$_3$)$_3$]3H$_2$O with NTA-X-Biotin followed by His-GFP incubation with the resulting complex for different incubation times. The final complex was immobilized to beads functionalized with streptavidin via biotin-streptavidin interaction. Amount of immobilized protein as measure for biotinylated protein was determined based on the fluorescence of the beads slurry ($\lambda_{ex}$=490 nm, $\lambda_{em}$=535 nm). A [Co(III)(NTA-X-Biotin)(His-GFP)] complexes generated after 10 min Na$_3$[Co(III)(CO$_3$)$_3$]3H$_2$O/NTA-X-Biotin and 30 min [CoIII)(NTA-X-Biotin)(CO$_3$)]/His-GFP incubation immobilized on streptavidin beads. For all Na$_3$[Co(III)(CO$_3$)$_3$]3H$_2$O to NTA ratio a significant amount of His-GFP could be biotinylated and immobilized on the beads. Thereby higher Na$_3$[Co(III)(CO$_3$)$_3$]*3H$_2$O ratios lead to increased labeling rates. B [Co(III)(NTA-X-Biotin)(His-GFP)] complexes generated after 10 min Na$_3$[Co(III)(CO$_3$)$_3$]*3H$_2$O/NTA-X-Biotin and 30 min or 48 h [CoIII)(NTA-X-Biotin)(CO$_3$)]/His-GFP incubation immobilized on streptavidin beads after a stringent wash with 250 mM imidazole in buffer. With increasing protein incubation times the amount of immobilized and therefore chemical stable complex increases.

Figure 23:
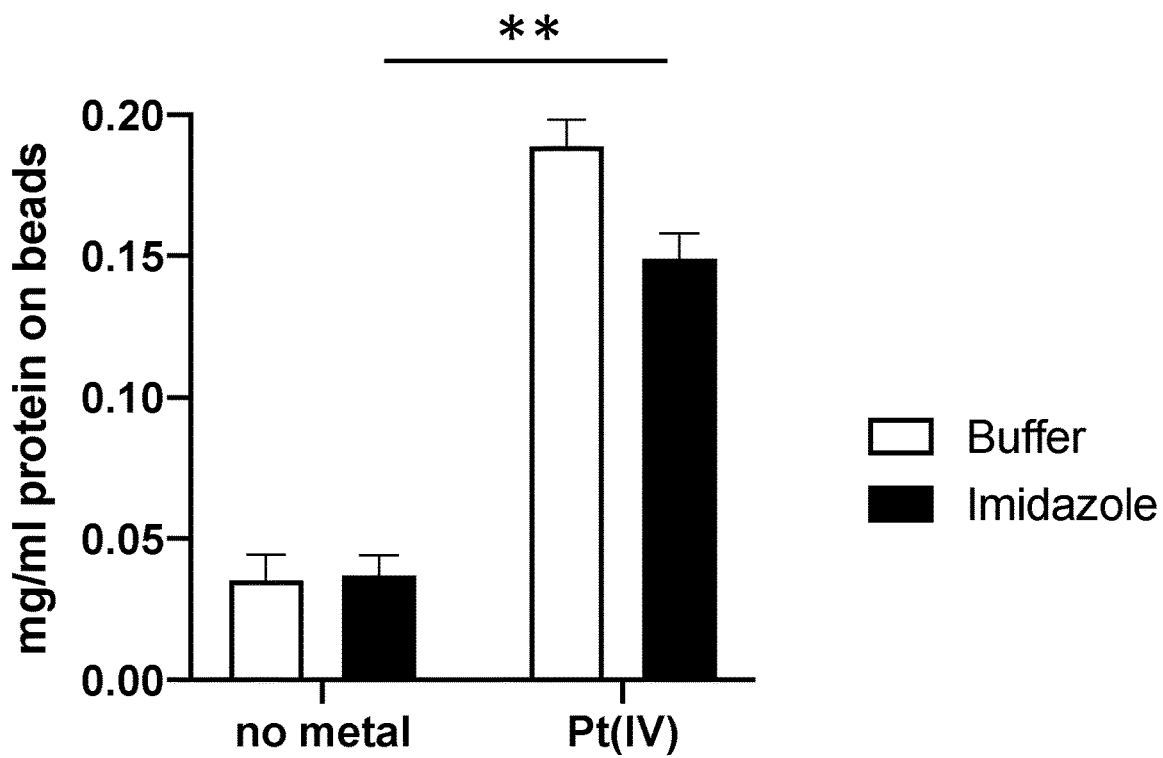

Error bars: +/−SD; p-values: <0.001: *; <0.01: ; <0.05: *; >0.05: not significant FIG. 23: His$_6$-GFP immobilization on [Pt(IV)(NTA)(NO$_3$)] functionalized beads NTA-functionalized agarose beads were incubated for 10 min with platinum(IV) nitrate followed by an incubation for 30 min with His$_6$-GFP. Chemical stability of the formed [Pt(IV)(NTA)(His$_6$-GFP)] complex was challenged with 250 mM imidazole and immobilized protein on beads was determined by BCA assay. The stable immobilization of a significant amount of protein via [Pt(IV)(NTA)(NO$_3$)] complexes could be demonstrated. Additionally, the usage of the metal binding ligand nitrate enabled a facile and fast protein binding to the complex. Error bars: +/−SD; p-values: <0.001: *; <0.01: ; <0.05: *; >0.05: not significant

EXAMPLES

Example 1: Comparison of the Chemical Stability of the [Co(II)(NTA)(His$_6$-GFP)] and the [Co(III)(NTA)(His$_6$-GFP)] Complexes Aliquots of beads with immobilized [Co(II)(NTA)(His$_6$-GFP)] and [Co(III)(NTA)(His$_6$-GFP)] were incubated with either strong chelators or with widely used reducing agents in combination with 250 mM imidazole to demonstrate that Co$^{3+}$ based complexes are superior to commonly used Ni$^{2+}$ or Co$^{2+}$ based complexes regarding chemical stability.

His$_6$-GFP (SEQ ID NO: 14) was expressed in E. coli BL21(DE3) using the plasmid pET His$_6$ GFP TEV LIC (Addgene #29663) (Pedelacq et al. 2006) and purified via Ni$^{2+}$-NTA-beads as described by Wegner and Spatz (Wegner and Spatz, 2013).

Ni$^{2+}$-NTA agarose resin (Novagen) was washed 1) with 9 bead volumes ddH$_2$O, 2) with 3 bead volumes 0.1 M EDTA pH 7.5, 3) thrice with 9 bead volumes buffer A (50 mM Tris-HCl pH 7.4, 300 mM NaCl), 4) with 1.5 bead volumes 0.1 M CoCl$_2$*6H$_2$O 5) with 9 bead volumes buffer B (bufferA with 250 mM imidazole) and 6) thrice with 9 bead volumes buffer A. Finally, His$_6$-GFP was loaded on the beads by incubating them in one bead volume of 10 μM His$_6$-GFP in buffer A. Between each step the bead slurry was centrifuged for 1 min at 300 g and the supernatant was decanted. To obtain [Co(III)(NTA)(His$_6$-GFP)] complexes the beads with immobilized His$_6$-GFP on Co$^{2+}$-NTA were incubated for 1 h at room temperature in buffer A with 20 mM H$_2$O$_2$ (the beads later used as control containing Co$^{2+}$ were incubated in buffer A without H$_2$O$_2$). Subsequently, after washing the beads several times with buffer A, beads were resuspended in 2 bead volumes buffer A and distributed in 150 μl aliquots for the stability experiment. Finally, 50 μl of each test reagent (final concentrations: chelators: 250 mM imidazole, 25 mM NTA, 25 mM EDTA; reducing agents (cysteamine, DTT, TCEP, ascorbate): 1 mM supplemented with 250 mM imidazole) was added to an aliquot. Following 1 h incubation at room temperature, 100 μl supernatant was analyzed for GFP fluorescence ($\lambda_{ex}$=480 nm, $\lambda_{em}$=510 nm) using a plate reader (TECAN, infinite 2000). All experiments were performed in duplicates.

As depicted in FIG. 1 only very small amounts of eluted protein were observed upon incubation with the tested chelators or reducing agents when His$_6$-GFP was bound to Co$^{3+}$ centers. In contrast, His$_6$-GFP bound to Co$^{2+}$ beads was completely eluted under the same conditions. Thus, the [Co(III)(NTA)(His$_6$-GFP)] complex is both inert towards the disruption by strong chelators and the reduction to Co$^{2+}$.

Example 2: Oxidation of Fluorophores by Hydrogen Peroxide

The utilization of H$_2$O$_2$ to oxidize Co$^{2+}$ to Co$^{3+}$ as employed in the method described in Example 1 and as previously described in the prior art (see Wegner and Spatz, 2013) does not only harm the attached protein but can also negatively affect the functionality of NTA-conjugates such as labels or carriers. For example, the fluorescence of several fluorophores can decrease upon oxidation by H$_2$O$_2$ as shown in the following.

Fluorophore conjugates were diluted in phosphate buffered saline (PBS) (Thermo; 18912014) (final concentrations: 5 μg/ml fluorescein (Riedel de Haen; 28802); 185 μg/ml Alexa488 coupled antibody (Invitrogen; A11039); 9 μg/ml FITC coupled antibody (Thermo; MA1-81891); 5 μM atto488 coupled $Ni^{2+}$-NTA (Sigma; 39625)) and 100 µl of each fluorophore solution was incubated for about 21 h with 0.05% $H_2O_2$ followed by another 22 h in 1% $H_2O_2$ in a black 96 well plate. Fluorescence intensity ($\lambda_{ex}$=490 nm, $\lambda_{em}$=535 nm) was measured every 15 min (0.05% $H_2O_2$) or 30 min (1% $H_2O_2$) on a plate reader (TECAN; Spark).

The fluorescence measurements depicted in FIG. 3 illustrate that all analysed fluorophores showed a pronounced decrease in fluorescence intensity upon incubation with $H_2O_2$.

Example 3: Protein Degradation and His-Tag Cleavage During Cobalt Oxidation by $H_2O_2$ The utilization of $H_2O_2$ to oxidize $Co^{2+}$ to $Co^{3+}$ as employed in the method described in Example 1 and as previously described by Wegner and Spatz (Wegner and Spatz 2013) can spontaneously provoke a Fenton-like reaction (Hanna, Kadiiska et al. 1992), which can lead to protein degradation and cleavage of the histidine residue (Davies 1987, Stadtman 1990) as demonstrated in an anti-His-tag Western Blot.

The fluorescent protein PercevalHR (SEQ ID NO: 15) was expressed in *E. coli* DH5α using the plasmid pRsetB-PercevalHR (Addgene #49081) (Tantama et al. 2013)) and purified via a $Ni^{2+}$-NTA column as described in (Tantama et al. 2013).

3.3 µM Hiss-tagged PercevalHR protein was mixed with 33 µM $CoCl_2*6H_2O$ in protein buffer (50 mM Tris pH7.4, 150 mM NaCl) and incubated for 2 min at room temperature. Subsequently, 20 mM $H_2O_2$ was added and the mixture was incubated for 1.5 h at 21° C. For control samples without cobalt and/or $H_2O_2$ an equivalent volume of protein buffer was used. Finally the reaction was quenched with 33 mM EDTA pH 8.0.

For Western Blot analysis the protein samples were mixed with SDS sample buffer (25 mM Tris-HCl pH 6.8, 192 mM Glycin, 0.1% (w/v) SDS, 0.002% (w/v) bromophenol blue, 100 mM DTT (final concentrations)), denatured at 70° C. for 10 min and 84 pmol of protein was loaded on a SDS-PAGE gel (7% (w/v) acrylamide-bisacrylamid (37.5:1), 375 mM Tris-HCl pH 8.8, 0.1% (w/v) SDS, 0.1 (w/v) ammoniumpersulfate, 0.1% (v/v) TEMED; run conditions: 120 V constant, Laemmli Running buffer (25 mM Tris-HCl pH 8.8, 192 mM Glycin, 0.1% (w/v) SDS)). Following protein separation, the proteins were blotted on a nitrocellulose membrane (Whatman, 10401196) and the membrane was washed for 5 min at room temperature with TBS-T (20 mM Tris-HCl pH 7.5, 150 mM NaCl, 0.1% (v/v) Tween20) and subsequently blocked for 1 h at room temperature with 5% (w/v) bovine serum albumin in TBS-T. Finally, the membrane was incubated with 200 ng/ml horse radish peroxidase labelled anti-His-tag antibody (clone H-3) (Santa Cruz, sc-8036 HRP), washed tricethrice for 10 min with TBS-T and incubated for 5 min at room temperature in luminol-based enhanced chemiluminescence horseradish peroxidase (HRP) substrate solution (Thermo, 34076). The chemoluminest signals from the His-tagged proteins were detected using a LAS3000 system (FUJIFILM).

The Western Blot in FIG. 4 demonstrates the possible protein degradation as well as spontaneous His-tag cleavage upon incubation of the protein with cobalt in combination with $H_2O_2$ by smeary and less intense protein bands.

Example 4: Synthesis of the $[Co(III)(NTA)(CO_3)]^{2-}$ Complex

In order to fully circumvent the use of $H_2O_2$ a new method was developed which employs Co(III) carbonate salts (e.g. $Na_3[Co(III)(CO_3)_3]*3H_2O$ and $K_3[Co(III)(CO_3)_3]*3H_2O$) for the formation of the [Co(III)(NTA)(His-protein)] complex. The complex formation process is schematically depicted in FIG. 2C. In a first step the Co(III) salt is incubated with NTA to form $[Co(III)(NTA)CO_3]^{2-}$. Proton magnetic resonance spectroscopy ($^1$H-NMR) was applied to demonstrate the successful formation of the $[Co(III)(NTA)CO_3]^{2-}$ complex.

Synthesis of Sodium tris-carbonatocobalte(III) trihydrate.

Sodium tris-carbonatocobalte(III) trihydrate ($Na_3$[Co(III)$(CO_3)_3$]$3H_2O$) was synthesized as described by Bauer and Drinkard (Bauer and Drinkard 1960). Briefly, a mixture of 0.1 mole (29.1 g) of $Co(II)(NO_3)*6H_2O$ (Sigma; 1.02554) in 50 ml dd$H_2O$ and 10 ml of 30% hydrogen peroxide (Riedel-de Haen; 18312) was added dropwise with stirring to an ice-cold slurry of 0.5 mole(=42.0 g) sodium bicarbonate (Merck; 1.06329) in 50 ml dd$H_2O$. The mixture was incubated on ice with continuous stirring for 1 h. Subsequently, the olive product was filtered and washed thrice with each of cold water, absolute ethanol and dry ether. Finally, the product was dried overnight under vacuum and stored at −20° C. in nitrogen atmosphere.

Synthesis of Potassium tris-carbonatocobalte(III) trihydrate.

Potassium tris-carbonatocobalte(III) trihydrate ($K_3$[Co(III)$(CO_3)_3$]$3H_2O$) was synthesized in solution as described by Shibata (Shibata 1983; adaptation of Mori et al. 1956). Briefly, a mixture of 0.1 mole (24 g) of $Co(II)Cl_2*6H_2O$ (Honeywell; 255599) in 24 ml dd$H_2O$ and 40 ml of 30% hydrogen peroxide was added dropwise with stirring to an ice-cold slurry of 0.7 mole (70 g) potassium bicarbonate (Honeywell; 237205) in 70 ml dd$H_2O$. Subsequently, the resulting green solution is filtered by suction and directly used for following experiments.

Preparation of the $[Co(III)(NTA)(CO_3)]^{2-}$ Complex

In order to produce the $[Co(III)(NTA)(CO_3)]^{2-}$ complex from the sodium salt, 580 µmole (210 mg) $Na_3$[Co(III)$(CO_3)_3$]*$3H_2O$ was added to 2 ml of 1 M sodium bicarbonate and 2 M nitrilotriacetic acid trisodium salt (Sigma; N0253) in dd$H_2O$ and the slurry was sonicated for 30 min. Following an incubation of 72 h at 70° C., 3 ml of 1 M sodium bicarbonate were added to the now pinkish slurry and the mixture was sonicated for 2 h at 70° C. Subsequently, the violet supernatant was submitted to NMR analysis. For complexes produced from potassium salt, $K_3$[Co(III)$(CO_3)_3$]*$3H_2O$ was synthesized in solution from 0.1 mole $CoCl_2*6H_2O$ (see above) and subsequently 0.1 mole nitrilotriacetic acid trisodium salt (25.7 g) was added with 60 ml dd$H_2O$ as described in (Shibata 1983). After 3 h of incubation under continuous stirring at 60° C., the resulting violet solution was filtered and the pH was adjusted with aqueous acetic acid to pH 7.3. Finally, the solution was incubated over night at 4° C., cleared from the white precipitate and submitted to NMR analysis. To obtain the complex $[Co(II)(NTA)(D_2O)]^-$ a mixture of 5 mM nitrilotriacetic acid (Sigma; 72559) and 5 mM $CoCl_2*6H_2O$ was produced from stock solutions in $D_2O$ and incubated for 15 min at room temperature prior to NMR measurement. To dissolve the nitrilotriacetic acid in $D_2O$ (Carl Roth; HN81.3) a small volume of 10 M NaOH was added to the corresponding stock solution. For the measurement of pure NTA a 5 mM solution in $D_2O$ was prepared from a stock solution prepared as described above. The $^1$H-NMR spectra were measured at room temperature on a Jeol ECZ400S spectrometer at a resonance frequency of 400 MHz. To improve the signal-to-noise ratio, up to 32 signals were added prior to the Fourier transformation. Intensities of resulting spectra were normalized at 7 ppm and all ppm values were adjusted to a water peak at 4.70 ppm.

By measuring the $H^1$-NMR spectra of pure NTA as well as its complexes with cobalt and water or carbonate ligands the formation of the $[Co(III)(NTA)CO_3]^{2-}$ complex was confirmed (FIG. 5). The spectrum of the hydrogens of pure NTA shows—beside the ubiquitous water peak at 4.70 ppm—a peak at ~3.6 ppm, which is in agreement with a simulation (3.57 ppm calculated) performed by the software NMR Predict (https://www.nmrdb.org/new_predictor/index.shtml?v=v2.103.0) (Banfi and Patiny, 2008; Castillo et al. 2011; Aires-de-Sousa et al. 2002). When NTA forms a complex with cobalt and water (here due to $H^1$-NMR measurements heavy water ($D_2O$) is used) ($[Co(II)(NTA)(D_2O)_2]^-$; FIG. 5B) or carbonate ($[Co(III)(NTA)(CO_3)]^{2-}$; Figure C+D) the original peak at ~3.6 ppm shifted to ~3.8 ppm for $D_2O$ as ligand and to ~1.9 ppm with carbonate, respectively. A similar peak shift was observed regardless of whether sodium or potassium cobalt(III) carbonate salt was used for production of the complex. The shifts of the NTA peak demonstrate that the magnetic environment of the hydrogen atoms in NTA changes as additional atoms come in close proximity to the hydrogen atoms during the complexation process. The observation of different peak shifts for complexes produced with cobalt(III) carbonate salt therefore strongly indicates the presence of a carbonate ligand instead of a water ligand in the final cobalt-NTA complex.

Example 5: Chemical Stability of the [Co(III)(NTA)($His_6$-PercevalHR)] Complex formed Via [Co(III)(NTA)$CO_3$]

The $[Co(III)(NTA)(CO_3)]^{2-}$ complex with NTA linked to agarose beads was incubated with the His-tagged protein PercevalHR to form [Co(III)(NTA)($His_6$-PercevalHR)] immobilized on agarose beads. Subsequently, the chemical stability of the [Co(III)(NTA)($His_6$-PercevalHR)] complex was evaluated. As control, a conventional $Ni^{2+}$-NTA based matrix was employed.

The fluorescent protein PercevalHR (SEQ ID NO: 15) was expressed in *E. coli* DH5α using the plasmid pRsetB-PercevalHR (Addgene #49081) (Tantama, Martinez-Francois et al. 2013) and purified via a $Ni^{2+}$-NTA column as described in (Tantama, Martinez-Francois et al. 2013).

NTA agarose resin (Qiagen, 1022963) was washed 1) with 10 bead volumes dd$H_2O$, 2) with 3 bead volumes 100 mM EDTA pH7.5, 3) thrice with 10 bead volumes dd$H_2O$ and subsequently 10 bead volumes 1 mM $Na_3[CO(III)(CO_3)_3]$ *3$H_2O$ or 1 mM Ni(II)$SO_4$ in 1 M NaHCO$_3$ were added. After an incubation for 48 h in a thermoshaker at 23° C. shaking at 1100 rpm, the beads were wash twice with 10 bead volumes dd$H_2O$ and once with 10 bead volumes protein buffer (50 mM Tris pH7.4, 150 mM NaCl). Finally, one bead volume of 10 μM $His_6$-PercevalHR (SEQ ID NO: 15) in protein buffer was added and incubated for 48 h at 4° C. shaking at 1100 rpm on a thermoshaker to bind the protein to the matrix. Following two washes with 10 bead volumes protein buffer, 3 bead volumes protein buffer were added and 10 μl bead slurry was analyzed for PercevalHR fluorescence ($\lambda_{ex}$=500 nm, $\lambda_{em}$=545 nm) using a plate reader (TECAN, infinite 2000). To test the stability of the complex 10 bead volumes of either 250 mM imidazole in protein buffer or protein buffer alone were added and subsequently removed by washing the beads with 10 bead volumes protein buffer. Finally, beads were resuspended in 3 bead volumes protein buffer and 10 μl of the bead slurry were analyzed for remaining fluorescence. All experiments were performed in triplicates.

As depicted in FIG. 6 the [Ni(II)(NTA)($His_6$-PercevalHR)] complexes used as control showed a low stability towards the chelator imidazole treatment. In sharp contrast, the [Co(III)(NTA)($His_6$-PercevalHR)] complexes formed via cobalt(III)carbonate salt and the [Co(III)(NTA)(CO$_3$)] pre-complex show strong stability towards imidazole. The measured stability of the complexes is similar to the [Co(III)(NTA)($His_6$-PercevalHR)] complexes produced with the indirect oxidation method (as employed in example 1). Accordingly, this data confirms that surprisingly [Co(III)(NTA)($His_6$-PercevalHR)] can be formed without an oxidation step at high efficiency by using a $[Co(III)(NTA)(CO_3)]^{2-}$ pre-complex.

Example 6: Binding Kinetics of $His_6$-GFP to $[Co(M)(NTA)CO_3]^{2-}$

Example 4 documents that a $[Co(III)(NTA)CO_3]^{2-}$ complex can be formed. Further, Example 5 indicates that the $[Co(III)(NTA)CO_3]^{2-}$ complex linked to beads via NTA can be synthesized and surprisingly used to form a [Co(III)(NTA)(His-protein)] complexes on beads. We speculated that the carbonate as ligand at the cobalt(III) center may facilitate the formation of the [Co$^{III}$(NTA)(His-protein)] complex. To confirm this finding, the binding efficacy of $His_6$-GFP to $[Co(III)(NTA)(H_2O)_2]$ and to $[Co(III)(NTA)(CO_3)]^{2-}$ was directly compared.

Functionalization of NTA Agarose Beads

NTA agarose resin (Qiagen, 1022963) was washed 1) with 10 bead volumes dd$H_2O$, 2) with 10 bead volumes 100 mM EDTA pH7.5, 3) twice with 10 bead volumes dd$H_2O$ and once with 6.7 bead volumes dd$H_2O$ for [Co(II)(NTA)($H_2O)_2$]$^-$ and [Co(III)(NTA)($H_2O)_2$] complexes or twice with 10 bead volumes dd$H_2O$ and once with 6.7 bead volumes 1 M NaHCO$_3$ for $[Co(III)(NTA)(CO_3)]^{2-}$ complexes, respectively. Subsequently 8.7 bead volumes 1 mM Co(II)$Cl_2$*6$H_2O$ in dd$H_2O$ (for [Co(II)(NTA)($H_2O)_2$] and [Co(III)(NTA)($H_2O)_2$] complexes) or 1 mM $Na_3[CO(III)(CO_3)_3]$3$H_2O$ in 1 M NaHCO$_3$ (for $[Co(III)(NTA)(CO_3)]^{2-}$ complexes) were added. After incubating for 18 h in a thermoshaker at 25° C. at 1100 rpm the beads were washed with 6.7 bead volumes of protein buffer (50 mM Tris-HCl pH 7.4, 300 mM NaCl) (for [Co(II)(NTA)($H_2O)2$]$^-$, [Co(III)(NTA)($H_2O)_2$] complexes and one sample of $[Co(III)(NTA)(CO_3)]^{2-}$ complexes) or 1 M NaHCO$_3$ (for one sample of $[Co(III)(NTA)(CO_3)]^{2-}$ complexes referred to as "[Co(III)(NTA)(CO$_3$)] in 1M NaHCO$_3$" in FIG. 7), respectively. For samples with final [Co(III)(NTA)($H_2O)_2$] complexes the second wash was performed with 6.7 bead volumes of 20 mM $H_2O_2$ in dd$H_2O$ and incubated for 1 h at 25° C. on a thermoshaker (1100 rpm).

Binding kinetics of $His_6$-GFP to the Functionalized NTA Agarose Beads

The produced beads were incubated with 3.3 bead volumes of 20 μM $His_6$-GFP (SEQ ID NO: 14) in protein buffer (50 mM Tris-HCl pH 7.4, 300 mM NaCl) and incubated at 4° C. shaking at 1100 rpm on a thermoshaker. For one sample of the $[Co(III)(NTA)(CO_3)]^{2-}$ (referred to as "[Co(III)(NTA)(CO$_3$)] in 1M NaHCO$_3$" in FIG. 7), 1 M NaHCO$_3$ was used instead of protein buffer. Fraction of unbound protein was analyzed by measuring the fluorescence intensity ($\lambda_{ex}$=490 nm, $\lambda_{em}$=535 nm) of 100 μl supernatant in a plate reader (TECAN, Spark) at various time points.

Chemical Stability of the [Co(III)(NTA)(His$_6$-GFP)] Complex

After the incubation of functionalized beads with His$_6$-GFP (SEQ ID NO: 14), as described above, was terminated, the amount of protein bound to the beads was analyzed. To this end, beads were washed thrice with 6.7 bead volumes protein buffer, resuspended in 6.7 bead volumes protein buffer and finally 100 µl bead slurry were analyzed for GFP fluorescence ($\lambda_{ex}$=490 nm, $\lambda_{em}$=535 nm) using a plate reader (TECAN, Spark). To test the stability of the complex 1.7 bead volumes of 1.25 M imidazole in protein buffer (final concentration 250 mM) were added and incubated for 10 min at 25° C. at 1100 rpm on a thermoshaker following three bead washes with 6.7 bead volumes of protein buffer. Finally, beads were resuspended in 6.7 bead volumes protein buffer and 100 µl bead slurry was analyzed for remaining fluorescence. All experiments were performed in triplicates.

The results of these experiments clearly demonstrate that the Co$^{3+}$ complexes with an associated carbonate molecule bind the protein significantly faster than complexes in which water molecules are bound to Co$^{3+}$ (FIG. 7A). Consistently, beads functionalized with [Co(III)(NTA)(CO$_3$)]$^{2-}$ complexes bind significantly more protein than beads preloaded with [Co(III)(NTA)(H$_2$O)$_2$] (FIG. 7B). In addition, FIG. 7B again confirms that [Co(III)(NTA)(His$_6$-GFP)] complexes show a strong stability towards chelators (here imidazole).

The experiments further indicate that washing the bead-attached [Co(III)(NTA)(CO$_3$)]$^{2-}$ with 1M NaHCO$_3$ prior to protein binding further facilitates His$_6$-GFP binding. Without being bound by theory, it is believed that the presence of HCO$_3^-$ and/or CO$^{2-}$ in the buffer prevents conversion of [Co(III)(NTA)(CO$_3$)]$^{2-}$ complexes into the slower enhancing [Co(III)(NTA)(H$_2$O)$_2$] complexes. While in the present experiment His-protein binding was performed also in presence of 1M NaHCO$_3$ for the "[Co(III)(NTA)(CO$_3$)] in 1M NaHCO$_3$" sample (see above), it is envisaged that the presence of 1M NaHCO$_3$ during the protein binding, if at all, only contributes to a very small degree. This is because during protein binding it is desired that the carbonate ligand is released from the Co$^{2+}$ complex which may be rather hindered than facilitated by the presence of 1M NaHCO$_3$.

Example 7: Binding Kinetics of a His-Tagged Protein to [Co(M)(NTA)(CO$_3$)]$^{2-}$ in Different Buffer Systems It was determined whether the formation of the [Co(III)(NTA)(His-Protein)] complex can be improved by changing the composition of the reaction buffer.

The beads functionalized with [Co(III)(NTA)(CO$_3$)]$^{2-}$ were prepared as described in Example 6 with small modifications: Bead washing steps 1) to 3) were performed with 5 bead volumes of the corresponding solutions. In 3) the second and third washing step were done with 1 M NaHCO$_3$. The metal was loaded in 6.5 bead volumes. After metal binding the beads were washed with 5 bead volumes 1 M NaHCO$_3$.

The incubation with His-tagged GFP (SEQ ID NO: 14) was also performed as described in Example 6 except that 5 bead volumes of 10 µM protein solution were used and that the protein buffer was adapted by replacing 50 mM Tris pH7.4 with either 50 mM Bis-Tris pH6.0, 50 mM HEPES pH7.0, 50 mM MES pH6.0 or 50 mM Tris-HCl pH7.5. Additionally, the first 24 hours of protein incubation were performed at room temperature instead of 4° C.

The experiments demonstrated that the reaction speed and efficacy could be significantly improved when Tris based buffers are replaced by HEPES or especially non-coordinating buffers such as MES or BisTris based buffers. After 24 hours of incubation 95% of all protein was immobilized on the beads when using MES and BisTris based buffers compared to 75% with Tris based buffer (FIG. 8A). Further, comparing the results of FIGS. 7A and 8A, indicates that the increase of the temperature for the first 24 h of protein incubation and/or washing with 1M NaHCO$_3$ facilitates His-protein coordination. After already three hours of incubation about 80% of the protein could be bound to beads when using MES or BisTris based buffers. By contrast in Tris based buffer less than 50% of the protein got immobilized on the beads. It was demonstrated that it is possible to coordinate His-tagged proteins with the [Co(III)(NTA)(CO$_3$)]$^{2-}$ complex with very high efficacy in reasonable time scales.

It is of note that the pH values indicated for the different protein buffers indicate the pH before adding the solution to the beads. Due to residual NaHCO$_3$ from the second washing step remaining on the beads, the pH in all samples was 8.5 to 9 (as verified by pH measurement) during incubation with the protein. Accordingly, due to the very similar pH values in all buffer solutions the experiments clearly demonstrate that the buffer substance per se has an influence on the His-protein binding. The observed better performance of the good buffers MES and BisTris relative to Tris buffer suggests that using Good buffers which cannot form complexes with Co$^{3+}$ is advantageous vis-à-vis the use of buffers which can form such complex, such as Tris buffer.

Example 8: UV-Vis Analysis of [Co(III)(NTA)(CO$_3$)]$^{2-}$

Example 4 documents that a [Co(III)(NTA)(CO$_3$)]$^{2-}$ complex can be formed by NMR. In the following examples the formation of the [Co(III)(NTA)CO$_3$]$^{2-}$ complex is proven by another technique, namely the absorbance measurement by UV-Vis.

Preparation of Co(III)(NTA)(CO$_3$)]$^{2-}$ Complex:

In order to produce the [Co(III)(NTA)(CO$_3$)]$^{2-}$ complex a solution of 1 mM Na$_3$[CO(III)(CO$_3$)$_3$]*3H$_2$O in 1 M NaHCO$_3$ by dissolving the salt in the solution with 1 h of sonication followed by a filtration step through a 0.22 µm filter is prepared. Subsequently, a mixture of 0.95 mM of the Na$_3$[CO(III)(CO$_3$)$_3$]*3H$_2$O in 1 M NaHCO$_3$ solution and 0.95 mM NTA trisodium salt (Sigma; N0253) dissolved in ddH$_2$O is prepared in 1 M NaHCO$_3$. Following an incubation of 1 h at 25° C., the visible absorbance of the light violet solution was measured in 1 cm cuvettes (Brand; 759150) on a UV-Vis-NIR Spectrophotometer (Cary5000).

Preparation of Co(III)(NTA)(H$_2$O)$_2$] Complex:

In order to produce the [Co(III)(NTA)(H$_2$O)$_2$] complex a mixture of 0.95 mM Co(II)Cl$_2$*6H$_2$O, 0.95 mM NTA trisodium salt (Sigma; N0253) and 20 mM H$_2$O$_2$ is prepared in ddH$_2$O. Following an incubation of 24 h at 25° C., the visible absorbance of the light violet solution was measured in 1 cm cuvettes (Brand; 759150) on a UV-Vis-NIR Spectrophotometer (Cary5000) against a blank with ddH$_2$O.

The results in FIG. 9 clearly demonstrate the coordination of carbonate as metal binding ligand in the [Co(III)(NTA)(CO$_3$)]$^{2-}$ complex by a shift of the two peaks from 402 nm for the [Co(III)(NTA)(H$_2$O)$_2$] complex to 390 nm for the [Co(III)(NTA)(CO$_3$)]$^{2-}$ complex or from 567 nm to 573 nm, respectively.

Example 9: His$_6$-GFP Coordination to [Co(III)(NTA)(CO$_3$)]$^{2-}$ and Stability of the Formed [Co(III)(NTA)(His-GFP)] Complex After Different Incubations Times and Temperatures of Na$_3$[Co(M)(CO$_3$)$_3$]*3H$_2$O with NTA Example 4 documents that a [Co(III)(NTA)CO$_3$]$^{2-}$ complex can be formed by the incubation of NTA with Na$_3$[Co(III)(CO$_3$)$_3$]*3H$_2$O. In the following example the effect of different incubation times and temperatures of Na$_3$[Co(III)(CO$_3$)$_3$]*3H$_2$O with NTA on His$_6$-GFP coordination to the resulting [Co(III)(NTA)(CO$_3$)]$^{2-}$ complexes as well as the chemical stability of the final Co(III)(NTA)(His-GFP)] complexes towards imidazole is investigated.

Functionalization of NTA Agarose Beads

NTA functionalized agarose beads (Qiagen; 1022963) were washed 1) with 27 bead volumes ddH$_2$O, 2) with 27 bead volumes 100 mM EDTA pH8.0, 3) once with 27 bead volumes ddH$_2$O and twice with 27 bead volumes 1 M NaHCO$_3$. Subsequently 16 bead volumes 1 mM Na$_3$[Co(III)(CO$_3$)$_3$]3H$_2$O in 1 M NaHCO$_3$ was added and beads were incubated at 4° C., 25° C. or 70° C. for 1 min, 10 min, 30 min, 1 h, 24 h or 48 h as indicated in a thermo shaker at 1400 rpm. After the incubation the beads were washed twice with 16 bead volumes of 1 M NaHCO$_3$.

Immobilization of His$_6$-GFP to Functionalized [CIII)(NTA)(CO$_3$)]$^{2-}$ Agarose Beads The produced beads were incubated with 12 bead volumes of 10 μM His$_6$-GFP (SEQ ID NO: 14) in protein buffer (50 mM HEPES pH 7.2, 150 mM NaCl) and incubated at 25° C. shaking at 1400 rpm on a thermo shaker for 48 h. After the incubation of functionalized beads with His$_6$-GFP (SEQ ID NO: 14), beads were washed once with 16 bead volumes protein buffer and resuspended in 16 bead volumes protein buffer.

Chemical Stability of the [Co(III)(NTA)(His$_6$-GFP)] Complex

After the indicated [Co(III)(NTA)(His-GFP)] complex formation processes were performed, the amount of protein bound to the beads with and without chemical stress was analyzed. To this end, beads were splitted in two portions (each 7.2 bead volumes) and washed once either with 17.8 bead volumes protein buffer or 250 mM imidazole in protein binding buffer, respectively.

After a final wash with 17.8 bead volumes protein buffer, beads were resuspended in 17.8 bead volumes protein buffer. Immobilized protein amount on 25 μl beads slurry was determined by BCA assay (Thermo, 23227) in microplate based on the manufacturer's guidelines. The experiment were performed in triplicates.

The results of these experiments shown in FIG. 10 clearly demonstrate that there is a positive correlation of the incubation times of Na$_3$[Co(III)(CO$_3$)$_3$]*3H$_2$O and NTA with the amount of immobilized His-GFP on the agarose beads after buffer as well as imidazole treatment when the protein was incubated for such a long period as 48 h. For incubations at 70° C. the reaction seems to reach its saturation point already after 1 min as Na$_3$[Co(III)(CO$_3$)$_3$]*3H$_2$O coordination to NTA is unsurprisingly accelerated at higher temperatures. Additionally, for incubations performed at 4° C. and 25° C. as depicted in FIGS. 10A and B the incubation times correlate positively with the complex stability. For incubations at 25° C. high complex stability is already reached at 10 min Na$_3$[Co(III)(CO$_3$)$_3$]*3H$_2$O/NTA incubation, while for 4° C. incubations this stability is reached only after 24 h Na$_3$[Co(III)(CO$_3$)$_3$]*3H$_2$O/NTA incubation. It is envisaged that stable complex formation is accelerated with higher temperatures.

Example 10: Kinetics of His-Protein Binding to Beads Functionalized with [Co(III)(NTA)(CO$_3$)]$^{2-}$ at Different Temperatures In the following example protein binding to [Co(III)(NTA)(CO$_3$)]$^{2-}$ functionalized magnetic agarose beads after different His-protein incubation times and at three different temperatures as well as the stability towards imidazole of the resulting [Co(III)(NTA)(His-GFP)] complexes is examined.

Functionalization of NTA Magnetic Agarose Beads

NTA functionalized agarose beads (Thermo; 78605) were washed 1) with 26 bead volumes ddH$_2$O, 2) with 26 bead volumes 100 mM EDTA pH8.0, 3) twice with 26 bead volumes ddH$_2$O and once with 26 bead volumes 1 M NaHCO$_3$. Subsequently 160 bead volumes 1 mM Na$_3$[Co(III)(CO$_3$)$_3$]*3H$_2$O in 1 M NaHCO$_3$ or 1 M NaHCO$_3$ for samples without metal were added and beads were incubated at 25° C. for 48 h on a thermo shaker at 1400 rpm. After the incubation the beads were washed thrice with 160 bead volumes of 1 M NaHCO$_3$.

Immobilization of His$_6$-GFP to Functionalized [CoIII)(NTA)(CO$_3$)]$^{2-}$ Magnetic Agarose Beads The produced beads were incubated with 120 bead volumes of 10 μM His$_6$-GFP (SEQ ID NO: 14) in 50 mM HEPES pH7.2, 150 mM NaCl and incubated at 4, 25 or 37° C. as indicated shaking at 1400 rpm on a thermo shaker for 1 min, 10 min, 30 min, 1 h, 2 h, 3.5 h or 24 h as indicated. After the incubation of functionalized beads with His$_6$-GFP (SEQ ID NO: 14), beads were washed once with 160 bead volumes protein buffer and finally resuspended in 160 bead volumes of the corresponding washing buffer.

Chemical Stability of the [Co(III)(NTA)(His$_6$-GFP)] Complex

After the indicated [Co(III)(NTA)(His-GFP)] complex formation processes were performed, the amount of protein bound to the beads with and without chemical stress was analyzed. To this end, beads were splitted in two portions and washed once either with bead volumes protein buffer or 250 mM imidazole in protein binding buffer, respectively. After a final wash with 178 bead volumes protein buffer, beads were resuspended in 178 bead volumes protein buffer-Finally, 10 μl bead slurry was analyzed for its immobilized protein amount via GFP fluorescence ($\lambda_{ex}$=490 nm, $\lambda_{em}$=535 nm) using a plate reader (TECAN, Spark). The experiments were performed in triplicates.

As depicted in FIG. 11A the amount of immobilized protein on imidazole treated beads increases with the incubation time of His-GFP with the [Co(III)(NTA)(CO$_3$)]$^{2-}$ functionalized beads. Thereby the temperature during incubation does not effect the final yield of formed [Co(III)(NTA)(His$_6$-GFP)] complex. For all protein incubation times and temperatures a high stability of the resulting complex towards imidazole could be observed (FIG. 11B).

Example 11: [Co(III)(NTA)(His-GFP)] Complex Formation and Stability using K$_3$[Co(III)(CO$_3$)$_3$]*3H$_2$O to form [Co(III)(NTA)(CO$_3$)]$^{2-}$ Complexes Example 4 demonstrates the formation of the [Co(III)(NTA)(CO$_3$)]$^{2-}$ complex by incubating K$_3$[Co(III)(CO$_3$)$_3$]*3H$_2$O with NTA. In the following example the coordination of His-GFP to Co(III)(NTA)(CO$_3$)]$^{2-}$ complex produced with K$_3$[Co(III)(CO$_3$)$_3$]*3H$_2$O as well as the chemical stability towards imidazole of the resulting [Co(III)(NTA)(His-GFP)] complex is examined.

Functionalization of NTA Magnetic Agarose Beads

NTA functionalized magnetic agarose beads (Thermo; 78605) were washed 1) with 600 bead volumes ddH$_2$O, 2) with 600 bead volumes 100 mM EDTA pH8.0, 3) once with 600 bead volumes ddH$_2$O and twice with 600 bead volumes 1 M NaHCO$_3$. Subsequently 160 bead volumes of 1 mM K$_3$[Co(III)(CO$_3$)$_3$]*3H$_2$O in 1 M NaHCO$_3$ or only 1 M NaHCO$_3$ of samples without metal were added. K$_3$[Co(III)(CO$_3$)$_3$]*3H$_2$O was produced as described in example 4. The concentration calculation is based in the assumption of a 100% reaction efficiency of the synthesis process. After incubating the samples as indicated for 10 min or 48 h as indicated in a thermo shaker at 25° C. at 1400 rpm the beads were washed thrice with 160 bead volumes of 1 M NaHCO$_3$.

Immobilization of His$_6$-GFP to the Functionalized NTA Magnetic Beads

The produced beads were incubated with 120 bead volumes of 10 µM His$_6$-GFP (SEQ ID NO: 14) in protein buffer (50 mM HEPES pH 7.2, 150 mM NaCl) and incubated at 25° C. shaking at 1400 rpm on a thermo shaker for 1 h or 48 h as indicated. After the incubation of functionalized beads with His$_6$-GFP (SEQ ID NO: 14), beads were washed once with 160 bead volumes protein buffer and resuspended in 160 bead volumes protein buffer.

Chemical Stability of the [Co(III)(NTA)(His$_6$-GFP)] Complex

After the indicated [Co(III)(NTA)(His-GFP)] complex formation processes were performed, the amount of protein bound to the beads with and without chemical stress was analyzed. To this end, beads were splitted in two portions (each 72 bead volumes) and washed once either with 178 bead volumes protein buffer or 250 mM imidazole in protein binding buffer, respectively. After a final wash with 178 bead volumes protein buffer, beads were resuspended in 178 bead volumes protein buffer and 10 µl bead slurry was analyzed for its immobilized protein amount via GFP fluorescence ($\lambda_{ex}$=490 nm, $\lambda_{em}$=535 nm) using a plate reader (TECAN, Spark). Experiment was performed in triplicates.

Figure 12:
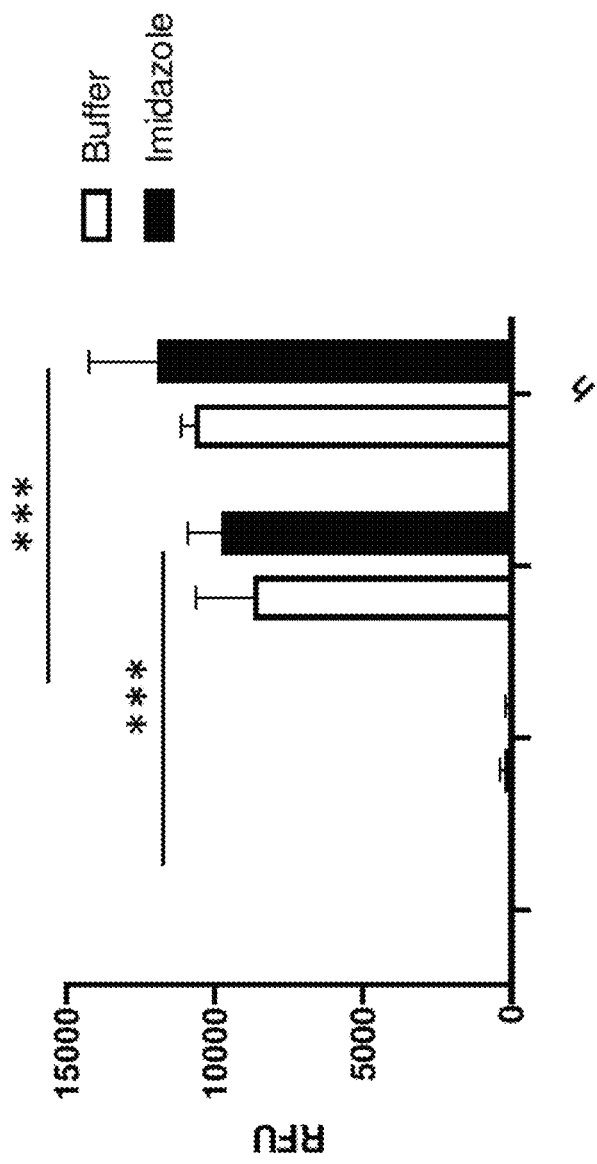

The results depicted in FIG. 12 clearly demonstrate, that His-GFP can coordinate to Co(III)(NTA)(CO$_3$)]$^{2-}$ complexes formed by the incubation of K$_3$[Co(III)(CO$_3$)$_3$]*3H$_2$O with NTA. The resulting [Co(III)(NTA)(His-GFP)] complexes show high chemical stability towards imidazole treatment. The use of K$_3$[Co(III)(CO$_3$)$_3$]*3H$_2$O offers the possibility to perform incubations with metal binding domains at higher concentration than with Na$_3$[Co(III)(CO$_3$)$_3$]*3H$_2$O as K$_3$[Co(III)(CO$_3$)$_3$]*3H$_2$O is soluble in higher concentrations.

Example 12: His$_6$-GFP Coordination to [Co(III)(NTA)(CO$_3$)]$^{2-}$ and Stability of the Formed [Co(III)(NTA)(His-GFP)] Complex in Different Protein Binding Buffers Example 7 demonstrates the effect of different buffer substances on the binding kinetics of a His-tagged protein to [Co(III)(NTA)(CO$_3$)]$^{2-}$. In the following example protein binding to [Co(III)(NTA)(CO$_3$)]$^{2-}$ functionalized magnetic agarose beads of two different Na$_3$[Co(III)(CO$_3$)$_3$]*3H$_2$O/NTA incubation times in various different buffers systems as well as the stability towards imidazole of the resulting [Co(III)(NTA)(His-GFP)] complex is examined.

Functionalization of NTA Magnetic Agarose Beads

NTA functionalized agarose beads (Thermo; 78605) were washed 1) with 182 bead volumes ddH$_2$O, 2) with 182 bead volumes 100 mM EDTA pH8.0, 3) once with 182 bead volumes ddH$_2$O and twice with 182 bead volumes 1 M NaHCO$_3$ for samples with 10 min Na$_3$[Co(III)(CO$_3$)$_3$]*3H$_2$O/NTA incubation time or twice with 182 bead volumes ddH$_2$O and once with 182 bead volumes 1 M NaHCO$_3$ for samples with 48 h Na$_3$[Co(III)(CO$_3$)$_3$]*3H$_2$O/NTA incubation time. Subsequently 160 bead volumes 1 mM Na$_3$[Co(III)(CO$_3$)$_3$]*3H$_2$O in 1 M NaHCO$_3$ or 1 M NaHCO$_3$ for samples without metal were added and beads were incubated at 25° C. for 10 min or 48 h as indicated in a thermo shaker at 1400 rpm. After the incubation the beads were washed twice for samples with 10 min Na$_3$[Co(III)(CO$_3$)$_3$]*3H$_2$O/NTA incubation time or thrice for samples with 48 h Na$_3$[Co(III)(CO$_3$)$_3$]*3H$_2$O/NTA incubation time with 160 bead volumes of 1 M NaHCO$_3$.

Immobilization of His$_6$-GFP to Functionalized [CoIII)(NTA)(CO$_3$)]$^{2-}$ Magnetic Agarose Beads The produced beads were incubated with 120 bead volumes of 10 µM His$_6$-GFP (SEQ ID NO: 14) in either Tris-, HEPES-, MES-, MOPS-, BisTris-, ACES-, PIPES-, BES-, CAPS-, TAPS-based protein buffer (50 mM buffer pH 7.2, 150 mM NaCl) or PBS and incubated at 25° C. shaking at 1400 rpm on a thermo shaker for 1 min, 15 min, 1 h or 24 h as indicated. After the incubation of functionalized beads with His$_6$-GFP (SEQ ID NO: 14), beads were washed once with 160 bead volumes protein buffer for samples with 10 min Na$_3$[Co(III)(CO$_3$)$_3$]*3H$_2$O/NTA incubation time analysis or analysis buffer (50 mM HEPES pH 7.2, 150 mM NaCl) for samples with 48 h Na$_3$[Co(III)(CO$_3$)$_3$]*3H$_2$O/NTA incubation time and finally resuspended in 160 bead volumes of the corresponding washing buffer.

Chemical Stability of the [Co(III)(NTA)(His$_6$-GFP)] Complex

After the indicated [Co(III)(NTA)(His-GFP)] complex formation processes were performed, the amount of protein bound to the beads with and without chemical stress was analyzed. To this end, beads for samples with 48 h Na$_3$[Co(III)(CO$_3$)$_3$]*3H$_2$O/NTA incubation time were splitted in two portions (each 72 bead volumes) and washed once either with 178 bead volumes protein buffer or 250 mM imidazole in protein binding buffer, respectively. After a final wash with 178 bead volumes protein buffer, beads were resuspended in 178 bead volumes protein buffer. Immobilized protein amount on 10 µl beads slurry was analyzed via GFP fluorescence ($\lambda_{ex}$=490 nm, $\lambda_{em}$=535 nm) using a plate reader (TECAN, Spark). For samples with 10 min Na$_3$[Co(III)(CO$_3$)$_3$]*3H$_2$O/NTA incubation time beads were analysed before and after a washing treatment with first 160 bead volumes of 250 mM imidazole in protein binding buffer followed by 160 bead volumes protein binding buffer. The experiments were performed in triplicates.

The results clearly demonstrated that in with all buffer systems his-tagged protein could be immobilized to the beads in a chemically stable manner. Thereby the proportion of stable complex is higher in samples with 48 h of Na$_3$[Co(III)(CO$_3$)$_3$]*3H$_2$O/NTA incubation time (FIG. 14) compared to samples with 10 min Na$_3$[Co(III)(CO$_3$)$_3$]*3H$_2$O/NTA incubation time (FIG. 13). For all buffer systems and Na$_3$[Co(III)(CO$_3$)$_3$]*3H$_2$O/NTA incubation times the amount of immobilized protein after imidazole treatment increases with the protein incubation time. Thereby the different buffer systems have a greater influence on reaction kinetics in samples with 48 h Na$_3$[Co(III)(CO$_3$)$_3$]*3H$_2$O/NTA incubation time compared to 10 min Na$_3$[Co(III)(CO$_3$)$_3$]*3H$_2$O/NTA incubation time. It is envisaged that the usage of HEPES, MES, MOPS and PIPES buffers on samples with 48 h Na$_3$[Co(III)(CO$_3$)$_3$]*3H$_2$O/NTA incubation times results in an increased amount of stably immobilized protein on the beads at short protein incubation times (FIG. 14B-D). For longer incubation times it is envisaged (FIG. 14E) HEPES, MES, MOPS or ACES are good buffers of choice.

Example 13: Effect of pH on His$_6$-GFP Coordination to [Co(III)(NTA)(CO$_3$)]$^{2-}$ and the Stability of the Formed [Co(III)(NTA)(His-GFP)] Complex Example 7 indicates the effect of the pH of the protein binding buffer on the binding kinetics of a His-tagged protein to [Co(III)(NTA)(CO$_3$)]$^{2-}$. In the following example protein binding to [Co(III)(NTA)(CO$_3$)]$^{2-}$ functionalized magnetic agarose beads in two protein binding buffer systems with each 5 different pH values as well as the stability towards imidazole of the resulting [Co(III)(NTA)(His-GFP)] complex is examined.

Functionalization of NTA Magnetic Agarose Beads

NTA functionalized agarose beads (Thermo; 78605) were washed 1) with 26 bead volumes ddH$_2$O, 2) with 26 bead volumes 100 mM EDTA pH8.0, 3) twice with 26 bead volumes ddH$_2$O and once with 26 bead volumes 1 M NaHCO$_3$. Subsequently 160 bead volumes 1 mM Na$_3$[Co(III)(CO$_3$)$_3$]*3H$_2$O in 1 M NaHCO$_3$ or 1 M NaHCO$_3$ for samples without metal were added and beads were incubated at 25° C. 48 h in a thermo shaker at 1400 rpm. After the incubation the beads were washed thrice for samples with 48 h Na$_3$[Co(III)(CO$_3$)$_3$]*3H$_2$O/NTA incubation time with 160 bead volumes of 1 M NaHCO$_3$.

Immobilization of His-GFP to Functionalized [CoIII)(NTA)(CO$_3$)]$^{2-}$ Magnetic Agarose Beads The produced beads were mixed with 120 bead volumes of 10 μM His$_6$-GFP (SEQ ID NO: 14) in either BisTris- or HEPES-based protein buffer (50 mM buffer, 150 mM NaCl) with pH 5.5, 6.0, 6.5, 7.0 or 7.5 for the BisTris-based system and pH 7.5, 8.0, 8.5, 9.0 or 9.5 for the HEPES-based systems and incubated at 25° C. shaking at 1400 rpm on a thermo shaker for 1 min, 15 min, 1 h or 24 h as indicated. After the incubation of functionalized beads with His$_6$-GFP (SEQ ID NO: 14), beads were washed once with 160 bead volumes analysis buffer (50 mM HEPES pH 7.2, 150 mM NaCl) and finally resuspended in 160 bead volumes analysis buffer.

Chemical Stability of the [Co(III)(NTA)(His$_6$-GFP)] Complex

After the indicated [Co(III)(NTA)(His-GFP)] complex formation processes were performed, the amount of protein bound to the beads with and without chemical stress was analyzed. To this end, beads were splitted in two portions (each 72 bead volumes) and washed once either with 178 bead volumes protein buffer or 250 mM imidazole in protein binding buffer, respectively. After a final wash with 178 bead volumes protein buffer, beads were resuspended in 178 bead volumes protein buffer. 10 μl bead slurry was analyzed for its immobilized protein amount via GFP fluorescence ($\lambda_{ex}$=490 nm, $\lambda_{em}$=535 nm) using a plate reader (TECAN, Spark). The experiments were performed in triplicates.

The results clearly demonstrated that in at all pH values his-tagged protein could be immobilized to the beads in a chemically stable manner. Thereby a high percentage of His-GFP could be immobilized in a chemically stable manner and the amount of immobilized protein before and after imidazole treatment increases with the protein incubation time (FIG. 15A). The complex formation efficiency of the final [Co(III)(NTA)(His-GFP)] complex are dramatically increased with protein binding buffers at lower pH values (FIG. 15B). Thereby not only efficiency differences based on the pH, but also originating from the buffer system could be observed (pH7.5 BisTris versus HEPES).

Example 14: Immobilization of Different Proteins via their His-Tags or Histidine-Rich Regions to [Co(III)(NTA)(Co)$_3$]$^{2-}$ or [Co(III)(IDA)(Co)$_3$]$^-$ Functionalized Beads Several examples demonstrate the immobilization of His$_6$-GFP via [Co(III)(NTA)(Co)$_3$]$^{2-}$ or [Co(III)(IDA)(Co)$_3$]$^-$ to beads. In the following example the immobilization of different his-tagged proteins as well as an antibody coordinated with its histidine-rich region of his Fc part to beads is tested. Additionally, the functionality of an immobilized enzyme (sortase) and the antibody (GFP binding to immobilized anti-GFP IgG1) is investigated.

NTA functionalized magnetic agarose beads (Thermo; 78605) or IDA functionalized magnetic beads (Cube Biotech; 30805) were washed 1) with 33 bead volumes ddH$_2$O, 2) with 33 bead volumes 100 mM EDTA pH8.0, 3) once with 33 bead volumes ddH$_2$O and twice with 33 bead volumes 1 M NaHCO$_3$ for samples without metal and with cobalt center or thrice with 33 bead volumes ddH$_2$O for samples with nickel center. Subsequently 160 bead volumes 1 mM Na$_3$[Co(III)(CO$_3$)$_3$]*3H$_2$O in 1 M NaHCO$_3$ or 1 M NaHCO$_3$ for samples without metal or 1 mM NiSO$_4$ in ddH$_2$O for samples with nickel center were added and beads were incubated at 25° C. 10 min in a thermo shaker at 1400 rpm. After the incubation the beads were washed thrice with 160 bead volumes of 1 M NaHCO$_3$ or ddH$_2$O for samples with nickel center.

Immobilization of Protein to Functionalized [CoIII)(NTA/IDA)(Co$_3$)]$^{2-}$ Magnetic Agarose Beads The produced beads were mixed with 120 bead volumes of protein (10 μM His-GFP (SEQ ID NO: 14); 10 μM His-Protein A (Abcam; ab52953); 10 μM His-sortase A (SEQ ID NO: 16); 1 μM His-Human serum albumin (anti-koerperonline; ABIN2181228); 0.2 μM anti-GFP mouse IgG1 (Biolegend; 902605)) in protein binding buffer (50 mM HEPES pH7.2, 150 mM NaCl) and incubated at 25° C. shaking at 1400 rpm on a thermo shaker for 48 h or 30 min for IDA samples, respectively. After the incubation of functionalized beads with protein a sample of the protein supernatant was saved for later analysis by SDS-PAGE and beads were washed once with 160 bead volumes protein buffer and finally resuspended in 160 bead volumes analysis buffer or for antibody sample continued with GFP incubation as described in a separate part.

Chemical Stability of the [Co(III)(NTA/IDA)(Protein)] Complex

After the indicated [Co(III)(NTA/IDA)(protein)] complex formation processes were performed, the amount of protein bound to the beads after chemical stress was analyzed. To this end, beads were washed once with 178 bead volumes of 250 mM imidazole in protein binding buffer. After a final wash with 178 bead volumes protein buffer, beads were resuspended in 178 bead volumes protein buffer. Protein amount on 25 μl beads slurry was determined by BCA assay (Thermo, 23227) in microplate based on the manufacturer's guidelines.

Determination of Functionality of Sortase A Immobilized on Beads

Activity of immobilized sortase A on 20 μl beads slurry was determined with the SensoLyte® 520 Sortase A Activity Assay Kit from Anaspec (#72228) as described by the manufacturer.

GFP Binding to Immobilized α-GFP Antibody

To assess the functionality of the immobilized antibody, beads functionalized with [Co(III)(NTA/IDA)(IgG1)] were incubated for 1 h at 25° C. with 120 bead volumes of 0.54 µM GFP (without His-tag) (Abcam; ab84191) in protein binding buffer. After the incubation beads were washed once with 160 bead volumes protein buffer and finally resuspended in 160 bead volumes analysis buffer and subjected in case of samples with IDA to chemical stability determination as described above. Finally, GFP bound to the immobilized antibody was determined based on GFP fluorescence ($\lambda_{ex}$=490 nm, $\lambda_{em}$=535 nm) of 10 µl beads slurry using a plate reader (TECAN, Spark).

SDS-PAGE of Protein Supernatants

SDS-PAGE of protein supernatant after protein incubation was performed as described in example 3 except that a 12% (w/v) acrylamide-bisacrylamid (37.5:1) gel was used and that per well 6 µl of protein supernatant was loaded. Visualization of bands was performed with an Instant Blue Coomassie stain (Expedion; ISB1L).

Purification of His-Sortase

The enzyme sortase A (SEQ ID NO: 16) was expressed in *E. coli* BL21(DE3) using the plasmid pET29_eSrtA (Addgene #75144) (Chen, Don et al. 2011) and purified via a $Ni^{2+}$-NTA column as described in (Chen, Dorr et al. 2011).

The results presented in FIG. 16 clearly demonstrate that beside $His_6$-GFP also other His-tagged proteins or even antibodies via their histidine-rich region can be cleared out of the supernatant during protein binding (FIG. 16A) and finally immobilized stably on $[Co(III)(NTA)(Co)_3]^{2-}$ or $[Co(III)(IDA)(Co)_3]^{-}$ functionalized beads (FIG. 16B). Additionally it could be demonstrated that immobilized protein is still functional as e.g. the enzyme sortase A is still active (FIG. 16C) or anti-GFP antibody immobilized on NTA or IDA beads can still bind its antigen GFP.

Example 15: Complex Formation and Stability using Other Metal Binding Domains than NTA Example 4 documents that a $[Co(III)(NTA)CO_3]^{2-}$ complex can be formed. Further, Example 5 indicates that the $[Co(III)(NTA)CO_3]^{2-}$ complex linked to beads via NTA can be synthesized and surprisingly used to form a [Co(III)(NTA)(His-protein)] complexes on beads. We speculated that also other metal binding domains than NTA can be used to form [Co(III)(metal binding domain)(His-protein)] complexes. In order to test the versatility of the method complex formation with iminodiacetic acid (IDA), a tridentate metal binding domain, and TALON, a commercial tetradentate metal binding domain was examined.

Functionalization of IDA/TALON Magnetic Beads

IDA functionalized magnetic beads (Cube Biotech; 30805) or TALON functionalized magnetic agarose resin (Takara, 635636) were washed 1) with 20 bead volumes $ddH_2O$, 2) with 20 bead volumes 100 mM EDTA pH8.0, 3) twice with 20 bead volumes $ddH_2O$ and once with 20 bead volumes 1 M $NaHCO_3$. Subsequently 160 bead volumes 1 mM $Na_3[Co(III)(CO_3)_3]$*$3H_2O$ in 1 M $NaHCO_3$ or only 1 M $NaHCO_3$ for samples without metal were added. After incubating the samples as indicated for 10 min or 48 h in a thermo shaker at 25° C. at 1400 rpm the beads were washed thrice with 160 bead volumes of 1 M $NaHCO_3$.

Immobilization of $His_6$-GFP to the Functionalized IDA/TALON Magnetic Beads

The produced beads were incubated with 160 bead volumes of 10 µM $His_6$-GFP (SEQ ID NO: 14) in protein buffer (50 mM HEPES pH 7.2, 150 mM NaCl) and incubated at 25° C. shaking at 1400 rpm on a thermo shaker for 30 min, 1 h or 48 h as indicated. After the incubation of functionalized beads with $His_6$-GFP (SEQ ID NO: 14), beads were washed once with 160 bead volumes protein buffer and resuspended in 160 bead volumes protein buffer.

Chemical Stability of the [Co(III)(IDA/TALON)($His_6$-GFP)] Complex

After the indicated [Co(III)(IDA)(His-GFP)] or [Co(II)(TALON)(His-GFP)] complex formation processes were performed, the amount of protein bound to the beads with and without chemical stress was analyzed. To this end, beads were splitted in two portions (each 72 bead volumes) and washed once either with 178 bead volumes protein buffer or 250 mM imidazole in protein binding buffer, respectively. After a final wash with 178 bead volumes protein buffer, beads were resuspended in 178 bead volumes protein buffer and 10 µl bead slurry was analyzed for its immobilized protein amount via GFP fluorescence ($\lambda_{ex}$=490 nm, $\lambda_{em}$=535 nm) using a plate reader (TECAN, Spark). Both experiments were performed in triplicates.

The experiments clearly demonstrate the protein immobilization with IDA (FIG. 17A) and TALON (FIG. 17B) as metal binding domain. Therefore the cobalt(III)-mediated protein immobilization via cobalt(III) carbonate complexes is not restricted to the use of NTA as metal binding domain. Additionally, the tridentate metal binding domain IDA shows even improved characteristics such as an improved stability for short incubation times compared to (see FIG. 20B). The tetradentate metal binding domain TALON also demonstrates protein immobilization.

Example 16: Investigation of the Chemical Stability of the [Co(III)(IDA)(His-GFP)] Complex Example 1 demonstrates the chemical stability of the [Co(III)(NTA)(His-GFP)] complex. In Example 15 the formation of [Co(III)(IDA)(His-GFP)] and its stability towards imidazole is proven. In following example [Co(III)(IDA)(His-GFP)] functionalized beads were incubated with either strong chelators or with widely used reducing agents in combination with 250 mM imidazole to demonstrate that complexes of IDA with a $Co^{3+}$ metal center form chemical stabile complexes such as complex composed of NTA and $Co^{3+}$ can do as demonstrated in Example 1.

Functionalization of IDA Magnetic Beads

IDA functionalized magnetic beads (Cube Biotech; 30805) were washed 1) with 20 bead volumes $ddH_2O$, 2) with 20 bead volumes 100 mM EDTA pH8.0, 3) twice with 20 bead volumes $ddH_2O$ and once with 20 bead volumes 1 M $NaHCO_3$. Subsequently 160 bead volumes 1 mM $Na_3[Co(III)(CO_3)_3]$*$3H_2O$ in 1 M $NaHCO_3$ or 1 M $NaHCO_3$ for samples without metal were added and beads were incubated at 25° C. for 10 min in a thermo shaker at 1400 rpm. After the incubation the beads were washed thrice with 20 bead volumes of 1 M $NaHCO_3$. The produced beads were incubated with 160 bead volumes of 10 µM $His_6$-GFP (SEQ ID NO: 14) in 50 mM HEPES pH 7.2, 150 mM NaCl and incubated at 25° C. shaking at 1400 rpm on a thermo shaker for 30 min. After the incubation with $His_6$-GFP (SEQ ID NO: 14), beads were washed thrice with 160 bead volumes protein buffer.

Chemical Sstability of the [Co(III)(IDA)($His_6$-GFP)] Complex

Subsequently, 160 bead volumes of each test reagent (final concentrations: 250 mM imidazole, 25 mM NTA or 25 mM EDTA in protein buffer or 1 mM DTT, TCEP or ascorbate supplemented with 250 mM imidazole in protein buffer or 50 mM Glycin pH10.0 as indicated was added to the coresponding sample. Following 1 h incubation at 25° C. and 1400 rpm shaking, the supernatant was removed and beads were washed thrice with 160 bead volumes protein buffer and dissolved in 160 bead volumes protein buffer. Finally, 10 µl bead slurry was analyzed for its remaining immobilized protein amount via GFP fluorescence ($\lambda_{ex}$=490 nm, $\lambda_{em}$=535 nm) using a plate reader (TECAN, Spark). The experiment were performed in triplicates.

The experiments clearly demonstrates the high chemical stability of [Co(III)(IDA)(His$_6$-GFP)] complexes towards different chemicals including chelators and reducing agents. As depicted in FIG. 18 in comparison to beads treated with buffer only a very small reduction of immobilized was observed upon incubation with the tested chelators or reducing agents when His$_6$-GFP was bound to [Co(III)(IDA)(CO$_3$)] complexes. Thus, the [Co(III)(IDA)(His$_6$-GFP)] complex is both inert towards the disruption by strong chelators and the reduction to $Co^{2+}$.

Example 17: Comparison of [Co(III)(IDA)(His-GFP)] Complex Formation via [Co(III)(IDA)(CO$_3$)]$^-$ Versus [Co(III)(IDA)(H$_2$O)$_2$]$^+$ Example 4 documents that a [Co(III)(NTA)CO$_3$]$^{2-}$ complex can be formed. Further, Example 5 indicates that the [Co(III)(NTA)CO$_3$]$^{2-}$ complex linked to beads via NTA can be synthesized and surprisingly used to form a [Co(III)(NTA)(His-protein)] complexes on beads. In example 6 it is shown that the binding kinetics of His-GFP to [Co(III)(NTA)(CO$_3$)]$^{2-}$ is improved compared to the kinetics for complex formation using [Co(III)(NTA)(H$_2$O)$_2$]. In example 15 it is demonstrated IDA is as possible metal binding domain for the formation [Co(III)(IDA)(His-GFP)] complex via the [Co(III)(IDA)CO$_3$]$^-$. We speculated that the carbonate as ligand at the cobalt(III) center may facilitate also the formation of the [Co(III)(IDA)(His-protein)] complex. To confirm this finding, the complex formation efficiency of His$_6$-GFP to [Co(III)(IDA)(H$_2$O)$_2$] and to [Co(III)(IDA)(CO$_3$)]$^-$ as well as the chemical stability of the final [Co(III)(IDA)(His-GFP)] complex was directly compared.

Functionalization of IDA Magnetic Beads

IDA functionalized magnetic beads (Cube Biotech; 30805) were washed 1) with 80 bead volumes ddH$_2$O, 2) with 80 bead volumes 100 mM EDTA pH8.0, 3) twice with 80 bead volumes ddH$_2$O and once with 80 bead volumes 1 M NaHCO$_3$ for [Co(III)(IDA)(CO$_3$)]$^{2-}$ complexes or ddH$_2$O for [Co(II)(IDA)(H$_2$O)$_2$]$^-$ complexes or no metal samples, respectively.

Subsequently 160 bead volumes 1 mM Co(II)Cl$_2$*6H$_2$O in degassed ddH$_2$O (for [Co(II)(IDA)(H$_2$O)$_2$] and [Co(III)(IDA)(H$_2$O)$_2$]$^+$ samples) or 1 mM Na$_3$[Co(III)(CO$_3$)$_3$]*3H$_2$O in 1 M NaHCO$_3$ (for [Co(III)(IDA)(CO$_3$)]$^-$ complexes) were added. To samples without metal 160 bead volumes ddH$_2$O was added. After incubating for 10 min (or 48 h for indicated samples with [Co(III)(IDA)(CO$_3$)]$^-$ complex) in a thermo shaker at 25° C. at 1400 rpm the beads were washed thrice with 160 bead volumes of 1 M NaHCO$_3$ for samples with [Co(III)(IDA)(CO$_3$)]$^{2-}$ complexes or ddH$_2$O for [Co(II)(IDA)(H$_2$O)$_2$] samples or no metal samples, respectively. [Co(III)(IDA)(H$_2$O)$_2$]$^+$ were washed once with 160 bead volumes, incubation in 160 bead volumes of 20 mM H$_2$O$_2$ for 1 h at 25° C. on a thermo shaker with 1400 rpm and finally washed once with 160 bead volumes of ddH$_2$O.

Immobilization of His$_6$-GFP to the Functionalized IDA Magnetic Beads

The produced beads were incubated with 160 bead volumes of 10 µM His$_6$-GFP (SEQ ID NO: 14) in protein buffer (50 mM HEPES pH 7.2, 150 mM NaCl) or PBS as indicated and incubated at 25° C. shaking at 1400 rpm on a thermo shaker for 3 h or 24 h as indicated. After the incubation of functionalized beads with His$_6$-GFP (SEQ ID NO: 14), beads were washed once with 160 bead volumes protein buffer and resuspended in 160 bead volumes protein buffer.

Chemical Stability of the [Co(III)(IDA)(His$_6$-GFP)] Complex

After the indicated Co(III)(IDA)(His-GFP)] complex formation processes were performed, the amount of protein bound to the beads with and without chemical stress was analyzed. To this end, beads were splitted in two portions (each 72 bead volumes) and washed once either with 178 bead volumes protein buffer or 250 mM imidazole in protein binding buffer, respectively. After a final wash with 178 bead volumes protein buffer, beads were resuspended in 178 bead volumes protein buffer and 10 µl bead slurry was analyzed for its immobilized protein amount via GFP fluorescence ($\lambda_{ex}$=490 nm, $\lambda_{em}$=535 nm) using a plate reader (TECAN, Spark). Experiment was performed in triplicates.

The results of these experiments clearly demonstrate that beads functionalized with [Co(III)(IDA)(CO$_3$)]$^-$ complexes obtained by incubating NTA and Na$_3$[Co(III)(CO$_3$)$_3$]*3H$_2$O for 10 min bind significantly more protein than beads preloaded with [Co(III)(IDA)(H$_2$O)$_2$]$^+$ (FIG. 19). For beads functionalized with [Co(III)(IDA)(CO$_3$)]$^-$ complexes obtained after 48 h of Na$_3$[Co(III)(CO$_3$)$_3$]*3H$_2$O incubation, a significant advantage over Co(III)(IDA)(H$_2$O)$_2$]$^+$ complexes is only visible after 24 h protein incubation. It is emphasized that preferred incubation times for IDA are 10 min for Na$_3$[Co(III)(CO$_3$)$_3$]*3H$_2$O/NTA and 30 min to 3 h for the subsequent protein incubation. With these incubation time combinations a significant improved immobilization efficiency to [Co(III)(IDA)(CO$_3$)]$^-$ complexes compared to [Co(III)(IDA)(H$_2$)$_2$]$^+$ is achieved. In addition, FIG. 19 again confirms that [Co(III)(IDA)(His$_6$-GFP)] complexes show a strong stability towards chelators (here imidazole).

Example 18: Comparison of [Co(III)(Metal Binding Domain)(His-GFP)] Chemically Stable Complex Formation via [Co(III)(Metal Binding Domain)(CO$_3$)]$^{2-}$ Versus Oxygen Treatment of [Co(II)(Metal Binding Domain)(His-GFP)]

Example 5 documents that a high percentage of [Co(III)(NTA)(His-protein)] complexes formed via [Co(III)(NTA)(CO$_3$)]$^{2-}$ are chemically stabile. We speculated that the [Co(III)(metal binding domain)(His-protein)] complex formation starting with [Co(III)(metal binding domain)CO$_3$]$^{2-}$ may result in an increased amount of chemically stable [Co(III)(metal binding domain)(His-protein)] complexes than the treatment of [Co(II)(metal binding domain)(His-protein)] with oxygen. To confirm this finding, the amount of formed chemically stable [Co(III)(metal binding domain)(His-protein)] complex via [Co(III)(metal binding domain)(CO$_3$)] or by 8 hours of oxygen treatment of [Co(II)(metal binding domain)(His-protein)] was directly compared using NTA or IDA as metal binding domain, respectively.

Functionalization of IDA/NTA Magnetic Agarose Beads

IDA functionalized magnetic beads (Cube Biotech; 30805) or NTA functionalized magnetic agarose resin (Thermo, 78605) were washed 1) with 80 bead volumes ddH$_2$O, 2) with 80 bead volumes 100 mM EDTA pH8.0, 3)

twice with 80 bead volumes $ddH_2O$ and once with 160 bead volumes $ddH_2O$ for $[Co(II)(IDA/NTA)(H_2O)_2]$ complexes or 1 M $NaHCO_3$ for $[Co(III)(IDA/NTA)(CO_3)]$ complexes or no metal samples, respectively. For samples involving or $[Co(II)(IDA/NTA)(H_2O)_2]$ complexes, all washes were performed with degassed, 20 min nitrogen aerated solutions as well as in tubes overlayed with nitrogen.

Subsequently 160 bead volumes 1 mM $CoCl_2*6H_2O$ in degassed, 20 min nitrogen aerated $ddH_2O$ (for $[Co(II)(IDA/NTA)(H_2O)_2]$) or 1 mM $Na_3[Co(III)(CO_3)_3]*3H_2O$ in 1 M $NaHCO_3$ (for $[Co(III)(IDA/NTA)(CO_3)]$ complexes) were added. To samples without metal 1 M $NaHCO_3$ was added. After incubating for 10 min (or 48 h for indicated samples with $[Co(III)(NTA)(CO_3)]^{2-}$ complex) in a thermo shaker at 25° C. at 1400 rpm the beads were washed thrice with 160 bead volumes of $ddH_2O$ for $[Co(II)(IDA/NTA)(H_2O)_2]$ samples or 1 M $NaHCO_3$ for samples with $[Co(III)(IDA/NTA)(CO_3)]$ complexes or no metal samples, respectively.

Immobilization of $His_6$-GFP to the Functionalized IDA/NTA Magnetic Beads

The produced beads were incubated with 120 bead volumes of 10 µM $His_6$-GFP (SEQ ID NO: 14) in protein buffer (50 mM HEPES pH 7.2, 150 mM NaCl) and incubated at 25° C. shaking at 1400 rpm on a thermo shaker for 30 min or 48 h for no metal samples or as indicated in FIG. 9. After the incubation of functionalized beads with $His_6$-GFP (SEQ ID NO: 14), beads were washed twice (sample "[Co(III)(IDA/NTA)(His-GFP)] via $H_2O_2$" only once) with 160 bead volumes protein buffer and finally 160 bead volumes protein buffer was added. One sample of $[Co(II)(IDA/NTA)(His-GFP)]$ (referred to as "[Co(III)(IDA/NTA)(His-GFP)] via $O_2$" in FIG. 20) was aerated with $O_2$ for 8 hours, while in another sample of $[Co(II)(IDA/NTA)(His-GFP)]$ (referred to as "[Co(III)(IDA/NTA)(His-GFP)] via $H_2O_2$" in FIG. 9) 6.4 bead volumes of 500 mM $H_2O_2$ (final 20 mM) were added and incubated for 1 h at 25° C. with 1400 rpm on a thermo shaker followed by a wash with 160 bead volumes protein buffer.

Chemical Stability of the $[Co(III)(IDA/NTA)(His_6\text{-GFP})]$ Complex

After the indicated Co(III)(IDA)(His-GFP)] or Co(II)(NTA)(His-GFP)] complex formation processes were performed, the amount of protein bound to the beads with and without chemical stress was analyzed. To this end, beads were washed once with 160 bead volumes protein buffer, resuspended in 160 bead volumes protein buffer, splitted in two portions (each 72 bead volumes) and washed once either with 178 bead volumes protein buffer or 250 mM imidazole in protein binding buffer, respectively. After a final wash with 178 bead volumes protein buffer, beads were resuspended in 178 bead volumes protein buffer and 10 µl bead slurry was analyzed for its immobilized protein amount via GFP fluorescence ($\lambda_{ex}$=490 nm, $\lambda_{em}$=535 nm) using a plate reader (TECAN, Spark). IDA experiments were performed in triplicates; NTA experiments in singlets in three independent experiments.

The results of these experiments as documented in FIG. 20 clearly demonstrate that significantly more $His_6$-GFP protein can be immobilized chemically stable on beads using $[Co(III)(IDA)(CO_3)]^{2-}$ complexes (FIG. 20A) and $[Co(III)(NTA)(CO_3)]^{2-}$ complexes (FIG. 20B) than when aerating beads functionalized with Co(II)(metal binding domain)(His-protein)] complexes for 8 hours with oxygen. Beside a higher percentage of stable complex, using $[Co(III)(\text{metal binding domain})(CO_3)]^{2-}$ is also faster than the oxidation method.

Example 19: Protein Immobilization via [Co(III)(HS-PEG-NTA)(CO_3)]^{2-}$ Complexes on Surfaces Several examples of this invention demonstrate the formation of [Co(III)(NTA)(His-protein)] complexes via [Co(III)(NTA)(CO_3)]^{2-}$. In this example the protein immobilization with this principle is tested on glass surfaces with nano-structured gold dots.

Production and Passivation of Nano-Structured Glass Surfaces

Nanostructured surfaces were produced by diblock-copolymer micelle nanolithography as previously described (Spatz, Mossmer et al. 2000, Roman, Martin et al. 2003, Lohmuller, Aydin et al. 2011) with an average particle spacing of 58 nm as determined by scanning electron microscopy. Briefly, 5 mg/ml of polystyrene(501)-b-poly-2-vinylpyridine(323) (Polymer Source, Canada) respectively was dissolved in o-xylene. Subsequently, tetrachloroauric acid to vinylpyridine monomer ratio of 0.5 were added to the solution and stirred for 24 hours. The solution was spin-coated on 20×20 mm N° 1 glass coverslips (Carl Roth, Germany). Afterwards, the substrates were subjected to a plasma procedure (10% $H_2$/90% Ar, 350 W, 0.4 mbar, 45 min).

To prevent non-specific adhesion of any proteins to the glass substrate in-between the gold nanostructures, the glass surfaces were passivated according to a procedure as described before (Blummel, Perschmann et al. 2007). Therefore, the nano patterned surfaces were activated in an oxygen plasma (150 W, 0.4 mbar, 10 min) and incubated at 80° C. over night in dry toluene p.a. (Acros Organics, USA) containing 0.25 mM α-methoxy-ω-trimethoxysilyl poly(ethylene glycol) (molecular weight 2000 g/mol) (Iris Biotech, Germany), 5.5 µM water and 20 mM dried trimethylamine (Acros Organics, USA) under nitrogen atmosphere. Finally, the substrates were washed thrice with ethyl acetate (Acros Organics, USA), once with methanol (VWR chemicals, USA) and dried under $N_2$ flow.

Functionalization of Surfaces with thiol-PEG-NTA

After passivation 100 µl of 0.5 mM HS—$(CH_2)_{11}$-$EG_3$-NTA (Prochimia; TH007) in 99.8% ethanol or ethanol only for "PEG only" and "PEG/GFP" sample were pipetted on each surface. Following an incubation for 1 h at room temperature surfaces were washed thrice in a $ddH_2O$ bath or for sample "[Co(III)(NTA)(His-GFP)]" in 1 M $NaHCO_3$.

Formation of [Co(III)(NTA)(His-GFP)] Complex

After functionalization the surfaces are covered with 400 µl of 1 mM $Na_3[Co(III)(CO_3)_3]*3H_2O$ in 1 M $NaHCO_3$ for sample "[Co(III)(NTA)(His-GFP)]" or $ddH_2O$ for the other samples and incubated for 10 min at room temperature. Subsequently, surfaces were washed thrice in a bath of 1 M $NaHCO_3$ for sample "[Co(III)(NTA)(His-GFP)]" or $ddH_2O$ for the other samples. Finally, 300 µl 10 µM $His_6$-GFP in protein binding buffer (50 mM HEPES pH7.2, 150 mM NaCl) were added on top of surfaces and incubated for 30 min at room temperature. After three washes in a bath of protein binding buffer, surfaces were placed in a transparent 6-well plate, covered with protein binding buffer and GFP-fluorescence ($\lambda_{ex}$=490 nm, $\lambda_{em}$=535 nm) as measure of immobilized protein on surfaces was analysed using a plate reader (TECAN, Spark).

The results of the experiment are presented in FIG. 21. Thereby a much higher fluorescent signal for the surface treated with thiol-PEG-NTA, $Na_3[Co(III)(CO_3)_3]*3H_2O$ and His-GFP could be measured compared to the other control samples showing the successful formation of the [Co(III)(NTA)(His-GFP)] complex on the surfaces.

Example 20: Site-Specific Biotinylation of His-GFP with [Co(M)(Biotin-X-NTA)(CO$_3$)] Complexes In several examples the immobilization of His-tagged proteins to beads and in example 19 to surfaces functionalized with NTA via to [Co(III)(NTA)(CO$_3$)]$^{2-}$ complexes is demonstrated. In the following example the in solution biotinylation of His-GFP at its His-tag via [Co(III)(Biotin-X-NTA)(CO$_3$)] complexes is tested.

Biotinylation of His-GFP

60 µM Biotin-X-NTA (Sigma-Aldrich; 51410) is mixed with 30 µM (sample 1:2), 60 µM (sample 1:1) or 600 µM (sample 10:1) Na$_3$[Co(III)(CO$_3$)$_3$]*3H$_2$O in 1 M NaHCO$_3$ or only 1 M NaHCO$_3$ for samples with metal and incubated for 10 min at room temperature on a rotating wheel. The resulting [Co(III)(Biotin-X-NTA)(CO$_3$)] complexes are subsequently incubated at room temperature with a solution of 6 µM His$_6$-GFP (SEQ ID NO: 14) in protein binding buffer (50 mM HEPES pH7.2, 150 mM NaCl) for 30 min or 48 h on a rotator wheel.

Immobilization of [Co(III)(Biotin-X-NTA)(His-GFP)] to Streptavidin Functionalized Sepharose After the incubation the resulting [Co(III)(Biotin-X-NTA)(His-GFP)] complexes were bound in a 30 min or 48 h as indicated incubation step with rotation at room temperature to streptavidin functionalized sepharose (GE Healthcare, 17-5113-01), which was prepared by three washes with 166 bead volumes protein binding buffer. After the incubation the beads were washed thrice with 16 bead volumes of protein binding buffer and resuspended in 16 bead volumes of protein buffer Chemical Stability of the [Co(III)(Biotin-X-NTA)(His$_6$-GFP)] Complex After the immobilization process of [Co(III)(Biotin-X-NTA)(His-GFP)] complex to the beads, the amount of protein bound to the beads with or without chemical stress was analyzed. To this end, beads were splitted in two portions and washed once either with 17 bead volumes protein buffer or 250 mM imidazole in protein binding buffer, respectively. After a final wash with 17 bead volumes protein buffer, beads were resuspended in 17 bead volumes protein buffer. Finally, 10 µl bead slurry was analyzed for its immobilized protein amount via GFP fluorescence ($\lambda_{ex}$=490 nm, $\lambda_{em}$=535 nm) using a plate reader (TECAN, Spark). The experiments were performed in triplicates.

As presented in FIG. 22A the in solution biotinylation of His-tagged GFP could be demonstrated for all Co/NTA ratios. However, with higher ratios of Biotin-X-NTA to Na$_3$[Co(III)(CO$_3$)$_3$]*3H$_2$O also a better labeling efficiency could be achieved as measured based in the fluorescence of biotinylated protein immobilized on the streptavidin beads. In FIG. 22B it is demonstrated that longer protein incubations yield in a higher amount of stable formed complex as more complex after 48 h of protein incubation is immobilized on streptavidin beads after a stringent imidazole wash as compared to samples with 10 min protein incubation.

Example 21: Complex Formation and Chemical Stability of [Pt(IV)(NTA)(His$_6$-GFP)] using Platinum(IV) Nitrate We speculated that not only the carbonate as ligand, but also nitrate at the metal center may facilitate the formation of the [(metal)(NTA)(His-protein)] complex. Additionally, we speculate that beside Co$^{3+}$ also other transition metals with low ligand exchange rates may form chemically stable [(metal)(NTA)(His-protein)] complexes. To confirm this finding, the binding efficiency of His$_6$-GFP to [Pt(IV)(NTA)(NO$_3$)] was examined.

Functionalization of NTA Agarose Beads

NTA functionalized agarose beads (Qiagen; 1022963) were washed 1) with 10 bead volumes ddH$_2$O, 2) with 10 bead volumes 100 mM EDTA pH8.0, 3) twice with 10 bead volumes ddH$_2$O and once with 10 bead volumes 1 M nitric acid. Subsequently 16 bead volumes platinum(IV) nitrate solution (44 mg/1 Pt(IV)) (Fisher Scientific; 15407817) in 1 M nitric acid or only 1 M nitric acid for samples without metal were added. After incubating the samples for 10 min in a thermo shaker at 25° C. at 1400 rpm the beads were washed thrice with 16 bead volumes of 1 M nitric acid.

Immobilization of His$_6$-GFP to functionalized [Pt(IV)(NTA)(NO$_3$)] Agarose Beads The produced beads were incubated with 16 bead volumes of 10 µM His$_6$-GFP (SEQ ID NO: 14) in protein buffer (50 mM HEPES pH 7.2, 150 mM NaCl) and incubated at 25° C. shaking at 1400 rpm on a thermo shaker for 30 min. After the incubation of functionalized beads with His$_6$-GFP (SEQ ID NO: 14), beads were washed once with 16 bead volumes protein buffer and resuspended in 16 bead volumes protein buffer.

Chemical Stability of the [Pt(IV)(NTA)(His$_6$-GFP)] Complex

After the indicated Pt(IV)(NTA)(His$_6$-GFP)] complex formation process was performed, the amount of protein bound to the beads with and without chemical stress was analyzed. To this end, beads were splitted in two portions (each 7.2 bead volumes) and washed once either with 17.8 bead volumes protein buffer or 250 mM imidazole in protein binding buffer, respectively. After a final wash with 17.8 bead volumes protein buffer, beads were resuspended in 17.8 bead volumes protein buffer. Protein amount on 25 µl beads slurry was determined by BCA assay (Thermo, 23227) in microplate based on the manufacturer's guidelines. The experiment was performed in triplicates.

The results depicted in FIG. 23 clearly demonstrate the platin(IV) mediated immobilization of His$_6$-GFP to NTA functionalized beads in a chemical stable manner. This proofs that not only cobalt(III), but also platin(IV) can form kinetically inert complexes with NTA and his-tagged protein. Additionally a very fast complex formation could be demonstrated by the use of nitrate as metal binding ligand.

The text herein above refers to the following references which are herewith incorporated herein by reference in their entirety:

Achour, B., J. Costa, R. Delgado, E. Garrigues, C. F. G. C. Geraldes, N. Korber, F. Nepveu and M. I. Prata (1998). "Triethylenetetramine-N,N,N',N'',N''',N'''-hexaacetic Acid (TTHA) and TTHA-Bis(butanamide) as Chelating Agents Relevant to Radiopharmaceutical Applications." Inorganic Chemistry 37(11): 2729-2740.

ADC_Review (2019). "What are Stable Linkers?" Journal of Antibody-Drug Conjugates.

Aebischer, N., G. Laurenczy, A. Ludi and A. E. Merbach (1993). "Monocomplex formation reactions of hexaaquaruthenium(II): a mechanistic study." Inorganic Chemistry 32(13): 2810-2814.

Aires-de-Sousa, J., M. C. Hemmer and J. Gasteiger (2002). "Prediction of 1H NMR chemical shifts using neural networks." Anal Chem 74(1): 80-90.

Alberti, E., M. Zampakou and D. Donghi (2016). "Covalent and non-covalent binding of metal complexes to RNA." J Inorg Biochem 163: 278-291.

Andberg, M., J. Jantti, S. Heilimo, P. Pihkala, A. Paananen, A. M. Koskinen, H. Soderlund and M. B. Linder (2007). "Cleavage of recombinant proteins at poly-His sequences by Co(II) and Cu(II)." Protein Sci 16(8): 1751-1761.

Arnold, F. H. (1991). "Metal-affinity separations: a new dimension in protein processing." Biotechnology (NY) 9(2): 151-156.

Banfi, D. and L. Patiny (2008). "http://www.nmrdb.org/ Resurrecting and Processing NMR Spectra On-line." Chimia 62(4): 280-281.

Bauer, H. F. and W. C. Drinkard (1960). "A General Synthesis of Cobalt (III) Complexes; A New Intermediate, Na3[Co(CO3)3]*3H20." J. Am. Chem. Soc. 82(19): 5031-5032.

Bell, P. and W. Sheldrick (2014). "Preparation and Structure of Zinc Complexes of Cysteine Derivatives". Zeitschrift fur Naturforschung B, 39(12), pp. 1732-1737

Blummel, J., N. Perschmann, D. Aydin, J. Drinjakovic, T. Surrey, M. Lopez-Garcia, H. Kessler and J. P. Spatz (2007). "Protein repellent properties of covalently attached PEG coatings on nanostructured SiO(2)-based interfaces." Biomaterials 28(32): 4739-4747.

Border, W. A., C. B. Wilson and O. Gotze (1976). "Nephritic factor: Description of a new quantitative assay and findings in glomerulonephritis." Kidney Int 10(4): 311-318.

Cal, P. M., G. J. Bernardes and P. M. Gois (2014). "Cysteine-selective reactions for antibody conjugation." Angew Chem Int Ed Engl 53(40): 10585-10587.

Caravan, P., C. Comuzzi, W. Crooks, T. J. McMurry, G. R. Choppin and S. R. Woulfe (2001). "Thermodynamic Stability and Kinetic Inertness of MS-325, a New Blood Pool Agent for Magnetic Resonance Imaging." Inorganic Chemistry 40(9): 2170-2176.

Castillo, A. M., L. Patiny and J. Wist (2011). "Fast and accurate algorithm for the simulation of NMR spectra of large spin systems." J Magn Reson 209(2): 123-130.

Chappell, L. L., D. Ma, D. E. Milenic, K. Garmestani, V. Venditto, M. P. Beitzel and M. W. Brechbiel (2003). "Synthesis and evaluation of novel bifunctional chelating agents based on 1,4,7,10-tetraazacyclododecane-N,N',N'',N'''-tetraacetic acid for radiolabeling proteins." Nucl Med Biol 30(6): 581-595.

Chen, X. and Y. W. Wu (2016). "Selective chemical labeling of proteins." Org Biomol Chem 14(24): 5417-5439.

Chen, I., B. M. Dorr and D. R. Liu (2011). "A general strategy for the evolution of bond-forming enzymes using yeast display." Proc Natl Acad Sci USA 108(28): 11399-11404.

Chin, J., S. S. Lee, K. J. Lee, S. Park and D. H. Kim (1999). "A metal complex that binds alpha-amino acids with high and predictable stereospecificity." Nature 401(6750): 254-257.

Cini, R. and G. Giogi (1987). "Purine nucleotide-metal complexes." Inorganica Chimica Acta 137(1-2): 87-90.

Clerac, R., F. A. Cotton, K. R. Dunbar, T. Lu, C. A. Murillo and X. Wang (2000). "New linear tricobalt complex of di(2-pyridyl)amide (dpa), [Co3(dpa)4(CH3CN)2][PF6]2." Inorg Chem 39(14): 3065-3070.

Cusanelli, A., U. Frey, D. T. Richens and A. E. Merbach (1996). "The Slowest Water Exchange at a Homoleptic Mononuclear Metal Center: Variable-Temperature and Variable-Pressure 170 NMR Study on [Ir(H$_2$O)6]3+." Journal of the American Chemical Society 118(22): 5265-5271.

Davies, G. and Y.-W. Hung (1976). "Carbonatocobaltate (III) complexes. Stoichiometry and kinetics of the reaction between tris(carbonato)cobaltate(III) species and pyridine in aqueous sodium bicarbonate media." Inorganic Chemistry 15(3): 704-708.

Davies, K. J. (1987). "Protein damage and degradation by oxygen radicals. I. general aspects." J Biol Chem 262(20): 9895-9901.

Dawson, P. E., T. W. Muir, I. Clark-Lewis and S. B. Kent (1994). "Synthesis of proteins by native chemical ligation." Science 266(5186): 776-779.

Deiters, A., T. A. Cropp, M. Mukherji, J. W. Chin, J. C. Anderson and P. G. Schultz (2003). "Adding amino acids with novel reactivity to the genetic code of Saccharomyces cerevisiae." J Am Chem Soc 125(39): 11782-11783.

Di Russo, J., J. L. Young, A. Balakrishnan, A. S. Benk and J. P. Spatz (2019). "NTA-Co(3+)-His6 versus NTA-Ni(2+)-His6 mediated E-Cadherin surface immobilization enhances cellular traction." Biomaterials 192: 171-178.

Dubowchik, G. M., R. A. Firestone, L. Padilla, D. Willner, S. J. Hofstead, K. Mosure, J. O. Knipe, S. J. Lasch and P. A. Trail (2002). "Cathepsin B-Labile Dipeptide Linkers for Lysosomal Release of Doxorubicin from Internalizing Immunoconjugates: Model Studies of Enzymatic Drug Release and Antigen-Specific In Vitro Anticancer Activity." Bioconjugate Chemistry 13(4): 855-869.

Dunand, F. A., L. Helm and A. E. Merbach (2003). "Solvent Exchange on Metal Ions". Advances in Inorganic Chemistry, Academic Press. 54: 1-69.

Evans, W. J. and A. G. Pierce (1982). "Interaction of Phytic Acid with the Metal Ions, Copper (II), Cobalt (II), Iron (III), Magnesium (II), and Manganese (II)." Journal of Food Science 47(3): 1014-1015.

Ferreira, C. M. H., I. S. S. Pinto, E. V. Soares and H. M. V. M. Soares (2015). "(Un)suitability of the use of pH buffers in biological, biochemical and environmental studies and their interaction with metal ions—a review." RSC Advances 5(39): 30989-31003.

Ferguson, W. J., K. I. Braunschweiger, W. R. Braunschweiger, J. R. Smith, J. J. McCormick, C. C. Wasmann, N. P. Jarvis, D. H. Bell and N. E. Good (1980). "Hydrogen ion buffers for biological research." Analytical Biochemistry 104(2): 300-310.

Fernandez-Suarez, M., H. Baruah, L. Martinez-Hernandez, K. T. Xie, J. M. Baskin, C. R. Bertozzi and A. Y. Ting (2007). "Redirecting lipoic acid ligase for cell surface protein labeling with small-molecule probes." Nat Biotechnol 25(12): 1483-1487.

Filippi, M., J. Martinelli, G. Mulas, M. Ferraretto, E. Teirlinck, M. Botta, L. Tei and E. Terreno (2014). "Dendrimersomes: a new vesicular nano-platform for MR-molecular imaging applications." Chem Commun (Camb) 50(26): 3453-3456.

Forster, A. C., J. L. McInnes, D. C. Skingle and R. H. Symons (1985). "Non-radioactive hybridization probes prepared by the chemical labelling of DNA and RNA with a novel reagent, photobiotin." Nucleic Acids Res 13(3): 745-761.

Franzreb, M., M. Siemann-Herzberg, T. J. Hobley and O. R. Thomas (2006). "Protein purification using magnetic adsorbent particles." Appl Microbiol Biotechnol 70(5): 505-516.

Gaertner, H. F. and R. E. Offord (1996). "Site-specific attachment of functionalized poly(ethylene glycol) to the amino terminus of proteins." Bioconjug Chem 7(1): 38-44.

Giandomenico, C. M., M. J. Abrams, B. A. Murrer, J. F. Vollano, M. I. Rheinheimer, S. B. Wyer, G. E. Bossard and J. D. Higgins (1995). "Carboxylation of Kinetically Inert Platinum(IV) Hydroxy Complexes. An Entr.acte.ee into Orally Active Platinum(IV) Antitumor Agents." Inorganic Chemistry 34(5): 1015-1021.

Good, N. E., G. D. Winget, W. Winter, T. N. Connolly, S. Izawa and R. M. M. Singh (1966). "Hydrogen Ion Buffers for Biological Research*." Biochemistry 5(2): 467-477.

Good, N. E. and S. Izawa (1972). [3] Hydrogen ion buffers. Methods in Enzymology, Academic Press. 24: 53-68.

Graff, L., G. Muller and D. Burnel (1995). "In vitro and in vivo comparative studies on chelation of aluminum by some polyaminocarboxylic acids." Res Commun Mol Pathol Pharmacol 88(3): 271-292.

Hale, J. E. (1995). "Irreversible, oriented immobilization of antibodies to cobalt-iminodiacetate resin for use as immunoaffinity media." Anal Biochem 231(1): 46-49.

Han, L., Q. Liu, L. Yang, T. Ye, Z. He and L. Jia (2017). "Facile Oriented Immobilization of Histidine-Tagged Proteins on Nonfouling Cobalt Polyphenolic Self-Assembly Surfaces." ACS Biomaterials Science & Engineering 3(12): 3328-3337.

Hanna, P. M., M. B. Kadiiska and R. P. Mason (1992). "Oxygen-derived free radical and active oxygen complex formation from cobalt(II) chelates in vitro." Chem Res Toxicol 5(1): 109-115.

Harju, L. and A. Ringbom (1970). "Compleximetric titrations with triethylenetetramine-hexaacetic acid." Analytica Chimica Acta 49(2): 221-230.

Harrington, J. M., M. M. Mysore and A. L. Crumbliss (2018). "The kinetics of dimethylhydroxypyridinone interactions with iron(iii) and the catalysis of iron(iii) ligand exchange reactions: implications for bacterial iron transport and combination chelation therapies." Dalton Trans 47(20): 6954-6964.

Hartley, J. A. (2011). "The development of pyrrolobenzodiazepines as antitumour agents." Expert Opin Investig Drugs 20(6): 733-744.

Hayashi, Y., C. W. Nakagawa and A. Murasugi (1986). "Unique properties of Cd-binding peptides induced in fission yeast, Schizosaccharomyces pombe." Environ Health Perspect 65: 13-19.

Helm, Elding and Merbach (1984). "Water Exchange Mechanism of Tetraaquapalladium(II). A Variable Pressure and Variable Temperature Oxygen 17 NMR Study." helvetica chimica acta 67(6): 1453-1460.

Helm and Merbach (1999). "Water exchange on metal ions: experiments and simulations." Coordination Chemistry Reviews 187(1): 151-181.

Helm, L. and A. E. Merbach (2002). "Applications of advanced experimental techniques: high pressure NMR and computer simulations." Journal of the Chemical Society, Dalton Transactions(5): 633-641.

Hnatowich, D. J., W. W. Layne and R. L. Childs (1982). "The preparation and labeling of DTPA-coupled albumin." Int J Appl Radiat Isot 33(5): 327-332.

Hnatowich, D. J., W. W. Layne, R. L. Childs, D. Lanteigne, M. A. Davis, T. W. Griffin and P. W. Doherty (1983). "Radioactive labeling of antibody: a simple and efficient method." Science 220(4597): 613-615.

Hochuli, E., H. Dobeli and A. Schacher (1987). "New metal chelate adsorbent selective for proteins and peptides containing neighbouring histidine residues." J Chromatogr 411: 177-184.

Hochuli, E., W. Bannwarth, H. Döbeli, R. Gentz and D. Stüber (1988). "Genetic Approach to Facilitate Purification of Recombinant Proteins with a Novel Metal Chelate Adsorbent." Bio/Technology 6: 1321.

House, J. E., K. A. House (2015). "Descriptive Inorganic Chemistry" 3rd edition; Academic Press, ISBN 9780128029794; Chapter 20.5.1, p 505.

Huang, Z., P. Hwang, D. S. Watson, L. Cao and F. C. Szoka, Jr. (2009). "Tris-nitrilotriacetic acids of subnanomolar affinity toward hexahistidine tagged molecules." Bioconjug Chem 20(8): 1667-1672.

Hugi-Cleary, D., L. Helm and A. E. Merbach (1987). "High pressure NMR kinetics. Part 30. Water exchange on hexaaquagallium(III): high-pressure evidence for a dissociative exchange mechanism." Journal of the American Chemical Society 109(15): 4444-4450.

Hutchens, T. W. and T. T. Yip (1992). "Synthetic metal-binding protein surface domains for metal ion-dependent interaction chromatography. II. Immobilization of synthetic metal-binding peptides from metal ion transport proteins as model bioactive protein surface domains." J Chromatogr 604(1): 133-141.

Hutschenreiter, S., L. Neumann, U. Radler, L. Schmitt and R. Tampe (2003). "Metal-chelating amino acids as building blocks for synthetic receptors sensing metal ions and histidine-tagged proteins." Chembiochem 4(12): 1340-1344.

Jain, N., S. W. Smith, S. Ghone and B. Tomczuk (2015). "Current ADC Linker Chemistry." Pharm Res 32(11): 3526-3540.

Jeffrey, S. C., J. De Brabander, J. Miyamoto and P. D. Senter (2010). "Expanded Utility of the beta-Glucuronide Linker: ADCs That Deliver Phenolic Cytotoxic Agents." ACS Med Chem Lett 1(6): 277-280.

Junker, A. K. R., G. J. P. Deblonde, R. J. Abergel and T. J. Sorensen (2018). "Investigating subtle 4f vs. 5f coordination differences using kinetically inert Eu(iii), Tb(iii), and Cm(iii) complexes of a coumarin-appended 1,4,7,10-tetraazacyclododecane-1,4,7-triacetate (DO3A) ligand." Dalton Transactions 47(21): 7362-7369.

Junutula, J. R., H. Raab, S. Clark, S. Bhakta, D. D. Leipold, S. Weir, Y. Chen, M. Simpson, S. P. Tsai, M. S. Dennis, Y. Lu, Y. G. Meng, C. Ng, J. Yang, C. C. Lee, E. Duenas, J. Gorrell, V. Katta, A. Kim, K. McDorman, K. Flagella, R. Venook, S. Ross, S. D. Spencer, W. Lee Wong, H. B. Lowman, R. Vandlen, M. X. Sliwkowski, R. H. Scheller, P. Polakis and W. Mallet (2008). "Site-specific conjugation of a cytotoxic drug to an antibody improves the therapeutic index." Nat Biotechnol 26(8): 925-932.

Kamoto, M., N. Umezawa, N. Kato and T. Higuchi (2008). "Novel probes showing specific fluorescence enhancement on binding to a hexahistidine tag." Chemistry 14(26): 8004-8012.

Kang, E., J. W. Park, S. J. McClellan, J. M. Kim, D. P. Holland, G. U. Lee, E. I. Franses, K. Park and D. H. Thompson (2007). "Specific adsorption of histidine-tagged proteins on silica surfaces modified with Ni2+/NTA-derivatized poly(ethylene glycol)." Langmuir 23(11): 6281-6288.

Kern, J. C., M. Cancilla, D. Dooney, K. Kwasnjuk, R. Zhang, M. Beaumont, I. Figueroa, S. Hsieh, L. Liang, D. Tomazela, J. Zhang, P. E. Brandish, A. Palmieri, P. Stivers, M. Cheng, G. Feng, P. Geda, S. Shah, A. Beck, D. Bresson, J. Firdos, D. Gately, N. Knudsen, A. Manibusan, P. G. Schultz, Y. Sun and R. M. Garbaccio (2016). "Discovery of Pyrophosphate Diesters as Tunable, Soluble, and Bioorthogonal Linkers for Site-Specific Antibody-Drug Conjugates." J Am Chem Soc 138(4): 1430-1445.

Kline, S. J., D. A. Betebenner and D. K. Johnson (1991). "Carboxymethyl-substituted bifunctional chelators: preparation of arylisothiocyanate derivatives of 3-(carboxymethyl)-3-azapentanedioic acid, 3,12-bis(carboxymethyl)-6, 9-dioxa-3,12-diazatetradecanedioic acid, and 1,4,7,10-tetraazacyclododecane-N,N',N'',N'''-tetraacetic acid for use as protein labels." Bioconjugate Chemistry 2(1): 26-31.

Kong, F. L., Y. Zhang, M. S. Ali, C. Oh, R. Mendez, S. Kohanim, N. Tsao, M. Chanda, W. C. Huang and D. J. Yang (2010). "Synthesis of (99m)Tc-EC-AMT as an imaging probe for amino acid transporter systems in breast cancer." Nucl Med Commun 31(8): 699-707.

Krzek, J., A. Apola, M. Stolarczyk and W. Rzeszutko (2007). "Spectrophotometric determination of Pb(II), Fe(III) and Bi(III) in complexes with 1,2-diaminocyclohexane-N,N,N',N'-tetraacetic acid (DACT)." Acta Pol Pharm 64(1): 3-8.

Lang, K., L. Davis, J. Torres-Kolbus, C. Chou, A. Deiters and J. W. Chin (2012). "Genetically encoded norbornene directs site-specific cellular protein labelling via a rapid bioorthogonal reaction." Nat Chem 4(4): 298-304.

Lin, C. W. and A. Y. Ting (2006). "Transglutaminase-catalyzed site-specific conjugation of small-molecule probes to proteins in vitro and on the surface of living cells." J Am Chem Soc 128(14): 4542-4543.

Lindhoud, S., A. H. Westphal, A. J. Visser, J. W. Borst and C. P. van Mierlo (2012). "Fluorescence of Alexa fluor dye tracks protein folding." PLoS One 7(10): e46838.

Lippard, S. J. and J. M. Berg (1994). "Principles of Bioinorganic Chemistry." University Science Books, Mill Valley CA Lohmuller, T., D. Aydin, M. Schwieder, C. Morhard, I. Louban, C. Pacholski and J. P. Spatz (2011). "Nanopatterning by block copolymer micelle nanolithography and bio-inspired applications." Biointerphases 6(1): MR1-12.

Lyon, R. P., T. D. Bovee, S. O. Doronina, P. J. Burke, J. H. Hunter, H. D. Neff-LaFord, M. Jonas, M. E. Anderson, J. R. Setter and P. D. Senter (2015). "Reducing hydrophobicity of homogeneous antibody-drug conjugates improves pharmacokinetics and therapeutic index." Nat Biotechnol 33(7): 733-735.

Livingstone, S. E. (1973). "The Chemistry of Ruthenium, Rhodium, Palladium, Osmium, Iridium and Platinum", 1st edition; Pergamon Texts in Inorganic Chemistry, Volume 25; eBook ISBN: 9781483137100 1973

Luther III, George W. (2016). "Inorganic Chemistry for Geochemistry and Environmental Sciences: Fundamentals and Applications", John Wiley & Sons, ISBN 1118851404

Martos-Maldonado, M. C., C. T. Hjuler, K. K. Sorensen, M. B. Thygesen, J. E. Rasmussen, K. Villadsen, S. R. Midtgaard, S. Kol, S. Schoffelen and K. J. Jensen (2018). "Selective N-terminal acylation of peptides and proteins with a Gly-His tag sequence." Nat Commun 9(1): 3307.

McAuliffe, C. A., J. V. Quagliano and L. M. Vallarino (1966). "Metal Complexes of the Amino Acid DL-Methionine." Inorganic Chemistry 5(11): 1996-2003.

Mitsuo, T., U. Akira, K. Eishin and T. Ryokichi (1970). "Cobalt(II) Complexes with Nitrilotriacetic Acid, Nitrilopropionicdiacetic Acid and Nitriloisopropionicdiacetic Acid." Bulletin of the Chemical Society of Japan 43(4): 1061-1065.

Mori, M., M. Shibata, E. Kyuno and T. Adachi (1956). "Studies on the Synthesis of Metal Complexes. I. Synthesis of an Ammine-carbonato Series of Cobalt(III) Complexes." Bulletin of the Chemical Society of Japan 29(8): 883-886.

Morrow, J. R. and K. O. A. Chin (1993). "Synthesis and dynamic properties of kinetically inert lanthanide compounds: lanthanum(III) and europium(III) complexes of 1,4,7,10-tetrakis(2-hydroxyethyl)-1,4,7,10-tetraazacyclododecane." Inorganic Chemistry 32(15): 3357-3361.

Okazaki, T., S. Yoshida, H. Teshima and M. Shimada (2011). "The addition of calcium ion chelator, EGTA to thawing solution improves fertilizing ability in frozen-thawed boar sperm." Anim Sci J 82(3): 412-419.

Ou, W., T. Uno, H. P. Chiu, J. Grunewald, S. E. Cellitti, T. Crossgrove, X. Hao, Q. Fan, L. L. Quinn, P. Patterson, L. Okach, D. H. Jones, S. A. Lesley, A. Brock and B. H. Geierstanger (2011). "Site-specific protein modifications through pyrroline-carboxy-lysine residues." Proc Natl Acad Sci USA 108(26): 10437-10442.

Pages, B. J., D. L. Ang, E. P. Wright and J. R. Aldrich-Wright (2015). "Metal complex interactions with DNA." Dalton Transactions 44(8): 3505-3526.

Pedelacq, J. D., Cabantous, S., Tran, T., Terwilliger, T. C., Waldo, G. S. (2006). "Engineering and characterization of a superfolder green fluorescent protein". Nat Biotechnol 24(1): 79-88

Popp, M. W., J. M. Antos, G. M. Grotenbreg, E. Spooner and H. L. Ploegh (2007). "Sortagging: a versatile method for protein labeling." Nat Chem Biol 3(11): 707-708.

Porath, J., J. Carlsson, I. Olsson and G. Belfrage (1975). "Metal chelate affinity chromatography, a new approach to protein fractionation." Nature 258(5536): 598-599.

Porath, J. and B. Olin (1983). "Immobilized metal ion affinity adsorption and immobilized metal ion affinity chromatography of biomaterials. Serum protein affinities for gel-immobilized iron and nickel ions." Biochemistry 22(7): 1621-1630.

Rahhal, S. and H. W. Richter (1988). "Reduction of hydrogen peroxide by the ferrous iron chelate of diethylenetriamine-N,N,N',N'',N''-pentaacetate." Journal of the American Chemical Society 110(10): 3126-3133.

Rizkalla, E. N., M. T. M. Zaki and M. I. Ismail (1980). "Metal chelates of phosphonate-containing ligands; Stability of some 1-Hydroxyethane-1,1-Diphosphonic acid metal chelates." Talanta 27: 715-719.

Roman, G., M. Martin and P. S. Joachim (2003). "Block copolymer micelle nanolithography." Nanotechnology 14(10): 1153.

Rusmini, F., Z. Zhong and J. Feijen (2007). "Protein immobilization strategies for protein biochips." Biomacromolecules 8(6): 1775-1789.

Saha, N. and D. Mukherjee (1984). "Metal complexes of pyrimidine-derived ligands—IV. synthesis, characterisation and coordinating properties of two guanidino pyrimidines: Ni(II) complexes with 2-guanidino-4,6-dimethyl pyrimidine and 2-phenyl guanidino-4,6-dimethyl pyrimidine—potential ligands or biological interest." Polyhedron 3(8): 983-990.

Saito, K., H. Kido and A. Nagasawa (1990). "Reactivity and reaction mechanism of acetylacetonato complexes of tervalent metal ions in solution." Coordination Chemistry Reviews 100: 427-452.

Saito, G., J. A. Swanson and K. D. Lee (2003). "Drug delivery strategy utilizing conjugation via reversible disulfide linkages: role and site of cellular reducing activities." Adv Drug Deliv Rev 55(2): 199-215.

Sajadi, S. A. A. (2010). "Metal ion-binding properties of L-glutamic acid and L-aspartic acid, a comparative investigation". Natural Science Vol. 2, No. 2, 85-90.

Shao, S., J. Geng, H. Ah Yi, S. Gogia, S. Neelamegham, A. Jacobs and J. F. Lovell (2015). "Functionalization of cobalt porphyrin-phospholipid bilayers with his-tagged ligands and antigens." Nat Chem 7(5): 438-446.

Shibata, M. (1983). "Modern Syntheses of Cobalt (III) Complexes: Versatile Uses of Tricarbonatocobaltate(III) as Starting Material." Topics in Current Chemistry 110(Chapter 2): 26-45.

Simecek, J., M. Schulz, J. Notni, J. Plutnar, V. Kubicek, J. Havlickova and P. Hermann (2012). "Complexation of metal ions with TRAP (1,4,7-triazacyclononane phosphinic acid) ligands and 1,4,7-triazacyclononane-1,4,7-triacetic acid: phosphinate-containing ligands as unique chelators for trivalent gallium." Inorg Chem 51(1): 577-590.

Sobiesciak, T. D. and P. Zielenkiewicz (2010). "Double selective synthetic approach to the N-functionalized 1,4,7-triazacyclononane derivatives: chelating compounds for controllable protein orientation." J Org Chem 75(6): 2069-2072.

Song, W. Y., D. G. Mendoza-Cozatl, Y. Lee, J. I. Schroeder, S. N. Ahn, H. S. Lee, T. Wicker and E. Martinoia (2014). "Phytochelatin-metal(loid) transport into vacuoles shows different substrate preferences in barley and Arabidopsis." Plant Cell Environ 37(5): 1192-1201.

Spatz, J. P., S. Mössmer, C. Hartmann, M. Möller, T. Herzog, M. Krieger, H.-G. Boyen, P. Ziemann and B. Kabius (2000). "Ordered Deposition of Inorganic Clusters from Micellar Block Copolymer Films." Langmuir 16(2): 407-415.

Stadtman, E. R. (1990). "Metal ion-catalyzed oxidation of proteins: biochemical mechanism and biological consequences." Free Radic Biol Med 9(4): 315-325.

Stenton, B. J., B. L. Oliveira, M. J. Matos, L. Sinatra and G. J. L. Bernardes (2018). "A thioether-directed palladium-cleavable linker for targeted bioorthogonal drug decaging." Chemical Science 9(17): 4185-4189.

Strand, J., H. Honarvar, A. Perols, A. Orlova, R. K. Selvaraju, A. E. Karlstrom and V. Tolmachev (2013). "Influence of macrocyclic chelators on the targeting properties of (68)Ga-labeled synthetic affibody molecules: comparison with (111) In-labeled counterparts." PLoS One 8(8): e70028.

Sugimori, T., K. Shibakawa, H. Masuda, A. Odani and O. Yamauchi (1993). "Ternary metal(II) complexes with tyrosine-containing dipeptides. Structures of copper(II) and palladium(II) complexes involving L-tyrosylglycine and stabilization of copper(II) complexes due to intramolecular aromatic ring stacking." Inorganic Chemistry 32(22): 4951-4959.

Sun, Y., C. J. Anderson, T. S. Pajeau, D. E. Reichert, R. D. Hancock, R. J. Motekaitis, A. E. Martell and M. J. Welch (1996). "Indium(III) and Gallium(III) Complexes of Bis (aminoethanethiol) Ligands with Different Denticities: Stabilities, Molecular Modeling, and in Vivo Behavior." Journal of Medicinal Chemistry 39(2): 458-470.

Tantama, M., J. R. Martinez-Francois, R. Mongeon and G. Yellen (2013). "Imaging energy status in live cells with a fluorescent biosensor of the intracellular ATP-to-ADP ratio." Nat Commun 4: 2550.

Taube, H. (1952). "Rates and Mechanisms of Substitution in Inorganic Complexes in Solution." Chemical Reviews 50(1): 69-126.

Tirat, A., F. Freuler, T. Stettler, L. M. Mayr and L. Leder (2006). "Evaluation of two novel tag-based labelling technologies for site-specific modification of proteins." Int J Biol Macromol 39(1-3): 66-76.

Tolcher, A. W., S. Sugarman, K. A. Gelmon, R. Cohen, M. Saleh, C. Isaacs, L. Young, D. Healey, N. Onetto and W. Slichenmyer (1999). "Randomized phase II study of BR96-doxorubicin conjugate in patients with metastatic breast cancer." J Clin Oncol 17(2): 478-484.

Tsuchikama, K. and Z. An (2018). "Antibody-drug conjugates: recent advances in conjugation and linker chemistries." Protein & Cell 9(1): 33-46.

Visser, H. G., W. Purcell and S. S. Basson (2001). "A new reaction route for the synthesis of different cobalt(III) nitrilotriacetato complexes. The crystal structure of Cs2[Co (nta)(CO$_3$)]·H2O." Polyhedron 20(3-4): 185-190.

Wegner, S. V. and J. P. Spatz (2013). "Cobalt(III) as a stable and inert mediator ion between NTA and His$_6$-tagged proteins." Angew Chem Int Ed Engl 52(29): 7593-7596.

Wegner, S. V., F. C. Schenk and J. P. Spatz (2016). "Cobalt(III)-Mediated Permanent and Stable Immobilization of Histidine-Tagged Proteins on NTA-Functionalized Surfaces." Chemistry—A European Journal 22(9): 3156-3162

Wubs, H. J. and A. A. Beenackers (1993). "Kinetics of the oxidation of ferrous chelates of EDTA and HEDTA in aqueous solution." Industrial & engineering chemistry research 32(11): 2580-2594.

Yin, J., P. D. Straight, S. M. McLoughlin, Z. Zhou, A. J. Lin, D. E. Golan, N. L. Kelleher, R. Kolter and C. T. Walsh (2005). "Genetically encoded short peptide tag for versatile protein labeling by Sfp phosphopantetheinyl transferase." Proc Natl Acad Sci USA 102(44): 15815-15820.

Yuanfang, L. and W. Chuanchu (1991). "Radiolabelling of monoclonal antibodies with metal chelates." Pure & Appl. Chem. 63(3): 427-463.

Zatloukalova, E. and Z. Kucerová (2006). "Immunoaffinity carrier prepared by immobilization of antibody via Co3+-chelate." J Sep Sci 29(8): 1082-1087.

Zhang, S., Z. Jiang, X. Wang, C. Yang and J. Shi (2015). "Facile Method To Prepare Microcapsules Inspired by Polyphenol Chemistry for Efficient Enzyme Immobilization." ACS Appl Mater Interfaces 7(35): 19570-19578.

Zhang, C., M. Welborn, T. Zhu, N. J. Yang, M. S. Santos, T. Van Voorhis and B. L. Pentelute (2016). "Pi-Clamp-mediated cysteine conjugation." Nat Chem 8(2): 120-128.

Zhao, R. Y., S. D. Wil helm, C. Audette, G. Jones, B. A. Leece, A. C. Lazar, V. S. Goldmacher, R. Singh, Y. Kovtun, W. C. Widdison, J. M. Lambert and R. V. J. Chari (2011). "Synthesis and Evaluation of Hydrophilic Linkers for Antibody—Maytansinoid Conjugates." Journal of Medicinal Chemistry 54(10): 3606-3623.

The invention claimed is:

1. A method for attaching a label and/or a carrier to a target molecule comprising the step of incubating a complex comprising:
   a) a metal cation, selected from the group consisting of $Co^{3+}$, $Rh^{3+}$, and $Ir^{3+}$;
   b) a metal cation ligand being $CO_3^{2-}$;
   c) a metal cation chelating domain comprising a chelating ligand, selected from the group consisting of nitrilotriacetic acid (NTA), iminodiacetic acid (IDA), and tris(carboxymethyl)ethylenediamine (TED); and
   d) a carrier, selected from the group consisting of a polymer, a hydrogel, a microparticle, a nanoparticle, a nanosphere, a microsphere, a bead, and a solid surface,
with a target molecule,
wherein the target molecule comprises a protein, peptide or nucleic acid that can exchange the metal cation ligand in the complex, wherein said target molecule comprises at least 4 histidine residues or histidine-like residues in a sequence $[H_nS_m]_k$, wherein His a histidine residue or a histidine-like residue, wherein S is a spacer amino acid residue, wherein n is in each case independently 1 to 4, wherein m is in each case independently 0 to 6, and wherein k is 2 to 6.

2. The method of claim 1, wherein the method further comprises washing the complex in a solution comprising $CO_3^{2-}$ before the incubation and/or wherein the incubation is performed in a solution comprising $CO_3^{2-}$.

3. The method of claim 1, wherein the incubation is performed in an aqueous solution containing one or more Good's buffer substances, Tris, phosphate and/or carbonate/bicarbonate.

4. The method of claim 1, wherein the incubation is performed in an aqueous solution containing one or more buffer substances selected from the group consisting of: ACES, AMPSO, BES, BisTris, BisTris propane, borate, CAPS, CAPSO, CHES, DIPSO, EPPS, HEPES, HEPBS, HEPPSO, MES, MOPS, MOPSO, PIPES, POPSO, TAPS, TAPSO, TEA, TES, carbonate/bicarbonate buffers, phosphate buffers and Tris.

5. The method of claim 1, wherein the incubation is performed in an aqueous solution comprising a buffer substance selected from the group consisting of: Bis-Tris, MES, HEPES and PIPES.

6. The method of claim 2, wherein the solution comprises $CO_3^{2-}$ at a concentration of at least 1 mM.

7. The method of claim 2, wherein the solution comprises $CO_3^{2-}$ at a concentration of at least 10 mM.

8. The method of claim 2, wherein the solution comprises $CO_3^{2-}$ at a concentration of at least 1 M.

9. The method of claim 1, wherein the method further comprises recovering and/or purifying the target molecule with the carrier linked thereto.

10. The method of claim 1, wherein the chelating ligand of the metal cation chelating domain of c) is:
nitrilotriacetic acid (NTA) or iminodiacetic acid (IDA).

11. The method of claim 1, wherein the metal cation is $Co^{3+}$.

12. The method of claim 1, wherein the complex comprises a $[Co(III)(NTA)CO_3]^{2-}$ complex, a $[Co(III)(IDA)CO_3]^-$ complex, or a hydrate thereof, wherein the carrier is attached to NTA or IDA.

13. The method of claim 1, wherein the label comprises a fluorophore, a diagnostic, a targeting moiety, a therapeutic agent, a PEG molecule, a lipid, biotin and/or its derivatives, proteins, peptides, a toxin, and/or a reactive group selected from a thiol, azide, alkyne, nitrone, tetrazine and tetrazole.

* * * * *